(12) United States Patent
Jiang

(10) Patent No.: US 7,912,464 B2
(45) Date of Patent: Mar. 22, 2011

(54) PROVIDING MULTIPLE MSISDN NUMBERS IN A MOBILE DEVICE WITH A SINGLE IMSI

(75) Inventor: John Yue Jun Jiang, Danville, CA (US)

(73) Assignee: Roamware Inc., San Jose, CA (US)

( * ) Notice: Subject to any disclaimer, the term of this patent is extended or adjusted under 35 U.S.C. 154(b) by 0 days.

(21) Appl. No.: 12/536,261

(22) Filed: Aug. 5, 2009

(65) Prior Publication Data
US 2010/0048197 A1     Feb. 25, 2010

Related U.S. Application Data

(63) Continuation of application No. 10/782,681, filed on Feb. 18, 2004, now Pat. No. 7,577,431.

(51) Int. Cl.
*H04W 4/00* (2009.01)

(52) U.S. Cl. .............. 455/432.1; 455/433; 455/435.1; 455/558; 455/445

(58) Field of Classification Search ............ 455/432.1, 455/433, 435.1, 558, 445
See application file for complete search history.

(56) References Cited

U.S. PATENT DOCUMENTS

| | | | |
|---|---|---|---|
| 5,353,328 A | 10/1994 | Jokimies | |
| 5,586,166 A | 12/1996 | Turban | |
| 5,742,910 A | 4/1998 | Gallant et al. | |
| 5,818,824 A | 10/1998 | Lu et al. | |
| 5,854,982 A | 12/1998 | Chambers et al. | |
| 5,901,359 A | 5/1999 | Malmstrom | |
| 5,903,832 A | 5/1999 | Seppanen et al. | |
| 5,930,701 A | 7/1999 | Skog | |
| 5,940,490 A | 8/1999 | Foster et al. | |
| 5,943,620 A | 8/1999 | Boltz et al. | |
| 5,987,318 A | 11/1999 | Alperovich et al. | |
| 5,987,325 A | 11/1999 | Tayloe | |

(Continued)

FOREIGN PATENT DOCUMENTS

CA     2281041 A1     2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner* — Barry W Taylor
(74) *Attorney, Agent, or Firm* — Arent Fox LLP

(57) ABSTRACT

A SIMM System and method is provided that supports many Mobile Subscriber Integrated Service Digital Network (MSISDN) numbers on a mobile device. The mobile device includes one Subscriber Identity Module (SIM) and one International Mobile Subscriber Identity (IMSI). The SIMM system includes at least one signal gateway that supports the use of numerous MSISDN numbers by the mobile device. The signal gateway couples among components of the public mobile networks to which the MSISDN numbers correspond. The signal gateway connects calls between the mobile device and a first public mobile network using a first MSISDN where, for example, the first public mobile network is in a first country. Likewise, the signal gateway connects calls between the mobile device and a second public mobile network using a second MSISDN where, for example, the second public mobile network is in a second country.

20 Claims, 67 Drawing Sheets

Subscriber data -

| IMSI,MSISDN -F,MSISDN -H, FTN-no-change flag MSISDN -F # forward on call flag RCM flag etc |
|---|

Roaming info –

| IMSI,MSISDN -F,MSISDN -H, VMSC, VLR, FTN,FTN -F, camel, GPRS, date/time, GT of SG etc |
|---|

Roaming info history

| IMSI,MSISDN -F,MSISDN -H, VMSC, VLR, FTN, camel, GPRS, date/time, GT of SG etc |
|---|

Optimal Routing DB –

| MSISDN -F, Destination VMSC, Origination GMSC |
|---|

Call Context –

| IMSI, cIC, call info etc |
|---|

HPMN # pool –

| H-PMN#, FPMN -MSRN |
|---|

FPMN # POOL –

| F-PMN#, real -MSRN |
|---|

FTN-F # Pool –

| FPMN-FTN, real FTN |
|---|

Transaction Mapping –

| Tid-in, Tid-out Tid-in associated info Tid-out associated info |
|---|

CDR data –

| IMSI,MSISDN -H,MSISDN -F, Calling number, called number, Duration, date/time, Oringating GMSC, Terminating VMSC, MSRN,, Pool type, pool numbers etc |
|---|

U.S. PATENT DOCUMENTS

| | | | | |
|---|---|---|---|---|
| 6,014,561 | A * | 1/2000 | Molne | 455/419 |
| 6,052,604 | A | 4/2000 | Bishop et al. | |
| 6,058,309 | A | 5/2000 | Huang et al. | |
| 6,075,855 | A | 6/2000 | Christiansen et al. | |
| 6,085,084 | A | 7/2000 | Christmas | |
| 6,138,005 | A | 10/2000 | Park | |
| 6,138,009 | A | 10/2000 | Birgerson | |
| 6,148,197 | A | 11/2000 | Bridges et al. | |
| 6,163,701 | A | 12/2000 | Saleh et al. | |
| 6,185,295 | B1 | 2/2001 | Frederiksen et al. | |
| 6,185,436 | B1 | 2/2001 | Vu | |
| 6,192,255 | B1 | 2/2001 | Lewis et al. | |
| 6,195,532 | B1 | 2/2001 | Bamburak et al. | |
| 6,208,864 | B1 | 3/2001 | Agrawal et al. | |
| 6,212,372 | B1 * | 4/2001 | Julin | 455/418 |
| 6,356,756 | B1 | 3/2002 | Koster | |
| 6,456,845 | B1 | 9/2002 | Drum et al. | |
| 6,456,859 | B1 | 9/2002 | Desblancs et al. | |
| 6,463,298 | B1 | 10/2002 | Sorenson et al. | |
| 6,466,786 | B1 | 10/2002 | Wallenius | |
| 6,505,050 | B1 | 1/2003 | Brudos et al. | |
| 6,574,481 | B1 | 6/2003 | Rathnasapathy et al. | |
| 6,603,761 | B1 | 8/2003 | Wang et al. | |
| 6,603,968 | B2 * | 8/2003 | Anvekar et al. | 455/433 |
| 6,611,516 | B1 | 8/2003 | Pirkola et al. | |
| 6,628,934 | B2 | 9/2003 | Rosenberg et al. | |
| 6,671,523 | B1 | 12/2003 | Niepel et al. | |
| 6,684,073 | B1 * | 1/2004 | Joss et al. | 455/433 |
| 6,693,586 | B1 | 2/2004 | Walters et al. | |
| 6,738,622 | B1 | 5/2004 | Stadelmann et al. | |
| 6,738,636 | B2 | 5/2004 | Lielbridis | |
| 6,764,003 | B1 | 7/2004 | Martschitsch et al. | |
| 6,782,264 | B2 | 8/2004 | Anderson | |
| 6,856,818 | B1 | 2/2005 | Ford | |
| 6,876,860 | B1 * | 4/2005 | Berg et al. | 455/459 |
| 6,920,487 | B2 | 7/2005 | Sofer et al. | |
| 6,925,299 | B1 | 8/2005 | Sofer et al. | |
| 6,961,559 | B1 | 11/2005 | Chow et al. | |
| 6,963,543 | B2 | 11/2005 | Diep et al. | |
| 6,968,383 | B1 | 11/2005 | Heutschi et al. | |
| 6,975,444 | B2 | 12/2005 | Vo et al. | |
| 6,975,852 | B1 | 12/2005 | Sofer et al. | |
| 6,978,156 | B1 | 12/2005 | Papadopoulos et al. | |
| 7,020,479 | B2 | 3/2006 | Martschitsch | |
| 7,139,570 | B2 | 11/2006 | Elkarat et al. | |
| 7,184,764 | B2 | 2/2007 | Raviv et al. | |
| 7,231,431 | B2 | 6/2007 | Sofer et al. | |
| 2002/0009199 | A1 | 1/2002 | Ala-Laurila et al. | |
| 2002/0012351 | A1 | 1/2002 | Sofer et al. | |
| 2002/0037708 | A1 | 3/2002 | McCann et al. | |
| 2002/0087631 | A1 | 7/2002 | Sharma | |
| 2002/0101858 | A1 | 8/2002 | Stuart et al. | |
| 2002/0101859 | A1 | 8/2002 | Maclean | |
| 2002/0160763 | A1 | 10/2002 | Mittal et al. | |
| 2002/0187780 | A1 | 12/2002 | Souissi | |
| 2002/0191575 | A1 | 12/2002 | Kalavade et al. | |
| 2002/0197991 | A1 | 12/2002 | Anvekar et al. | |
| 2003/0017843 | A1 | 1/2003 | Noblins | |
| 2003/0050047 | A1 * | 3/2003 | Ala-Luukko | 455/412 |
| 2003/0051041 | A1 | 3/2003 | Kalavade et al. | |
| 2003/0064723 | A1 | 4/2003 | Thakker | |
| 2003/0069922 | A1 | 4/2003 | Arunachalam | |
| 2003/0129991 | A1 | 7/2003 | Allison et al. | |
| 2003/0133421 | A1 | 7/2003 | Sundar et al. | |
| 2003/0139180 | A1 | 7/2003 | McIntosh et al. | |
| 2003/0224795 | A1 | 12/2003 | Wilhoite et al. | |
| 2003/0229791 | A1 | 12/2003 | De Jong | |
| 2004/0087305 | A1 | 5/2004 | Jiang | |
| 2004/0120552 | A1 | 6/2004 | Borngraber et al. | |
| 2004/0131023 | A1 | 7/2004 | Auterinen | |
| 2004/0132449 | A1 | 7/2004 | Kowarch | |
| 2004/0196858 | A1 | 10/2004 | Tsai et al. | |
| 2004/0229601 | A1 | 11/2004 | Zabawskyj et al. | |
| 2004/0236836 | A1 | 11/2004 | Appelman | |
| 2005/0021834 | A1 | 1/2005 | Coulombe | |
| 2005/0047378 | A1 | 3/2005 | Wuschke et al. | |
| 2005/0064883 | A1 | 3/2005 | Heck et al. | |
| 2005/0186939 | A1 | 8/2005 | Barnea et al. | |
| 2005/0215250 | A1 | 9/2005 | Chava et al. | |
| 2005/0232282 | A1 | 10/2005 | Silver et al. | |
| 2005/0250493 | A1 | 11/2005 | Elkarat et al. | |
| 2006/0003775 | A1 | 1/2006 | Bull et al. | |
| 2006/0009204 | A1 | 1/2006 | Ophir | |
| 2006/0025129 | A1 | 2/2006 | Wolfman et al. | |
| 2006/0052113 | A1 | 3/2006 | Ophir et al. | |
| 2006/0068778 | A1 | 3/2006 | Della-Torre | |
| 2006/0068786 | A1 | 3/2006 | Florence | |
| 2006/0079225 | A1 | 4/2006 | Wolfman et al. | |
| 2006/0079236 | A1 | 4/2006 | Del Pino et al. | |
| 2006/0148459 | A1 | 7/2006 | Wolfman et al. | |
| 2006/0205404 | A1 | 9/2006 | Gonen et al. | |
| 2006/0211420 | A1 | 9/2006 | Ophir et al. | |
| 2007/0021118 | A1 | 1/2007 | Ophir et al. | |
| 2007/0049269 | A1 | 3/2007 | Ophir et al. | |
| 2007/0054665 | A1 | 3/2007 | Elkarat et al. | |
| 2007/0072587 | A1 | 3/2007 | Della-Torre et al. | |
| 2007/0178885 | A1 | 8/2007 | Lev et al. | |

FOREIGN PATENT DOCUMENTS

| | | |
|---|---|---|
| EP | 0899 974 A2 | 3/1999 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/65884 | 9/2001 |
| WO | WO 02/41641 A2 | 5/2002 |
| WO | WO 03/019960 A1 | 3/2003 |
| WO | WO 03/043367 A | 5/2003 |
| WO | WO 03/065660 A | 8/2003 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brunen, M. "Roaming im Zugangsnetz Mit OWLAN uberall zu Hause sein, "Net-Zeitschrift Fuer Kommunikationsmangement, Huthig Verlag, Heilderberg, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LA," NTZ (Nachrichtentechnische zeitschrift), 2002, pp. 24-26 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal Mobile Telecommunications system (UMTS) NAS Functions Related to Mobile Station MS in Idle Mode" ETSI TS 123 122 V3.1.0, Jan. 2000, pp. 1-33.

"Digital Cellular Telecommunications System (Phase 2+) GSM; Universal Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.

Salman A. Baset et al., "An analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q 764 (1999), Signaling System No. 7—ISDN User Part signaling procedures.
Q 730 (1999), ISND User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification $3^{rd}$ Generation Partnership Project; Technical Specification Group Services and System Aspects; Service accessibility (Release 1999).
Signaling procedure and the Mobile Application Part (MAP) (Release 1999).
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group recieve mode (GSM 03.22 version 8.3.0 Release 1999).
GSM 22011 service accessibility; 3 GPP TS 22.011 V3.8.0 (Sep. 2002) Technical Specification; $3^{rd}$ Generation Partnership Project; Technical Specification Group Services and System Aspects; Service accessibility (Release 1999).
3 GPP 29010; 3 GPP TS 29.010 V3.10.0 (Dec. 2002); Technical Specification; $3^{rd}$ Generation Partnership Project; Technical Specification Group Core Network; Information element mapping between Mobile Station—Base Station System (MS-BSS) and Base Station System—Mobile-services Switching Centre (BSS -MSC).
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7 - ISDN user part enhancements for the support of Number Portability.
3G TS 22.078 version 3.2.0 Release 1999 UMTS CAMEL.
Q.761 (Functional description of the ISDN User Part of CCITT Signaling System No. 7) (Dec. 1999).
Q762 (General Functions of CCITT Signaling System No. 7 ISDN User Part Messages and parameters). 1999.
Q 763 (Formats and codes of CCITT Signaling System No. 7 ISDN User Part Message and parameters). 1999.
Q765 (Application Transport Mechanism, CCITT Signaling System No. 7 ISDN User Part ) (May 1998).

Q766 (Performance Objectives in the Integrated Services Digital Network Application, CCITT Signaling System No. 7 ISDN User Part) (Mar. 1993).
Q.767 (ITU-T—Application of the ISDN User Part of CCITT Signaling System No. 7 for International ISDN Interconnections) (1991).
Q.768 (ITU-T-Signalling Interface Between an International Switching Centre (ISC) and an ISDN Satellite Subnetwork) (Oct. 1995).
Q769 (ITU-T—ISDN User Part Enhancements for the Support of Number Portability) (Dec. 1999).
Universal Mobile Telecommunications System (UMTS); Multimedia Messaging Service (MMS), Functional description; Stage 2 (3GPP TS 23.140 version 4.2.0 Release 4) (Mar. 22, 2001).
Q1214, ITU-T Intelligent Network Distributed Functional Plane for Intelligent Network CS-1. 1995.
Q1215, ITU-T Physical Plane for Intelligent Network CS-1. 1995.
Q1218 ITU-T Interface Recommendation for Intelligent Network CS-1. 1995.
3 GPP 29010; 3 GPP TS 29.010 V3.10.0; Technical Specification; $3^{rd}$ Generation Partnership Project; Technical Specification Group Core Network; Information element mapping between Mobile Station — Base Station System (MS-BSS) and Base Station System —Mobile-services Switching Centre (BSS —MSC); (Dec. 2002).
ITU-T Q.771 Series Q: Switching and Signalling —Specifications of Signalling System No. 7—Transaction capabilities application part. Functional description of transaction capabilities (Jun. 1997).
ITU-T Q.772 Series Q: Switching and Signalling —Specifications of Signalling System No. 7 —Transaction capabilities application part. Transaction capabilities information element definitions (Jun. 1997).
ITU-T 0.773 Series Q: Switching and Signalling —Specifications of Signalling System No. 7 —Transaction capabilities application part. Transaction capabilities formats and encoding (Jun. 1997).
ITU-T Q.774 Series Q: Switching and Signalling —Specifications of Signalling System No. 7 —Transaction capabilities application part. Transaction capabilities procedures. (Jun. 1997).
ITU-T Q.775 Series Q: Switching and Signalling —Specifications of Signalling System No. 7 —Transaction capabilities application part. Guidelines for using transaction capabilities. (Jun. 1997).
GSM 11.11 Digital Cellular Telecommunications System (Phase 2+); Specification of the Subscriber Identity Module —Mobile Equipment (SIM-ME) Interface. Dec. 1995, version 5.0.0.
GSM 1114 SIM Toolkit. (Dec. 1996).
IR 7320 Steering of Roaming Implementation Guidelines 0.1. May 13, 2005.
GSM 03.48 version 8.3.0 Release 1999; ETSI TS 101 181 V8.3.0; Digital cellular telecommunications system (Phase 2+); Security Mechanisms for the SIM application toolkit; Stage 2; pp. 1-34; (2000-08).
GSM 31048 Security and OTA (Oct. 2005).
GSM 23.119 $3^{rd}$ Generation Partnership Project; Technical Specification Group Core Network; Gateway Location Register (GLR) — Stage 2 (3G TS 23.119 version 0.3.0). 1999.
GSM 408 Mobile Radio Interface Network Layer (May 1996).
GSM 23122 NAS Functions Related to Mobile Station (MS) in Idle Mode. 1999.
GSM 24.008 Digital Cellular Telecommunications Systems (Phase 2+) (GSM); Universal Mobile Telecommunications System (UMTS); Mobile Radio Interface Network Layer 3 Specification, Core Network Protocols —Stage 3 (3G TS 24.008 version 3.2.1 Release 1999) 2000-01.
GSM 253.04 $3^{rd}$ Generation Partnership Project; Technical Specification Group Radio Access Network; UE Procedures in Idle Mode (3G TS 25.304 version 3.0.0) 1999.
3GPP TS 29.002 version 4.9.0 Release 4; ETSI TS 129 002 V4.9.0; Digital cellular telecommunications system (Phase 2+); Universal Mobile Telecommunications System (UMTS); Mobile Application Part (MAP) specification; pp. 1-1286; (Sep. 2002).
3G TS 23.278 version 6.0.0. Release 6, $3^{rd}$ Generation Partnership Project; Technical Specification Group Core Network; Customized Applications for Mobile Network Enhanced Logic (CAMEL) Phase 4- Stage 2; IM CN Interworking. 2004.
GSM 360 GPRS Roaming Guidelines PRD IR.33. Version 3.2.0, Apr. 03, 2003.

GSM 09.60 version 7.4.1 Release 1998; ETSI EN 301 347 V7.4.1; Digital cellular telecommunications system (phase 2+); General Packet Radio Service (GPRS); GPRS Tunnelling Protocol (GTP) across the Gn and Gp Interface; pp. 1-67; (Nov. 2000).

GSM 23060 3$^{rd}$ Generation Partnership Project; Technical Specification Group Services and System Aspects; General Packet Radio Service (GPRS); Service description; Stage 2 (Release 5). 2002.

GSM 29060 3$^{rd}$ Generation Partnership Project; Technical Specification Group Core Network; General Packet Radio Service (GPRS); GPRS Tunneling Protocol (GTP) across the Gn and Gp interface (release 1999).

GSM 23.012 3$^{rd}$ Generation Partnership Project; Technical Specification Group Core Network; Location Management Procedures (Release 4) 2001.

Q701, Specifications of Signalling System No. 7—Functional Description of the Message Transfer Part (MTP) of Signalling System No. 7. 1993.

Q702 ITU-T Specifications of Signalling System No. 7, Signalling Data Link. 1993.

Q703 ITU-T Specifications of Signalling System No. 7—Message Transfer Part. Signalling link. 1996.

Q704, Signalling network functions and messages. Specifications of Signalling System No. 7—Message Transfer Part. (July 1996).

Q705, Signalling Network Structure. Specifications of Signalling System No. 7 (Mar. 1993).

* cited by examiner

Subscriber data -

| IMSI,MSISDN -F,MSISDN -H, |
| FTN-no-change flag |
| MSISDN -F # forward on call flag |
| RCM flag etc |

Roaming info -

| IMSI,MSISDN -F,MSISDN -H, |
| VMSC, VLR, FTN,FTN -F, camel, |
| GPRS, date/time, GT of SG etc |

Roaming info history

| IMSI,MSISDN -F,MSISDN -H, |
| VMSC, VLR, FTN, camel, |
| GPRS, date/time, GT of SG etc |

Optimal Routing DB -

| MSISDN -F, Destination VMSC, Origination GMSC |

Call Context -

| IMSI, cIC, call info etc |

HPMN # pool -

| H-PMN#, FPMN -MSRN |

FPMN # POOL -

| F-PMN#, real -MSRN |

FTN-F # Pool -

| FPMN-FTN, real FTN |

Transaction Mapping -

| Tid-in, Tid-out |
| Tid-in associated info |
| Tid-out associated info |

CDR data -

| IMSI,MSISDN -H,MSISDN -F, |
| Calling number, called number, |
| Duration, date/time, Oringating GMSC, |
| Terminating VMSC, MSRN,, |
| Pool type, pool numbers etc |

Figure 4

PROVIDING MULTIPLE MSISDN NUMBERS IN A MOBILE DEVICE WITH A SINGLE IMSI

RELATED APPLICATION

This application claims priority from U.S. Patent Application No. 60/447,998, filed Feb. 18, 2003.

TECHNICAL FIELD

The disclosed embodiments relate to portable communication networks and devices.

BACKGROUND

Operators and service providers of mobile and cellular telephone services face tremendous challenges in growing their revenue streams in the face of increasing competition and pricing pressures. Roaming users/subscribers/devices, referred to as roamers, remain an attractive source of revenue for operators, and contribute heavily to the bottom-line because of the additional surcharges placed on roaming calls by many operators. In some cases roamers contribute as much as 40% of the total revenues, while in most cases roamers contribute approximately 8% to 20% of the total revenues. It is thus extremely important to be able to control and influence the roaming network choices that roamers have, in order to maximize the benefits and profits both to the operator as well as the subscriber.

A particularly attractive segment of the roaming market is users who roam frequently between two or more networks in two or more countries and have a need for a local number in each country. A local number in each country in which a user roams both enables local callers in the visited country to call the roamers under cheaper local telephone rates without worrying about international IDD calls, and presents a multinational appearance. Such international roamers typically buy local pre-paid subscriptions to local cellular telephone services in visited countries. Apart from having to change the SIM card in the cellular telephone or handset every time a roamer uses the local cellular services in a visited country, this also results in erosion of the operator's roaming revenues in the roamer's home country (home operator).

A typical method of supporting two different cellular telephone numbers for use in different countries has service providers using Dual IMSI SIM cards that contain an IMSI/MSISDN entry for each of the partnering operators or service providers. When in a first or home calling area, the home IMSI is selected manually or automatically. When in a partner country outside of the home country or calling area, the partner IMSI is selected manually or automatically. The dual IMSI approach requires use of a SIM having multiple SMSCs and multiple authentication keys (Ki), among other things, thereby resulting in a number of logistical problems. The dual IMSI approach also requires a new type of SIM card, one that includes an STK application. This new SIM card causes the HPMN to extend existing or create new SIM agreements with SIM manufacturers, further increasing costs and complicating the logistics process. In addition, each time the location of the device hosting the SIM card changes, the STK must determine whether it is in a network that requires another home IMSI; this typically results in a significant drain of battery power in the host mobile handset.

Consequently, there is a need for operators in one country (home) to join forces with operators in another country (visited country) in order to offer a local MSISDN in the visited country on the same SIM card, thereby creating a monetarily beneficial relationship to both operators and the roaming user.

BRIEF DESCRIPTION OF THE FIGURES

FIG. 4 is block diagram of the persistent and transit data, under an embodiment.

ACRONYMS

Figure 1:
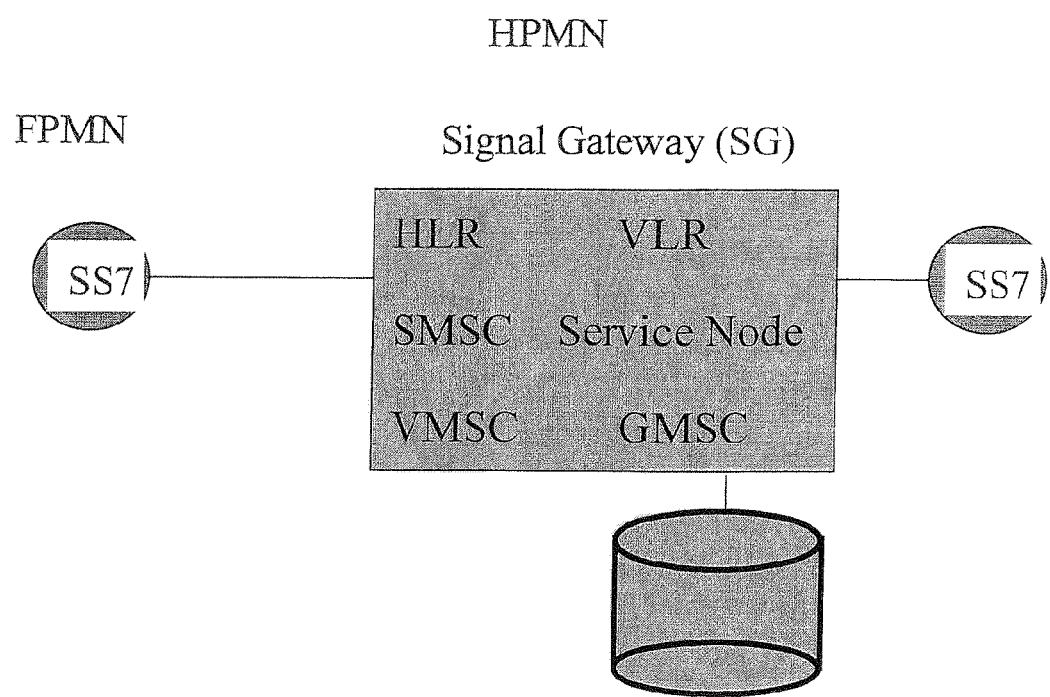
FIG. 1 is a block diagram of a single International Mobile Subscriber Identity (IMSI) Multiple MSISDN service, under an embodiment.

Following are a list of acronyms used herein.
International Mobile Subscriber Identity (of HPMN) (IMSI);
Mobile Subscriber ISDN Number (phone number) (MSISDN);
Single IMSI Multiple MSISDN Service (SIMM);
Subscriber Identity Module (SIM);
Home Public Mobile Network who intends to provide MSISDN Service (HPMN);
Foreign Public Mobile Network who intends to partner with HPMN for Multiple MSISDN Service (FPMN);
Mobile Switching Center (MSC);
Signal Gateway (SG) or Signal Gateway (SG);
Gateway MSC (GMSC);
GMSC in HPMN (GMSC-H);
GMSC in FPMN (GMSC-F);
GMSC in VPMN (GMSC-V);
MSISDN of the Multiple MSISDN Service allocated by HPMN in HPMN numbering plan (MSISDN-H);
MSISDN of the Multiple MSISDN Service subscriber in the FPMN (Co-operating VPMN) numbering plan (MSISDN-F);
Signaling System 7 (SS7);
Visited Mobile Switching Center (VMSC);
Serving VMSC in HPMN (VMSC-H);
Serving VMSC in FPMN (VMSC-F);
Serving VMSC in VPMN (VPMN is not HPMN/FPMN) (VMSC-V);
Associated Public Mobile Network for SMS Inter-working (APMN);
Call Detail Record (CDR);
Call Forwarding in Busy (CFB);
Call Forwarding on Not Reachable (CFNR);
Call Forwarding on No Reply (CFNRy);
Call Forwarding Unconditional (CFU);
Circuit Switch Data (CSD);
Digital Distribution Frame (DDF);
Forwarded-To-Number typically used in Call Forwarding (FTN);
General Packet Radio Service (GPRS);
Gateway GPRS Service Node (GGSN);
GPRS Roaming Exchange (GRX);
Serving GPRS Service Node (SGSN);
Global Title (SS7 parlance) (GT);
Home Location Register (HLR);
Intelligent Network (IN);
Intelligent Network Application Part (INAP);
Inter Operator SMS within HPMN (IOSMS);
International Roaming Expert Group (IREG);
ISDN User Part message from SS7 stack (ISUP);
Interactive Voice Response (IVR);
Late Call Forwarding (LCF);
Message Application Part (from GSM 09.02 GSM Standards) (MAP);
Mobile Global Title (derived from IMSI) (MGT);
Mobile Station Roaming Number (MSRN);
Originally Called Number (OCN) (same as ODN);
Originally Dialed Number (ODN) (same as OCN);
Outreach Messaging (Enhanced version of legacy SMS Welcome) (OM);
Optimized Routing (OR);
Packet Data Protocol (PDP);
Provide Roaming Number MAP message (PRN);
Service Control Point (SCP);
Signal Control Connection Part (SCCP);
Send Routing Information MAP message (SRI);
Short Message Service (SMS);
Short Message Service Center (SMSC);
SMSC in HPMN (SMSC-H);
SMSC in APMN (where APMN is not HPMN or FPMN) (SMSC-A);
SMSC in FPMN (SMSC-F);
Transfer Accounting Procedure (TAP);
Transfer Accounting Data Interchange Group (TADIG);
Transaction Capability Part (TCAP);
Translation Type (SS7 parlance) (TT);
Virtual Home Environment (VHE);
Visited Location Register (VLR);
Serving VLR in HPMN (VLR-H);
Serving VLR in FPMN (VLR-F);
Serving VLR in VPMN (VPMN is not HPMN/FPMN) (VLR-V);
Visited Public Mobile Network (other than HPMN or FPMN) (VPMN);
Wireless Fidelity (WiFi);
Basic Call State Model (BCSM);
Customized Applications for Mobile network Enhanced Logic (CAMEL);
Camel related message from SCF to SSF (Connect, Continue);
Detection Point (DP);
Deflected To Number (DTN);
Dialed Services CAMEL Subscription Information (D-CSI);
Event Detection Point (EDP);
Gateway MLC (GMLC);
GPRS Service Switching Function (gprsSSF);
GPRS CAMEL Subscription Information (GPRS-CSI);
GSM Service Control Function (gsmSCF);
GSM Specialised Resource Function (gsmSRF);
GSM Service Switching Function (gsmSSF);
Home PLMN (HPLMN);
InitialDP (IDP);
Information Element (IE);
Information Flow (IF);
Intelligent Peripheral (IP);
Interrogating PLMN (IPLMN);
IP Multimedia Subsystem Service Control Interface (ISC);
Location Services (LCS);
Localised Service Area (LSA);
Mobility Management event Notification CAMEL Subscription Information (M-CSI);
Mobile Forwarding (MF);
Mobile Location Center (MLC);
Mobile Originating (MO);
Mobile Terminating in GMSC (MT);
Network CAMEL Service Information (N-CSI);
North American (NA);
Network Node Interface (NNI);
Originating Basic Call State Model (O-BCSM);
Originating CAMEL Subscription Information (O-CSI);
Operator Determined Barring (ODB);
Operator Specific Service (OSS);

Packet Data Protocol (PDP);
Point In Call (PIC);
Public Land Mobile Network (PLMN);
Serving GPRS Support Node (SGSN);
Service Logic Program Instance (SLPI);
Service Management Function (SMF);
Serving MLC (SMLC);
Short Message Service CAMEL Subscription Information (SMS-CSI);
Supplementary Service Notification CAMEL Subscription Information (SS-CSI);
Terminating Basic Call State Model (T-BCSM);
Terminating CAMEL Subscription Information (in the GMSC) (T-CSI);
Trigger Detection Point (TDP);
Transfer Protocol Data Unit (TPDU);
Translation Information Flag (TIF-CSI);
USSD CAMEL Subscription Information (U-CSI);
USSD General CAMEL Service Information (UG-CSI);
User Network Interface (UNI);
Visited PLMN (VPLMN);
Mobile Terminating in VMSC (VT);
VMSC Terminating CAMEL Subscription Information (VT-CSI);
Charging data collection interface between a CDR transmitting unit (e.g. an SGSN or a GGSN) and a CDR receiving functionality (a CGF) (Ga);
Interface between an SGSN and a BSS (Gb);
Interface between a GGSN and an HLR (Gc);
Interface between an SMS-GMSC and an SGSN, and between an SMS-IWMSC and an SGSN (Gd);
Interface between an SGSN and an EIR (Gf);
Reference point between GPRS and a packet data network (Gi);
Interface between two GSNs within the same PLMN (Gn);
Interface between two GSNs in different PLMNs (Gp) (the Gp interface allows support of GPRS network services across areas served by the co-operating GPRS PLMNs);
Interface between an SGSN and an HLR (Gr);
Interface between an SGSN and an MSC/VLR (Gs);
Interface between the RNS and the core network (Iu) (also considered as a reference point);
Kilobits per second (kbit/s);
Megabits per second (Mbit/s) (1 Mbit/s=1 million bits per second);
Reference point between a non-ISDN compatible TE and MT (typically this reference point supports a standard serial interface) (R);
The service area for which the location of an MS is reported (Reporting Area);
The location accuracy level needed for service management purposes in the 3G-SGSN, e.g. a routing area or a cell (the 3G-SGSN can request the SRNC to report: i) the MS's current service area; ii) when the MS moves into a given service area; or iii) when the MS moves out of a given service area) (Service Area);
Interface between the mobile station (MS) and the A/Gb mode network. The Um interface is the MS to network interface for providing GPRS services over the radio to the MS (Um); and
Interface between the mobile station (MS) and the Iu mode network. The Uu interface is the Iu mode network interface for providing GPRS services over the radio to the MS (Uu).

DETAILED DESCRIPTION

A Single IMSI Multiple MSISDN (SIMM) System and Service is provided that supports providing mobile communication devices with multiple Mobile Subscriber ISND Numbers (MSISDN) using one International Mobile Subscriber Identity (IMSI). The SIMM System/Service does not require a new type of SIM card in a mobile device or handset. The SIMM System/Service allows operators in one country (home) to join forces with operators in another country (visited country) in order to offer a local MSISDN in the visited country on the same SIM card, thereby creating a monetarily beneficial relationship to both operators and the roaming user. The SIM for use under the SIMM System/Service includes a single IMSI (and the associated parameters, e.g., Ki) from the HPMN; the SIM does not have the FPMN MSISDN. The subscriber is allocated a FPMN MSISDN in addition to the HPMN MSISDN. The subscriber registers with the HPMN IMSI. This simplifies the user experience as the user need not be concerned with whether they are in the local country or are roaming when registered with the FPMN network. The SIMM System/Service described below does not require an intelligent SIM application to automatically detect the FPMN network, resulting in reduced power usage. It also makes it simple for subscribers to use home services despite having a local number. This makes it easier to transparently support GPRS and USSD services.

The following description provides specific details for a thorough understanding of, and enabling description for, embodiments of the SIMM System/Service. However, one skilled in the art will understand that the SIMM System/Service may be practiced without these details. In other instances, well-known structures and functions have not been shown or described in detail to avoid unnecessarily obscuring the description of the embodiments of the SIMM System/Service. The headings provided herein are for convenience only and do not affect the scope or meaning of the claimed invention.

The mobile devices described herein include, for example, cellular telephones, personal computers, portable computing devices, portable telephones, portable communication devices, subscriber devices or units, and personal digital assistants. The mobile devices, which also may be referred to as "mobile communication devices," "portable communication devices" and "communication devices," can include all such devices and equivalents, and are not limited to communication devices that are wireless. The communication networks described herein support the transfer of information including voice and data signals between the mobile devices and the operator or service provider systems via at least one of wireless couplings, wired couplings, and a combination of wireless/wired couplings using one or more communication protocols known in the art. The networks described herein can use at least one of Global System for Mobile Communications (GSM), General Packet Radio Service (GPRS), Code Division Multiple Access (CDMA), and Time Division Multiple Access (TDMA) communication protocols, for example, but are not so limited.

The SIMM System/Service for roaming is a subscription-based service provided by a service provider, also referred to as an operator, but is not so limited. The SIMM service provides a local number at each partner network for a subscriber, also referred to as a user. The local number can be assigned to a subscriber permanently or temporarily depending upon operator requirements. The SIMM service for roaming is normally applied by an HPMN operator for (international and national) outbound roamers at a partner FPMN involving some logistical arrangements at the FPMNs. The SIMM service for roaming can also be applied to (national or international) inbound roamers without involving any HPMN logistics. In particular, it can be deployed for a Mobile Virtual Network Operator (MVNO).

FIG. 1 is a block diagram of a Single IMSI Multiple MSISDN (SIMM) service, under an embodiment. The SIMM service uses at least one Signal Gateway (SG) to support international roaming for outbound roamers having permanent local numbers as well as providing temporary local numbers, national roaming and inbound roaming (nationally or internationally). The Signal Gateway (SG) is also referred to as a Signaling Gateway (SG). The SIMM solution is built on a Signal Relay Gateway Framework (SRGF) which also supports Multiple IMSI Multiple MSISDN (MIMM) and Multiple IMSI Single MSISDN (MISM) within the same operator or between different operators (across different countries) and within a single SIM or multiple SIMs, but is not so limited.

The Signal Gateway Relay Framework (SGRF) of an embodiment is for worldwide deployment by cellular telephone operators or service providers. The different applications on the SGRF share many fundamental features although they apply different logics and procedures. The SGRF of an embodiment stores SIMM service subscription information and roaming information of SIMM subscribers at the FPMN. The SGRF also extends across GSM and CDMA technologies. The SGRF platform has the capability to impersonate various GSM network entities in order to provide many additional services. The platform of an embodiment is a pure SS7-based solution that functions as virtual HLR, virtual VLR, virtual GMSC, virtual VMSC, virtual SMSC and virtual service node depending on interactions with various SS7 network elements. The SGRF is virtual in the sense that it does not store subscription data as in HLR, does not have switching support as in GMSC, and does not have trigger mechanisms, etc.

As described above, cellular telephone operators face tremendous challenges in growing their revenue streams, in the face of increasing competition and pricing pressures. Roamers remain an attractive source of revenue or operators, and contribute heavily to revenues.

The SIMM System/Service targets users who roam frequently between two countries and have a need for a local number in each network, either to enable local users to call them at a cheap rate without worrying about international IDD calls or to present a multi-national appearance. Consequently, the SIMM System/Service allows the operators to be able to control and influence the roaming network choices that roamers have, in order to maximize the benefits and profits both to the operator as well as the subscriber. In so doing, operators in one country (home) can join forces with operators in another country (visited country) in order to offer a local MSISDN in the visited country on a singe SIM card, thereby creating a monetarily beneficial relationship.

The operators in different counties can offer local MSISDN via a single SIM card under multiple approaches. A first approach requires the two operators to cooperate in the building of a dual IMSI SIM card which automatically detects the country the user is in and uses the IMSI of that country (Multiple IMSI with Multiple MSISDN, or Multiple IMSI with Single MSISDN-H). A second approach requires the two operators to cooperate and map the HPMN MSISDN on the network side to a local MSISDN in the partner foreign network.

The SGRF of an embodiment supports both approaches by functioning as a virtual HLR for the subscribers. Under the first approach the SGRF will host for the FPMN IMSI and MSISDN allocated to the HPMN and use HPMN Auc for authenticating subscribers. In this way, the Multi-IMSI SIM only need to have the HPMN keys and algorithms, eliminating the logistical complexity of security management. This first approach also makes it easier for billing as a local subscriber at FPMN since there is a local IMSI involved. However USSD service which is IMSI-based, will always have to go through the SGRF, making it less transparent. For GPRS which is also IMSI-based, if the FPMN IMSI is chosen as the home IMSI, this could introduce problems to APN (unless it has the absolute network operator path) and PDP contexts (unless GGSN grants permission to the FPMN IMSI) set up. In the rare event of failure of the SGRF, subscribers under the first approach will not however be able to register at FPMN as a local subscriber.

To avoid confusion in billing at a third party operator, both the SGRF and the SIM application will need to disable and reject FPMN IMSI at VPMN. In this case, the SIM application will need to switch back to HPMN IMSI. This might cause some confusion to the user since the SIM application will not be able to distinguish a loss of coverage in FPMN or need to swap in another home IMSI for registration unless there is a registration of a network. When the subscriber registers (e.g. briefly) as a roamer at a home network (non HPMN home operators can be rejected) when the home IMSI in the SIM has the value of the FPMN IMSI, this could introduce further confusion. It is possible to control the STK application from the HPMN network side for which home IMSI to use, but this would further complicate the logistics and add costs (e.g. SMS).

Furthermore, under the first approach, the service will use a new type of SIM that includes an STK application. This could require HPMN to extend existing or create new SIM agreements with SIM manufacturers, further adding costs and complicating the logistics process. When multiple IMSI is introduced or extended, the HPMN will need to update the local IMSI list in the SIM (either via OTA or change of SIM), which again adds logistic complexity. In addition, each time a new location changes, the STK will need to perform a check to see if it is in a network that requires another home IMSI. This could drain battery power significantly.

On the billing side, under the first approach, when registering with the FPMN IMSI at a FPMN network (e.g., Beijing Mobile), the network will see the subscriber as a domestic subscriber (e.g., from Guang Dong Mobile) which it would bill in a standard way. If this is desired, then there is no problem. However if the FPMN still wants to view this subscriber as a roamer while applying centralized discounts (e.g., by CMCC in China Mobile), then this would present a problem, as the local networks will settle among themselves rather than going through the central body. This problem usually does not arise in small networks or small countries.

Turning to the second approach, the SGRF of an embodiment hosts the FPMN MSISDN allocated to HPMN. The subscriber therefore always registers with HPMN IMSI. This simplifies the user experience as the user need not be concerned with whether they are regarded as a roamer or a local subscriber when registered with the FPMN network. This approach does not require an intelligent SIM application to automatically detect the FPMN network, thereby reducing device battery consumption and reducing costs. This second approach also simplifies the use by subscribers of home services despite having a local number. However since the subscriber's IMSI is still a HPMN IMSI, while it helps HPMN in gaining more roaming revenue, it will require slightly more complex billing solution than the first approach if FPMN and HPMN want to place subscriber calls on par with local calls rather than roaming calls when roaming in FPMN. Nevertheless, it is easier under the second approach to transparently fall back as a normal roamer in the rare situation where the SGRF fails.

Therefore, service under the second approach generally involves fewer logistical challenges when compared to service under the first approach. Service under the second approach also allows the home operator to offer a service whereby the frequent roamer can get MSISDN in more than one country without a requirement for a new SIM or OTA process to change the SIM values. The roamer is always an HPMN subscriber which means that calls (including international and roaming calls) made by the subscriber contribute revenue towards the home operator regardless of the subscriber's location.

1. Service Description

The SIMM service is offered in collaboration with a participating operator in a foreign country (referred to as the FPMN). Consequently, the HPMN of an embodiment has bilateral roaming agreements with the FPMN operator for Voice and SMS services.

The target market for the SIMM service is subscribers who frequently roam between HPMN and FPMN and who have a need for local numbers in both networks. Traditionally, these roamers buy pre-paid subscriptions in FPMN and use that number to make outgoing calls. However, if the roamers have a single phone and have swapped out the HPMN SIM card, they will not be able to receive MN calls and SMS messages. Also, when the roamers are back in HPMN, they may not be able to receive calls on their FPM number.

The SIMM service of an embodiment solves this problem by allowing subscribers or users to receive calls on both numbers (HPMN and FPMN) without swapping the SIM card. Subscribers also receive SMS messages addressed to both numbers.

Users do not have to do anything special in order to use the SIMM service other than getting a new SIM card. They can retain their HPMN numbers but will get a new FPMN number. It is possible for the HPMN to enter into agreements with multiple FPMNs in various countries and offer a "set of numbers" on a single IMSI. There are no additional changes for the subscribers once they receive a new SIM card. Hence, subscribers can choose to add local MSISDN numbers for countries that they visit most frequently.

In a country where Mobile Number Portability (MNP) is supported, it is possible for the service provider or operator to acquire subscribers from other operators and offer them the SIMM service. It is also possible for subscribers to port-out the existing HPMN numbers; however they cannot port out the FPMN number. As a result, the SIMM service provides a lock-in of services with the HPMN.

The SIMM service does not impact the subscriber's GPRS, USSD and SMS services. It is just transparent as a normal subscriber for most cases of these services. The MMS, IN, Camel, and 3G services should not involve the SGRF and so should not be impacted from a normal subscriber perspective.

The SIMM Service charges can be combined with regular charges or shown as separate charges for the service. The particular presentation option is left to the operator.

The SIMM service can also be used for privacy management. The subscriber can choose to route calls from one number directly to voicemail, for example, while letting calls on other numbers ring through to the mobile device. The subscriber chooses call routing via preference setting using USSD or MO-SMS, but is not so limited.

The SIMM service can also be used for subscribers who do not want to receive rerouted calls when roaming, but rather want the calling party to pay for the international portion of the call by asking the caller to call using the FPMN number.

In this way, when the calling party calls the HPMN number, the call will be immediately forwarded to a voicemail that says, for example, "I am in China, to reach me you must call my China number which is 123456789".

1.1. Comparison with Additional Numbers by HLR

Some HLR vendors offer a modification of an additional number feature to mimic SIMM service because, in the HLR approach, the subscriber can have multiple MSISDNs. Depending on the registered network, HLR can select the right MSISDN to send to the VLR. However, this approach involves modifications of the existing HLR and can introduce serious problems when the HLR is upgraded. The SIMM System/Service provided herein has numerous advantages when compared to the HLR approach, including the following: supports CDR thru at least one of ISUP loopback, IN, and map interface; controls optimal routing; controls trunk routing over special lines to reduce rerouted costs; offers special dial service numbers (e.g., customer care number) and routes these calls; allows HPMN to control whether a subscriber can roam to non-FPMN networks in an FPMN country; performs optimal routing for late call forwarding when the subscriber is in an FPMN network; controls SMS relay to guarantee SMS delivery on MSISDN-F for outbound roamers; allows subscribers to change CLI on demand via USSD; allows subscribers to disable MSISDN-H/F rerouting on demand via USSD; and allows subscribers to disable MSISDN-H/F international rerouting but allows local rerouting (e.g., calls on MSISDN-F when the subscriber is in FPMN country) on demand via USSD.

2. Technology and Implementation Architecture

The SIMM System/Service of an embodiment relies logically on the presence of a Signal Gateway function, also referred to herein as a Signal Gateway function or Signal Gateway (SG). The Signal Gateway function is a combination of an SCCP node and a Service Node, but is not so limited.

2.1. Physical Location of the Signal Gateway

The physical location of the Signal Gateway can be at HPMN or FPMN based on operator requirements. For those partners that do not host the Signal Gateway, routing configurations will send ISUP calls over dedicated leased lines and to direct MAP and TCAP signaling to the Signal Gateway across countries. For the purpose of the description herein, the Signal Gateway is assumed to be hosted at the HPMN, but is not so limited. The signaling and architecture associated with the Signal Gateway is similar regardless of the location of the Signal Gateway.

2.2. Basic Network Architecture

Figure 2:
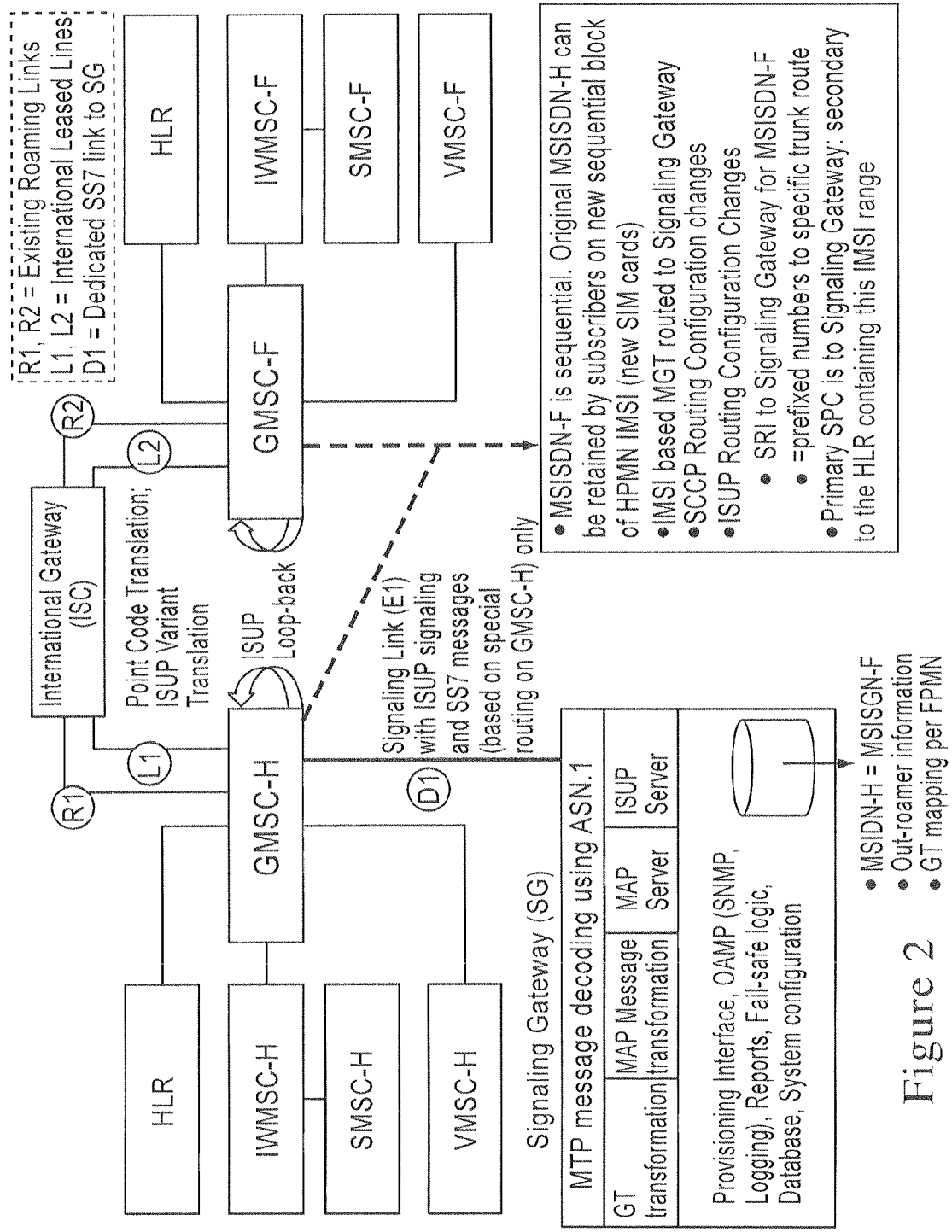
FIG. 2 is a system block diagram of a single IMSI Multiple MSISDN service, under an embodiment.

FIG. 2 is a system block diagram of a Single IMSI Multiple MSISDN (SIMM) system, under an embodiment. Note that the Signal Gateway function is only at the HPMN and need not be installed at FPMN or any other VPMN. Hence, it imposes minimum operations load on an FPMN.

The SIMM System supports many Mobile Subscriber Integrated Service Digital Network (MSISDN) numbers on a mobile device. The mobile device includes one Subscriber Identity Module (SIM) and one International Mobile Subscriber Identity (IMSI). The SIMM system includes at least one signal gateway that supports the use of numerous MSISDN numbers by the mobile device. The signal gateway couples among components of the public mobile networks to which the MSISDN numbers correspond. The signal gateway connects calls between the mobile device and a first public mobile network using a first MSISDN where, for example, the first public mobile network is in a first country. Likewise, the signal gateway connects calls between the mobile device and a second public mobile network using a second MSISDN where, for example, the second public mobile network is in a second country.

A Signal Gateway function couples to the GMSC-H for Signaling with Voice loop-back at the GMSC-H. The GMSC-H is also coupled to the FPMN through a leased line that is provided by an ISC, but is not so limited. This leased line is used to carry SS7 signaling as well as voice traffic for Multiple MSISDN subscribers. The Signal Gateway is also responsible for generating Call Detail Records that are used to enable special billing of calls and SMS for the Multiple MSISDN subscribers.

Due to the SS7 version differences on the leased line, HPMN arranges with a vendor and/or an ISC to provide a SS7 converter. A leased line will be used to route calls and their associated ISUP signaling that will involve call path between FPMN and HPMN. The leased line also provides the signaling path for SCCP routing on any MSISDN-F global title.

2.3. Signal Gateway Internal Architecture

Figure 3:
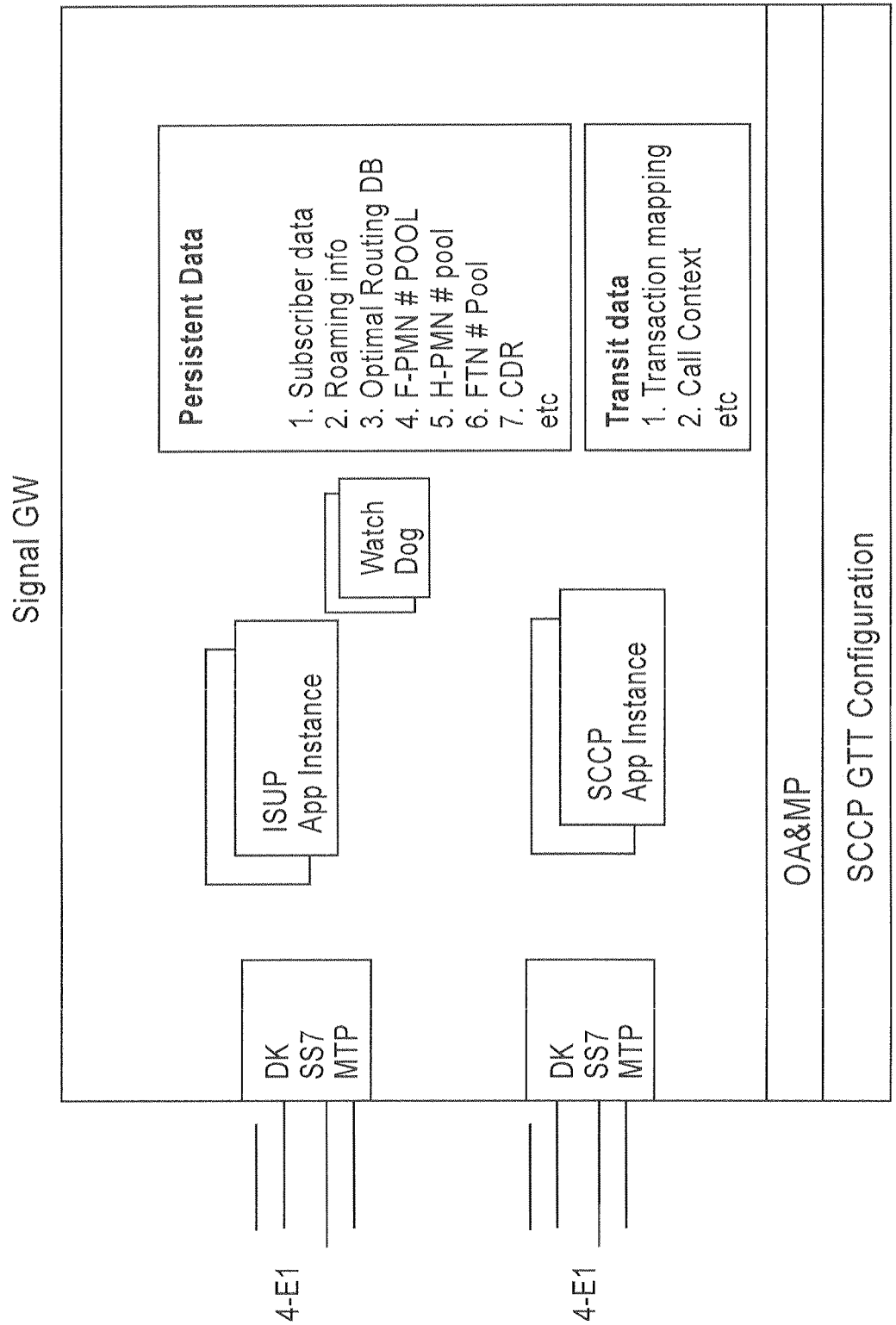
FIG. 3 is a block diagram of a Signal Gateway (SG), under an embodiment.

The Signal Gateway function of an embodiment includes at least one Signal Gateway. FIG. 3 is a block diagram of a Signal Gateway (SG), under an embodiment. Each Signal Gateway can be implemented on a Sun Solaris platform, for example, but is not so limited. It can host up to four DataKinetics Septel Boards with each having four E1 interfaces. Each board processes SS7 messages up to MTP 2/3. Higher level messages are distributed to 2 pools of User Part Application Instances. One pool (called MAP server) is for processing SCCP messages. The other (called ISUP server) is for processing ISUP loopback messages.

There is a watchdog process which oversees the state of each app instances. Whenever an app instance is stopped for some reason, the watch dog kills the instance and starts a new one. If all instances of a particular application protocol stopped for some reason, the watch dog kills the SS7 stack on each DK first before it kills all instances of any application protocol. It will then restart the application instances of all application protocols followed by starting the SS7 stack on each DK card.

There are many types of persistent information in the memory. The memory also contains many types of temporary information.

The Signal Gateway also has SNMP agent and MIB. It also allows SCCP GTT configuration and MTP3 routing table. The OA&MP interface is a web interface to allow operators to provision new customers and other maintenance functions.

2.3.1. Persistent and Transit Data

FIG. 4 is block diagram of the persistent and transit data, under an embodiment. There are many types of persistent data which are maintained in the memory before they are written to an Oracle DB. For high-availability, redundancy support and best performance, the Oracle DB best resides in a separate physical box.

The memory data also acts as a cache for the database. The database server also has another level of cache which hosts a copy of the memory data in the Signal Gateway ion and acts like a shared memory to the Signal Gateways.

The Subscriber Data is provisioned by the operator via a web interface or stored procedures. It contains the HPMN MSISDN-H number, IMSI, any FPMN MSISDN-F number. It also contains several flags. The MSISDN-F # forward call flag is to enable/disable of call-re-routing when the subscriber is called on MSISDN-F but not registered in FPMN network. The MSISDN-F # CF flag is to enable/disable of call-re-routing to any call forwarding value (e.g. voicemail) when the subscriber is called on MSISDN-F but not registered in FPMN network and not reachable for whatever reason (e.g.

ECF or CFU or LCF). The idea is to set redirection counter=6 (or set call diversion indicator CDI=0) in the IAM message to disallow call-forwarding. The MSISDN-F # forward default number flag is to enable/disable of call-re-routing to an operator controlled default number (e.g. FPMN announcement or customer care) when the subscriber is called on MSISDN-F but not registered in FPMN network. In all 3 cases, the objective is to provide the flexibility to SIMM subscribers to avoid paying IDD call-rerouting. Also in all 3 cases, CFU for MSISDN-F will be disabled when any of the 3 flags is set.

The FTN-no-change flag allows a subscriber to have the option to directly route the late call forwarding call to the FTN without being replaced by a virtual FTN to cause the call routed through the Signal Gateway.

Sometimes, an operator has its own service node platform that need be integrated with the Signal Gateway. CSL is such an operator. The RCM (Roaming Call Management) flag indicates whether the ISUP loopback call should go through the CSL service node platform. If it is set, the Signal Gateway will produce a special prefixed number so that the GMSC-H will route the call the CSL service node and it sets the generic number field to MSISDN-H where the number qualifier indicator is set to addition called number in the IAM message. The service node can offer HK ringback tone service to SIMM subscribers.

There is also an operator-level controlled CF default number, e.g. a virtual voicemail number. If the RCM flag is set, all condition FTN will be replaced by this default number for routing from VMS C-F to the Signal Gateway. The Signal Gateway can then replace the virtual number to a real number (e.g. voicemail number such as 19-MSISDN-H where 19 is CSL's internal routing number for voicemail).

There may be other flags related to RCM service which is a CSL specific service where customization will be done at implementation stage.

The roamer information for a subscriber is created when the SIMM subscriber successfully registers with a FP network. It contains the VMSC, VLR and other information (e.g. forwarding values) that are collected from both VLR during updateLocation and HLR (e.g. Camel and GPRS info) during insertSubscriberData. In particular, it contains the assignment of a FTN-F pool # to each conditionally forwarded FTN value. The roamer information data is initially maintained in the memory and/or disk before it is sent to the Oracle DB only after a successful registration.

The roamer information will be removed upon receiving a cancellation from HLR. However before this is carried out, a copy is sent to the roamer information history DB. This is used to examine SIMM subscriber roaming behavior etc for reporting purpose.

The Optimal Routing DB contains the network information on whether calls on MSISDN-F number ranges can be optimally routed based on the interrogating MSC/GMSC address, the destination VMSC address. This information is maintained by the HPMN operator via a web interface or stored procedures.

The Call Context DB maintains the current ISUP loopback call (including forwarding) context of a SIMM subscriber. The context is maintained in the memory and is cleared as soon as a call is released/aborted. There is also a flag when set to indicate the current call context has been established or forwarded. This flag is used to control whether a second call to a subscriber registered in FPMN network will go straight into forwarding mode or not. There are no simultaneous call contexts for a subscriber registered at FPMN.

The HPMN # pool contains the pool of dedicated HPMN numbers used by the Signal gateway function to ensure GMSC-H will loopback the call through the Signal Gateway when the subscriber is registered in FPMN but called by the MSISDN-H number. It also contains the mapping of a dedicated HPMN number to the current assigned MSRN-F number obtained by the Signal Gateway from VLR-F to establish the call. The GMSC-H will set up the call to MSRN-F over the leased line through GMSC-F.

The FPMN # pool contains the pool of dedicated FPMN numbers assigned by the Signal gateway function to ensure the call from the FPMN will be routed over the leased line to GMSC-H which then loops-back the call through the Signal Gateway when the subscriber is called by the MSISDN-F number. It also contains the mapping of a dedicated FPMN number to the current assigned MSRN number obtained by the Signal Gateway from HLR/VLR-F to establish the call.

The FPMN FTN # pool contains the pool of dedicated FPMN numbers assigned by the Signal gateway function for a conditionally forwarding value for a SIMM subscriber in the FPMN to ensure the late forwarded call will be routed over the leased line to GMSC-H which then loops-back the call through the Signal Gateway when the subscriber is registered in FPMN and called by the MSISDN-F/MSISDN-H number.

The FPMN# pool and the FTN # pool can share the same dedicated FPMN numbers. The FTN number pool can be eliminated if FPMN supports OCN capability.

The CDR contains the call detailed records for all the ISUP calls that have been looped through a Signal Gateway. Other than the standard parameters, a CDR record will contain which VMSC/GMSC the call originated from, which destination VMSC/VLR/MSRN of the call, what pool type and number has been used for the set up of the call.

Figure 5:
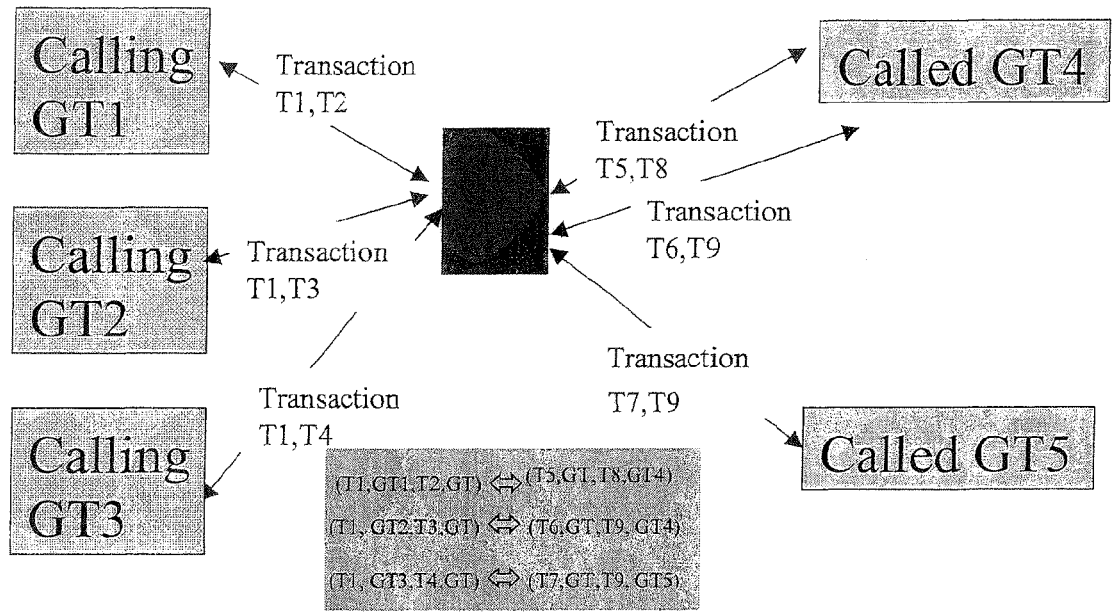
FIG. 5 is a block diagram of transactional mappings at a Signal Gateway (SG), under an embodiment.

FIG. 5 is a block diagram of transactional mappings at a Signal Gateway (SG), under an embodiment. The transaction mapping contains the mapping of the TCAP transactional dialog of the Signal Gateway function with the calling GT on one side and the TCAP transactional dialog of the Signal Gateway function with the called GT on the other side. The Signal Gateway function can distinguish transactions initiated by the calling GT using the calling GT and its associated originating transaction identifier. However this transaction cannot be relayed to the called GT side since the Signal Gateway function (with a single GT that does not correspond to any calling GT) cannot determine the corresponding original calling GT from the response from the called GT to relay back the response. The Signal Gateway will need to create a new unique transaction with the called side and relates this transaction with the transaction generated from the calling side. Note that the transaction identification (ID) (destination or origination) need only be unique for the Signal Gateway function.

However if there is a unique SG GT for each calling GT from the initiating operation of transaction, the transaction can then be relayed across the called side. Therefore the transaction ID mapping must be understood as a logical mapping. Depending on the actual implementation choice, the physical mapping might involve the same transaction ID (since the calling GT could be made unique with a unique SG GT that corresponds to the initiating entity of the operation of a transaction).

To simplify the description, a logical SG GT is used uniformly in the call flows to represent a Signal Gateway global title. The actual physical SG GT used varies according to the implementation choices. When using a unique physical SG GT to correspond to each network element (e.g. HLR, VLR, VMSC etc) the correct notation should be SG-network-element.

2.3.2. Deployment Topology

The Signal Gateway function in HPMN is implemented in two physical Signal Gateways. Each is connected to a GMSC-H using SS7 links for both SS7 as well as ISUP signaling. In an embodiment, ISUP loop-back Signaling (only ISUP signals are sent to the Signal Gateway while voice trunks are looped back at the GMSC-H) handles ISUP calls for billing and call control. This enables voice trunks to not get hauled all the way to the Signal Gateway but uses the spare port capacity already provisioned on the switch.

Figure 6:
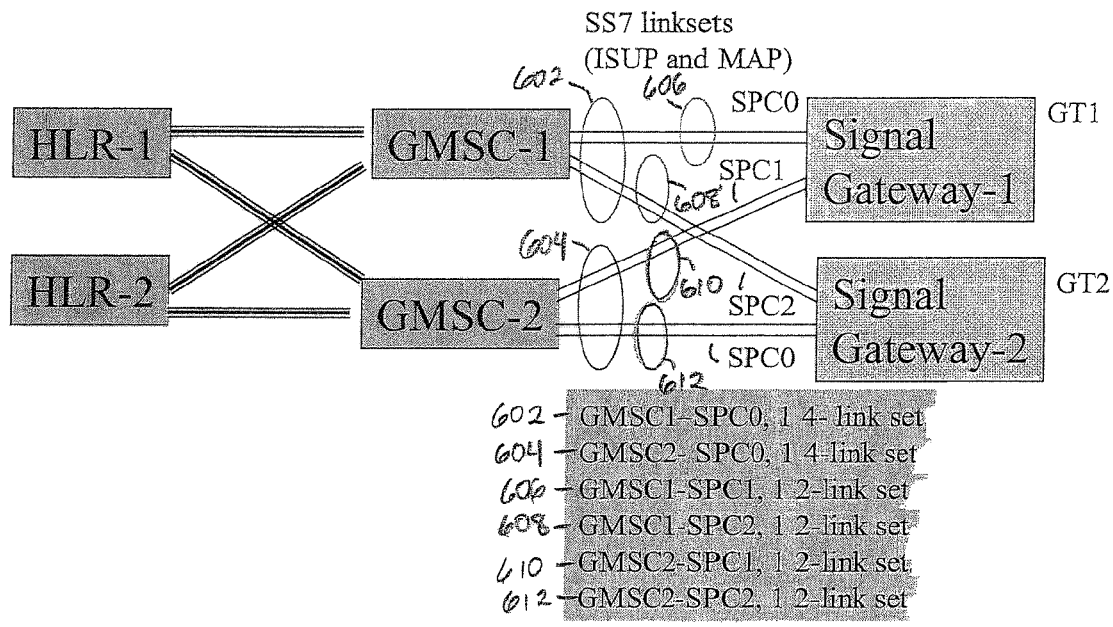
FIG. 6 is a block diagram of a cross-connect deployment topology, under an embodiment.

FIG. 6 is a block diagram of a cross-connect deployment topology, under an embodiment. Each Gateway is assigned two Signal Point Codes. One SPC (SPC0) is common across both gateways and the other SPC is unique to itself (SPC1 and SPC2). Each gateway is also assigned a distinguishing Global Title, GT1 and GT2 respectively.

The Signal gateways will be connected to 2 GMSCs of HPMN in a cross-connect manner. However due to the cost of ISUP loopback circuits, one GMSC may also be used. Each GMSC will have two links to each Signal Gateway. There are six different linksets created. A linkset contains links that share the adjacent signal point code. Since the two Signal Gateways also have a common SPC (SPC0), the GMSC1-SPC0 can have a four-link linkset across two Signal Gateways, resulting greater fail-over support. Each GMSC will also have a two-link linkset with each Signal Gateway's unique SPC (SPC1, SPC2) respectively. Note that a link can participate in more than one linkset. Each signaling link can contain both MAP and ISUP signaling.

Figure 7:
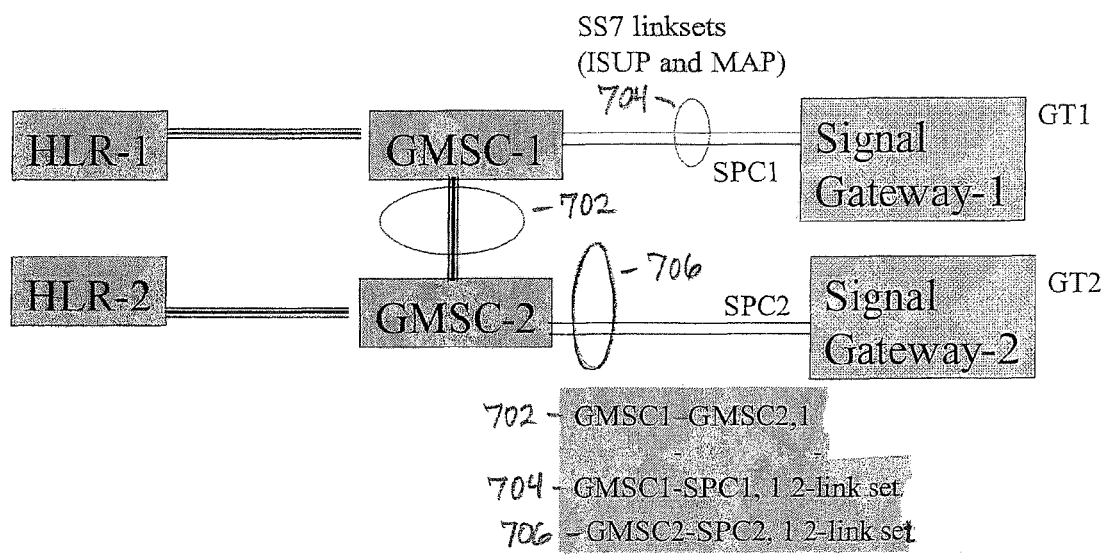
FIG. 7 is a block diagram of a non-cross-connect deployment topology, under an embodiment.

FIG. 7 is a block diagram of a non-cross-connect deployment topology, under an embodiment. Using this alternative non-cross-connect configuration to achieve an active/active load-balancing mode, map messages routed on MGT can still be mapped into either gateway via SCCP translation at each GMSC-H. However if the SCCP configuration does not support nested modes such as (Active/Active)/Passive, then the GTT cannot be configured to fall back on real HLR when the gateway function goes down. However it is possible to configure the GTT at each GMSC in such a way that the direct connected gateway is the Active SCCP entity while the real HLR for the SIMM MGTs is the standby/secondary SCCP entity. Since both GMSCs might be traversed evenly, this effectively achieves the load-balance between the Signal Gateways. However this still does not solve the fail-over case since if 1 gateway goes down, and the MGT-based MAP messages reach the direct connected GMSC, the real HLR will take over even though the other Signal Gateway is still alive.

For ISUP lookback signaling it should be possible to loop through the GMSC to a non-direct connected node via the other GMSC using MTP 3 routing. To support fail-over (partial), each GMSC will configure 2 alternate linksets for its loopback circuits. The primary link set for each GMSC will be the one directly connected to a Signal Gateway. The alternate link set will be the one connected to the other gateway via the other GMSC.

The cross-connect configuration is recommended for MAP, while both configurations are possible for ISUP loopback.

One embodiment of a logical cross-connection for MAP signaling virtually achieves the cross-connection by logically cross-connecting for SCCP but not physically cross-connecting. As such, the GMSC1 will know whenever SG2 is down based on the STP routing via GMSC2 so that when SPC2 is down, GMSC1 will not route GT2 message to SPC2 via GMSC2 (primary), but route to SPC1 (secondary) directly (no translation of called address by GMSC1 (still GT2)).

When both SG1 and SG2 are down, MGT (E.214) can be routed to HLR1/2 (according to IMSI range) directly instead of routing to other GMSC to check back and forth. This backup route is just for MGT but not necessary for MSISDN-F or GT1/GT2 because the HLRs will not recognize it and the messages will time-out.

Furthermore, the embodiment of the logical cross-connection for MAP signaling uses one link-set (MSC1-SPC1) to serve two route-sets (one to SPC0 and one SPC1) from MSC1 to SG1. Therefore, to a certain extent, SPC1 looks like STP for SPC0 (in other words, both SPC0 and SPC1 share the same MSC1-SPC1-signaling-linkset (with two physical C7 links) from the perspective of the GMSC).

Figure 8:
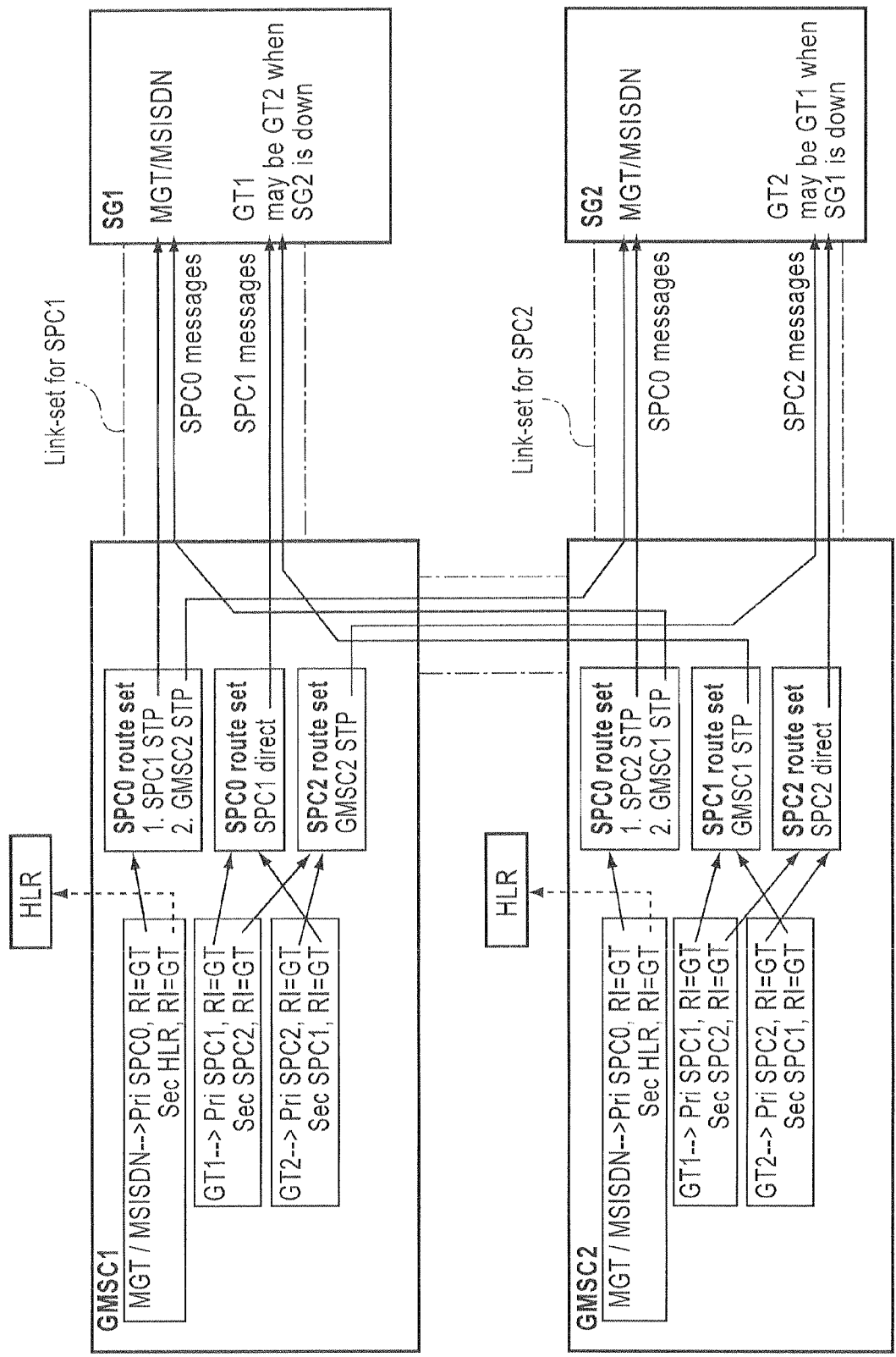
FIG. 8 is another block diagram of a cross-connect deployment topology, under an embodiment.

FIG. 8 is another block diagram of a cross-connect deployment topology, under an embodiment. When the HPMN has more than two GMSCs, all the above configurations can be used. The additional GMSC is configured to route calls on numbers from different pools in the Signal Gateway function to the two GMSCs in the cross-connect set-up. The MTP3 routing table and GTT translation on different GMSCs is also modified to reach the Signal Gateway function.

2.3.3. SCCP Addressing, ISUP Trunk Routing and Transformation Capabilities

One of the key functions of the Signal Gateway function is SCCP. It will use SCCP Global Title based routing to route/re-route messages through the GMSC to which it is coupled (GMSC-H). TCAP (ITU-T Q.773 compliant) and MAP messages (MAP v1, v2 and v3 as documented in ETSI GSM 09.02) will be decoded and certain fields transformed (as required on a case-by-case scenario). The specific transformations are described in individual scenarios below. The GMSC-H in HPMN also configures its GTT function to route MAP messages on global titles of the SIMM subscribers through the Signal Gateway function.

Figure 9:
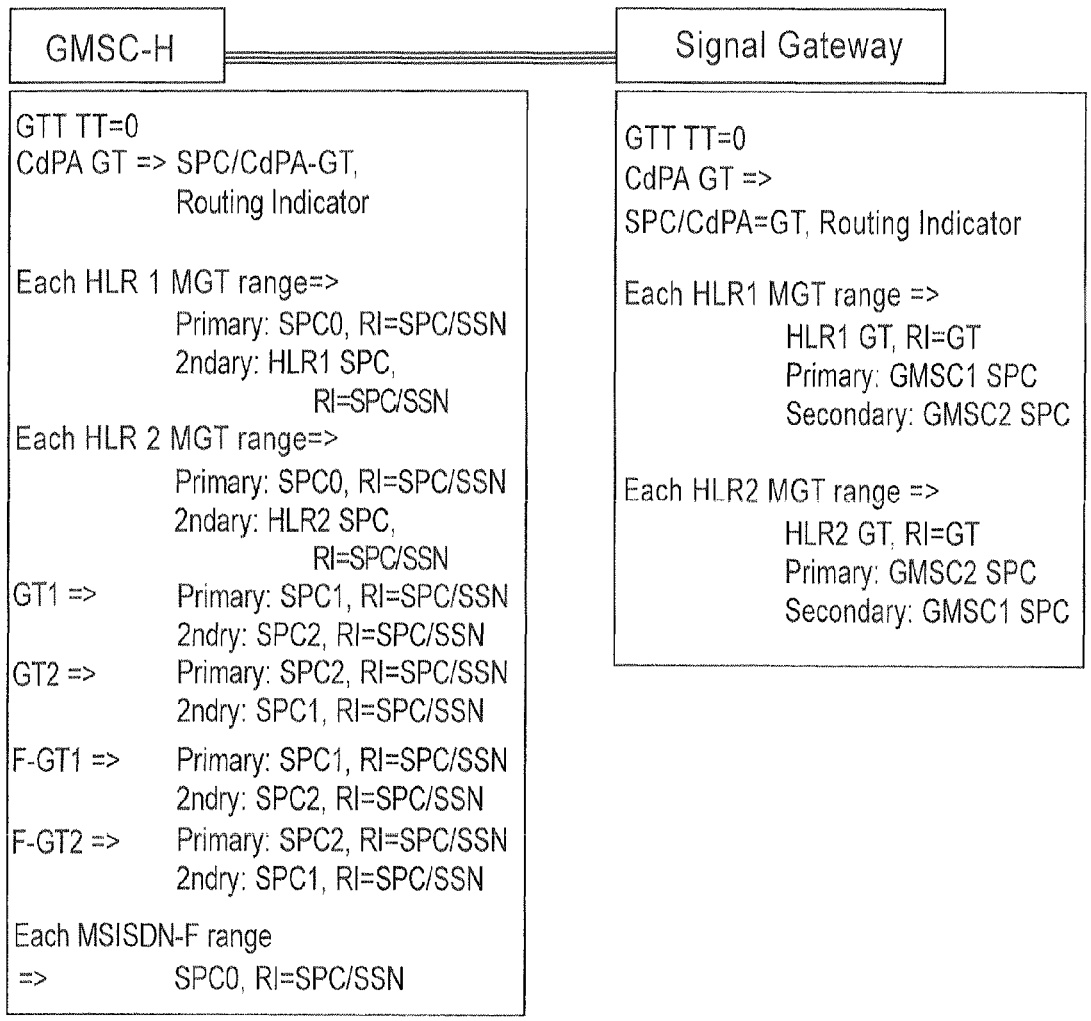
FIG. 9 is a block diagram of a Global Title Translation (GTT) routing configuration at a Gateway Mobile Switching Center (GMSC) in a Home Public Mobile Network (HPMN) (GMSC-H), under an embodiment.

FIG. 9 is a block diagram of a Global Title Translation (GTT) routing configuration at a Gateway Mobile Switching Center (GMSC) in a Home Public Mobile Network (HPMN) (GMSC-H), under an embodiment. At GMSC-H, routing on GT for each E-214 MGT range of the SIMM subscribers that correspond to a HLR will need to go through the Signal Gateway. This is configured in a primary and 2ndary active/standby set-up. The primary/active SPC of this translation will be the common SPC (i.e. SPC0) of both Signal Gateways. This effectively achieves an active/active load-balancing and fail-over support across gateways. The 2ndary/standby SPC is that of the HLR for the corresponding MGT range. This allows normal local and roaming services to be retained in the rare event of the failure of both gateways.

MAP messages on CdPA=MGT of the SIMM IMSI will be routed as normal messages as HPMN roamers in FPMN network. That is, they can go to the existing ISC providers, get routed in a normal way to the HPMN as a roaming subscriber in FPMN. No special configuration on FPMN GMSC-F need be made for CdPA=MGT.

However because HPMN HLR may perform different procedures (e.g. SS such as call barring and ODB services in VLR update, subscriber SS registration etc) based on a SIMM subscriber's network location, the Signal Gateway need to have two types of GTs. One type is the HPMN GT which is what FPMN VLR will know. The other type is the FPMN GT which is what HPMN HLR will know when the SIMM subscriber is registered at a FPMN.

If there are multiple FPMNs involved, each Signal Gateway will have its own corresponding FPMN GT for each FPMN. If the procedures at the HLR only depends on whether the subscriber is outside HPMN or not, a pseudo non HPMN GT might be used by a Signal Gateway for all FPMNs as long as the HLR procedures will regard such pseudo GT as a roaming GT.

If the HLR procedures can be configured based on VLR GT ranges, then there will not be a need to assign two types of GTs: HPMN and FPMN, to a Signal Gateway. The HPMN GTs of the Signal Gateways are simply regarded as roaming GTs by the HLR procedure configuration. As a result, for a Signal Gateway, its FPMN GT will be the same as its HPMN GT. For example, to support national roaming, an HLR is configured to indicate which address is a roaming GT. The SG GT can be configured like a roaming GT as if it is a roaming GT in national roaming.

Alternatively, if the HPMN network wants to regard a FPMN network as if it is an extended home network, then again there is no need for the FPMN type of GT for the Signal Gateway function for the FPMN network.

To support the general case, the configuration of an embodiment enables FPMN GT support for the Signal Gateway function per FPMN. In this case, when the Signal Gateway function imitates a FPMN VLR, it will present its FPMN GT that corresponds to the FPMN to the HPMN HLR. Whilst, when the Signal Gateway function imitates a HPMN HLR, it will present its HPMN GT to the VLR-F or SGSN-F. In this way, the HPMN HLR can then decide the right procedure to apply. When the HPMN HLR responds or initiates a dialog with the FPMN GT associated with a Signal Gateway, the GMSC routes it to the corresponding Signal Gateway.

When the subscriber registers with a FPMN network, the MSISDN-F is used as the calling party in delivering MO-SMS. If the message is intended for a non-FPMN country destination, the sending number is modified to MSISDN-H. For this reason, there will also be a special SMSC address (SMSC-S-H) used when IMSI-F is used for registration. The GMSC-H GTT translates the SMSC-S-H to SPC0 of the Signal Gateway. The Signal Gateway determines if it needs to change the sending number MSISDN-F to MSISDN-H.

Note however since SMS will be forwarded to wherever the HLR-H indicates when it receives SRI-SM(MSISDN-H), then when the SIMM subscriber registers at a FPMN, the Signal Gateway can present one of the following three options: (1) SG presents its HPMN GT to a HPMN HLR for VMSC and SGSN imitations; (2) SG presents FPMN GT to a HPMN HLR for VMSC and SGSN imitations in which case, the FPMN STP is configured to translate the FPMN GT in CdPA to the HPMN GT of the Signal Gateway; (3) SG passes GT of VMSC-F and SGSN-F transparently to HPMN HLR without any change. Since a MSISDN-F is provisioned at the Signal Gateway on the HPMN side, special SCCP routing is constructed from FPMN and possibly HPMN side too (e.g., in the case of optimal routing).

Figure 10:
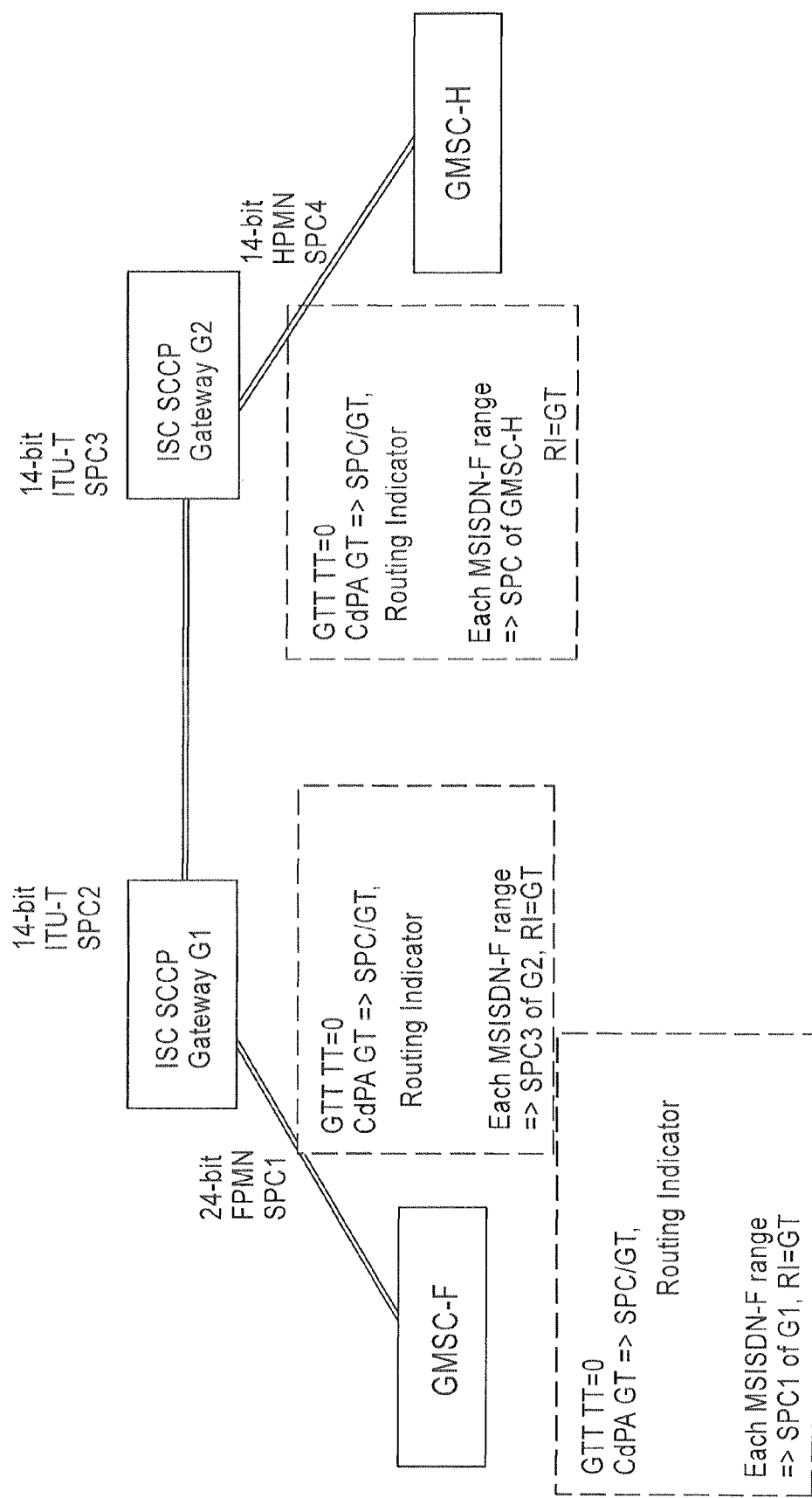
FIG. 10 is a block diagram of a Global Title Translation (GTT) routing configuration at a Gateway Mobile Switching Center (GMSC) in a Foreign Public Mobile Network (FPMN) (GMSC-F), under an embodiment.

FIG. 10 is a block diagram of a Global Title Translation (GTT) routing configuration at a Gateway Mobile Switching Center (GMSC) in a Foreign Public Mobile Network (FPMN) (GMSC-F), under an embodiment. There are three methods for routing MAP messages on CdPA=MSISDN-F. The first two routing methods use the existing ISC. The first routing method configures GMSC-F/STP-F GTT function on each MSISDN-F range to translate the CdPA=MSISDN-F into the Signal Gateway function (common GT) GT0 as the CdPA field with Routing Indicator=GT. The GTT translation for GT0 will be the SPC of the ISC SCCP gateway. The rest of the SCCP routing is supported by the ISC in the method described herein.

In the second routing method, GMSC-F/STP-F configures its GTT function on each MSISDN-F range to set its next SCCP node to the SPC of the ISC SCCP gateway on the FPMN side. The ISC SCCP gateway has 2 SPC. One conforms to the 24 bit SPC format of the FPMN side; while the other conforms to the 14-bit SPC format of the ITU-T international standard. The ISC configures this SCCP gateway to route the MAP messages on CdPA=MSISDN-F to the ISC SCCP gateway that corresponds to the HPMN network. The ISC SCCP gateway also has 2 SPC. One conforms to the 14-bit SPC format of the HPMN side; while the other conforms to the 14-bit SPC format of the ITU-T international standard. This gateway configures its GTT to route the MAP messages on MSISDN-F to the GMSC-H. All routing is done on global title of MSISDN-F range. GMSC-H will do the final translation into a routing indication on SPC/SSN as shown in the above GTT configuration at GMSC-H.

The third routing method routes MAP messages on MSISDN-F ranges over the dedicated leased line used to route calls between GMSC-F and GMSC-H for the SIMM service. To provide the special tariff for SIMM subscribers and avoid IDD charge, HPMN and FPMN set up a dedicated leased line between GMSC-F and GMSC-H. By routing MAP messages on CdPA=MSISDN-F on the dedicated leased line, the HPMN can avoid configuring GTT changes on the existing ISC gateways. While the ISC providers offer routing and trunking as well as SS7 conversions, the HPMN also gets an SS7 conversion over the leased line.

Figure 11:
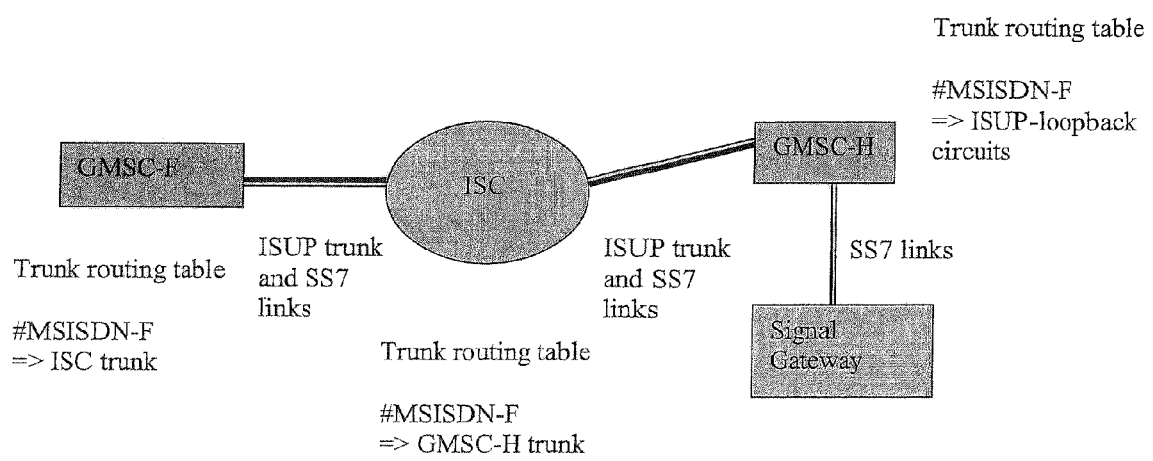
FIG. 11 is a block diagram of a trunk routing configuration of the GMSC-F.

Similarly, GMSC-F also configures its ISUP trunk routing table to route all calls on the special range of FPMN numbers (denoted by #MSISDN-F) allocated for the SIMM service towards an ISC carrier (dedicated or existing one). The ISC carrier needs to route these calls towards the GMSC-H. FIG. 11 is a block diagram of a trunk routing configuration of the GMSC-F.

2.3.4. Service Node Capabilities

Service Node Capabilities are used to generate CDR for voice calls and Mobile Terminated SMS. This CDR is used for appropriate rating, providing discount/rebate, billing and settlement. between the HPMN, FPMN and the SIMM subscriber. The Signal Gateway of an embodiment supports two types of interfaces: the ISUP loopback interface and the IN interface as described below.

2.3.4.1. ISUP Loopback Interface

Figure 12:
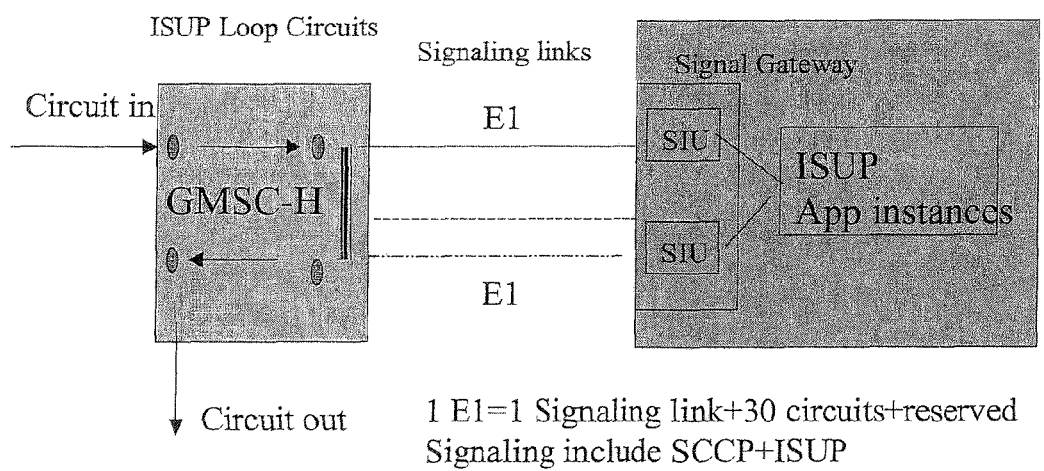
FIG. 12 is a block diagram of an Integrated Service Digital Network (ISDN) User Part (ISUP) message loopback circuit configuration at a GMSC in a Home Public Mobile Network (HPMN) (GMSC-H), under an embodiment.

As described above, the Signal Gateway is capable of terminating and generating ISUP signaling. However, it does not have voice ports so it loops-back voice ports at the GMSC by controlling circuit allocations at the GMSC. FIG. 12 is a block diagram of an Integrated Service Digital Network (ISDN) User Part (ISUP) message loopback circuit configuration at a GMSC in a Home Public Mobile Network (HPMN) (GMSC-H), under an embodiment.

The ISUP loopback circuits of an embodiment are constructed at GMSC-H by configuring two E1 ports as loopback circuits such as 1-30 range of circuit IDs of the 1st E1 is mapped correspondingly to 33-62 range of circuit IDs of the 2nd E1. That is, voice path coming in on circuit ID 1 will go to circuit 33 and vice versa, voice path coming in on circuit ID 2 will go to circuit 34 and vice versa, and so on. While the voice paths are looped between the two E1 ports, the signaling path is constructed at GMSC-H for both ports to be non-associatively looped through the Signal Gateway function.

The Signal Gateway might also modify the calling parameter in addition to the called parameter in some cases for ISUP loopback calls. When the MIMM subscriber is called by the subscriber's FPMN number in FPMN country when the subscriber is in the HPMN/VPMN network, the A party number will be modified by the Signal Gateway to add an international prefix (e.g. +86 in China) after national prefix is stripped (e.g. 0 in China). This allows the called party to easily call back. Since all the ISUP loopback calls will also go through the leased line of an ISC carrier, it is possible to perform this function by the ISC carrier. But it is recommended to conduct this in the Signal Gateway to avoid costs and ISC complication.

Loopback circuits double the circuits used in setting up a call looped through the GMSC-H with signaling via the Signal Gateway function. So routing through loopback circuits is carefully filtered. The different ranges of numbers from different pools of the Signal Gateway function are configured to use loopback circuits at the GMSC-H.

2.3.4.2. IN Interface

As described above, the Signal Gateway also supports IN interface. The IN interface is in fact more ideal than ISUP loopback since it does not incur double voice trunking or any voice trunking. However the switch must support IN which is often not the case. Sometimes an operator is also unwilling to or cannot deploy an IN solution due to possible feature interactions and switch vendor involvement.

Throughout the description herein, the ISUP loopback is used as the base of description since it is the least common denominator of operator switches. Operator must be aware of the IN option which is a far more scalable solution than ISUP loopback. For this reason, a description of the IN interface is provided.

Figure 13:
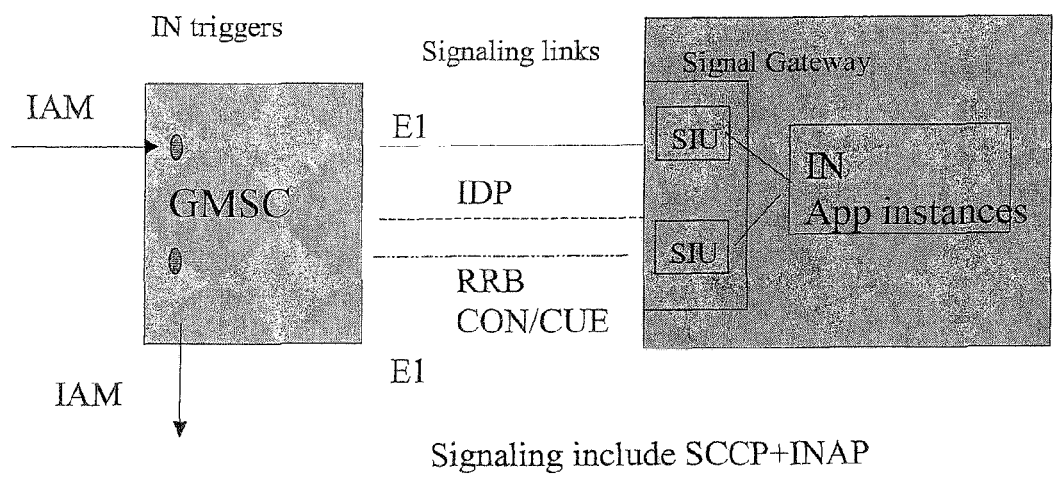
FIG. 13 is a block diagram of an interface between a Signal Gateway (SG) and an Intelligent Network (IN), under an embodiment.

FIG. 13 is a block diagram of an interface between a Signal Gateway (SG) and an Intelligent Network (IN), under an embodiment. The IN architecture involves defining triggers at the GMSC. These triggers could be on special prefixed numbers and could even be dynamically armed from HLR. When the trigger criterion is satisfied, GMSC will issue INAP InitialDP (IDP) to the Signal Gateway. The Signal Gateway can issue further instructions such as RequestReportBCSM (RRB) to report on call events (such as non-answer, busy, answer, disconnect etc) and CONNECT (CON) to a new number and CONTINUE (CUE). Subsequently, the switch reports events via ERB (EventReportBSCM) to the Service Node, and the report information is used for accounting purposes and preparation of a CDR.

2.3.5. IN Interface

In addition to using the IN interface to replace ISUP loopback at HPMN as described above, the IN interface has other uses depending on operator requirements and network environment. As one example of other uses of the IN interface, if IN/Camel is supported at an HPMN, for SIMM subscribers, IN or O-CSI can be defined; as such, every time the SIMM subscriber makes a call, the IDP trigger comes to the Signal Gateway. Checks are performed to determine if the called party is a FPMN country number; if it is, the SG can modify the calling party number in IN or generic number in Camel to be the FPMN number. For IN, the trigger criteria can be defined on FPMN country number in called party at HPMN switches. For Camel 1+, trigger criteria can be defined on O-CSI at HLR to limit the trigger on called party being a FPMN country number prefix. IN of course can only be limited to HPMN. Camel can be applied at any VPMN that supports Camel to HPMN.

As a second example of other uses of the IN interface, if IN/Camel is supported at FPMN, optimal routing CDR can be generated. In this case, a direct MSRN (described below) will not be issued initially to GMSC-F when MSISDN-F is called and the roamer is at a non-HPMN network (FPMN or VPMN). Instead a prefixed MSRN will be returned first to the GMSC-F. The GMSC-F can then issue an IDP on the trigger criteria of the special prefix to the Signal Gateway via SCCP (the beauty of SCCP across international boundaries). The CON (Connect) is then issued to the real MSRN. In this way, optimal routing can be achieved with the CDR (not just MAP SRI records) also generated by the Signal Gateway at HPMN.

In a third example of other uses of the IN interface, the IN provides the possibility of supporting multiple HPMNs in a central location since ISUP loopback will be prohibitively expensive when looping-back across international boundaries.

2.3.6. Redundancy and Availability of Service

Carrier-grade systems require extremely high levels of network uptime, typically 99.999%. A critical requirement in many systems is to eliminate single points of failure in SS7 links, SS7 boards, and the system chassis. Furthermore, systems require the ability to perform hardware and software upgrades without system downtime. There are also redundancy requirements on software applications, data storage, and power supplies, for example, including: redundancy in signaling data links (e.g. nominated reserves or switched connections); redundancy in signaling terminal devices (e.g. a common pool of terminals for the same signaling point); redundancy of signaling links within a link set (typically operating with load sharing); redundancy in signaling routes for each destination (possibly operating with load sharing); redundancy in signaling boards; redundancy in power supplies; redundancy in software application instances; redundancy in data storage; redundancy in LAN connection; and redundancy in watch dogs.

One solution as adopted by HLR/MSC which is sometimes referred to as the switch design is to build all the above redundancy requirements within a single chassis completely for the Signal Gateway function. One big advantage of this approach is that a single global title and SPC can be assigned to the Signal Gateway. There is no need to replicate data across gateways since TCAP transactions always return to the same node. There is also no need to replicate ISUP loopback context and call context. To avoid memory, disk failure and chassis damage, industry grade hardware components will be needed. This design can be used for core telco services such as voice call and SMS, but is overkill for the SIMM service because the failure of the Signal Gateway functions, at worst, causes SIMM subscriber services to revert back to a normal home subscriber service (local or roaming).

Figure 14:
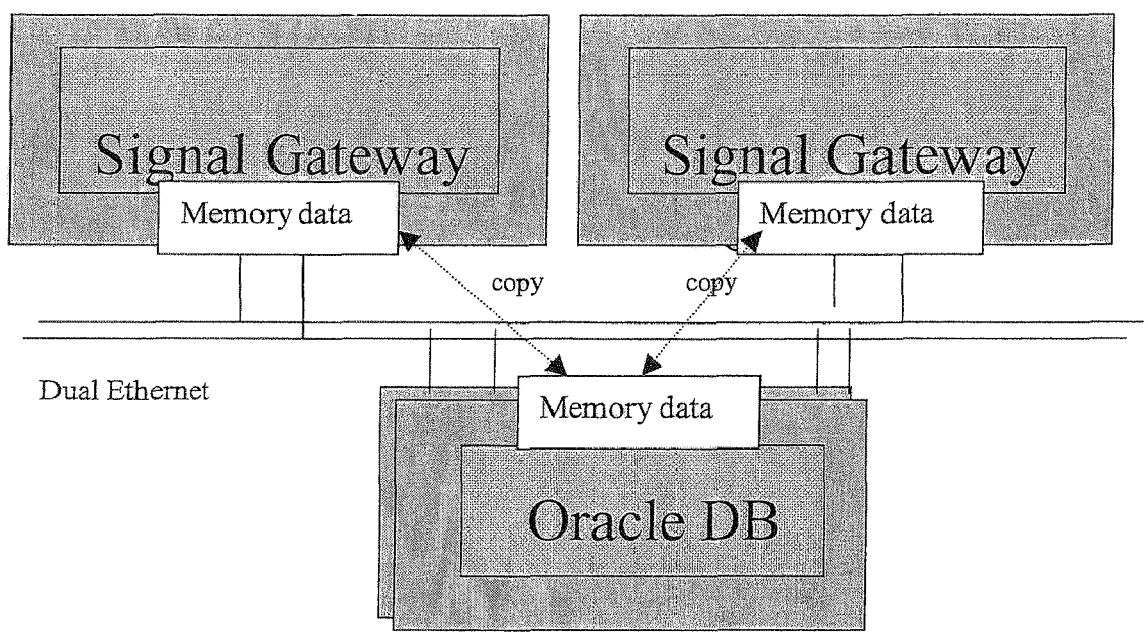
FIG. 14 is a block diagram of a system including at least one Signal Gateway (SG) and a database, under an embodiment.

Given the prohibitive cost nature of some switch designs, the Signal Gateway functions of an embodiment are implemented in a server farm which is sometimes referred to as the server system or design. The configuration of an embodiment includes two Signal Gateway servers performing the Signal Gateway function. The two Signal Gateway servers are coupled to a database server that acts as the shared memory and shared disk for the two gateways. FIG. 14 is a block diagram of a system including at least one Signal Gateway (SG) and a database, under an embodiment.

Two example server system configurations are provided herein, but many alternative embodiments are possible. One server system configuration is based on the Sun Netra family, while another server system configuration is based on Sun Fire family. In both cases, the use of four servers is proposed. In the Sun Netra configuration, two Netra 20 will run the Signal Gateway function while two T1405 will host a database (DB), for example an Oracle database with replication support. In the Sun Fire configuration, two Sun Fire V480s host the Signal Gateway function and two Sun Fire V480s host the database with replication support.

The Netra 20 has four PCI slots and up to UltraSparc III 2*900 Mhz central processor units (CPUs) and up to 16 GB random access memory (RAM). It is designed to achieve high performance for the Signal Gateway function. It has alternating current (AC) and dual direct current (DC) power options and up to 2*36 GB disk. The Netra 1405 has up to 4*440 Mhz CPU, up to 8 G RAM but up to 4*36 GB hard disk and hot swappable (n+1) AC and DC power options. Netra 1405 is chosen for DB server for its high reliability and hot swappable n+1 power supplies.

The Sun Fire V480 server is configured with up to 4*900 MHz UltraSPARC III CPUs with 8 MB of cache per processor. The Sun Fire V480 server supports up to 32 GB of memory. All memory is accessible by any processor. The Sun Fire V480 server also comes with a DVD-ROM drive, two hot-swappable (N+1) AC and DC power options, two hot-pluggable Fibre Channel disks, two integrated dual 10/100/1000 Mbps Ethernet ports, and six PCI slots, all in a 5 RU, 24-inch deep, rack-optimized chassis. The Signal Gateway function server will also have up to 16 GB-RAM and 2*36 GB disk. The database server will have up to 16 GB-RAM and 8*36 GB disk.

Each Signal Gateway has its own memory data to run the SIMM service. The memory data contains transit information as well as persistent information obtained from the database or to be written to the database. The memory data is also copied to the shared memory space in the database server in the case of full redundancy support. The shared memory can also contain the data from the DB to be accessed by each Signal Gateway. The architecture thus forms a hierarchical level of data management.

When a Signal Gateway searches for data, it first searches the corresponding memory data. If it is not found it is going to look for it in the shared memory on the DB server and cache the data in the gateway's memory. The DB server will load the data into its memory if the data is in DB but not in the memory. The DB server's disk is also configured in mirrored disk structure for data redundancy.

When a Signal Gateway's memory data record has changed, a copy is made to the DB server. This is an option to support full fail-over if necessary. If the DB server already had a copy from the Signal Gateway, nothing will be done. However if the DB server last had a copy from another gateway, the DB server will inform the other Signal Gateway to remove its copy or mark its copy for renewal. This is to solve the data consistency problem in a load balancing mode with full fail-over support.

Regardless of whether the Signal Gateway memory data is copied into the shared memory, at the end of a transaction (e.g. location update) of a Signal Gateway, data of persistent type (e.g., roaming information, CDR, etc.) is copied to the shared DB server.

Figure 15:
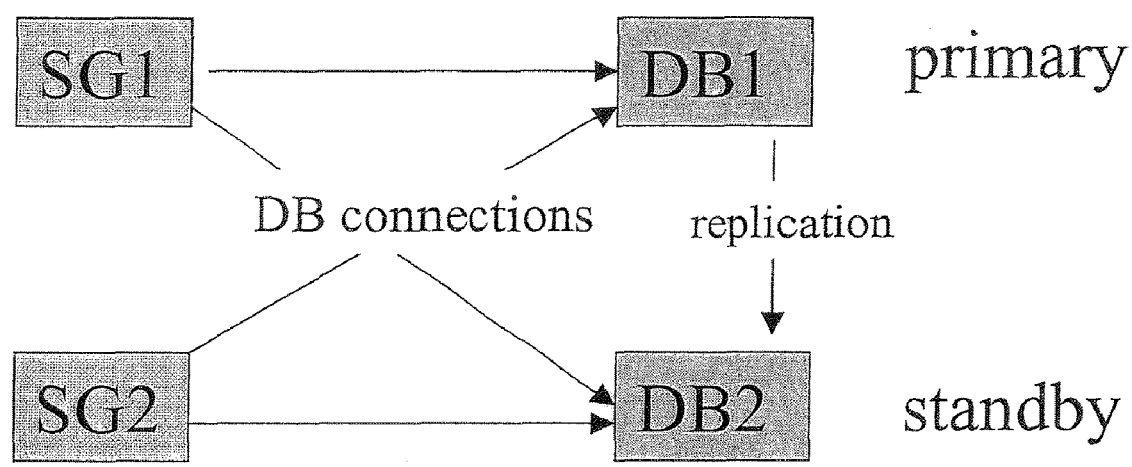
FIG. 15 is a block diagram of couplings between Signal Gateways (SGs) and databases in a system, under an embodiment.

FIG. 15 is a block diagram of couplings between Signal Gateways (SGs) and databases in a system, under an embodiment. If one Signal Gateway fails, the other gateway can still function by accessing the shared DB server. The redundancy of DB server is maintained separately and is implemented on a high-availability machine such as Netra T1405 or Sun Fire V480 which have three AC and three DC hot swappable power supplies. The DB server will also have a high memory space 8-32 G RAM to support shared memory for both gateways.

If the database server fails, the Signal Gateway function will cease to function (all protocol stacks will automatically be shut and all apps will not proceed until a DB connection can be established) and essentially constitute a failure of the Signal Gateway function. In this case, normal HLR function will take over. However the shared data redundancy can be supported by having another replicated DB server with redundancy/fail-safe and transparent application failure support in stand-by mode.

The system of an embodiment includes Oracle Net or Net 8 for transparent application failure (TAF). The system includes TNSNAMES.ORA configuration as shown below. The configuration supports transparent fail-over across multiple instances of a DB on different ports of the same machine or across machines; it also supports load-balancing and active/active fail-over. The fail-safe operates in active/standby mode since the failure of DB server will render the Signal Gateway function completely useless. Standby mode is chosen since replication might not be fast enough for normal cases of Signal Gateway functions although it is acceptable for exceptional cases (e.g. fail-over switch). In this architecture, each Signal Gateway will open up a DB connection with the primary DB server which replicates data to the standby DB server.

In the event of failure of the primary DB server, each gateway will open up a DB connection with the standby DB server. When the original primary DB server is completely restored, it can become the primary server again. This process is automatic. Service will not be interrupted.

The original standby server (now the new primary server) will be manually configured to synchronize with or (more precisely) replicate to the new standby server (the original primary server). If during the restoration process of the original primary server, the new primary server also goes down, then the whole system fails. There will be another alarm and no SS7 messages will be accepted; normal HLRs will take control.

When both DB servers are down, each Signal Gateway will completely shut down the protocol stacks to reject all SS7 messages. The applications will not proceed until DB connections are re-established.

To support full fail-over, shared memory data is copied to both DB servers, or the primary DB server is configured to replicate the memory data across the standby DB server. Full fail-over support for a service is defined as no service interruption as long as one of two physical gateways is functional. Partial fail-over support for a service is defined as to include a service interruption when the gateway initially chosen to handle the service fails but service is restored when a spare gateway is activated.

Each Signal Gateway has at least 4 PCI slots (one 33/66 MHz and three 33 MHz) for peripheral IO cards. The SS7 interface cards are housed in these slots. Each server has two disks of 36 GB each. They are configured in mirrored mode and hence provide high resilience.

Referring again to FIG. 6, two GMSC-Hs are used in an embodiment to cross-connect with the two physical Signal Gateways. As mentioned before, each gateway has its own distinguishing Global Title (GT) (GT1 and GT2) and distinguishing SPC (SPC1 and SPC2). Both gateways also have a common SPC (SPC0). Link-level redundancy is achieved by using linksets which in some cases span across both gateways as mentioned in the deployment topology section before.

When considering ISUP call fail-over handling, depending on the fail-over requirements, different link sets will be configured at the GMSC-H for non-associated signaling for the ISUP loopback calls. For example, if full fail-over is desired, then the four-link linkset that spans across two Signal Gateways will be used for a GMSC-H's non-associated ISUP signaling. If partial fail-over is acceptable, then the two two-link linksets that do not span across the two Signal Gateways can be used. Note also due to the cost of ISUP loopback circuits, the Signal Gateways can all be coupled to one GMSC-H.

The ISUP loopback circuits of an embodiment are constructed at GMSC-H by configuring two (or more pairs) E1 ports as loopback circuits such as 1-30 range of circuit IDs of the first E1 is mapped correspondingly to 33-62 range of circuit IDs of the second E1. That is, voice path coming in on circuit ID 1 will go to circuit 33 and vice versa, voice path coming in on circuit ID 2 will go to circuit 34 and vice versa, and so on. There may be many pairs of E1s configured at a GMSC-H for ISUP loopback calls, depending on dimensioning requirements.

Figure 16:
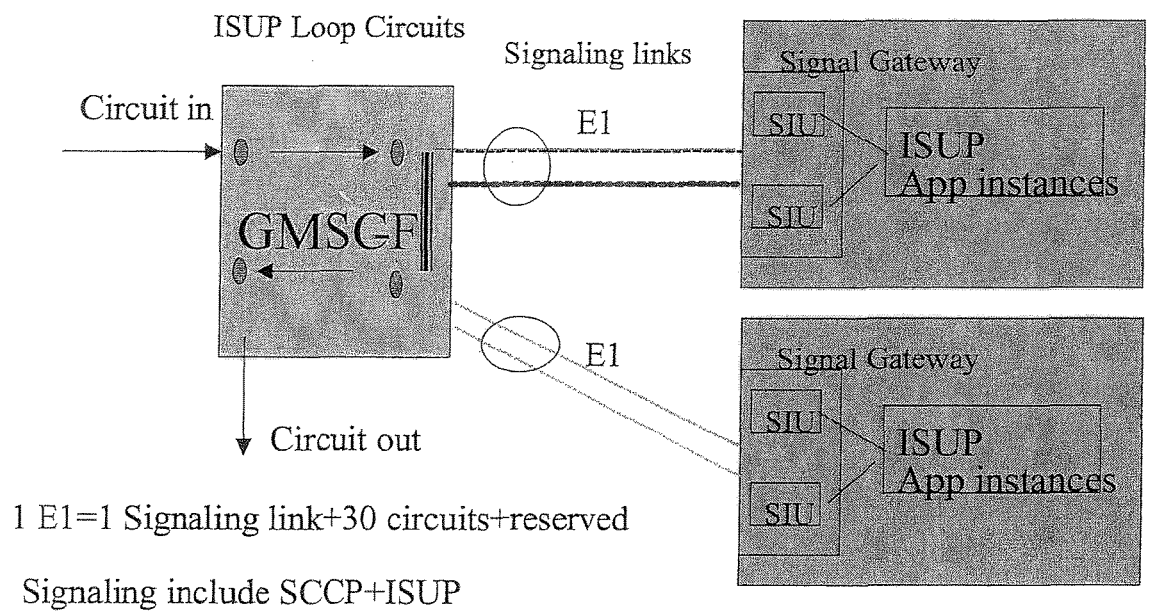
FIG. 16 is a block diagram of an ISDN User Part (ISUP) message loopback circuit configuration for call fail-over handling, under an embodiment.

FIG. 16 is a block diagram of an ISDN User Part (ISUP) message loopback circuit configuration for call fail-over handling, under an embodiment. While the voice paths are looped between the two E1 ports, the signaling path is constructed at GMSC-H for both ports to be non-associatively looped through the Signal Gateway function using two alternate links sets with SPC1 and SPC2 as the adjacent SPC respectively in the case of partial fail-over support. If GMSC is not directly connected to a gateway as in the non-cross-connect configuration, then the alternate linkset will include the adjacent GMSC. In the case of full fail-over support, a single link set between the GMSC-H and SPC0 can be used. However call context need be copied to the shared memory of the DB server by each Signal Gateway.

To ensure data consistency, each time a shared memory of the DB server obtains a copy from a Signal Gateway that differs from the last gateway, then the DB server informs the last gateway to remove its copy. For example, during an ISUP loopback call, signaling might first come in one gateway where call context will be created and copied to the shared DB server. It might later go to another gateway which would need to load in the call context from the shared DB server. The copy of the other server must be removed to ensure data consistency. However this could introduce a racing condition since the next message could go back to the original gateway faster than its call context being removed. To avoid this problem for ISUP signaling, each Signal Gateway should attempt to load the latest if any from the shared DB server.

Since ISUP signaling runs over the same linksets as MAP signaling between GMSC-H and the Signal Gateway function, in the case of full fail-over support, ISUP signaling can also be switched physically between two Signal Gateways so that it can be switched to the second Signal Gateway when the first Signal Gateway fails for some reason. In this way, calls can continue as if nothing had happened.

In both cases, however to protect against unexpected failures on both nodes and to prevent fraud, ISUP signaling through the gateways are monitored periodically to produce a temporal CDR duration every X seconds (e.g., X=6) where X is configurable. In this way, call durations can be accurate at least within the boundary of X seconds.

However unlike MAP signaling where a Signal Gateway can be addressed by its distinguishing global title for subsequent interactions of a MAP transaction once the gateway is chosen in a fail-over or load-balancing initially, the ISUP signaling interactions for the full fail-over case will span across both physical gateways in an on-going ISUP call session. This means copying of call context into the shared memory data space of the DB server by each Signal Gateway is essential if the signaling links from a linkset spans across both physical gateways.

If the partial fail-over is acceptable (as recommended for ISUP loopback signaling due to the possible racing condition mentioned above), then when the Signal Gateway that accepted the ISUP signaling for a loopback call fails, there will be no fail-over to the second gateway and the call is simply dropped by the GMSC-H. In this case, no copy of call context to the DB server is required. The linksets used for the ISUP signaling between GMSC-H and the Signal Gateway function will be two alternate linksets (instead of one across both gateways) using the distinguishing SPC of each gateway in primary and secondary mode. So if the gateway that accepted the initial ISUP signaling failed, the current calls get dropped. However for new ISUP loopback calls, the second gateway will be used.

Note that when a linkset associated with a circuit call completely fails, MTP2 level at GMSC-H of the ISUP loopback calls will inform the higher level—ISUP level which will bring the circuit down. This avoids the case where a call could continue forever when the Signal Gateways are all down.

Next SCCP signaling fail-over support is described. Referring again to FIG. 9, the SCCP GTT configurations have been described in the SCCP configuration above. SCCP routing of messages (e.g. UpdateLocation) on each MGT range of the SIMM subscribers will go through the two Signal Gateways in an active/active set up at the GMSC-H, supporting both load-sharing and fail-over. GMSC-H in this case will be configured at GTT set-up for each range of IMSI (or MGT) to go through the single common SPC (SPC0) of both Signal Gateways in an effective active/active mode. The real HLR for the corresponding range of MGTs of SIMM subscribers will be configured as a secondary backup. In the rare condition of the entire system failing, the SIMM subscribers will roam as normal HPMN users. Note that it does not matter which gateway is chosen in the SCCP routing of messages on MGTs of SIMM subscribers.

The SCCP routing of messages (e.g. SRI, SRI-SM, etc.) based on CdPA=MSISDN-F from FPMN towards HPMN is also supported via an active/active GTT configuration at the GMSC-H. This again achieves load-balancing and fail-over support by the Signal Gateways. However unlike MGT-based routing, there will be no secondary backup for MSISDN-F based routing. In the rare condition of the entire system failing, the SIMM subscribers will roam as normal HPMN users and can only get home services (calls and SMS etc) on the HPMN number, but not on the FPMN number.

However because HPMN HLR may perform different procedures (e.g. SS such as call barring and ODB services) based on a SIMM subscriber's network, the Signal Gateway has two types of GTs. One type is the HPMN GT which is what FPMN VLR will know. The other type is the FPMN GT which is what HPMN HLR will know when the SIMM subscriber is registered at a FPMN.

If there are multiple FPMNs involved, each Signal Gateway will have its own corresponding FPMN GT for each FPMN. If the procedures at the HLR only depends on whether the subscriber is outside HPMN or not, a pseudo non HPMN GT might be used by a Signal Gateway for all FPMNs as long as the HLR procedures will regard such pseudo GT as a roaming GT.

If the HLR procedures can be configured based on VLR GT ranges, then there will not be a need to assign two types of GTs: HPMN and FPMN, to a Signal Gateway. The HPMN GTs of the Signal Gateways are simply regarded as roaming GTs by the HLR procedure configuration. As a result, for a Signal Gateway, its FPMN GT will be the same as its HPMN GT. For example, to support national roaming, an HLR is configured to indicate which address is a roaming GT. The SG GT can be configured like a roaming GT as if it is a roaming GT in national roaming.

Alternatively, if the HPMN network wants to regard an FPMN network as if it is an extended home network, then again there is no need for the FPMN type of GT for the Signal Gateway function for the FPMN network.

To support the general case, an embodiment supports a configuration to enable FPMN GT support for the Signal Gateway function per FPMN.

When the Signal Gateway function imitates an FPMN VLR, it will present the FPMN GT that corresponds to the FPMN to the HPMN HLR. When the Signal Gateway function imitates a HPMN HLR, it will present its HPMN GT to the VLR-F or SGSN-F. In this way, the HPMN HLR can then decide the right procedure to apply. When the HPMN HLR responds or initiates a dialog with the FPMN GT associated with a Signal Gateway, the GMSC routes it to the corresponding Signal Gateway.

Note however that since the SMS will be forwarded to wherever the HLR-H indicates when it receives SRI-SM (MSISDN-H), then when the SIMM subscriber registers at a FPMN, the Signal Gateway of an embodiment presents one of the following: (1) an HPMN GT to a HPMN HLR for VMSC and SGSN imitations; an FPMN GT to a HPMN HLR for VMSC and SGSN imitations in which case, the FPMN STP is configured to translate the FPMN GT in CdPA to the HPMN GT of the Signal Gateway; and the GT of VMSC-F and SGSN-F are passed transparently to HPMN HLR without any change.

Unlike the SCCP routing of messages based on MGT and MSISDN-F as CdPA, the SCCP routing of messages (e.g. insertSubData from HLR or ack from a VLR or forwardSMS from a SMSC) towards a GT of a Signal gateway at the GMSC-H is configured in an active-standby mode in the case of full fail-over support. The primary DPC of the translation in this case is the distinguishing SPC corresponding to the HPMN (if towards VLR-F) or FPMN (if towards the Signal Gateway) GT of the Signal Gateway; while the secondary DPC is the SPC corresponding to the HPMN (if towards VLR-F) or FPMN (if towards the Signal Gateway) GT of the other gateway. In the event of the targeted gateway failing, the second gateway will communicate with the originating global title using the global title of the first gateway.

Figure 17:
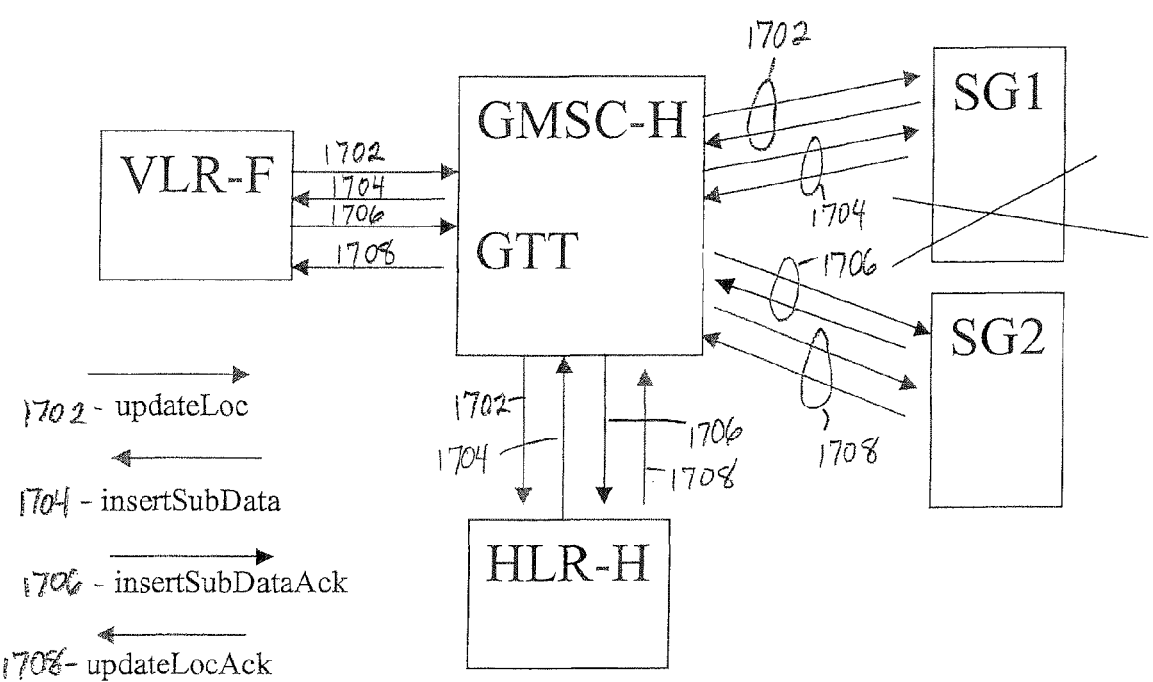
FIG. 17 is a block diagram of updated location transaction flow following Signal Gateway (SG) failure, under an embodiment.

FIG. 17 is a block diagram of updated location transaction flow following Signal Gateway (SG) failure, under an embodiment. As an example, on receiving the VLR-F's ack to insertSubData from HPMN GT1 of the SPC1 Signal Gateway, GMSC-H will switch over to the SPC2 of the Signal Gateway when SPC1 fails. SPC2 will assume HPMN GT1 as the calling GT when sending Ack to updateloc to VLR-F since VLR-F will only accept the updateLoc Ack if the calling GT is the same one as before in the transaction.

The reason that the routing of messages on GT of a Signal Gateway is not based on active/active set up but a active/standby setup is because the current transaction context was first established at the chosen Signal Gateway when messages are routed through the gateway based on MGT and MSISDN-F. Even each gateway copies the transaction context as fast as it can over 100 Mbps Ethernet, it might not be as fast as the messages routed on GT of a Signal Gateway, which could be in milliseconds. This could create a racing condition (similar to the ISUP signaling). When the original gateway was not chosen on the current transaction context, the still-alive gateway will take longer time to load the data from the shared memory.

Therefore even in the case of full fail-over support, the transaction still goes back with the originally chosen gateway as long as it is possible to avoid shared DB server access. This makes it particularly efficient for some signaling flow (e.g. SRI messaging). For cases where the switch-over cannot be avoided, the extra overhead introduced is still efficient enough for fail-over handling.

In the event of a failure of the targeted gateway, the second gateway will take over in a full fail-over support. The second gateway will need to load the latest data from the shared DB server. In the partial fail-over support, the transaction will be dropped, and a new transaction issued by the original calling SCCP entity.

In general, stand-alone transactions (e.g. PurgeMS, non-framed insertSubdData etc) on the GT of a Signal Gateway as CdPA will not need to go back to the gateway since the context from the gateway will have already been copied to the shared DB server. However since the chosen GT in CdPA of stand-along transactions is usually the result of a load-sharing transaction based on MGT and MSISDN-F as CdPA (e.g. updateLoc), the stand-alone transactions towards a particular Signal Gateway will effectively be load-balanced.

It is possible to always set the GT of the Signal Gateway in the MAP content as a common GT between two Signal Gateways in the case of full fail-over support. This would require each gateway to be associated with both a distinguishing GT and a common GT. While either gateway will have the same GT in the MAP context, the calling party or called party will be the distinguishing GT of the gateway for the new transaction initiated by the Signal Gateway. For example, when the chosen Signal Gateway, say GT1, relays the updateLoc messages to a HLR-H, the calling GT will be GT1 but the VLR content in the message will be replaced by the common GT GT0. This approach should achieve load-balancing slightly better than the case of a distinguishing GT in the MAP content for stand-alone MAP transactions. However as mentioned before, since the set of GTs of stand-alone transactions in CdPA is usually the result of evenly distributed transactions on MGT and MSISDN-F, the final distribution is still fairly even. The common GT is thus not necessary.

Note that the GTT configuration at GMSC-H does not require translation from a global title into another global title. The translation capability from a global title to a SPC is sufficient. The GTT configuration also does not assume any new translation type. Only translation type 0 is used.

In reviewing the definitions of full fail-over and partial fail-over support described above, full fail-over support for a service type (e.g., MAP or ISUP) is defined as the current services of the service type not being interrupted as long as one of the two (or N) physical gateways is functioning. Partial fail-over support for a service type is defined to include possible partial interruptions of the current services when the gateway initially chosen to handle the service fails but new services of the service type can be handled by a functioning gateway(s).

For example, if location-update fails as a result of a Signal Gateway failure, the MS/VLR can do a retry which will be handled correctly by the still-alive Signal Gateway. Similarly for SMS, if the MT-SMS fails as a result of a Signal Gateway failure, the SMSC-X can initiate another transaction (SRI-SM followed by MT-SMS) which can then be taken over by the functioning gateway.

For ISUP loopback calls, when a Signal Gateway fails with partial fail-over support, the call simply gets dropped. New ISUP loopback calls can be handled by the functioning gateway.

When the IN architecture is used, and a Signal Gateway fails with partial fail-over support, the call simply gets dropped. New InitialDP requests can be handled by the functioning gateway.

By using the shared memory and shared DB architecture between load-balancing gateways, the Signal Gateway function is also able to support full fail-over depending on the racing conditions. However due to racing conditions, the following configuration is recommended: partial fail-over support for ISUP loopback call; partial fail-over support for MAP transactions; primary and standby DB servers with replication.

This means that copying of memory data record from the Signal Gateway function to the database server will not be necessary in the case of partial fail-over support. For purposes of the description herein, this copying as an option used to illustrate the case of full fail-over support.

It is noted that even in the case of partial fail-over support, at the end/completion of a transaction involving data of persistent nature (e.g., roaming information, CDR, etc.) in a Signal Gateway, the data is saved into the shared DB server. This means that at a later stage where a transaction initiated by a VLR-F (e.g. SS registration, SendAuthentication etc) or by a HPMN HLR (e.g. PRN query, FSMS etc), even the Signal Gateway stored in these registers failed, based on the standby configuration of GTT, the functioning gateway can still handle the transaction by using the shared DB server(s).

For example, if a SIMM subscriber MSISDN-H is called when the subscriber is registered at FPMN, the HPMN HLR will query the stored Signal Gateway (since it is the VLR-F to the HLR). If the gateway failed for any reason, the functioning gateway can still access the shared DB server(s) to locate the real VLR-F to get the MSRN information. For SMS to MSISDN-H of a SIMM subscriber at FPMN, the HPMN HLR will return the stored Signal Gateway as VMSC/SGSN where it will receive the forwarded SMS from the SMSC. If the stored gateway failed for any reason, the functioning gateway can still use the shared DB server(s) to handle SMS forwarding. As another example, if a SIMM subscriber performs an SS operation when the subscriber is registered at an FPMN, the FPMN VLR-F will query the stored Signal Gateway (since it is the HLR to the VLR-F). If the gateway failed for any reason, the functioning gateway can still access the shared DB server(s) to handle the transaction.

Therefore partial failover really means ongoing transactions will not be handled when the Signal Gateway that was processing the transaction failed. However for completed transactions, full failover is supported. Data server redundancy is assumed here.

Referring again to FIG. 3, in addition to the signal board redundancy across both gateways, there can also be board redundancy within each gateway. Each gateway can host one board per PCI slot. Use of up to six boards is possible with the Sun Fire V-480 family. Each board can distribute messages to a pool of user part app instances in a round robin load-sharing and fail-safe mode. Whenever an instance fails, the watch dog will restart the instance again. There is also a unix cron that oversees the watch dog and restarts the watch dog when it fails. The watch dog periodically monitors app instances. When an app instance fails, it is automatically removed from the configuration, and further traffic is processed by other app instances. After the app instance is automatically restarted, the app instance can be reintegrated in the platform, without interrupting traffic. Similarly, new app instances, CPU, memory, SS7 board can be added as capacity requirement increase.

When all app instances for any SS7 application protocol fail, the watch dog will terminate the SS7 stack on each DK card before it terminates all app instances of any SS7 application protocol. This will force the GSMC-H to apply SS7 based switch-over. The watch dog then restarts all app instances of all SS7 application protocols before restarting the SS7 stack on each DK card. If an instance did not fail, but failed to properly handle the SS7 messages intended for it, the DK board will not be able to distribute its messages. In this case the other Signal Gateway will be automatically switched over by the GMSC-H.

Figure 18:
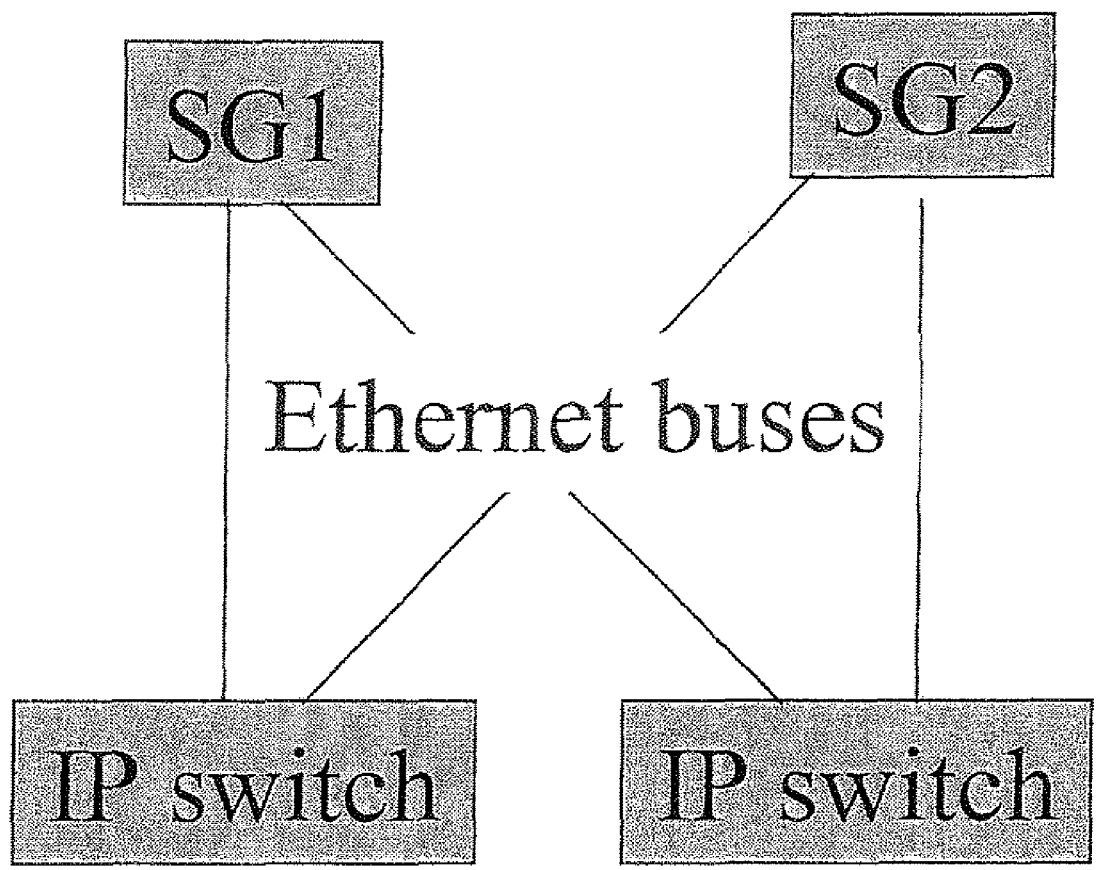
FIG. 18 is a block diagram of system redundancy in a system having Signal Gateways (SGs) coupled to an Ethernet, under an embodiment.

FIG. 18 is a block diagram of system redundancy in a system having Signal Gateways (SGs) coupled to an Ethernet, under an embodiment. To deal with Ethernet failure, two Ethernet buses can be configured. Each machine can have two IP addresses connected to the different segments of the LAN. Under normal operation traffic is shared between them. If one fails, all traffic is routed to the remaining Ethernet. Like SS7 links, the Ethernet buses should also be configured in a cross-connect manner with HPMN's IP switches.

The fact that in normal operation all components of the Signal Gateway function share traffic provides major advantages over the "standby" approach, where spare components stand idle until primary components fail. For example the spare capacity configured into a platform can be used to handle peaks of traffic. In addition, when all the components are functioning, their health can be monitored: when spare components stand idle, monitoring and preventive maintenance is impossible.

Since each gateway is also functioning as a VLR-F to HLR-H and HLR-H to VLR-F, in the event both servers go down and Signal Gateway records are corrupted, the information will be rebuilt using stored information in the Signal Gateways, HLR and VLR using GSM MAP messages. In particular, the Signal Gateways will perform a periodic tape-drive backup.

Unlike a HLR or a VLR whose corruption or loss of data will only trigger either a HLR restoration or a VLR restoration but not both, the corruption or loss of Signal Gateway data will trigger restoration at both directions. It will first require a restart. After restoring from backup, all affected IMSI records will need to set the purged flag and initiate reset-VLR MAP message to the list of VLR-Fs recorded by the back up. Normal updateLocation procedure will be triggered by the VLR-F to automatically establish roaming data in the gateways from the scratch. However providing roaming number from HLR-H to a Signal Gateway, forward SMS to the Signal Gateway, SRI/SRI-SM on MSISDN-F will not trigger MAP-Restore-Data by the Signal Gateway to the HLR-H or MAP-reset to a VLR-F. These messages will be mapped by the Signal Gateway function to the real destinations VLR-F/VMSC-F/SGSN-F which can then initiate restore data process. Signal Gateway recovery procedures are described in more detail below.

The requirements of optimal routing of Late-Call-Forwarding also require maintenance of state information (mapping between FTN and temporary FTN). Hence, it is necessary to share the in-memory information across the different application servers by copying the data into the shared DB server.

2.3.7. Scalability and Dimension

The SIMM System/Service of an embodiment is scalable based on at least one of the following growth factors: addition of more FPMNs in multiple countries; addition of more Multiple MSISDN subscribers; and increase in SS7 messaging traffic due to growth.

Figure 19:
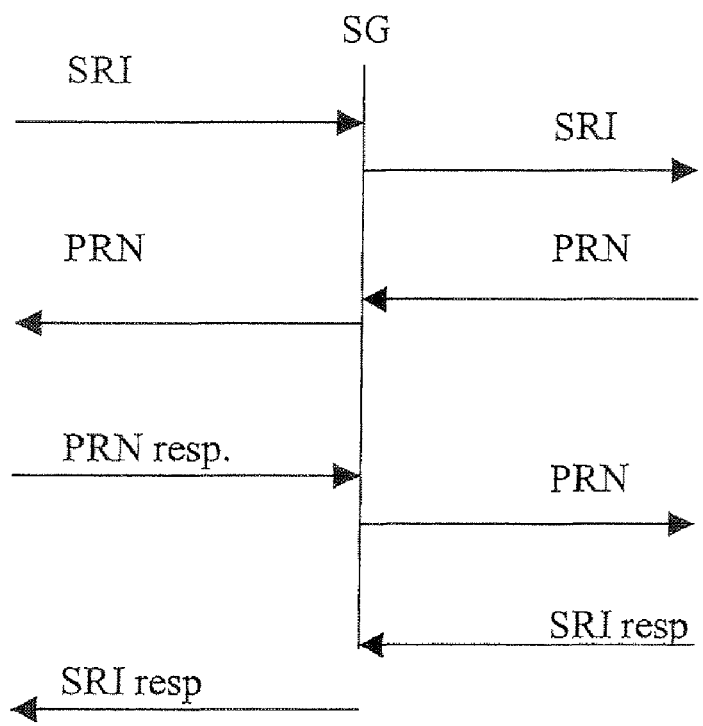
FIG. 19 is a signal flow diagram of a voice call traffic model, under an embodiment.
Figure 20:
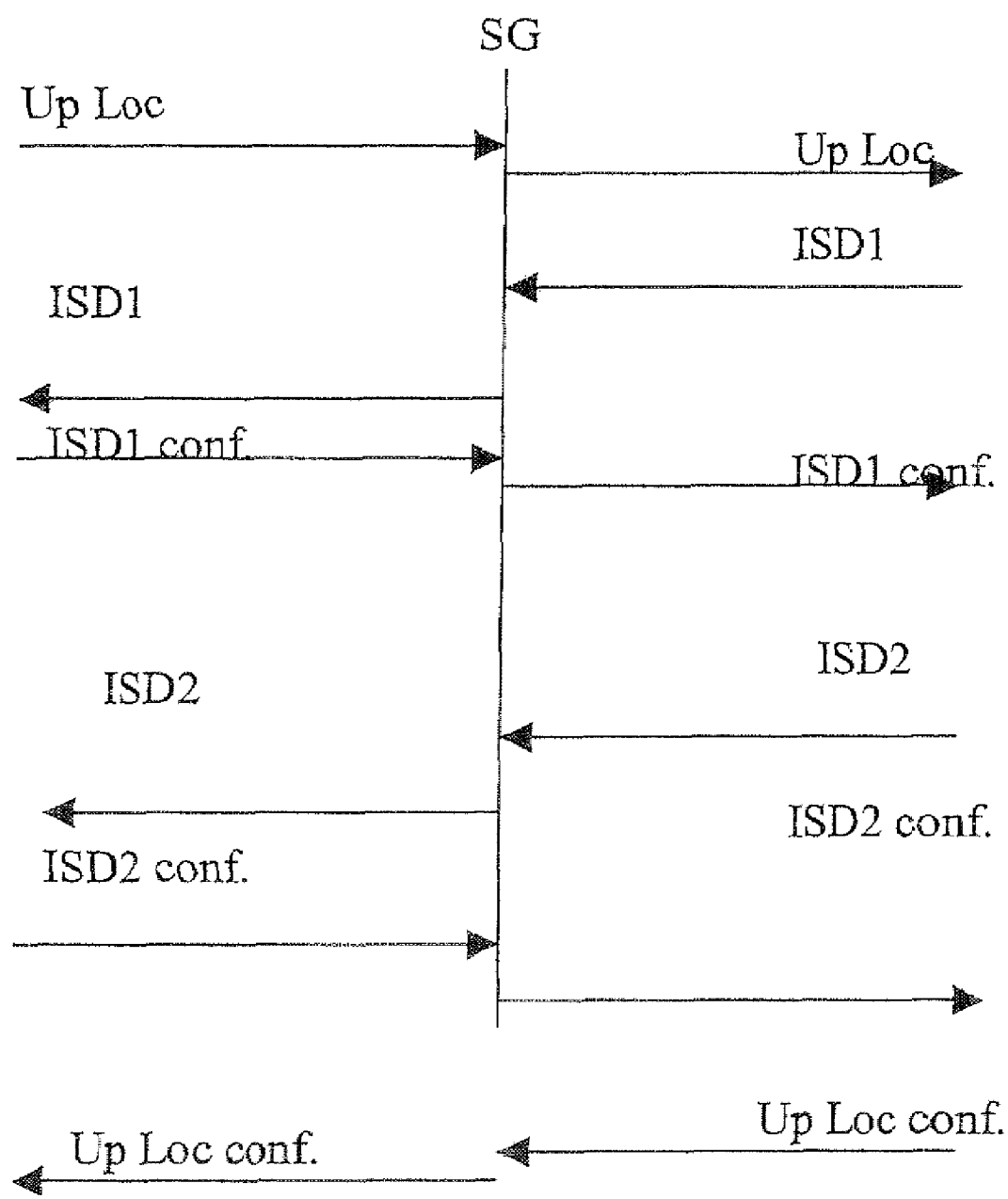
FIG. 20 is another signal flow diagram of a voice call traffic model, under an embodiment.

As an example, assume the following traffic model for a voice call: incoming call during busy hour (BCHA) is one call to MSISDN-H and one call to MSISDN-F; average call duration is 90 seconds; probability of subscriber roaming in China is 30% (or 9 days per month); 50 k sub×(1 MT-F×100% handled regardless of customer location)+(1 MT-H×30% handled)=65 k BHCA; daily call per sub=5 call to MS-H and 5 calls to MS-F; Monthly call per sub=140 call to MS-H and 140 calls to MS-F (or 210 minutes each). Note that when a MAP transaction traverses through a Signal Gateway, the Signal Gateway will initiate another transaction. For example, FIG. 19 is a signal flow diagram of a voice call, under an embodiment, in which the signal flow on the MSISDN-F includes four MAP transactions. FIG. 20 is another signal flow diagram of a voice call, under an embodiment, that includes 2 MAP transactions. It can be seen from the flow diagrams of FIGS. 19 and 20 that some MAP transactions involve significantly more messages than others. In our following measurements, a MAP transaction is assumed to include an average of four MSUs of 200 bytes each.

Using this example, the MAP transactions through the Signal Gateway per SIMM subscriber are calculated as follows: Location update transaction=1 per hour (location update and insert-sub-data etc); Send-routing-information (SRI) MSISDN-F=1 per hour; PRN for MSISDN-F and MSISDN-H=2 per hour; Provide Roaming Number transactions=1 per hour; All other transactions (Send Authentication, SS, USSD, SRI-SM, FSM, Cancel-Loc)=3 per hour; Probability of subscriber roaming in China: 30%=9 days per month; Since location update in HPMN and VPMN only go through Signal Gateway the first time, it takes about ¼ of the normal transaction; 2*(1*(0.3+0.7*0.25) LocUpdate+1+2 PRN*0.3)=4.15 MAP transactions per hour; All the rest=2*3*(0.3+0.7*0.25)=2.85 MAP per hour; MAP transaction loading in peak hour=50 k×(4.15+2.85)=50K*7=350K MAP transactions in peak hour; Total transactions (MAP+ISUP)=(350K+65000*2)=480K transactions/BH, where an ISUP transaction is defined as all the ISUP messages within an ISUP loopback call (e.g., IAM in, IAM out, ACM in, ACM out, ANS in, ANS out, REL in, REL out, RLC in, RLC out, etc.).

A SIMM call is defined herein as an ISUP loopback call with signaling going through the Signal Gateway function. This could happen when the subscriber gets called on MSISDN-F or when registered in FPMN.

Figure 21:
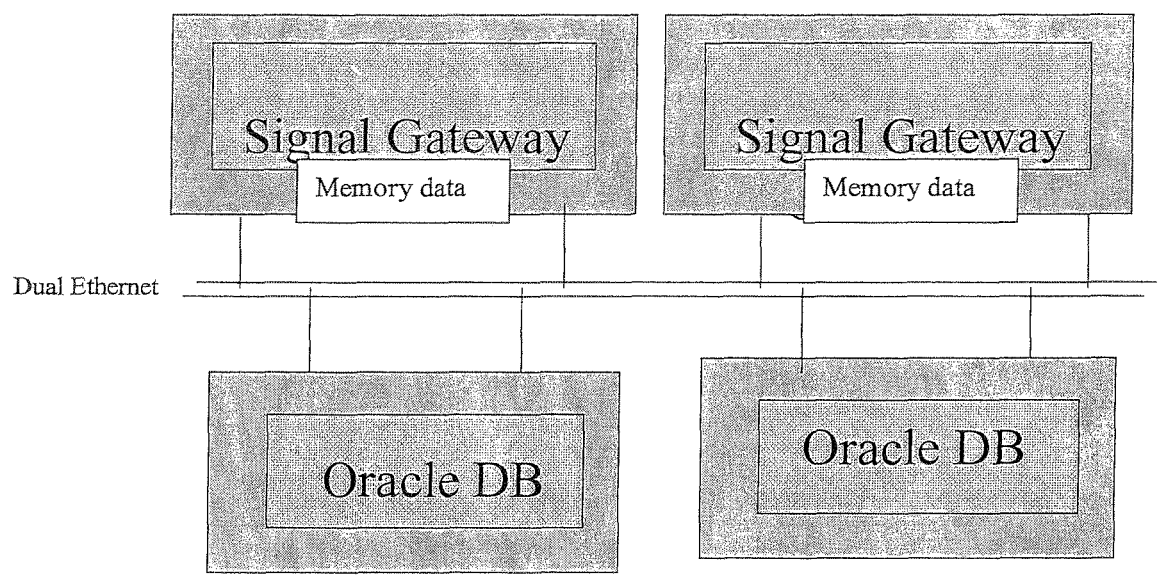
FIG. 21 is a block diagram of a system including two Signal Gateways (SGs) and two databases, under an embodiment.

FIG. 21 is a block diagram of a system including two Signal Gateways (SGs) and two databases, under an embodiment. As described above, two example system configurations are provided, including one configuration based on the Sun Netra family, and another configuration based on Sun Fire family. In both configurations, four servers can be used, but the embodiment is not so limited. In the Sun Netra configuration, two Netra 20 will run the Signal Gateway function while two T1405 will host the databases with replication. In the Sun Fire configuration, four Sun Fire V480 servers are used with two servers hosting the database with replication.

Two separate DB servers in a primary/standby set up are used instead of loading them onto the two Signal Gateways, but numerous alternative configurations are possible. This configuration improves the performance of the Signal Gateway function as well as reduces points of failure. For example, if one DB server goes down, the two Signal Gateways can still function in a load-sharing manner. If one Signal Gateway goes down, the DB server still has a standby available.

The Signal Gateway MAP function is built on top of the SCCP protocol stack. The TCAP layer improves performance. DK provides TCAP stack but limited to no greater than 16K simultaneous dialogs (for both incoming and outgoing) hence the throughput.

With the Netra configuration (using 2 CPU, 2 G RAM and 2*36 disk for all machines in the test), each Netra 20 Signal Gateway is able to support approximately 50 (MAP or ISUP) transactions per second. With the Sun Fire configuration, each V480 Signal Gateway using 2 CPU, 2 G RAM and 2*36 GB disks supports approximately 50 transactions per second, roughly the same number as Netra configuration. When using the Sun Fire 4-CPU configuration, each V480 Signal Gateway using 4 CPU, 4 G RAM and 2*36 GB disks supports approximately 80 (MAP or ISUP) transactions per second. These figures increase to approximately 80 transactions per second and 150 transactions per second using 2 DK cards in each Signal Gateway in the Netra and Sun Fire configurations, respectively. Each DK card is 10-bound by 4*8K bytes/s=32K bytes/s each direction, noting four signaling links at 8K bytes per second per card.

The Netra/Sun-Fire-2-CPU configuration, therefore, can handle 180K (288K with two DK cards) transactions per busy hour in a simulated environment. Likewise, the Sun Fire 4-CPU configuration can handle 288K (540K for 2 DK cards) transactions per busy hour or 65K BHCA per peak hour in a simulated environment.

In a complete load-balancing mode, the two-gateway configuration supports up to 360K (or 576K in 2 DK cards) transactions per peak hour using the Netra/Sun-Fire-2-CPU configuration and up to 576K (or 1080K in 2 DK cards) transactions per peak hour using the Sun Fire 4-CPU configuration.

The Signal Gateway function also tracks the transaction loading of the system. Alarms are generated when memory, CPU, and transaction rate exceed pre-specified thresholds, say 80%. In this case, the Signal Gateway can choose to reject certain type of SS7 messages, e.g. SMS so that the sending SMSC can queue it at its end. The Signal Gateway can also reject messages based on FPMN. The Signal Gateway can also choose to relay for new LUP messages so the SIMM subscribers can be handled as normal roamers as if the Signal Gateway function failed. This relay can also be applied based on FPMN in times of system overloading.

2.4. Logistics

Deployment of the SIMM System/Service of an embodiment includes the following logistics between the HPMN and FPMN. The HPMN reserves one or more sequential block(s) of IMSI to be used for offering the service (multiple MSISDN service subscribers will have to change their SIM cards). Also, the FPMN reserves one or more sequential blocks of FPMN MSISDN-F numbers to be used by HPMN for SIMM subscribers. Further, the GMSC-F is configured to route IMSI based MGT(s) (E.214 Numbering Plan) and MSISDN-F based Global Titles (GT based on E.164 Numbering Plan) to GMSC-H through a leased line (if a leased line is used). The GMSC-F is also configured to generate a MAP Send Routing Info (SRI) message on receiving an ISUP with MSISDN-F as the called number/address. In essence, the Signal Gateway acts like a HLR to the MSISDN-F for FPMN.

Continuing, the HPMN reserves four HPMN GTs and one SPC for each Signal Gateway. The HPMN also reserves four FPMN GTs for each Signal Gateway for each FPMN supported in case the FPMN GT option is selected. Each of the four GTs is used to represent different types of network elements (HLR, VLR, VMSC/SGSN, GMSC/SMSC). The Signal Gateway treats these four GTs as prefixes and appends approximately four digits afterwards to create four pools of GTs for dynamic assignment on the actual Signal Gateway GTs. The HPMN also provides a common Signaling Point Code for all Signal Gateways and maps several Sub System Numbers (SSN) (e.g., 6, 7, 8 etc) to each Signal Gateway. The GMSC-H defines routes for all SCCP (MAP) messages having CdPA as the four reserved GTs, MSISDN-F and MGT corresponding to reserved IMSI range to a Signal Gateways.

The FPMN provides a pool of MSISDN-F numbers to HPMN. These numbers are used to route calls through the leased line between FPMN and HPMN in late call forwarding and call rerouting for SIMM subscribers. The GMSC-F is configured to route calls on this pool of MSISDN-F towards GMSC-H through the leased line. The GMSC-H is configured to route calls on this pool using ISUP loopback circuits or IN architecture with signaling through a Signal Gateway.

The GMSC-H is configured to route calls over the leased line for called numbers that belong to FPMN. It should be configured in a primary and secondary mode such that if the leased line is down, the call routing can still proceed over normal ISC providers.

The HPMN also provides a pool of MSISDN-H. This pool will be used by a Signal Gateway to control call-rerouting towards FPMN. GMSC-H will route all calls on this pool using loopback circuits with signaling through a Signal Gateway.

The GMSC-H configures loopback circuits which will be used on routing all pools of numbers via ISUP loopback The IN triggers are defined at the GMSC-H to send InitialDP to the Signal Gateway when the IN architecture is used.

If the leased line option is to be applied to all messages then, in the HPMN, the GT that corresponds to FPMN of the message is routed to GMSC-F through leased line. On the FPMN side, if the GT is that of a Signal Gateway, the message should be routed via the leased line.

The FPMN assigns an SPC representing GMSC-H; messages routed to this SPC are transferred via the leased line. HPMN also assigns an SPC representing GMSC-F; messages routed towards this SPC are transferred via the leased line.

If existing ISC provider to be used for MAP signaling on CdPA=MSISDN-F, GMSC-F configures GTT on CdPA=MSISDN-F in SCCP routing to set the next SCCP destination node to the ISC providers. The ISC provider configures their GTT on CdPA=MSISDN-F to finally route to the GMSC-H which will route the messages to a Signal Gateways.

Alternatively, GMSC-F/STP-F configures its GTT in such a way that for CdPA=MSSDN-F translates it to CdPA=HPMN-Common-GT-of-Signal-GW. The HPMN network should be able to assign a common GT to both Signal Gateways. It is just used logically in the translation to the common SPC of both Signal Gateways.

If the leased line is to be used for MAP signaling on CdPA=MSISDN-F, GMSC-F configures GTT on CdPA=MSISDN-F in SCCP routing to set the next SCCP destination node to the FPMN SPC that corresponds to the GMSC-H over the leased line.

The ISC carries signaling and voice traffic between the HPMN and FPMN. The ISC STP for each side of the participating operators of the Multiple MSISDN service is configured to route GT on FPMN numbers (including ported-in numbers) towards the HPMN Signal Gateway. The SS7 variant translation (including ISUP and MAP) can be performed by a conversion function.

The HPMN assigns a special SMSC address (SMSC-S-H) for use as the SMSC address in the SIM of a SIMM subscriber. HPMN GMSC-H/GTT translates this global title to the SPC of the Signal Gateway. The Signal Gateway determines whether to convert the sending number (e.g., from MSISDN-F to MSISDN-H) based on the network of the SIMM subscriber and the destination number of the recipient.

If IW-MSC is not the same as GMSC-F, then IW-MSC is configured to route messages (in particular MAP SRI SM) to GMSC-F that in turn routes messages to GMSC-H via a leased line.

Based on these logistics, the following GSM scenarios are described below: Update Location and Insert Subscriber Data between HPMN, FPMN and VPMN; Mobile Originated Calls from SIMM subscriber in HPMN, FPMN and VPMN; Mobile Terminated Calls to SIMM subscriber in HPMN, FPMN and VPMN when called on MSISDN-H; Mobile Terminated Calls to SIMM subscriber in HPMN FPMN and VPMN when called on MSISDN-F; Early and Late Call Forwarding in above cases for voice calls; Mobile Originated SMS from SIMM subscriber in HPMN, FPMN and VPMN; Mobile Terminated SMS to SIMM subscriber in HPMN, FPMN and VPMN when SMS is sent to MSISDN-H; Mobile Terminated SMS to SIMM subscriber in HPMN, FPMN and VPMN when SMS is sent to MSISDN-F; and supplementary services handling.

2.5. SIMM IMSI and MSISDN-F

While a new SIMM subscriber will have to change the SIM card in his/her handset, the SIM structure remains the same as before (no dual IMSI etc), so that an operator can use its existing agreement with the SIM vendor. Furthermore, the MSISDN-H of the subscriber remains the same. Only the MSISDN-F is in a particular IMSI range, not the MSISDN-H.

The particular IMSI range allows the operator to separate SIMM subscribers from ordinary subscribers both in terms of network configuration and billing. In this way, the operator has better control in network configuration and billing. The IMSI range also allows signaling to be redirected thru the Signal Gateway where translations and mappings can be applied. For example, the subscriber when registered at FPMN will have MSISDN-F as caller ID. Another example, when the subscriber is sending a SMS to a FPMN country number, MSISDN-F can be used as a caller ID.

Moreover, the IMSI range simplifies billing at the FPMN because it is usually based on the IMSI. The FPMN can treat CDR with the HPMN special IMSI range as local CDRs irrespective of what MSISDN (MSISFN-F or MSISDN-H) is set at the FPMN; this ensures roaming charges are not applied. The billing records exchange between FPMN and HPMN can be thru specially rated TAP or CDR (MO or MT).

A special MSISDN-F range, when used, is used to simplify the FPMN network GTT routing to the Signal Gateway. The Signal Gateway will act as the HLR of the MSISDN-F range. So SCCP routing on MSISDN-F will come to the Signal Gateway either via Global Title Modification. There is no IMSI-F associated with MSISDN-F.

2.6. Roamer Information

Based on the messages that get routed via the Signal Gateway, various pieces of information are extracted and maintained. Table 1 lists some of the key information elements extracted.

TABLE 1

| S. No. | MAP MESSAGE | Information Elements Extracted |
|---|---|---|
| 1. | Update Location | IMSI, Serving MSC Address, Current VLR Address, LMSI |
| 2. | Insert Subscriber Data | IMSI, MSISDN-H, Forwarding Number Information |
| 3. | Update Location Response and Insert Subscriber Data Response | Error messages, if any |
| 4. | SRI for Short Message | Inter-working MSC address |

2.7. Location Update 2.7.1. SIMM Subscriber in HPMN

A VLR-H is generally configured to know the HLRs that correspond to the MGTs of all HPMN subscribers, then location update message can be issued with CdPA=GT-of-the-HLR with Routing Indicator set on Route on Global Title. Typical GSM registration procedures are followed. The HLR includes the true VLR address and VMSC address. The Signal Gateway function is not involved.

If a VLR-H is not configured to know the HLR that corresponds to the MGT of the SIMM subscriber, then registration flow follows that of the case in VPMN. This could happen for example, when the SIMM MGT is in a new range that is not covered in VLR-H. Rather than configuring each VLR-H, just configure the changes on GTT at the GMSC-H. A VLR-H simply routes the messages towards a GMSC-H which can then take care of the next node for the messages.

2.7.2. SIMM Subscriber in FPMN

Figure 22:
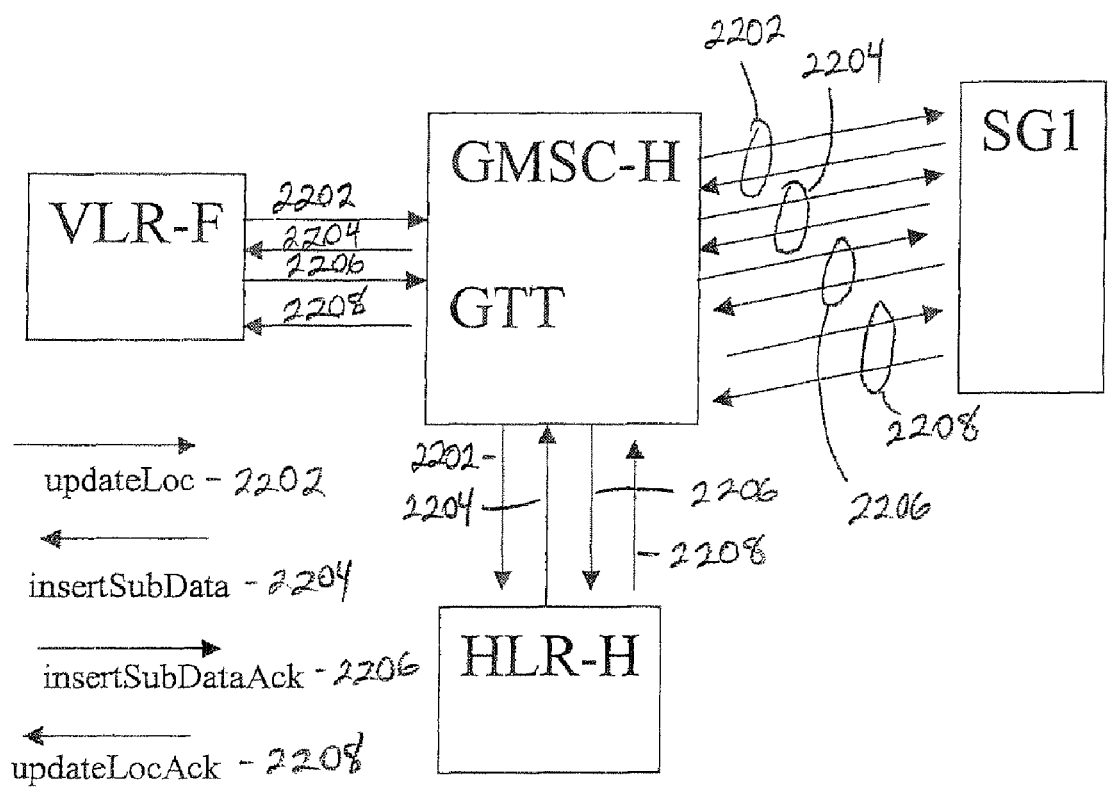
FIG. 22 is a signal flow diagram of an update location transaction, under an embodiment.

FIG. 22 is a signal flow diagram of an update location transaction, under an embodiment. The VMSC/VLR-F initiates MAP Update Location message by deriving MGT (E.214) based on IMSI-H. Due to routing defined at FPMN for this MGT, the message is routed to GMSC-H, which in turn routes it to the Signal Gateway (SG1). On receipt of the Update location, the Signal Gateway carries out the transformations in Table 2.

TABLE 2

| Update Location from VLR-F | | Message from Signal Gateway1 to HLR1 | |
|---|---|---|---|
| SCCP Called Address: | | SCCP Called Address: | |
| GT: | MGT | GT: | HLR1-H |
| SSN: | 6 | SSN: | 6 |
| TT: | 0 | TT: | 0 |
| SCCP Calling Address: | | SCCP Calling Address: | |
| GT: | VLR-F | GT: | F-SG1 |
| SSN: | 7 | SSN: | 7 |
| TT: | 0 | TT: | 0 |
| MAP level parameters: | | MAP level parameters: | |
| MSC address | VMSC-F | MSC address: | SG1/unchanged |
| VLR address | VLR-F | VLR address: | F-SG1 |

In this table, SG1 and F-SG1 represent the HPMN GT and FPMN GT of the physically chosen Signal Gateway by GMSC-H in its GTT function. Thus, in HLR, the Signal Gateway GT is stored as MSC and VLR address instead of the actual addresses. This ensures that all MAP INSERT SUBSCRIBER DATA messages pass through the Signal Gateway and hence its contents can be modified appropriately (for example, the MSISDN-H can be changed to MSISDN-F apart from performing routing level address changes).

Recall that to simplify the description herein, a logical SG GT is used uniformly in the call flows to represent a Signal Gateway global title. The actual physical SG GT used varies according to the implementation choices. If a unique physical SG GT is used to correspond to each network element (e.g. HLR, VLR, VMSC etc), the correct notation is SG-network-element.

The reason that F-SG1 is introduced is because the HPMN HLR procedure could be based on subscriber network location. For example, barring of outgoing calls while roaming will become barring for all outgoing calls to the VLR in the roaming network. If SG1 were a HPMN GT, then the HLR might still think the roamer is not roaming. Another example is that sometimes call forwarding and call barring services registration may be not allowed while roaming.

The HLR generally reacts based on Calling GT. However if the HLR procedure reacts based on VLR address rather than calling GT and it does not verify if calling GT is the same as the VLR address, then the calling GT can just be SG1 rather than F-SG1.

However if SG1 can be configured as a roaming GT in the HLR procedure or HPMN will not allow such procedure to execute with dependency on network location, F-SG1 will be equal to SG1. For example, to support national roaming, the HLR is configured to indicate which address is a roaming GT. The SG GT can be configured like a roaming GT in national roaming.

Alternatively, if HPMN regards an FPMN as an extension of its network so not to treat the subscriber as a roamer when registered at the FPMN, then again there is no need to distinguish HPMN SG and FPMN F-SG for this particular FPMN.

A configuration option of an embodiment enables FPMN GT support for the Signal Gateway function per FPMN, as shown in Table 3. Note that since SMS will be forwarded to wherever HLR-H indicates when it is queried by SRI-SM (MSISDN-H), then when the SIMM subscriber registers at a FPMN, the Signal Gateway can present at least one of the following: an HPMN GT to a HPMN HLR for VMSC imitations; an FPMN GT to a HPMN HLR for VMSC imitations in which case, the FPMN STP is configured to translate the FPMN GT in CdPA to the common HPMN GT of the Signal Gateway; and the GT of VMSC-F is passed transparently to HPMN HLR without any change (recommended).

TABLE 3

| Insert Subscriber Data from HLR-H | | Message from Signal Gateway to VLR-F via GMSC-H | |
|---|---|---|---|
| SCCP Called Address: | | SCCP Called Address: | |
| GT: | F-SG1 | GT: | VLR-F |
| SSN: | 7 | SSN: | 7 |
| TT: | 0 | TT: | 0 |
| SCCP Calling Address: | | SCCP Calling Address: | |
| GT: | HLR1-H | GT: | SG1 |
| SSN: | 6 | SSN: | 6 |
| TT: | 0 | TT: | 0 |
| MAP level parameters: | | MAP level parameters: | |
| MSISDN: | MSISDN-H | MSISDN: | MSISDN-F |
| FTN: | FTN | FTN: | SG-FTN |

The message is routed to the FPMN VLR. The SCCP Calling Party Address is replaced with the Signal Gateway GT. This guarantees that when the reply for this message is sent, GMSC-H can route it to the Signal Gateway.

Figure 23:
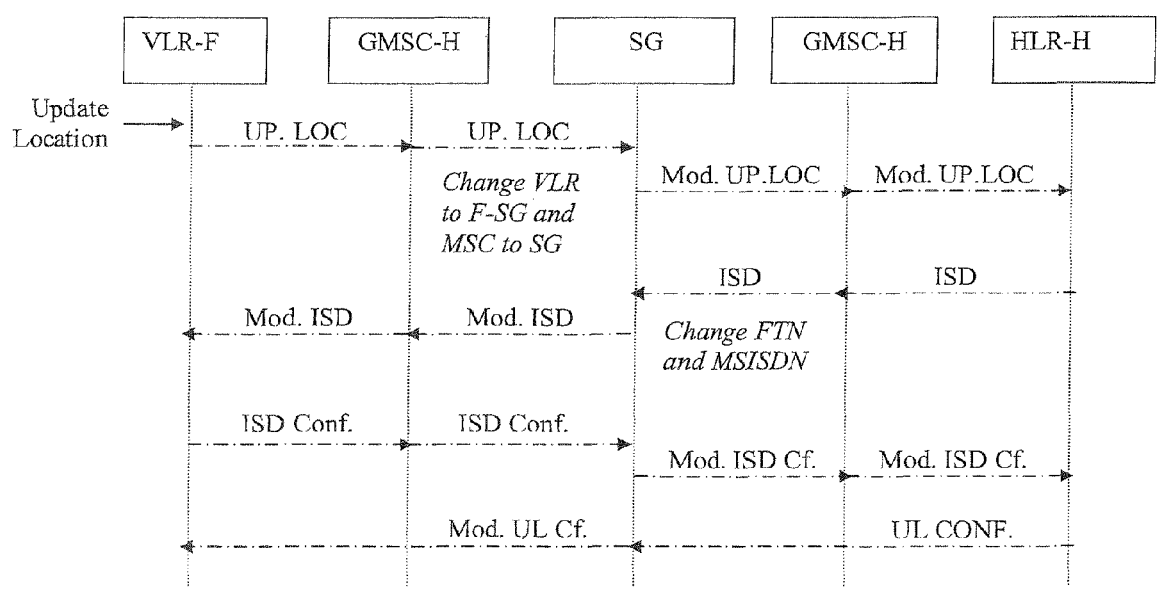
FIG. 23 is a signal flow diagram of an update location transaction when the SIMM subscriber is in the FPMN, under an embodiment.

If Forward-To-Numbers present in the Insert Subscriber Data are not of the FPMN country (see below for more details) then they are modified as per policy defined for the particular FPMN. FIG. 23 is a signal flow diagram of an update location transaction when the SIMM subscriber is in the FPMN, under an embodiment.

Referring again to FIG. 19, the signal flow diagram depicts the flow when SG1 fails after insertSubData. In this case, GMSC-H switches over to SG2 via the GOO in the full fail-over case, as shown in Table 4.

TABLE 4

| ISD ack from VLR-F | | Message from SG2 to HLR1 | |
|---|---|---|---|
| SCCP Called Address: | | SCCP Called Address: | |
| GT: | SG1 | GT: | HLR1-H |
| SSN: | 6 | SSN: | 6 |
| TT: | 0 | TT: | 0 |
| SCCP Calling Address: | | SCCP Calling Address: | |
| GT: | VLR-F | GT: | F-SG1 |
| SSN: | 7 | SSN: | 7 |
| TT: | 0 | TT: | 0 |

The SG2 will continue the transaction using the context loaded from the shared memory data of the DB server which was copied by SG1 each time its memory data record changed, as shown in Table 5. From the context, SG2 will still use SG1 in communicating back with HLR-H and VLR-F. UpdateLoc Ack proceeds from HLR-H to SG1 and SG1 to VLR-F as if nothing happened to SG1 although the physical gateway to handle the transaction now is really associated with SG2.

TABLE 5

| Update LOC ack from HLR-H | | Message from SG2 to VLR-F via GMSC-H | |
|---|---|---|---|
| SCCP Called Address: | | SCCP Called Address: | |
| GT: | SG1 | GT: | VLR-F |
| SSN: | 7 | SSN: | 7 |
| TT: | 0 | TT: | 0 |
| SCCP Calling Address: | | SCCP Calling Address: | |
| GT: | HLR1-H | GT: | SG1 |
| SSN: | 6 | SSN: | 6 |
| TT: | 0 | TT: | 0 |
| HLR number: | HLR1-H | HLR number; | SG-HLR1-H |

Figure 24:
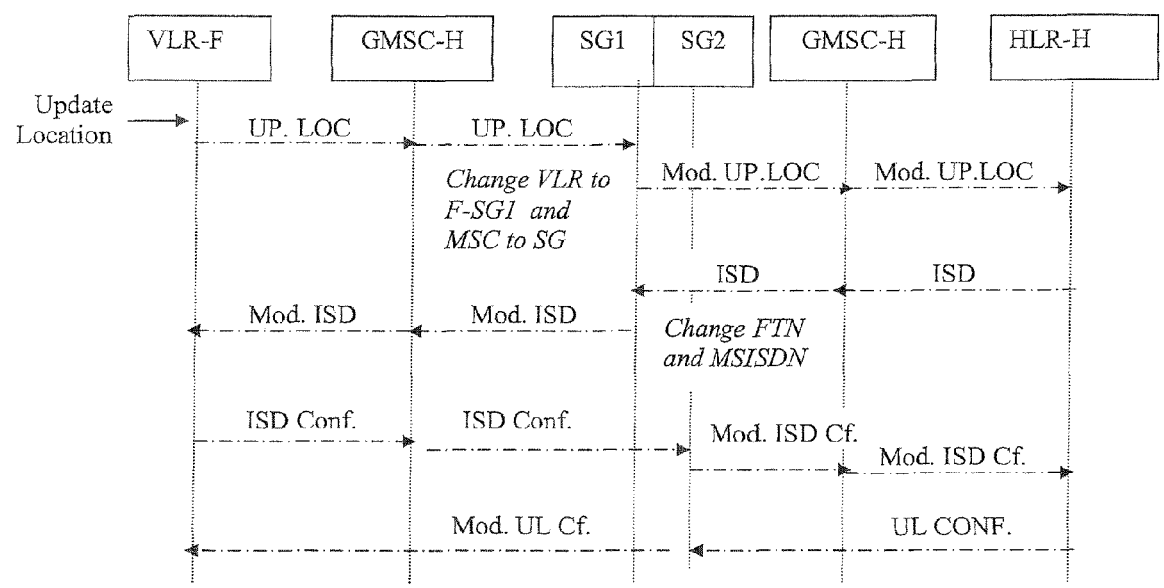
FIG. 24 is a signal flow diagram of an update location transaction following failure of a Signal Gateway (SG), under an embodiment.

FIG. 24 is a signal flow diagram of an update location transaction following failure of a Signal Gateway (SG), under an embodiment. This signal flow diagram shows the message flow in the event of a failure of SG1. After a successful location update transaction, the context is removed from the memory after roamer information is extract into roamer DB.

2.7.3. SIMM Subscriber in VPMN

The VMS C/VLR-V generates MGT based on IMSI-H in MAP Update Location message. Due to routing defined at GMSC-V for this MGT, the message is routed to GMSC-H, which in turn routes it to a Signal Gateway.

There will be a forbidden VPMN table for each group of IMSIs. For example, if HPMN can get discount for one specific IMSI range from FPMN, this range will not register with any operators in the same country as FPMN.

The Signal Gateway determines if the user is allowed to roam in VPMN/VLR. If the user is not allowed to roam in this VPMN/VLR (in a country with FPMN, for example), the Update Location request will be rejected and not forwarded or responded to. The Signal Gateway can also have flexible logic to accept initially rejected VPMN/VLR based on retry attempts and intervals between attempts. If the user is allowed to roam in this VPMN (in a country with no FPMN, for example), the Signal Gateway sends the message without modification and hence the HLR stores the true VLR and VMSC addresses in VPMN. Further interaction bypasses the Signal Gateways.

If the Signal Gateway function fails anyway, the GMSC-H will switch over to HLR-H completely via its GTT configuration. In this case, normal services (roaming voice and SMS, etc.) continue to function as if the Signal Gateway function does not exist. Services on MSISDN-F (e.g. calls and SMS) however will not function in this case.

2.7.4. Registration Option

The Signal Gateway of an embodiment can be configured to store the mapping of VMSC and VLR for SIMM subscribers registering at HPMN and VPMN. This information can be used to change caller ID when the SIMM subscriber is making a call to a FPMN country number. The SIMM subscriber can use a USSD command to toggle caller ID depending on the destination country he/she is calling. He/she can also use this function to mask his/her location.

2.8. Mobile Originated Calls 2.8.1. SIMM Subscriber in HPMN

No change in normal GSM procedures.

2.8.2. SIMM Subscriber in FPMN

The MAP INSERT SUBSCRIBER DATA message that was sent from HLR to VLR-F via the Signal Gateway is modified to have MSISDN-F as the caller ID, under an embodiment. Thus, all calls and SMS messages that originate in FPMN send MSISDN-F as CLI.

In order to make best utilization of the leased line, if possible, GMSC-F should be configured to route calls to HPMN via the leased line. The routing criteria could be based on caller IMSI range and destination number in HPMN. Additionally, it is possible to configure the system such that if the Caller ID is guaranteed over the leased line and the destination number is not in FPMN (e.g., an HPMN number in particular), the SS7 converter of an ISC carrier can change the CLI from MSISDN-F to MSISDN-H during ISUP variant conversions between FPMN and HPMN. This provides the subscriber the privacy they may desire in not letting people know they are roaming in an FPMN. Perhaps more importantly, the HPMN recipients can recognize who called since they are more familiar with the HPMN numbers.

Generally, when both the HPMN and FPMN support Camel and the subscriber has O-CSI, the gsmSCF address of the O-CSI will be the GT of the Signal Gateway. The O-CSI need only be loaded when the subscriber registered with FPMN. In this way, every time the subscriber at FPMN makes a call the O-CSI trigger issues InitialDP to the Signal Gateway which checks against the destination number and issues Connect with a new calling party if the caller ID is to be changed to MSISDN-H. Otherwise, if the subscriber calls a FPMN number, CONTINUE will be issued.

Since Camel is not supported in many networks, changes to the caller ID based on destination numbers rely on USSD commands sent to the Signal Gateway. For example, "**123*0#" shows the current caller ID; "**123*1#" toggles the caller ID between HPMN and FPMN; "**123*2#" informs the Signal Gateway not to automatically change caller ID; "**123*3#" informs the Signal Gateway to automatically change the caller ID. When the toggle USSD command is sent to the Signal Gateway, it issues InsertSubscriberData with the alternative caller ID to the real VLR. The USSD toggle can be applied in any VPMN and FPMN networks or can be limited to FPMN networks. The SIMM subscribers can also use the USSD toggle to mask their location with regard to the caller ID.

The originating MSC will generate a CDR with IMSI and MSISDN-F/MSISDN-H. The FPMN billing system should be able to rate these CDRs by looking at IMSI or MSISDN-F which is in a special range. In the case where a Signal Gateway outage occurs before an Update Location, the CDR will contain MSISDN-H along with the IMSI. However the FPMN billing system should still view this specially. The records are rated by FPMN and sent in special TAP/CDR files to HPMN.

2.8.3. SIMM Subscriber in VPMN

No change in normal GSM procedures.

2.9. Mobile Terminated Calls 2.9.1. SIMM Subscriber in HPMN

Calls to an MSISDN-H are normally routed and the subscriber is charged local MT call charges.

Calls to MSISDN-F are routed via the leased line. GMSC-F is configured to issue or transfer a MAP SRI request towards the Signal Gateway using MSISDN-F as SCCP Called Party Address. This accommodates the case where the originating MSC (e.g., VMSC-F) might directly issue the SRI although the SRI is routed to the GMSC-F. The Signal Gateway transforms the SRI message as shown in Table 6.

TABLE 6

| Send Routing Info from GMSC-F | | Message from Signal Gateway to HLR-H via GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

Note that the calling address of the Signal Gateway is SG not F-SG because, in this case, it is imitating a HPMN GMSC.

The SRI message is hence rerouted to the HLR that has information on MSISDN-H. HLR issues a MAP PRN message directed to VLR-H and gets MSRN in response. HLR returns MSRN-H in the SRI response back to the Signal Gateway. Signal Gateway transforms the message as shown in Table 7.

TABLE 7

| Send Routing Info Response from HLR-H | | Message from Signal Gateway to GMSC-F via GMSC-H | |
|---|---|---|---|
| SCCP Called Address: | | SCCP Called Address: | |
| GT: | SG | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| MSRN: | MSRN-H | MSRN: | #MSRN-H |

The #MSRN-H is a notation that denotes a number whose mapping to MSRN-H is maintained in the Signal Gateway function. The actual number could just be that where the symbol '#' is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping.

While reducing the use of FPMN numbers, the actual use of a prefix for the notation #MSRN-H could be logistically challenging in cases where every VMSC (e.g., for calls originated in FPMN network) can issue SRI query (e.g., China Mobile) since there might be hundreds if not thousands of VMSCs that require configuring to route the call via the leased line. The FPMN # pool choice on the other hand will cause the SRI-issuing VMSC (if not the GMSC-F itself, including those with optimal routing capability) to route the call at least to the GMSC-F for the chosen number from the pool. Only the GMSC-F will be configured to route the call over the leased line.

Another challenge for the prefix-based approach is that it might exceed both MAP and ISUP length for a FPMN. The pool-based approach does not suffer this problem.

If VMSC-F is the SRI-issuing node, then VMSC-F will route the call to GMSC-F. GMSC-F is configured to route the call via the leased line to GMSC-H based on #MSRN-H. GMSC-H is configured to send ISUP IAM message to the Signal Gateway based on the destination number. The voice trunks are held at GMSC-H. Signal Gateway maps the destination number to the real MSRN and routes the call back to the GMSC-H. GMSC-H routes the call to the terminating VMSC-H.

The Signal Gateway also examines the A-party number after receiving the ISUP loopback signaling from GMSC-H. If the A party number is a national number and the SRI-issuing node is a FPMN node, then the A party national prefix is stripped before prefixing the rest of the A party number with the international prefix of FPMN; otherwise A is prefixed directly with the international prefix of FPMN. For example, assuming FPMN is China Mobile, the following modifications will be performed: if the first digit of the A party is 0, the first digit is stripped off and the rest of A is prefixed with +86 (i.e change address indicator to international and prefix with 86 as addressing signal digits); if the first digit of the A party is 1, A is prefixed with +86 (i.e change address indicator to international and prefix with 86 as addressing signal digits).

Figure 25:
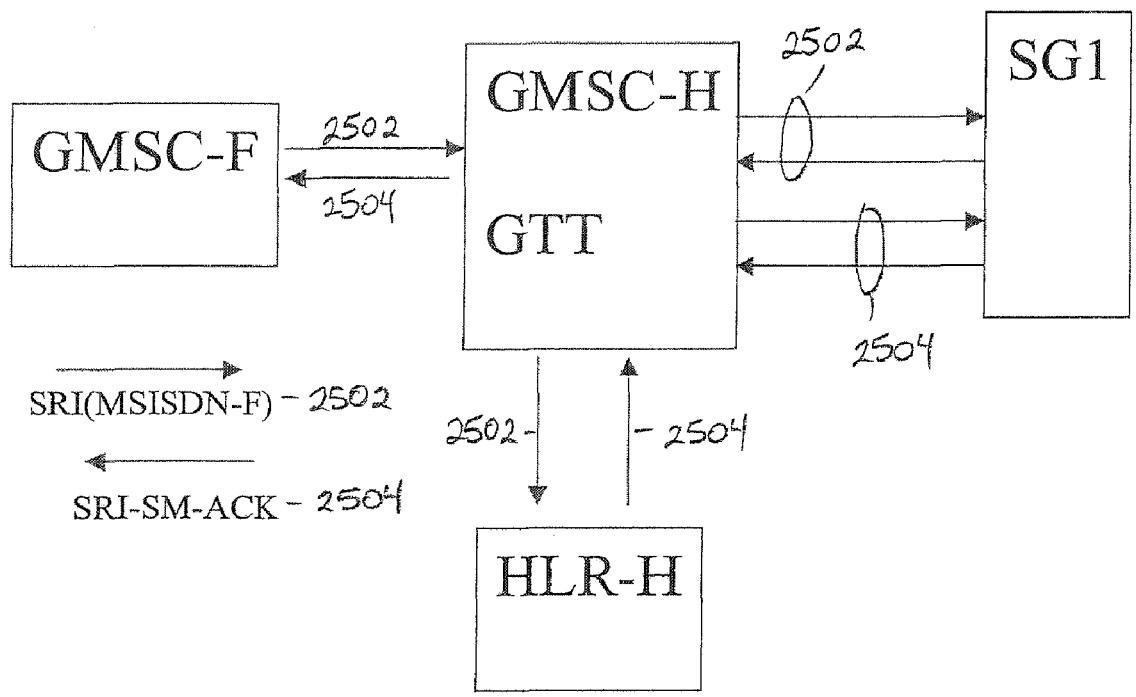
FIG. 25 is a signal flow diagram of mobile terminated calls when the Single IMSI Multiple MSISDN (SIMM) subscriber is in a HPMN, under an embodiment.
Figure 26:
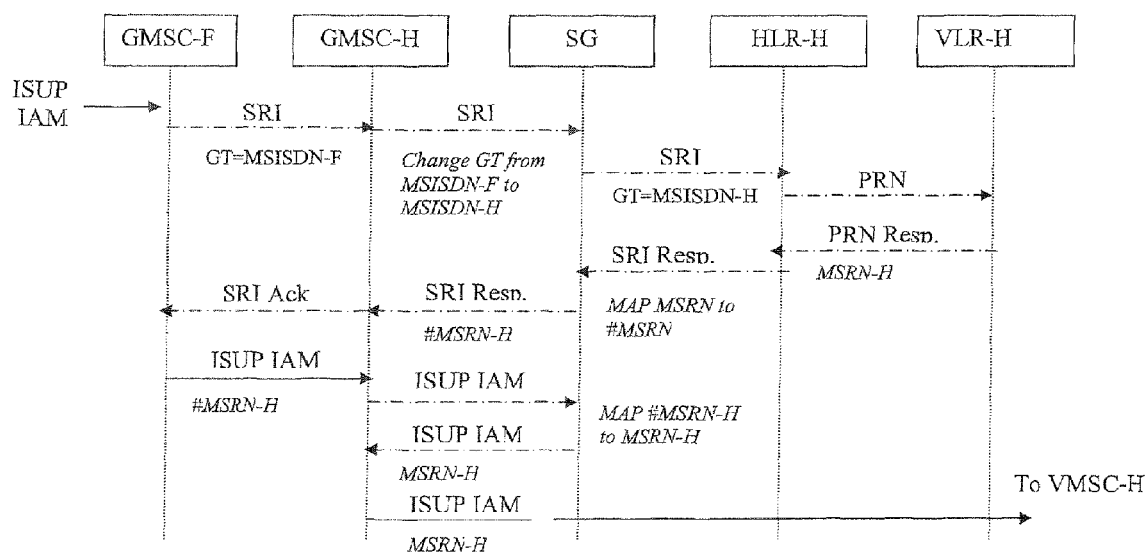
FIG. 26 is another signal flow diagram of mobile terminated calls when the SIMM subscriber is in a HPMN, under an embodiment.

FIG. 25 is a signal flow diagram of mobile terminated calls when the Single IMSI Multiple MSISDN (SIMM) subscriber is in a HPMN, under an embodiment, including the signaling trace for a call involving a normal flow of SRI. FIG. 26 is another signal flow diagram of mobile terminated calls when the SIMM subscriber is in a HPMN, under an embodiment.

The originating MSC will generate a Mobile Originated CDR. VMSC-H will generate a MT CDR and use it to compute local air-time charges for the SIMM subscriber. GMSC-F and GMSC-H will generate additional transit CDR. Signal Gateway will generate CDR that will be used by the HPMN billing system in order to add special roaming re-routing charges to the SIMM subscriber's bill over and above charges computed using VMSC MT CDR. If there are multiple FPMNs, it is possible to identify which FPMN originated the call since the CDR contains the chosen FPMN number and/or the SRI-issue VMSC-F/GMSC-F address. In addition, HPMN and FPMN may settle charges for calls routed via the leased line.

Figure 27:
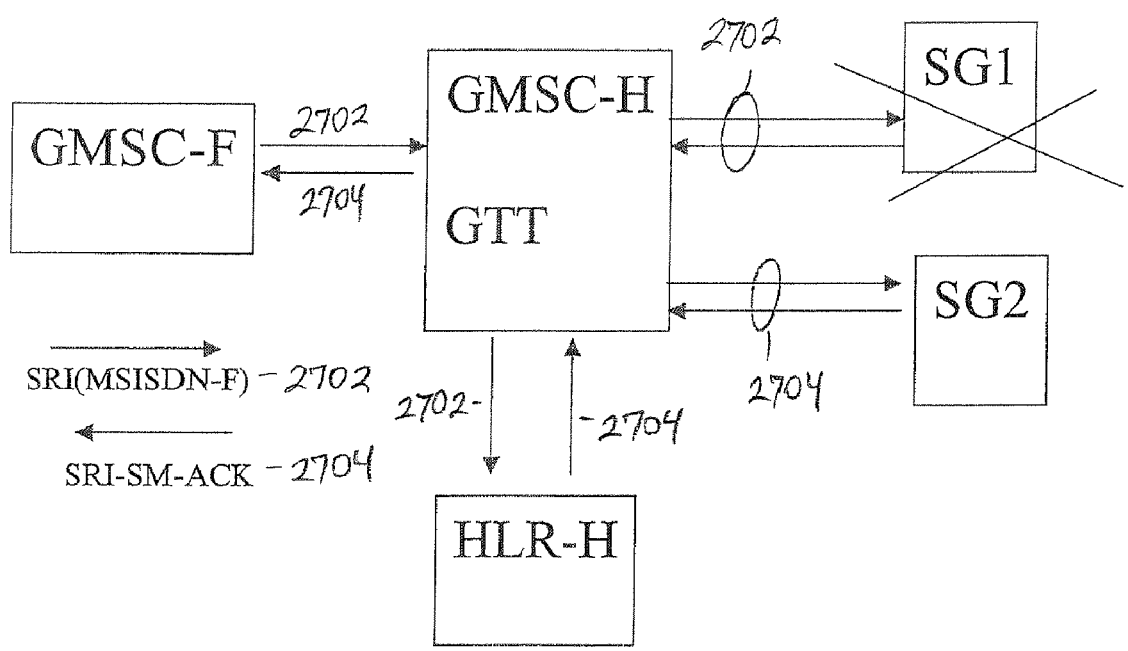
FIG. 27 is a signal flow diagram of mobile terminated calls when the SIMM subscriber is in a HPMN and a Signal Gateway (SG) fails, under an embodiment.
Figure 28:
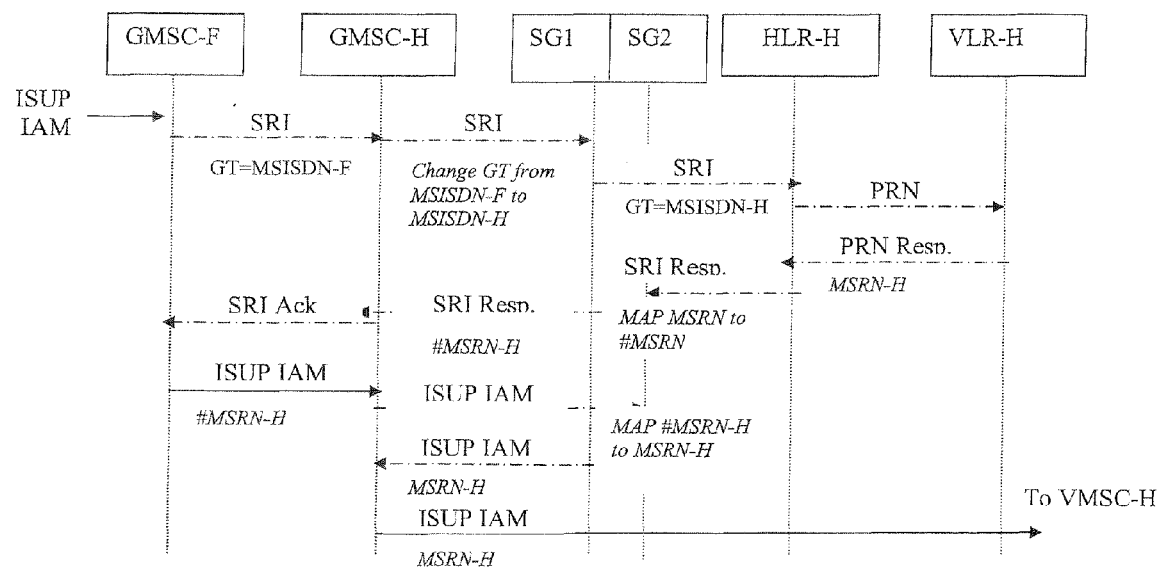
FIG. 28 is another signal flow diagram of mobile terminated calls when the SIMM subscriber is in a HPMN and a Signal Gateway (SG) fails, under an embodiment.
Figure 29:
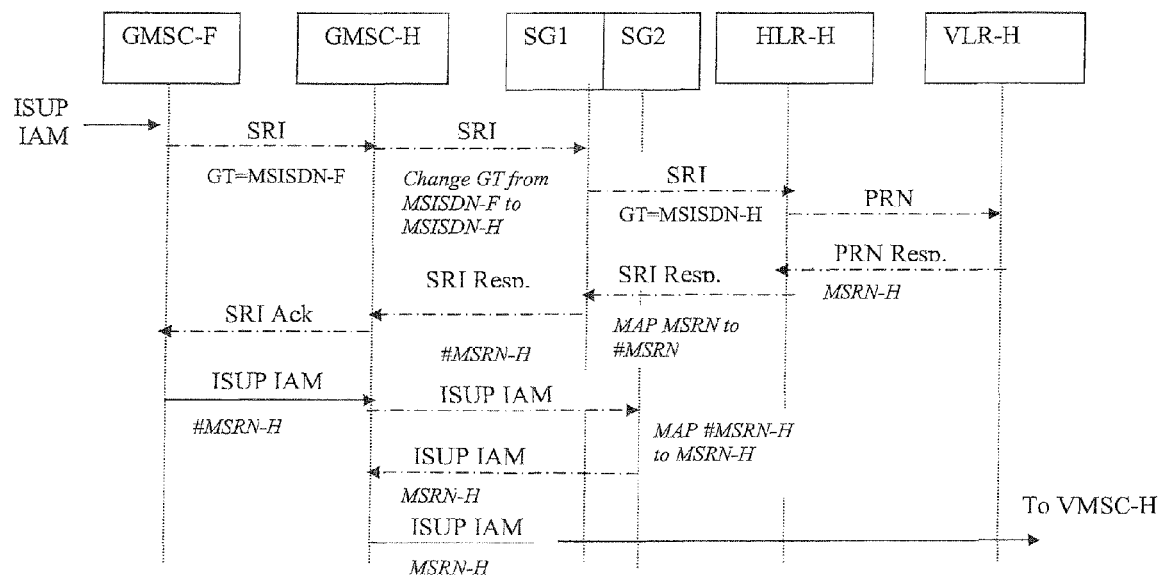
FIG. 29 is yet another signal flow diagram of mobile terminated calls when the SIMM subscriber is in a HPMN and a Signal Gateway (SG) fails, under an embodiment.

FIG. 27 is a signal flow diagram of mobile terminated calls when the SIMM subscriber is in a HPMN and a Signal Gateway (SG) fails, under an embodiment. This signal flow diagram depicts the SRI flow when SG1 breaks down after SRI-ACK is issued from HLR-H. FIG. 28 is another signal flow diagram of mobile terminated calls when the SIMM subscriber is in a HPMN and a Signal Gateway (SG) fails, under an embodiment. The signal trace of FIG. 28 includes the case of full fail-over support. FIG. 29 is yet another signal flow diagram of mobile terminated calls when the SIMM subscriber is in a HPMN and a Signal Gateway (SG) fails, under an embodiment.

Note that at the end of the MAP transaction before the ISUP transaction, the data (e.g., #MSRN, MSRN) associated with the MAP transaction is written to the shared DB server. There is a grace period for this data maintained in the transit in the gateway in case the ISUP loopback signaling indeed goes back to the gateway. However because the data is also shared in the DB server, the ISUP signaling can also go to the other server in which case the data will be read from the shared DB server.

Thus even in the case of partial fail-over, when SG1 failed after completing the MAP transaction but just before the ISUP loopback case, SG2 continues to function by reading the data (e.g., #MSRN, MSRN) from the DB server.

Note also that the pool of #MSRN-H is shared not split by SG1 and SG2. Besides, it is assumed that the MSC will route all ISUP and SCCP having a called number that matches numbers in a dedicated range of MSISDN-F and #MSRN-H to SG1/SG2. The architecture of an embodiment does not send any ISUP or SCCP message having a called number in the same range of MSISDN-F or #MSRN-H back to MSC.

An example CDR algorithm for a successful call is as follows (there are additional fields added by the Signal Gateway, e.g. the SRI-issuing MSC address, the prefixed MSRN information, etc.):

```
Roaming call (ROAM):
ROAM_CALL_REFERENCE CallRef (#MSRN)
ROAM_EXCHANGE_ID SG
ROAM_NUMBER_OF_SS_RECORDS 00
ROAM_CALLING_NUMBER CC|NDC|A (A#)
ROAM_CALLED_IMSI MCC|MNC|MSIN (SIMM subscriber IMSI)
ROAM_CALLED_NUMBER NDC|B (SIMM MSISDN-F)
ROAM_CALLED_MSRN NDC|msrn
ROAM_IN_CIRCUIT_GROUP BSC_CCT(loopback in circuit group)
ROAM_IN_CIRCUIT BSC_CCT(loopback in circuit)
ROAM_OUT_CIRCUIT_GROUP TRUNK_CCT(loopback out circuit group)
ROAM_OUT_CIRCUIT TRUNK_CCT(loopback out circuit)
ROAM_BASIC_SERVICE_TYPE 00 (tele serv.)
ROAM_BASIC_SERVICE_CODE 11 (telephony)
ROAM_FACILITY_USAGE 00000000
ROAM_CAUSE_FOR_TERMINATION 00000000
ROAM_CALL_TYPE 03 (outgoing)
ROAM_ROAM_MCZ_TARIFF_CLASS MCZ (msrn)
ROAM_ROAM_MCZ_PULSES 0000
ROAM_CALLED_MSRN_TON 06 (national)
ROAM_CALLED_MSRN_NPI 05 (isdn)
ROAM_CALLING_NUMBER_TON 05 (internat.)
ROAM_CALLING_NUMBER_NPI 05 (isdn)
ROAM_CALLED_NUMBER_TON 05 (internat.)
ROAM_CALLED_NUMBER_NPI 05 (isdn)
ROAM_LEG_CALL_REFERENCE CallRef G MSRN
ROAM_CALLED_MSRN-2 CC|NDC|msrn-f (#MSRN)
ROAM_CALLED_MSRN-2_TON 05 (internat.)
ROAM_CALLED_MSRN-2_NPI 05 (isdn)
ROAM_SRI-ISSUING-MSC: CC|NDC|msc (sri-issuing MSC-F)
ROAM_SET_UP_START_TIME
ROAM_IN_CHANNEL_ALLOCATED_TIME
ROAM_OUT_CHANNEL_ALLOCATED_TIME
ROAM_B_IDLE_TIME
ROAM_ANSWER_TIME
ROAM_CHARGING_START_TIME
ROAM_CHARGING_END_TIME
ROAM_ROAM_MCZ_DURATION
```

2.9.2. SIMM Subscriber in FPMN
2.9.2.1. Calls to a Voicemail-F

When the SIMM subscriber is in an FPMN country, the subscriber can call an FPMN-F number to check home voicemail; the GMSC-F routes this call over the dedicated leased line to the GSMC-H which can loopback the call signaling through the Signal Gateway function if billing by the Signal Gateway is desired. The Signal Gateway will add the corresponding voicemail number (e.g., 19xxx, CSL internal voicemail routing) to route back to the GSMC-H. Alternatively this can be all handled by GMSC-H via switch translation to avoid loopback circuits.

Caller ID will be altered by the Signal Gateway function to be MSISDN-H. If caller ID is received by the voicemail system at HPMN, only the PIN is requested (if set); otherwise the voicemail box number is also prompted.

2.9.2.2. Mobile Terminated Call on MSISDN-H

Calls to MSISDN-H are routed from GMSC-H to VMSC-F via the leased line. GMSC-H issues a MAP SRI command to the HLR with SCCP Called Party Address as MSISDN-H. Note that during the Update Location from FPMN, the message was routed via the Signal Gateway and the HLR contains the address of the Signal Gateway rather than the true VLR address. Hence, the HLR issues a MAP PRN request to the Signal Gateway. The Signal Gateway transforms the PRN as shown in Table 8.

TABLE 8

| Provide Roaming Number from HLR-H | | Message from Signal Gateway to VLR-F via GMSC-H | |
|---|---|---|---|
| SCCP Called Address: | | SCCP Called Address: | |
| GT: | F-SG | GT: | VLR-F |
| SSN: | 7 | SSN: | 7 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |

The message is routed to the FPMN and the Signal Gateway modifies the PRN response as shown in Table 9.

TABLE 9

| Provide Roaming Number Response from VLR-F | | Message from Signal Gateway to HLR-H via GMSC-H | |
|---|---|---|---|
| SCCP Called Address: | | SCCP Called Address: | |
| GT: | SG | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | F-SG |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Again #MSRN-F is simply a notation that denotes a number whose mapping to MSRN-F is maintained in the Signal Gateway function. The actual number could just be that where the symbol '#' is again a logical notation that can denote "#", "999" or some prefixes. The actual number could also be that of the pool of HPMN MSISDN-H.

While reducing the use of the HPMN numbers, the actual use of a prefix for the notation #MSRN-F could introduce length problem to both MAP and ISUP messages since MSRN-F is issued by the FPMN network. The HPMN # pool choice on the other hand does not have the problem at the expensive of consuming more HPMN numbers.

GMSC-H is configured to send ISUP IAM messages to the Signal Gateway based on the #MSRN-F destination number. The voice trunks are held at GMSC-H. Signal Gateway maps the destination number to the real MSRN-F and routes the call back to the GMSC-H.

The Signal Gateway also examines the A-party number after receiving the ISUP loopback signaling from GMSC-H. If the A party number is a national number and the PRN-issuing node is a HPMN node, then the A party has a national prefix which is stripped before prefixing the rest of A with the international prefix of HPMN; otherwise A is prefixed directly with the international prefix of HPMN.

The GMSC-H is configured to route the call via the leased line to GMSC-F based on MSRN-F being a number in FPMN. GMSC-F then routes the call to the terminating VMSC-F. Note that GMSC-H here did not distinguish MSRN-F generated as a result of SIMM roamers from normal roamers in FPMN. GMSC-H is configured to route all calls to FPMN numbers using the leased line. This is to increase the use of the leased line to cut down costs associated with IDD charges paid to the ISC providers.

To avoid congestion and to support fail-over, the GMSC-H should configure the routing towards FPMN side using a primary/secondary setting. The primary route in this case will be the leased line while the secondary standby route will be that of the existing ISC providers.

Figure 30:
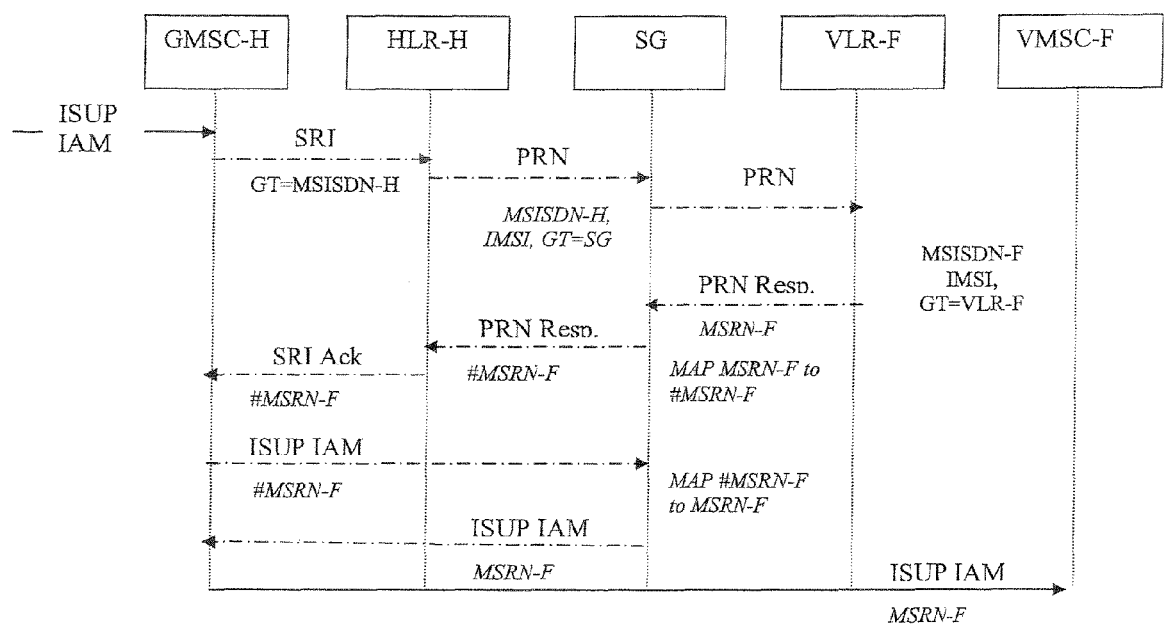
FIG. 30 is a signal flow diagram of mobile terminated calls on a MSISDN-H when the SIMM subscriber is in a FPMN, under an embodiment.

FIG. 30 is a signal flow diagram of mobile terminated calls on a MSISDN-H when the SIMM subscriber is in a FPMN, under an embodiment. Note that the pool of #MSRN-F is shared not split by SG1 and SG2. Besides, it is assumed MSC will route all ISUP and SCCP with called number in a dedicated range of #MSRN-F to SG1/SG2. The architecture of an embodiment does not send any ISUP or SCCP message having a called number in the same range of #MSRN-F back to MSC.

The FPMN VMSC generates MT CDR using IMSI and MSISDN-F. It is billed at a special pre-negotiated rate and sent via TAP. The CDR generated by Signal Gateway is used for adding roaming call re-routing charges. The CDR has the record of the assigned HPMN # from the HPMN # pool which indicates the call origination side and the destination MSRN-F which indicates the call destination side. An example CDR algorithm is as follows:

Roaming call (ROAM):
ROAM_CALL_REFERENCE CallRef (#MSRN-F)
ROAM_EXCHANGE_ID SG
ROAM_NUMBER_OF_SS_RECORDS 00
ROAM_CALLING_NUMBER CC|NDC|A (A#)
ROAM_CALLED_IMSI MCC|MNC|MSIN (SIMM subscriber IMSI)
ROAM_CALLED_NUMBER NDC|B (SIMM MSISDN-H)
ROAM_CALLED_MSRN NDC|msrn (msrn-F)
ROAM_IN_CIRCUIT_GROUP BSC_CCT(loopback in circuit group)
ROAM_IN_CIRCUIT BSC_CCT(loopback in circuit)
ROAM_OUT_CIRCUIT_GROUP TRUNK_CCT(loopback out circuit group)
ROAM_OUT_CIRCUIT TRUNK_CCT (loopback out circuit)
ROAM_BASIC_SERVICE_TYPE 00 (tele serv.)
ROAM_BASIC_SERVICE_CODE 11 (telephony)

```
ROAM_FACILITY_USAGE 00000000
ROAM_CAUSE_FOR_TERMINATION 00000000
ROAM_CALL_TYPE 03 (outgoing)
ROAM_ROAM_MCZ_TARIFF_CLASS MCZ (msrn-F)
ROAM_ROAM_MCZ_PULSES 0000
ROAM_CALLED_MSRN_TON 05 (international)
ROAM_CALLED_MSRN_NPI 05 (isdn)
ROAM_CALLING_NUMBER_TON 06 (nat.)
ROAM_CALLING_NUMBER_NPI 05 (isdn)
ROAM_CALLED_NUMBER_TON 06 (nat.)
ROAM_CALLED_NUMBER_NPI 05 (isdn)
ROAM_LEG_CALL_REFERENCE CallRef G MSRN
ROAM_CALLED_MSRN-2 CC|NDC|msrn-H (#MSRN-F)
ROAM_CALLED_MSRN-2_TON 06 (nat.)
ROAM_CALLED_MSRN-2_NPI 05 (isdn)
ROAM_SRI-ISSUING-MSC: CC|NDC|msc (sri-issuing MSC-H)
ROAM_SET_UP_START_TIME
ROAM_IN_CHANNEL_ALLOCATED_TIME
ROAM_OUT_CHANNEL_ALLOCATED_TIME
ROAM_B_IDLE_TIME
ROAM_ANSWER_TIME
ROAM_CHARGING_START_TIME
ROAM_CHARGING_END_TIME
ROAM_ROAM_MCZ_DURATION
```

2.9.2.3. Mobile Terminated Call on MSISDN-F

Calls to the MSISDN-F are routed to GMSC-F. GMSC-F is configured to issue or transfer a MAP SRI query to the Signal Gateway with SCCP Called Party Address as MSISDN-F. Note this transfer includes the case where the originating MSC (e.g. VMSC-F) might directly issue the SRI which is routed to GMSC-F.

The GMSC-F routes the message to GMSC-H which then passes the messages on to the Signal Gateway SG1 via GTT. SG1 then forwards the SRI query to the real HLR. Note that GMSC-F can either route SCCP messages on MSISDN-F towards HPMN side via an ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway.

Figure 31:
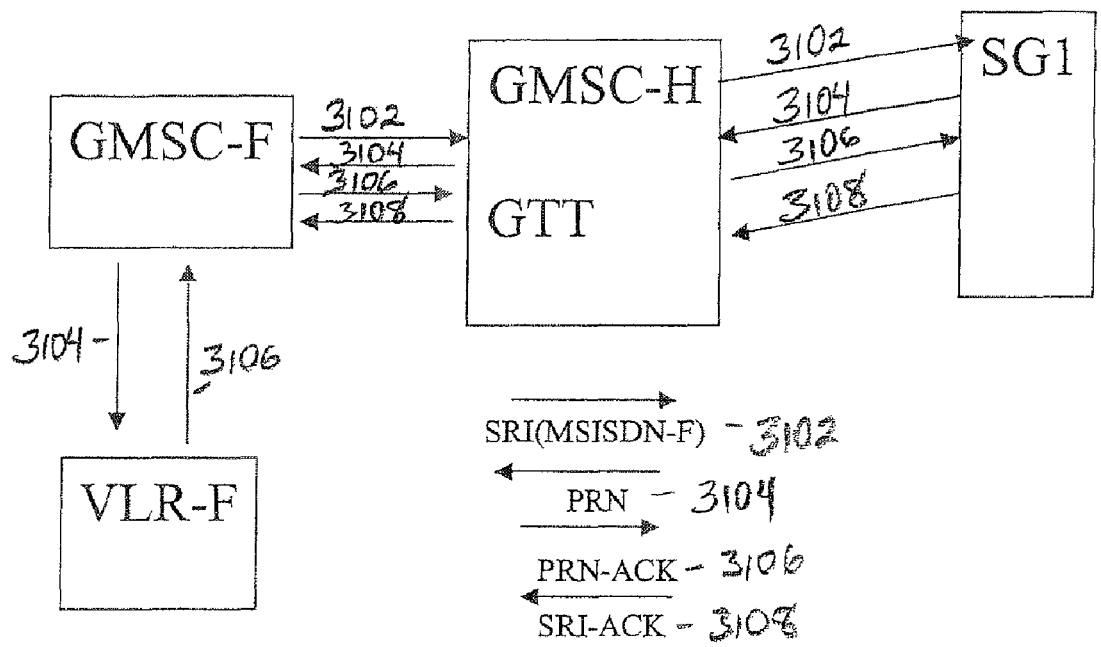
FIG. 31 is a signal flow diagram of mobile terminated calls on a MSISDN-F when the SIMM subscriber is in a FPMN, under an embodiment.

FIG. 31 is a signal flow diagram of mobile terminated calls on a MSISDN-F when the SIMM subscriber is in a FPMN, under an embodiment. Note that during the Update Location from FPMN, the message was routed via the Signal Gateway and the HLR contains the address of the Signal Gateway rather than the true VLR address. Hence, the HLR issues a MAP PRN request to the Signal Gateway. The Signal Gateway transforms the PRN as shown in Table 10.

TABLE 10

| Provide Roaming Number from HLR-H | | Message from Signal Gateway to VLR-F via GMSC-H | |
|---|---|---|---|
| SCCP Called Address: | | SCCP Called Address: | |
| GT: | F-SG | GT: | VLR-F |
| SSN: | 7 | SSN: | 7 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |

The message is routed to the FPMN and the Signal Gateway modifies the PRN response as shown in Table 11.

TABLE 11

| Provide Roaming Number Response from VLR-F | | Message from Signal Gateway to HLR-H via GMSC-H | |
|---|---|---|---|
| SCCP Called Address: | | SCCP Called Address: | |
| GT: | SG | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | F-SG |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Here #MSRN-F is a notation that denotes a number whose mapping to MSRN-F is maintained in the Signal Gateway function. The actual number could just be that where the symbol '#' is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping.

While reducing the use of the number of FPMN numbers, the actual use of a prefix for the notation #MSRN-F could be logistically challenging in cases where every VMSC (e.g., for calls originated in FPMN network) can issue SRI query (e.g., China Mobile) since there might be hundreds if not thousands of VMSCs will need be configured to route the call via the leased line. The FPMN # pool choice on the other hand will cause the SRI-issuing VMSC (if not the GMSC-F itself, including those with optimal routing capability) to route the call at least to the GMSC-F for the chosen number from the pool. Only the GMSC-F will then be configured to route the call over the leased line.

The GMSC-F is configured to route the call via the leased line to GMSC-H based on #MSRN-F. GMSC-H is configured to send ISUP IAM message to the Signal Gateway function based on the destination number. The voice trunks are held at GMSC-H. The chosen Signal Gateway maps the destination number to the real MSRN-F and routes the call back to the GMSC-H. GMSC-H routes the call to GMSC-F which will then route the call to the terminating VMSC-F.

In this case, the Signal Gateway leaves A-party information unchanged.

Figure 32:
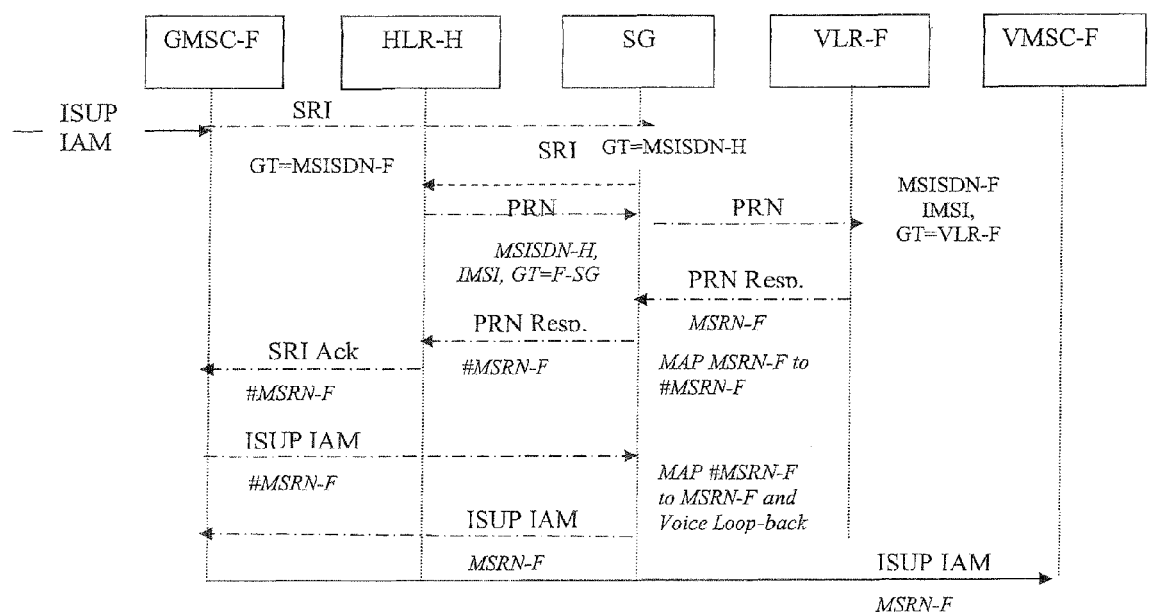
FIG. 32 is another signal flow diagram of mobile terminated calls on a MSISDN-F when the SIMM subscriber is in a FPMN, under an embodiment.

FIG. 32 is another signal flow diagram of mobile terminated calls on a MSISDN-F when the SIMM subscriber is in a FPMN, under an embodiment. The FPMN VMSC generates MT CDR using IMSI and MSISDN-F. It is billed at a special pre-negotiated rate and sent via TAP. The CDR generated by the Signal Gateway is used for adding roaming call re-routing charges; an example CDR algorithm is as follows:

```
Roaming call (ROAM):
ROAM_CALL_REFERENCE CallRef (#MSRN-F)
ROAM_EXCHANGE_ID SG
ROAM_NUMBER_OF_SS_RECORDS 00
ROAM_CALLING_NUMBER CC|NDC|A (A#)
ROAM_CALLED_IMSI MCC|MNC|MSIN (SIMM subscriber IMSI)
ROAM_CALLED_NUMBER NDC|B (SIMM MSISDN-F)
ROAM_CALLED_MSRN NDC|msrn (msrn-F)
ROAM_IN_CIRCUIT_GROUP BSC_CCT(loopback in circuit group)
```

-continued

```
ROAM_IN_CIRCUIT BSC_CCT(loopback in circuit)
ROAM_OUT_CIRCUIT_GROUP TRUNK_CCT(loopback out circuit
group)
ROAM_OUT_CIRCUIT TRUNK_CCT(loopback out circuit)
ROAM_BASIC_SERVICE_TYPE 00 (tele serv.)
ROAM_BASIC_SERVICE_CODE 11 (telephony)
ROAM_FACILITY_USAGE 00000000
ROAM_CAUSE_FOR_TERMINATION 00000000
ROAM_CALL_TYPE 03 (outgoing)
ROAM_ROAM_MCZ_TARIFF_CLASS MCZ (msrn-F)
ROAM_ROAM_MCZ_PULSES 0000
ROAM_CALLED_MSRN_TON 05 (international)
ROAM_CALLED_MSRN_NPI 05 (isdn)
ROAM_CALLING_NUMBER_TON 05 (internat.)
ROAM_CALLING_NUMBER_NPI 05 (isdn)
ROAM_CALLED_NUMBER_TON 05 (internat.)
ROAM_CALLED_NUMBER_NPI 05 (isdn)
ROAM_LEG_CALL_REFERENCE CallRef G MSRN
ROAM_CALLED_MSRN-2 CC|NDC|msrn-F (#MSRN-F)
ROAM_CALLED_MSRN-2_TON 06 (internat.)
ROAM_CALLED_MSRN-2_NPI 05 (isdn)
ROAM_SRI-ISSUING-MSC: CC|NDC|msc (sri-issuing MSC-F)
ROAM_SET_UP_START_TIME
ROAM_IN_CHANNEL_ALLOCATED_TIME
ROAM_OUT_CHANNEL_ALLOCATED_TIME
ROAM_B_IDLE_TIME
ROAM_ANSWER_TIME
ROAM_CHARGING_START_TIME
ROAM_CHARGING_END_TIME
ROAM_ROAM_MCZ_DURATION
```

Since roamer information (e.g., VMSC-F, VLR-F, IMSI-H) at FPMN is maintained in the Signal Gateways the Signal Gateway can also directly issue PRN to VLR-F when receiving SRI/SRI-SM query on the FPMN MSISDN-F number under certain conditions (e.g., CFU indicator is not set, there is no incoming call barring, there is no T-CSI service) rather than looped back through the HLR-H. However if any of the special conditions are present for the SIMM subscriber, the Signal Gateway will not have the HLR-H knowledge for those conditions since they will not be sent to the Signal Gateway when functioning as a VLR to HLR-H; in that case, the Signal Gateway will relay SRI to HLR-H and cannot directly issue PRN query to VLR-F even if it knows the VLR-F.

In Table 12, the SG1 is assumed to directly issue the PRN query to VLR-F, and optimal routing and fail-over support is described.

TABLE 12

| Send Routing Info from GMSC-F | | PRN Message from Signal Gateway to GMSC-H | |
|---|---|---|---|
| SCCP Called Address: | | SCCP Called Address: | |
| GT: | MSISDN-F | GT: | VLR-F |
| SSN: | 6 | SSN: | 6 |
| TT: | 0 | TT: | 0 |
| SCCP Calling Address: | | SCCP Calling Address: | |
| GT: | GMSC-F | GT: | SG1 |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-F |
| | | IMSI: | IMSI-H |

Note that MSISDN is an optional parameter in the request. GMSC-H routes the PRN to GMSC-F which then routes the message to the VLF-F. The VLR-F returns MSRN-F in the response to SG1. SG1 returns #MSRN-F to GMSC-F or the original SRI-issuing VMSC-F, as shown in Table 13.

TABLE 13

| Provide Roaming Number Response from VLR-F to SG1 | | Response from SG1 to GMSC-F or SRI-issuing VMSC-F | |
|---|---|---|---|
| SCCP Called Address: | | SCCP Called Address: | |
| GT: | SG1 | GT: | GMSC-F |
| SSN: | 6 | SSN: | |
| TT: | 0 | TT: | 0 |
| SCCP Calling Address: | | SCCP Calling Address: | |
| GT: | VLR-F | GT: | SG1 |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Figure 33:
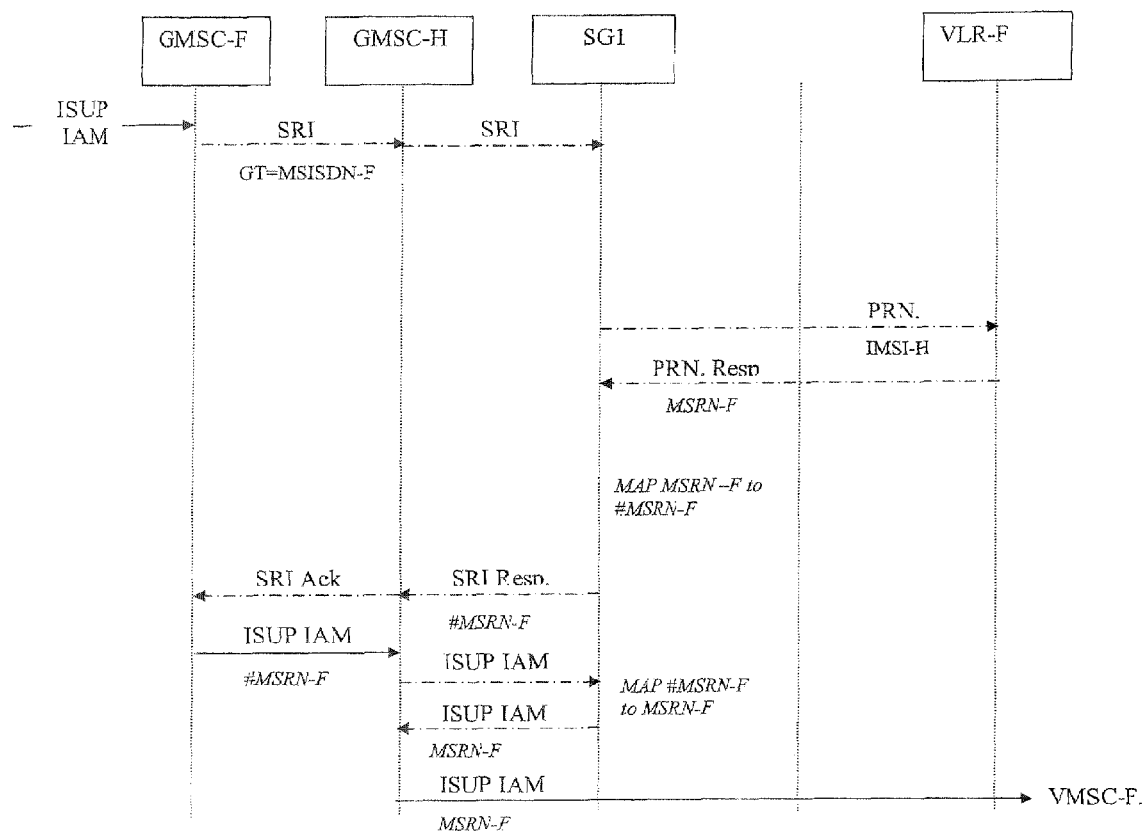
FIG. 33 is yet another signal flow diagram of mobile terminated calls on a MSISDN-F when the SIMM briber is in a FPMN, under an embodiment.

FIG. 33 is yet another signal flow diagram of mobile terminated calls on a MSISDN-F when the SIMM subscriber is in a FPMN, under an embodiment.

Now consider the case in which SG1 failed after or during the establishment of the call as depicted below. MTP level of switch can still change over to SG2. This is possible due to the channel non-associating signaling of the ISUP loopback set up.

Figure 34:
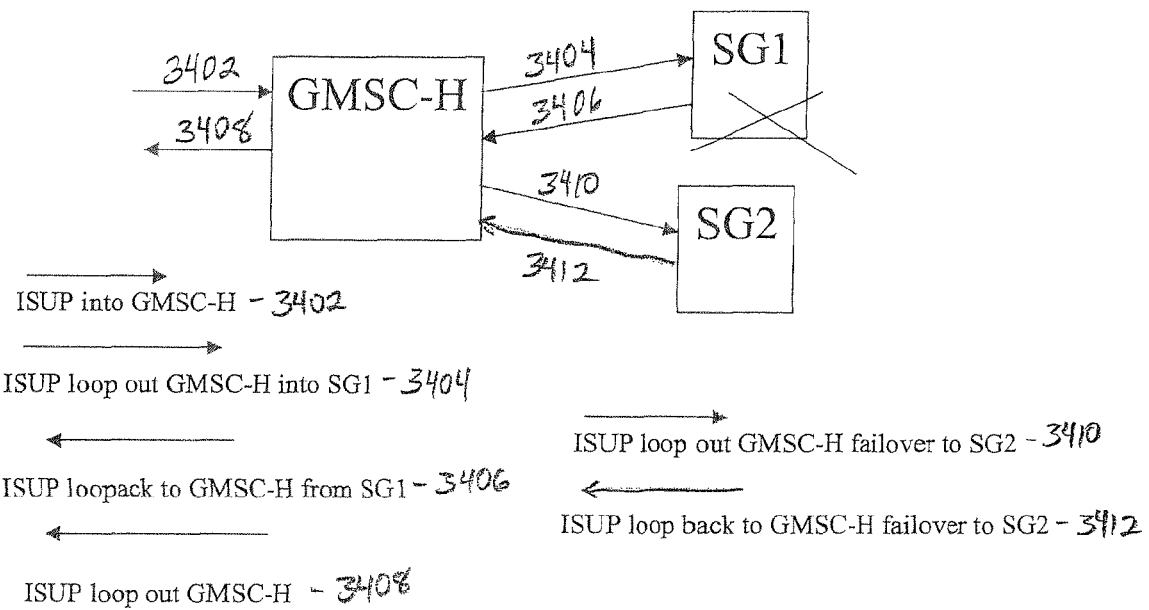
FIG. 34 is a signal flow diagram of mobile terminated calls on a MSISDN-F when the SIMM subscriber is in a FP and a Signal Gateway (SG) fails, under an embodiment.

FIG. 34 is a signal flow diagram of mobile terminated calls on a MSISDN-F when the SIMM subscriber is in a FPMN and a Signal Gateway (SG) fails, under an embodiment. This signal flow shows the generic flow of the ISUP loopback when SG1 failed. For example, when IAM message on #MSRN-F reaches the GMSC-H, it is looped through the loopback circuit with signaling going to SG1. SG1 then IAM MSRN-F back to GMSC-H which then goes out to VMSC-F. When VMSC-F returns an ACM message back to GMSC-H it switches over to SG2 when SG1 is down in the case of full fail-over support.

Figure 35:
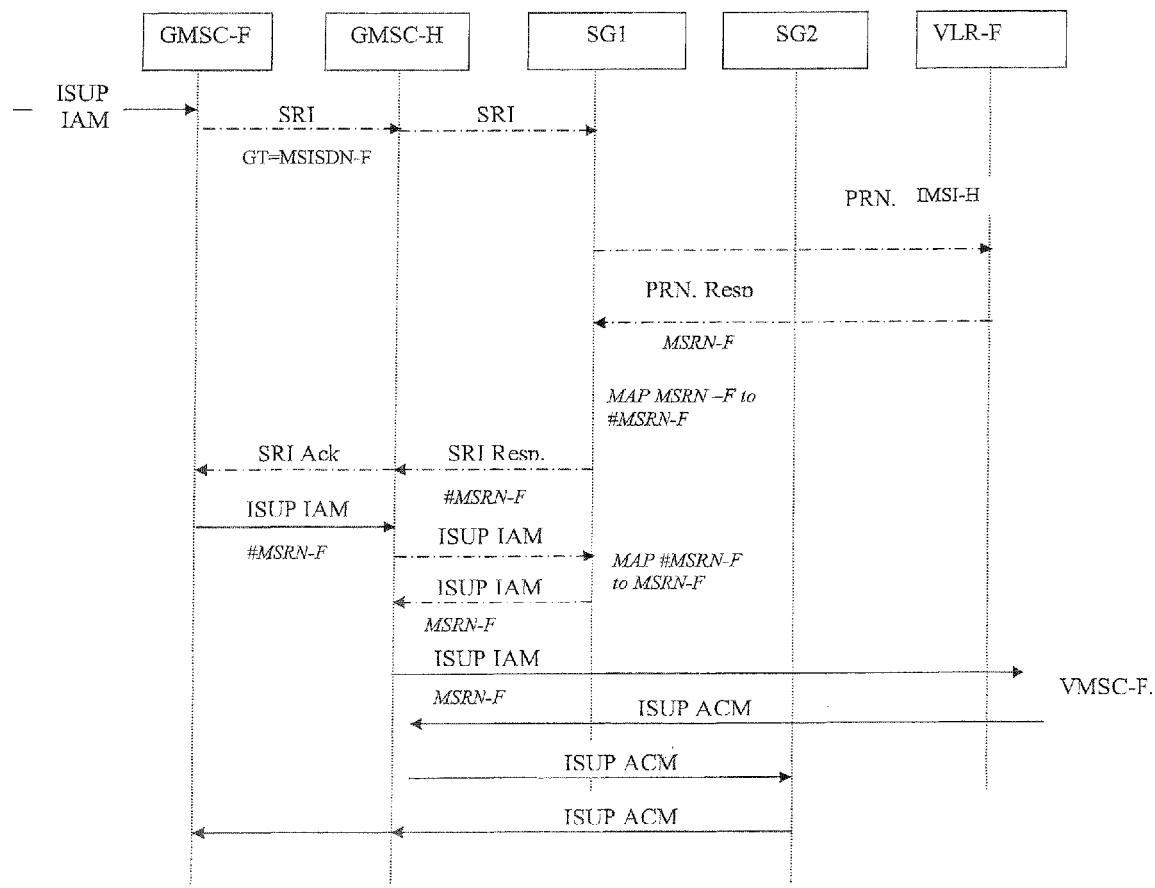
FIG. 35 is another signal flow diagram of mobile terminated calls on a MSISDN-F when the SIMM subscriber is in a FPMN and a Signal Gateway (SG) fails, under an embodiment.

FIG. 35 is another signal flow diagram of mobile terminated calls on a MSISDN-F when the SIMM subscriber is in a FPMN and a Signal Gateway (SG) fails, under an embodiment.

In the case of partial fail-over, however, at the completion of a MAP transaction just before the ISUP loopback at a particular Signal Gateway, the data is written into the shared DB server. If the gateway that completed the MAP transaction failed for some reason before the ISUP call, the call can be automatically handled by the remaining Signal Gateway which can retrieve the call set up information (e.g. #MSRN-F, MSRN-F etc) from the shared DB server.

Figure 36:
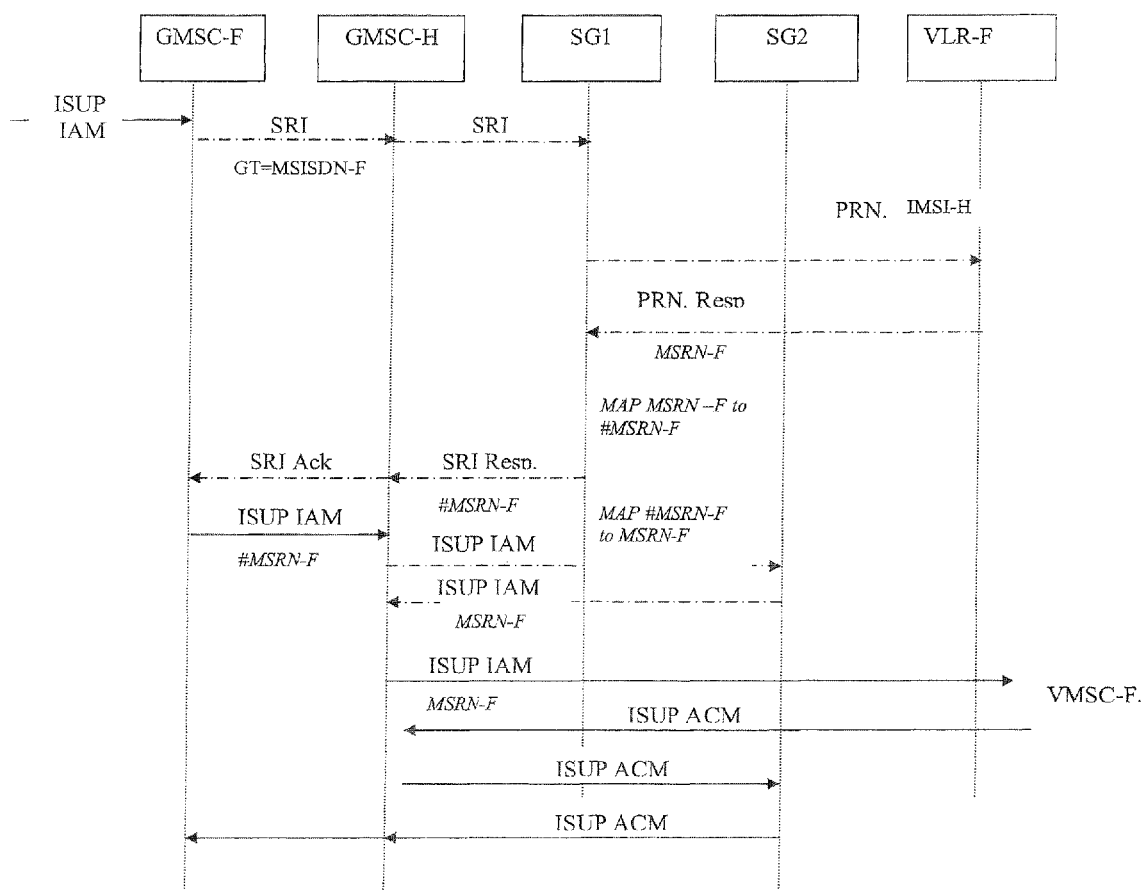
FIG. 36 is yet another signal flow diagram of mobile terminated calls on a MSISDN-F when the SIMM subscriber is in a FPMN and a Signal Gateway (SG) fails, under an embodiment.

FIG. 36 is yet another signal flow diagram of mobile terminated calls on a MSISDN-F when the SIMM subscriber is in a FPMN and a Signal Gateway (SG) fails, under an embodiment. If Optimal Routing of voice calls is configured and applicable for the particular MSRN-F range, and if billing arrangements are made as appropriate, the Signal Gateway can choose to return the real MSRN-F rather than #MSRN-F based on whether the current VLR-F is permitted for an optimally routed call. Routing is made directly to the terminating VMSC-F from the SRI-issuing VMSC-F/GMSC-F. There will be no route to GMSC-H and no loopback signaling through the Signal Gateway. The Signal Gateway will generate a roaming call CDR of type (HLR interrogation HLRI) except that there is no duration, no trunking and no MSRN-2 in the CDR; an example CDR algorithm is as follows:

```
Roaming call (ROAM) HLRI:
ROAM_CALL_REFERENCE CallRef (MSRN-F)
ROAM_EXCHANGE_ID SG
ROAM_NUMBER_OF_SS_RECORDS 00
ROAM_CALLING_NUMBER CC|NDC|A (A# if known in SRI
additional signal information)
ROAM_CALLED_IMSI MCC|MNC|MSIN (SIMM subscriber IMSI)
ROAM_CALLED_NUMBER NDC|B (SIMM MSISDN-F)
ROAM_CALLED_MSRN NDC|msrn (msrn-F)
ROAM_BASIC_SERVICE_TYPE 00 (tele serv.)
ROAM_BASIC_SERVICE_CODE 11 (telephony)
ROAM_FACILITY_USAGE 00000000
ROAM_CAUSE_FOR_TERMINATION 00000000
ROAM_CALL_TYPE 03 (outgoing)
ROAM_ROAM_MCZ_TARIFF_CLASS MCZ (msrn-F)
ROAM_ROAM_MCZ_PULSES 0000
ROAM_CALLED_MSRN_TON 05 (international)
ROAM_CALLED_MSRN_NPI 05 (isdn)
ROAM_CALLING_NUMBER_TON 05 (internat.)
ROAM_CALLING_NUMBER_NPI 05 (isdn)
ROAM_CALLED_NUMBER_TON 05 (internat.)
ROAM_CALLED_NUMBER_NPI 05 (isdn)
ROAM_SRI-ISSUING-MSC: CC|NDC|msc (sri-issuing MSC-F)
```

Figure 37:
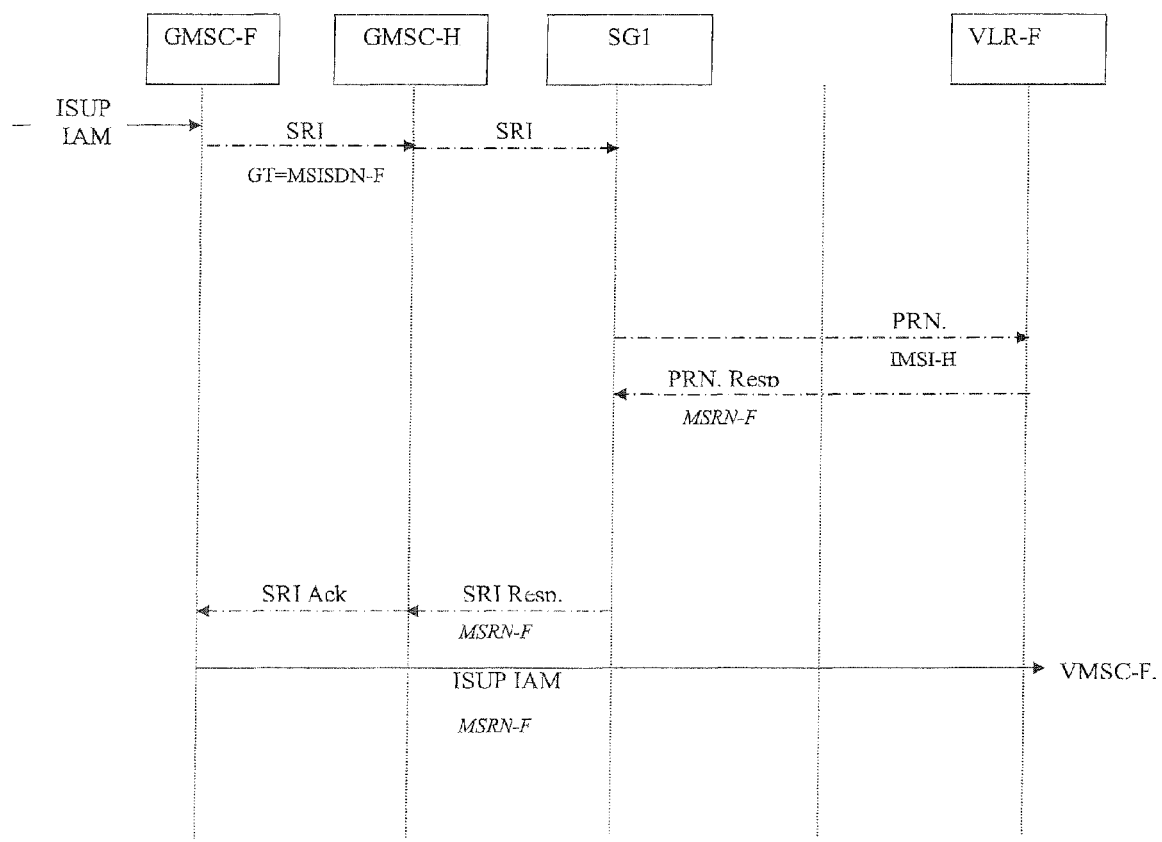
FIG. 37 is yet another signal flow diagram of mobile terminated calls on a MSISDN-F when the SIMM subscriber is in a FPMN and a Signal Gateway (SG) fails, under an embodiment.

FIG. 37 is yet another signal flow diagram of mobile terminated calls on a MSISDN-F when the SIMM subscriber is in a FPMN and a Signal Gateway (SG) fails, under an embodiment. MT CDR generated by VMSC-F will contain IMSI and MSISDN-F. When special billing is applied, the user will be charged FPMN local airtime. In addition, the duration-less CDR generated by the Signal Gateway will be used to add special charges for routing the call from FPMN to HPMN and HPMN to FPMN over the leased line.

2.9.3. SIMM Subscriber in VPMN
2.9.3.1. Subscriber Called on MSISDN-H
   No changes to normal GSM procedure.
2.9.3.2. Subscriber Called on MSISDN-F Call originates from VMSC-F or reaches GMSC-F. SRI-issuing VMSC-F or GMSC-F issues a MAP SRI message to the Signal Gateway with SCCP Called Party Address as MSISDN-F. Note that GMSC-F can either route SCCP messages on MSISDN-F towards HPMN side via the ISC provider which is configured to route the CdPA=MSISDN-F towards the HPMN side, or it is configured in its own GTT (of STP-F/GMSC-F) to translate CdPA=MSISDN-F to CdPA=Common-HPMN-GT-of-Signal-Gateway. The Signal Gateway transforms this request as shown in Table 14.

TABLE 14

| Send Routing Info from GMSC-F | | Message from Signal Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The request is routed to the HPMN HLR which issues a PRN request to VLR-V. The MSRN returned is routed back to the HLR and is returned in the SRI response. The message goes via the Signal Gateway and is transformed as shown in Table 15.

TABLE 15

| Send Routing Info Response from HLR-H | | Message from Signal Gateway to GMSC-F via GMSC-H | |
|---|---|---|---|
| SCCP Called Address: | | SCCP Called Address: | |
| GT: | SG | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| MSRN: | MSRN-V | MSRN: | #MSRN-V |

Here #MSRN-V is simply a notation that denotes a number whose mapping to MSRN-V is maintained in the Signal Gateway function. The actual number could just be that where the symbol '#' is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping.

While reducing the use of FPMN numbers, the actual use of a prefix for the notation #MSRN-V could be logistically challenging in cases where every VMSC (e.g., for calls originated in FPMN network) can issue SRI query (e.g China Mobile) since there might be hundreds if not thousands of VMSCs that are configured to route the call via the leased line to get the special re-routing tariff (otherwise normal IDD routing charges will be applied). The FPMN # pool choice on the other hand will cause the SRI-issuing VMSC (if not the GMSC-F itself, including those with optimal routing capability) to route the call at least to the GMSC-F for the chosen number from the pool. Only the GMSC-F then needs configuring to route the call over the leased line.

The GMSC-F is configured to route the call via the leased line to GMSC-H based on #MSRN-V. GMSC-H is configured to send ISUP IAM message to the Signal Gateway based on the destination number. The voice trunks are held at GMSC-H. The Signal Gateway maps the destination number to the real MSRN-V and routes the call back to the GMSC-H. GMSC-H routes the call to the terminating VMSC-V.

The Signal Gateway also examines the A-party number after receiving the ISUP loopback signaling from GMSC-H. If the A party number is a national number and the SRI-issuing node is a FPMN node, then the national prefix of the A party is stripped before prefixing the A party number with the international prefix of FPMN; otherwise the A party number is prefixed directly with the international prefix of FPMN. For example, assuming FPMN is China Mobile, the following modifications will be performed: if the first digit of the A party is 0, the first digit is stripped off and the remaining A party number is prefixed with +86 (i.e change address indicator to international and prefix with 86 as addressing signal digits); if the first digit of the A party is 1, A is prefixed with +86 (i.e change address indicator to international and prefix with 86 as addressing signal digits).

Figure 38:
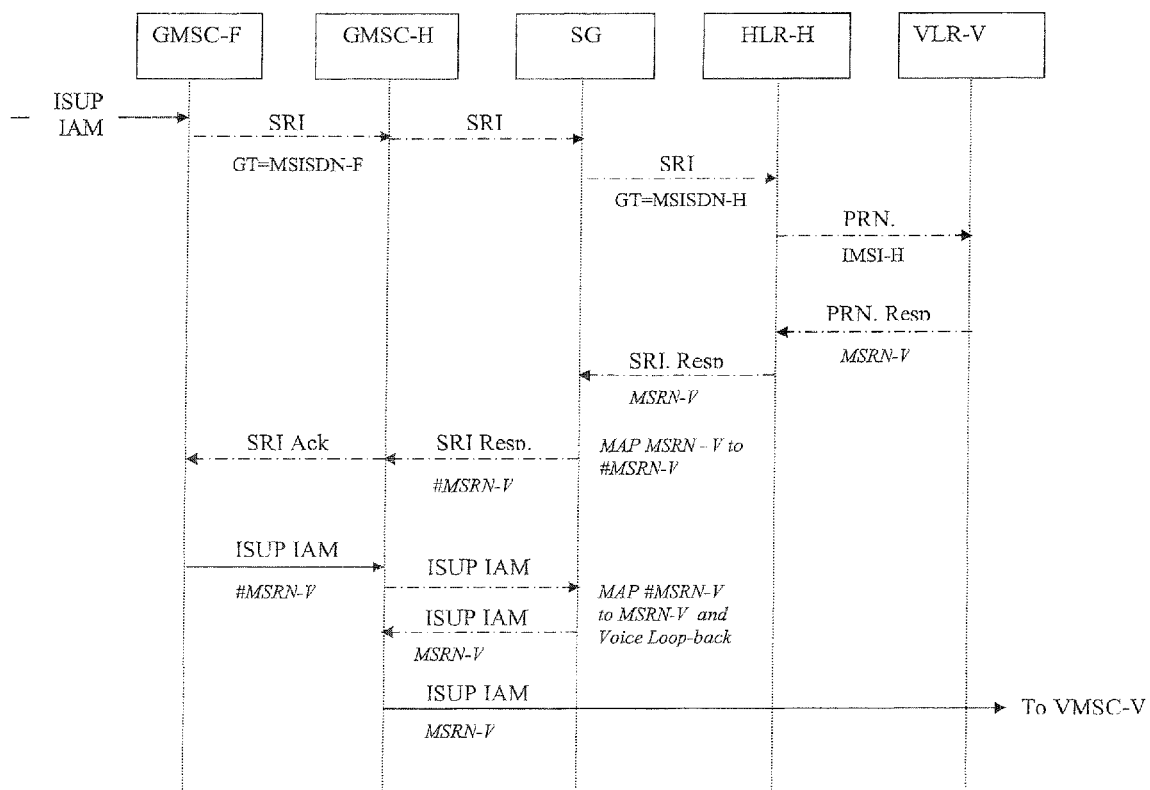
FIG. 38 is a signal flow diagram of mobile terminated calls on a MSISDN-F when the SIMM subscriber is in a Visited Public Mobile Network (VPMN), under an embodiment.

FIG. 38 is a signal flow diagram of mobile terminated calls on a MSISDN-F when the SIMM subscriber is in a Visited Public Mobile Network (VPMN), under an embodiment.

The VMSC generates MT CDR and bills HPMN normal roaming rates thru TAP arrangement. CDR generated by Signal Gateway will be used to bill the subscriber for one way reroute IDD from FPMN to HPMN at a special rate since the call is routed over the leased line. The CDR is generated as follows:

```
Roaming call (ROAM):
ROAM_CALL_REFERENCE CallRef (#MSRN-V)
ROAM_EXCHANGE_ID SG
ROAM_NUMBER_OF_SS_RECORDS 00
ROAM_CALLING_NUMBER CC|NDC|A (A#)
ROAM_CALLED_IMSI MCC|MNC|MSIN (SIMM subscriber IMSI)
ROAM_CALLED_NUMBER NDC|B (SIMM MSISDN-F)
ROAM_CALLED_MSRN NDC|msrn (msrn-v)
ROAM_IN_CIRCUIT_GROUP BSC_CCT(loopback in circuit group)
ROAM_IN_CIRCUIT BSC_CCT(loopback in circuit)
ROAM_OUT_CIRCUIT_GROUP TRUNK_CCT(loopback out circuit group)
ROAM_OUT_CIRCUIT TRUNK_CCT(loopback out circuit)
ROAM_BASIC_SERVICE_TYPE 00 (tele serv.)
ROAM_BASIC_SERVICE_CODE 11 (telephony)
ROAM_FACILITY_USAGE 00000000
ROAM_CAUSE_FOR_TERMINATION 00000000
ROAM_CALL_TYPE 03 (outgoing)
ROAM_ROAM_MCZ_TARIFF_CLASS MCZ (msrn-F)
ROAM_ROAM_MCZ_PULSES 0000
ROAM_CALLED_MSRN_TON 05 (international)
ROAM_CALLED_MSRN_NPI 05 (isdn)
ROAM_CALLING_NUMBER_TON 05 (internat.)
ROAM_CALLING_NUMBER_NPI 05 (isdn)
ROAM_CALLED_NUMBER_TON 05 (internat.)
ROAM_CALLED_NUMBER_NPI 05 (isdn)
ROAM_LEG_CALL_REFERENCE CallRef G MSRN-V
ROAM_CALLED_MSRN-2 CC|NDC|msrn-H (#MSRN-V)
ROAM_CALLED_MSRN-2_TON 05 (internat.)
ROAM_CALLED_MSRN-2_NPI 05 (isdn)
ROAM_SRI-ISSUING-MSC: CC|NDC|msc (sri-issuing MSC-F)
ROAM_SET_UP_START_TIME
ROAM_IN_CHANNEL_ALLOCATED_TIME
ROAM_OUT_CHANNEL_ALLOCATED_TIME
ROAM_B_IDLE_TIME
ROAM_ANSWER_TIME
ROAM_CHARGING_START_TIME
ROAM_CHARGING_END_TIME
ROAM_ROAM_MCZ_DURATION
```

2.10. Unconditional Call Forwarding/IMSI Detached

The SIMM subscriber has the option of setting a single CFU Forward-To-Number for both MSISDN-H and MSISDN-F. The FTN is returned in the MAP SRI response.

If at the Signal Gateway function, the received FTN is the same as MSISDN-F, either the default number (e.g., voicemail) is chosen or an error is returned to SRI query whether the call is started on MSISDN-F or MSISDN-H.

This exception handling mechanism is assumed in the following descriptions.

2.10.1. Calls to MSISDN-H

The GMSC-H routes the call to the FTN directly without involving the Signal Gateway.

2.10.2. Calls to MSISDN-F

The SRI-issuing VMSC-F or GMSC-F issues a MAP SRI request to the Signal Gateway function with SCCP Called Party Address as MSISDN-F.

Note that GMSC-F can either route SCCP messages on MSISDN-F towards HPMN side via a ISC provider which is configured to route the CdPA=MSISDN-F towards the HPMN side, or the GMSC-F is configured in its own GTT (of STP-F/GMSC-F) to translate CdPA=MSISDN-F to CdPA=Common-HPMN-GT-of-Signal-Gateway.

If the MSISDN-F subscriber is registered on FPMN, the Signal Gateway might perform directly a PRN query on the roamer's IMSI to VLR-F unless some conditions are satisfied. One of such conditions is CFU which will have an indicator received by the Signal Gateway function from the HLR-H during insertSubdata from HLR-H to the Signal Gateway function.

Considering the case where the Signal Gateway cannot directly issue PRN query to a VLR-F, the Signal Gateway function transforms the message as shown in Table 16.

TABLE 16

| Send Routing Info from GMSC-H | | Message from Signal Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The GMSC-H now routes this message to the HLR in HPMN. The HLR sends the CFU FTN in the SRI response that is routed back via Signal Gateway and is modified as shown in Table 17.

TABLE 17

| Send Routing Info Response from HLR-H | | Message from Signal Gateway to GMSC-F via GMSC-H | |
|---|---|---|---|
| SCCP Called Address: | | SCCP Called Address: | |
| GT: | SG | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| FTN: | FTN | FTN: | #FTN |

Here #FTN is simply a notation that denotes a number whose mapping to FTN is maintained in the Signal Gateway function. The actual number could just be that where the symbol '#' is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool is filtered to present a Beijing Mobile number to establish the mapping. Note that the pool # assignment is only made when CFU happens, not in registration time. It is immediately freed when the call has been forwarded.

While reducing the use of the number of FPMN numbers, the actual use of a prefix for the notation #FTN could be logistically challenging since every SRI-issuing VMSC-F (there might be hundreds if not thousands of VMSCs) will need to be configured to route the call via the leased line to get the special re-routing tariff (otherwise normal IDD routing charges will be applied).

The FPMN # pool choice on the other hand will cause the SRI-issuing VMSC (if not the GMSC-F itself, including those with optimal routing capability) to route the call at least to the GMSC-F for the chosen number from the pool. The GMSC-F is then configured to route the call over the leased line.

Another issue with the prefixed based approach is that it might exceed both MAP and ISUP length for a FPMN. The FPMN # pool-based approach does not have this issue.

The GMSC-F is configured to route the call via the leased line to GMSC-H based on #FTN. GMSC-H is configured to use loopback circuits to send ISUP IAM message to the Signal Gateway based on the destination number. The voice trunks are held at GMSC-H. Signal Gateway maps the destination number to the real FTN and routes the call back to the GMSC-H. GMSC-H routes the call to FTN.

Figure 39:
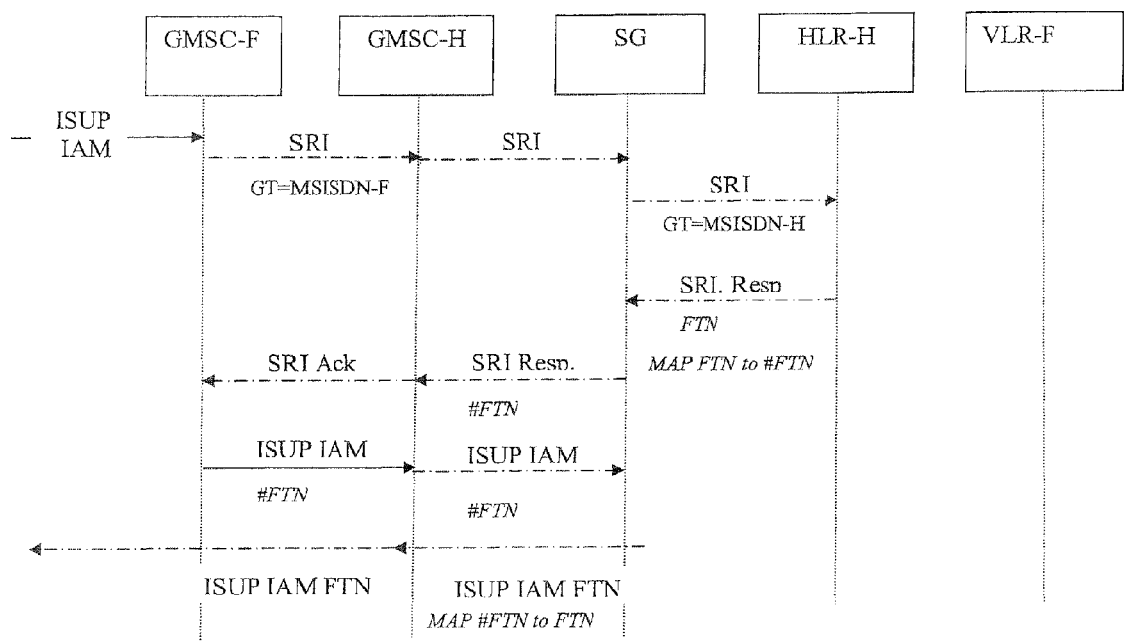
FIG. 39 is a signal flow diagram of unconditional call forwarding to a SIMM subscriber including calls to an MSISDN-F, under an embodiment.

FIG. 39 is a signal flow diagram of unconditional call forwarding to a SIMM subscriber including calls to an MSISDN-F, under an embodiment.

The SIMM subscriber of an embodiment is charged for the one-way reroute IDD (from FPMN to the Signal Gateway function) at a certain special rate, plus the charge for the CF-Leg to FTN, based on the CDR from the Signal Gateway; an example CDR algorithm is as follows:

```
Forwarded Call (FORW) :
FORW_CALL_REFERENCE CallRef #FTN
FORW_EXCHANGE_ID SG
FORW_NUMBER_OF_SS_RECORDS 01
FORW_CAUSE_FOR_FORWARDING 21 (CFU)
FORW_FORWARDING_IMSI MCC|MNC|MSIN (SIMM subscriber IMSI)
FORW_FORWARDING_IMEI FFFF...
FORW_FORWARDING_NUMBER NDC|B (MSISDN-F)
FORW_FORWARDED_TO_IMSI MCC|MNC|MSIN (unknown by gateway)
FORW_FORWARDED_TO_IMEI TAC|FAC|SN (unknown by gateway)
FORW_FORWARDED_TO_NUMBER NDC|C (FTN)
FORW_ORIG_CALLING_NUMBER CC|NDC|A (A#)
FORW_FORWARDING_FIRST_LAC FFFF
FORW_FORWARDING_FIRST_CI FFFF
FORW_FORWARDING_LAST_EX_ID FFFF
FORW_FORWARDING_LAST_LAC FFFF
FORW_FORWARDING_LAST_CI FFFF
FORW_FORWARDED_TO_FIRST_LAC FFFF
FORW_FORWARDED_TO_FIRST_CI FFFF
FORW_FORWARDED_TO_LAST_EX_ID FFFF
FORW_FORWARDED_TO_LAST_LAC FFFF
FORW_FORWARDED_TO_LAST_CI FFFF
FORW_IN_CIRCUIT_GROUP BSC_CCT (loopback in circuit group)
FORW_IN_CIRCUIT BSC_CCT (loopback in circuit)
FORW_OUT_CIRCUIT_GROUP BSC_CCT (loopback out circuit group)
FORW_OUT_CIRCUIT BSC_CCT (loopback out circuit)
FORW_BASIC_SERVICE_TYPE 00 (tele serv.)
FORW_BASIC_SERVICE_CODE 11 (telephony)
FORW_FACILITY_USAGE 00001000
FORW_CAUSE_FOR_TERMINATION 00000000
FORW_CALL_TYPE 01 (forwarded)
FORW_PNI FFFFFF
FORW_FORW_MCZ_TARIFF_CLASS MCZ (FTN)
FORW_FORW_MCZ_PULSES 0000
FORW_FORWARDING_NUMBER_TON 05 (international)
FORW_FORWARDING_NUMBER_NPI 05 (isdn)
FORW_FORWARDED_TO_NUMBER_TON 06 (national)
FORW_FORWARDED_TO_NUMBER_NPI 05 (isdn)
FORW_ORIG_CALLING_NUMBER_TON 05 (internat.)
FORW_ORIG_CALLING_NUMBER_NPI 05 (isdn)
FORW_ORIG_CALLED_NUMBER_TON 05 (international)
FORW_ORIG_CALLED_NUMBER_NPI 05 (isdn)
FORW_ORIG_CALLED_NUMBER NDC|B (MSISDN-F)
FORW_LEG_CALL_REFERENCE CallRef #FTN
FORW_FORWARDED_TO_NUMBER-2 NDC|#C (#FTN)
FORW_FORWARDED_TO_NUMBER-2_TON 05 (international)
FORW_FORWARDED_TO_NUMBER_NPI 05 (isdn)
FORW_SRI-ISSUING_MSC: GMSC-F
FORW_SET_UP_START_TIME
FORW_IN_CHANNEL_ALLOCATED_TIME
FORW_B_IDLE_TIME
FORW_ANSWER_TIME
FORW_CHARGING_START_TIME
FORW_CHARGING_END_TIME
FORW_FORW_MCZ_DURATION
```

2.11. Conditional Call Forwarding (IMSI Attached)

If at the Signal Gateway function, the received FTN is the same as MSISDN-F, either the default number (e.g. voicemail) is chosen or an error is returned to ISUP query regardless of whether the call is started on MSISDN-F or MSISDN-H.

This exception handling mechanism is assumed in the following description.

2.11.1. SIMM Subscriber in HPMN 2.11.1.1. Calls to MSISDN-H

The calls to MSISDN-H are routed normally to VMSC-H without going through the Signal Gateway. When a conditional call forwarding event triggers (CFNR, CFNRy and CFB), the VLR includes the FTN for these numbers and routes the call to the FTN directly. The VMSC generates Call Forwarding CDR and the subscriber is billed for the CF leg.

2.11.1.2. Calls to MSISDN-F

The calls to MSISDN-F are routed by SRI-issuing VMSC-F or GMSC-F to the Signal Gateway function with SCCP Called Party Address as MSISDN-F. The Signal Gateway function transforms the message as shown in Table 18.

TABLE 18

| Send Routing Info from GMSC-H | | Message from Signal Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

Consider the cases where the Signal Gateway cannot issue PRN to VLR directly. GMSC-H routes the request to HPMN HLR. The HLR issues a PRN to VLR-H and gets the MSRN in response which is sent back in turn in an SRI response to the Signal Gateway. The message is transformed as shown in Table 19.

TABLE 19

| Send Routing Info Response from HLR-H | | Message from Signal Gateway to SRI-issuing VMSC-F or GMSC-F via GMSC-H | |
|---|---|---|---|
| SCCP Called Address: | | SCCP Called Address: | |
| GT: | SG | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| MSRN: | MSRN-H | MSRN: | #MSMN-H |

Note that #MSRN-H is just a number that represents a mapping to the MSRN-H as explained before. The SRI-issuing VMSC-F or GMSC-F routes the ISUP IAM message via the leased line to the Signal Gateway. The loopback circuit is used with signaling going through the Signal Gateway. The Signal Gateway maps #MSRN-H to MSRN-H and loops back the signal at GMSC-H. Call is routed to VMSC-H.

Upon the triggering of a Late Call Forwarding event (CFB, CFNR, CFNRy), the VMSC-H routes the call to the corresponding FTN number, if any.

The CDR generated at the Signal Gateway is no different from a normal roaming call CDR, but is not so limited.

2.11.2. SIMM Subscriber in FPMN

When a SIMM subscriber registers at HPMN or VPMN, the real FTN values of the subscriber will be stored in the VLR. However during the location update for the SIMM subscriber at FPMN, the Signal Gateway can change the FTN value based on the FTN value, subscriber's FTN flag and SIMM subscriber's current location (VLR-F) and the subscriber's MSISDN-F. The FTN value will not be substituted by the Signal Gateway when issuing insertSubData to a FPMN VLR-F for a SIMM subscriber with MSISDN-F if the VLR-F network, FTN network, and MSISDN-F network has a corresponding entry in the following table maintained by HPMN or the subscriber's FTN-no-change flag is set. In this case, late call forwarding will be directly routed to FTN without going through the Signal Gateway. Table 20 shows FTN-no-change-at-FPMN.

TABLE 20

| MSISDN-F network range | VLR-F network range | FTN network range |
|---|---|---|

For example, the entry could be for all FPMN networks, e.g. China Mobile. Then as long as FTN is a China Mobile number, it will not be changed by the Signal Gateway. Another example could be that only provincial networks have the entries in the table. Then if the Beijing MSISDN-F is used by the SIMM in a Beijing VLR-F but the FTN is a Guang Dong Mobile number, the FTN will be replaced by the Signal Gateway. The exact network entry in the table depends on the billing arrangement HPMN with FPMN (and provincial FPMNs).

Following is a description of the case where the FTN has been changed. In this case, the forwarding call is routed back to the Signal Gateway which can then generate the CDR for billing purposes.

2.11.2.1. Calls to MSISDN-H

The GMSC-H issues an SRI request to HPMN HLR with SCCP Called Party Address as MSISDN-H. The HLR issues a PRN to the Signal Gateway since the Update Location was routed via it. The PRN message is transformed as shown in Table 21.

TABLE 21

| Provide Roaming Number from HLR-H | | Message from Signal Gateway to VLR-F via GMSC-H | |
|---|---|---|---|
| SCCP Called Address: | | SCCP Called Address: | |
| GT: | SG | GT: | VLR-F |
| SSN: | 7 | SSN: | 7 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP Parameters: | | MAP Parameters: | |
| MSISDN: | MSISDN-H | MSISDN: | MSISDN-F |

The PRN response is also routed back to the HPMN HLR via the Signal Gateway. The message is transformed as shown in Table 22.

TABLE 22

| Provide Roaming Number Response from VLR-F | | Message from Signal Gateway to HLR-H via GMSC-H | |
|---|---|---|---|
| SCCP Called Address: | | SCCP Called Address: | |
| GT: | SG | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | SG |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Again, #MSRN-F is just a notation that represents a number that maps to MSRN-F in the Signal Gateway function. GMSC-H routes the call through the loopback circuits with signaling going through the Signal Gateway. Signal Gateway maps #MSRN-F to MSRN-F and loops back the signaling with the voice ports established at GMSC-H. GMSC-H routes the call over the leased line. Note that the routing criterion is such that all calls from GMSC-H to an FPMN number are routed over the leased line to the GMSC-F that corresponds to the FPMN number.

If the RCM flag is on for the subscriber, the Signal Gateway will generate a new prefixed MSRN number, for example $MSRN, and it sets the generic number field to MSISDN-H where the number qualifier indicator is set to additional called number in the IAM message. The Signal Gateway then routes the call through the GMSC-H which recognizes it as intended for the CSL service node for HK ringback tone for voicemail optimized late call forwarding.

In order to detect and handle Late Call Forwarding, care is taken to make sure that only one Unanswered Call is in progress at any point in time; otherwise the Signal Gateway might not be able to determine which incoming leg is to be connected with the actual FTN when LCF event triggers. To achieve this, a call state is maintained for each subscriber roaming in FPMN when a call has been routed through to the FPMN side. There is also a flag in the call state that indicates if the call has been handled (connected or forwarded, etc.) or not.

When a new call is routed through the Signal Gateway for the same subscriber, if such a state exists and the flag is set, the call is immediately forwarded based on the CFB condition unless optimal routing takes place. The flag is cleared when the call is connected or released or LCF event is handled. In this way, call waiting and conference calling in LCF can be supported by the Signal Gateway. If the SRI or PRN request is received at the Signal gateway when the flag is set and the subscriber is registered at FPMN, then: (1) if it is the MSISDN-F of the SIMM subscriber that gets called, then (a) if the optimal routing is not allowed, the request will not be returned with a new #MSRN (no MSRN will be requested by the Signal gateway), instead early call forwarding will be triggered with ECF value if it is not empty or with the CFB value if the ECF value is empty; or (b) if optimal routing is allowed, then #MSRN will be assigned; or (2) if it is the MSISDN-H of the SIMM subscriber gets called, the request will not be returned with a new #MSRN (no MSRN will be requested by the Signal gateway), instead early call forwarding will be triggered with ECF value if it is not empty or with the CFB value if the ECF value is empty. In both cases, the default CF value can also be used in place of the ECF value (whether it is empty or not).

If the subscriber is registered at FPMN and the optimal routing is not allowed, the request will not be returned with a new #MSRN (no MSRN will be requested by the Signal Gateway), instead early call forwarding will be triggered with ECF value if it is not empty or with the CFB value if the ECF value is empty.

The call state is copied to the shared memory of the DB server. In the event of failure of the chosen Signal Gateway in the set up of the ISUP loopback call, the other gateway takes over the signaling. The call state also includes periodic (e.g., configurable X seconds) duration update. When the call is released, the call state is cleared after it is used to build CDR in the database.

Figure 40:
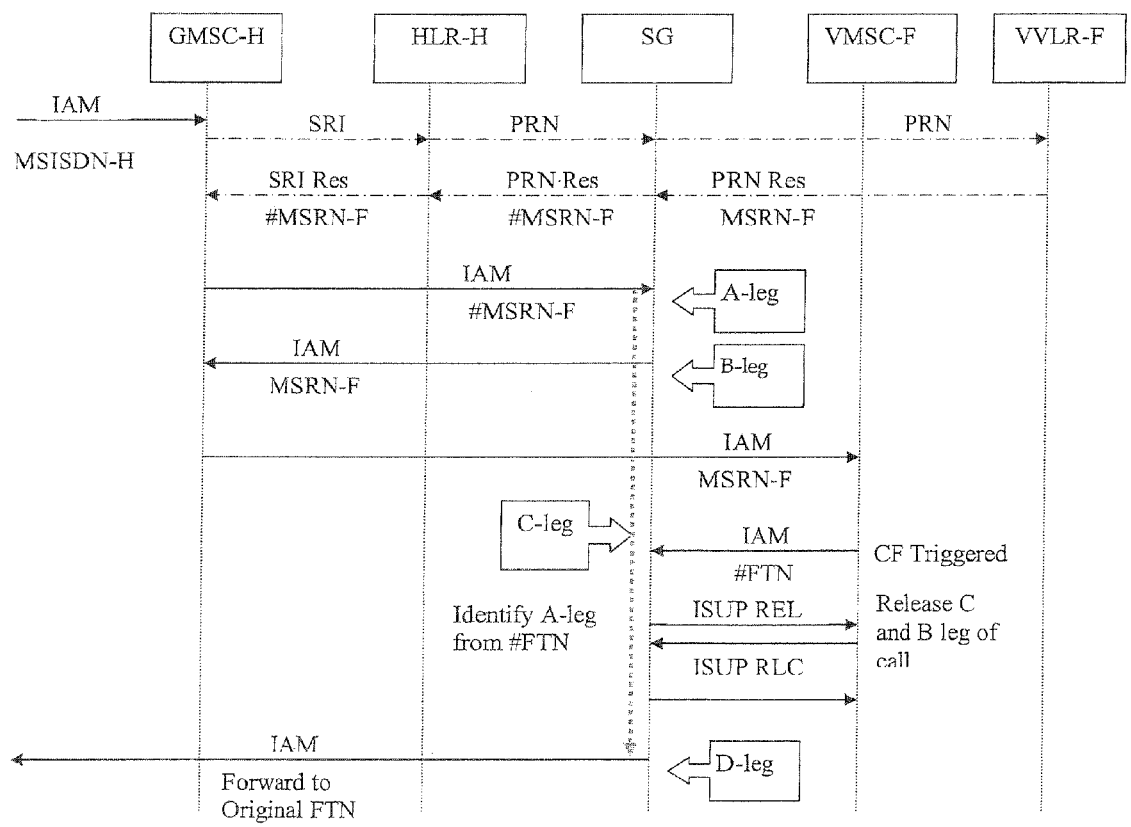
FIG. 40 is a signal flow diagram of conditional call forwarding to a SIMM subscriber in an FPMN including calls to an MSISDN-H, under an embodiment.

FIG. 40 is a signal flow diagram of conditional call forwarding to a SIMM subscriber in an FPMN including calls to an MSISDN-H, under an embodiment.

There are two ways of implementing #FTN representation, depending on FPMN switch capabilities. The first is to assign a different #FTN from a pool to each FTN value for each subscriber. This is switch independent, but would possible include a large number of #FTNs from either FPMN or HPMN. The second is to assign a different #FTN for each condition forwarding type. These depend on the OCN/ODN support of both the FPMN and HPMN.

Regarding the first implementation in which one FTN is used for each LCF value for each subscriber, the Signal Gateway creates a mapping between the allocated MSISDN (#FTN) from a pool and the actual FTN. SG manages this mapping as follows: (a) SG deletes this mapping and frees the MSISDN whenever it gets Cancel Location from HLR for the VLR and when it gets another Insert Subscriber Data, either standalone or as part of update location transaction which removes the call forwarding; (b) In case the call forwarding is changed to a different number, Insert Subscriber Data is issued by HLR and in that case SG changes the mapping. If Insert Subscriber Data has the same FTN as before, the mapping maintained in Signal Gateway is not changed. Otherwise, the mapping will be to the new FTN in the Insert Subscriber Data message with the same #FTN as before; and (c) There are two ways of creating the pool of FTN #s. One is to populate the pool with home MSISDN-H numbers; the other is to populate the pool with FPMN MSISDN-F numbers. The former has the advantage that it is less resource stressful to FPMN. However every GMSC (e.g., Beijing GMSC) in FPMN will be configured to route the call to the GMSC-F (e.g., Guang Dong GMSC) that has the leased line to GMSC-H. The second has the advantage that LCF calls are guarantee to be routed to GMSC-F without any configuration on their GMSCs. Only GMSC-F that has the leased line connection will be configured to route the call on #FTN over the leased line.

Note that the pool of #FTNs is shared not split by SG1 and SG2. Besides, it is assumed MSC will route all ISUP and SCCP with called number=dedicated range of MSISDN-F and #FTN to SG1/SG2.

The system of an embodiment does not send any ISUP or SCCP message with called number=same range of MSISDN-F or #FTN back to MSC.

Note also that care is taken to ensure that only one Unanswered Call is in progress at any point in time; otherwise the Signal Gateway may not be able to determine which incoming leg is to be connected with the actual FTN when LCF event triggers.

Regarding the second implementation in which one FTN is assigned for each LCF Condition type, when the Insert Subscriber Data is routed via the Signal Gateway, the gateway maintains a mapping between MSISDN-F, MSISDN-H and FTN values for CFB, CFNR and CFNRy. Table 23 is a call-forwarding table.

TABLE 23

| MSISDN-F | Call forwarding type | Call forwarding value | MSISDN-H |
| --- | --- | --- | --- |

It then substitutes the original FTN values with the corresponding value for each Call Forwarding event type in the translated Insert Subscriber Data message sent to VLR-F. When LCF event triggers at VMSC-F, VMSC-F looks up the FTN information from VLR-F and routes the call to the corresponding number. Note that the calls are routed to a common number for each type of condition forwarding and GMSC-H is configured to send the calls using loopback circuits with signaling through the Signal Gateway. The Signal Gateway function extracts the OCN or ODN value from the ISUP IAM, and extracts the LCF event type based on the number to which the call was forwarded. It then releases the current forwarded leg B (and C) of the call while maintaining the A-leg of the call. The original call leg (A) is then forwarded to the FTN number (D leg) retrieved by looking up the OCN/ODN values within the database containing original FTN numbers. This achieves optimal routing of Late-Call-Forwarding. It also generates a CF CDR. This approach does not require reserving a pool of MSISDN numbers from HPMN or FPMN.

Figure 41:
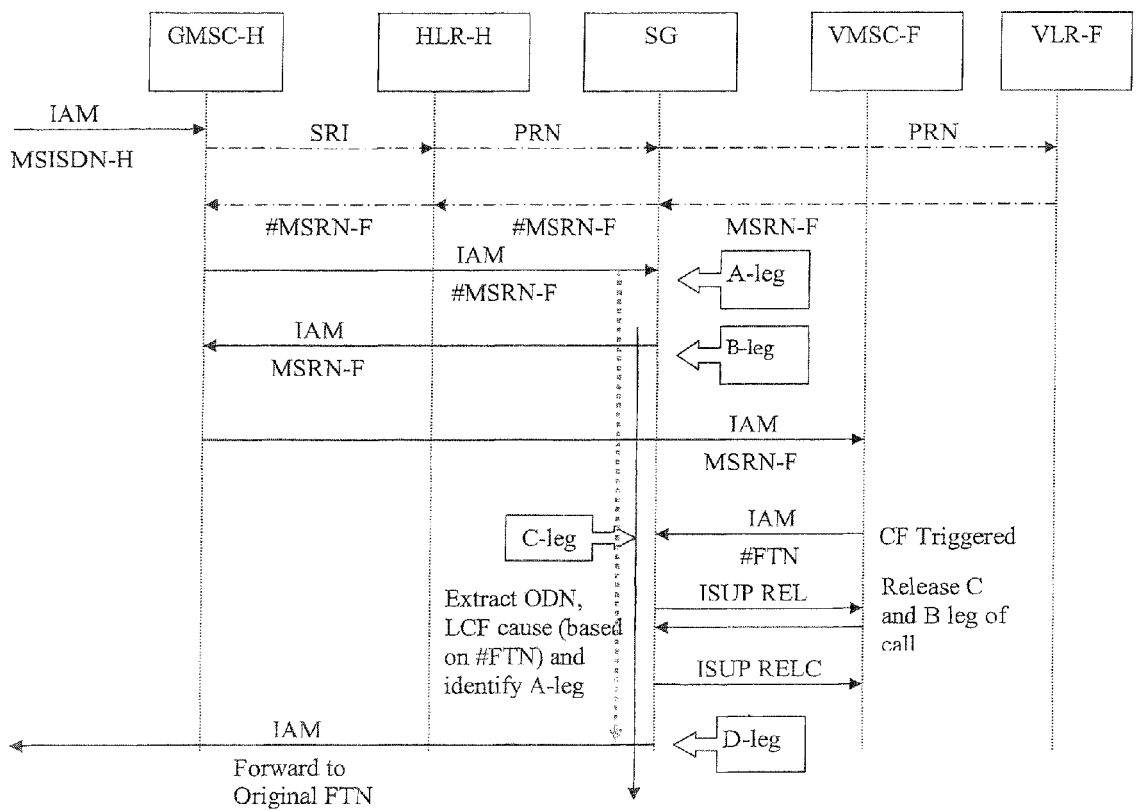
FIG. 41 is another signal flow diagram of conditional call forwarding to a SIMM subscriber in an FPMN including calls to an MSISDN-H, under an embodiment.

FIG. 41 is another signal flow diagram of conditional call forwarding to a SIMM subscriber in an FPMN including calls to an MSISDN-H, under an embodiment.

The second implementation above in which one FTN is assigned for each LCF Condition type is recommended if OCN/ODN is supported by both HPMN and FPMN. Unlike the CFU case where #FTN is only assigned from a pool when CFU happens not at registration time, the first implementation would require such an assignment from a pool at registration time whether LCF is triggered or not.

Each FPMN will be configured to apply one of the two implementations in LCF. For example, one service provider can be configured to have the OCN implementation; while another service provider can have the pool implementation.

An example algorithm supporting conditional call forwarding when the SIMM subscriber is in the HPMN and called on the MISIDN-H is as follows:

Forwarded Call (FORW):
FORW_CALL_REFERENCE CallRef MSISDN-H
FORW_EXCHANGE_ID SG
FORW_NUMBER_OF_SS_RECORDS 01
FORW_CAUSE_FOR_FORWARDING 29 (CFB)
FORW_FORWARDING_IMSI MCC|MNC|MSIN (SIMM subscriber IMSI)
FORW_FORWARDING_IMEI FFFF . . .
FORW_FORWARDING_NUMBER NDC|B (MSISDN-H)
FORW_FORWARDED_TO_IMSI MCC|MNC|MSIN (unknown by gateway)
FORW_FORWARDED_TO_IMEI TAC|FAC|SN (unknown by gateway)
FORW_FORWARDED_TO_NUMBER NDC|C (FTN)
FORW_ORIG_CALLING_NUMBER CC|NDC|A (A#)
FORW_FORWARDING_FIRST_LAC FFFF
FORW_FORWARDING_FIRST_CI FFFF
FORW_FORWARDING_LAST_EX_ID FFFF
FORW_FORWARDING_LAST_LAC FFFF
FORW_FORWARDING_LAST_CI FFFF
FORW_FORWARDED_TO_FIRST_LAC FFFF
FORW_FORWARDED_TO_FIRST_CI FFFF
FORW_FORWARDED_TO_LAST_EX_ID FFFF
FORW_FORWARDED_TO_LAST_LAC FFFF
FORW_FORWARDED_TO_LAST_CI FFFF
FORW_IN_CIRCUIT_GROUP BSC_CCT (loopback in circuit group)
FORW_IN_CIRCUIT BSC_CCT (loopback in circuit)
FORW_OUT_CIRCUIT_GROUP BSC_CCT (loopback out circuit group)
FORW_OUT_CIRCUIT BSC_CCT (loopback out circuit)
FORW_BASIC_SERVICE_TYPE 00 (tele serv.)
FORW_BASIC_SERVICE_CODE 11 (telephony)
FORW_FACILITY_USAGE 00001000
FORW_CAUSE_FOR_TERMINATION 00000000
FORW_CALL_TYPE 01 (forwarded)
FORW_PNI FFFFFF
FORW_FORW_MCZ_TARIFF_CLASS MCZ (FTN)
FORW_FORW_MCZ_PULSES 0000
FORW_FORWARDING_NUMBER_TON 06 (national)
FORW_FORWARDING_NUMBER_NPI 05 (isdn)
FORW_FORWARDED_TO_NUMBER_TON 06 (national)
FORW_FORWARDED_TO_NUMBER_NPI 05 (isdn)
FORW_ORIG_CALLING_NUMBER_TON 06 (nat.)
FORW_ORIG_CALLING_NUMBER_NPI 05 (isdn)
FORW_ORIG_CALLED_NUMBER_TON 06 (national)
FORW_ORIG_CALLED_NUMBER_NPI 05 (isdn)
FORW_ORIG_CALLED_NUMBER NDC|B (MSISDN-H)
FORW_LEG_CALL_REFERENCE CallRef FTN
FORW_SRI-ISSUING_MSC: GMSC-H
FORW_SET_UP_START_TIME
FORW_IN_CHANNEL_ALLOCATED_TIME
FORW_B_IDLE_TIME
FORW_ANSWER_TIME
FORW_CHARGING_START_TIME
FORW_CHARGING_END_TIME
FORW_FORW_MCZ_DURATION 2.11.2.2. Calls to MSISDN-F When the user is called on MSISDN-F, the SRI-issuing VMSC-F or GMSC-F issues a SRI request to the Signal Gateway with SCCP Called Party Address as MSISDN-F. The Signal Gateway modifies the SRI message as shown in Table 24.

TABLE 24

| Send Routing Info from GMSC-F | | Message from Signal Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The HLR issues a PRN request that is also routed via the Signal Gateway and is transformed as shown in Table 25.

TABLE 25

| Provide Roaming Number from HLR-H | | Message from Signal Gateway to VLR-F via GMSC-H | |
|---|---|---|---|
| SCCP Called Address: | | SCCP Called Address: | |
| GT: | F-SG | GT: | VLR-F |
| SSN: | 7 | SSN: | 7 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| MSC address: | SG | MSC address: | VMSC-F |
| MSISDN: | MSISDN-H | MSISDN: | MSISDN-F |

Note that MSISDN is an optional parameter and if present, it is replaced with MSISDN-F. The Signal Gateway also transforms the PRN response as shown in Table 26.

TABLE 26

| Provide Roaming Number Response from VMSC-F | | Message from Signal Gateway to HLR-H via GMSC-H | |
|---|---|---|---|
| SCCP Called Address: | | SCCP Called Address: | |
| GT: | SG | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | F-SG |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Since the roamer information (IMSI, VMSC-F, VLR-F, etc.) is maintained when the subscriber is in FPMN, the Signal Gateway can also directly issue PRN to the VLR-F to obtain the roaming number.

The #MSRN number is returned as SRI response to GMSC-F or the SRI-issuing VMSC-F. The SRI-issuing VMSC-F or GMSC-F routes the call to #MSRN-F over the leased line to GMSC-H. The GMSC-H sets up the call with loopback circuits with signaling going through the Signal Gateway function. The Signal Gateway instructs GMSC-H to set up the call on the real MSRN-F.

When the LCF event triggers, VMSC-F forwards the call to the FTN sent as part of the Insert Subscriber Data message. The call flow is similar to the call on MSISDN-H as described above.

Figure 42:
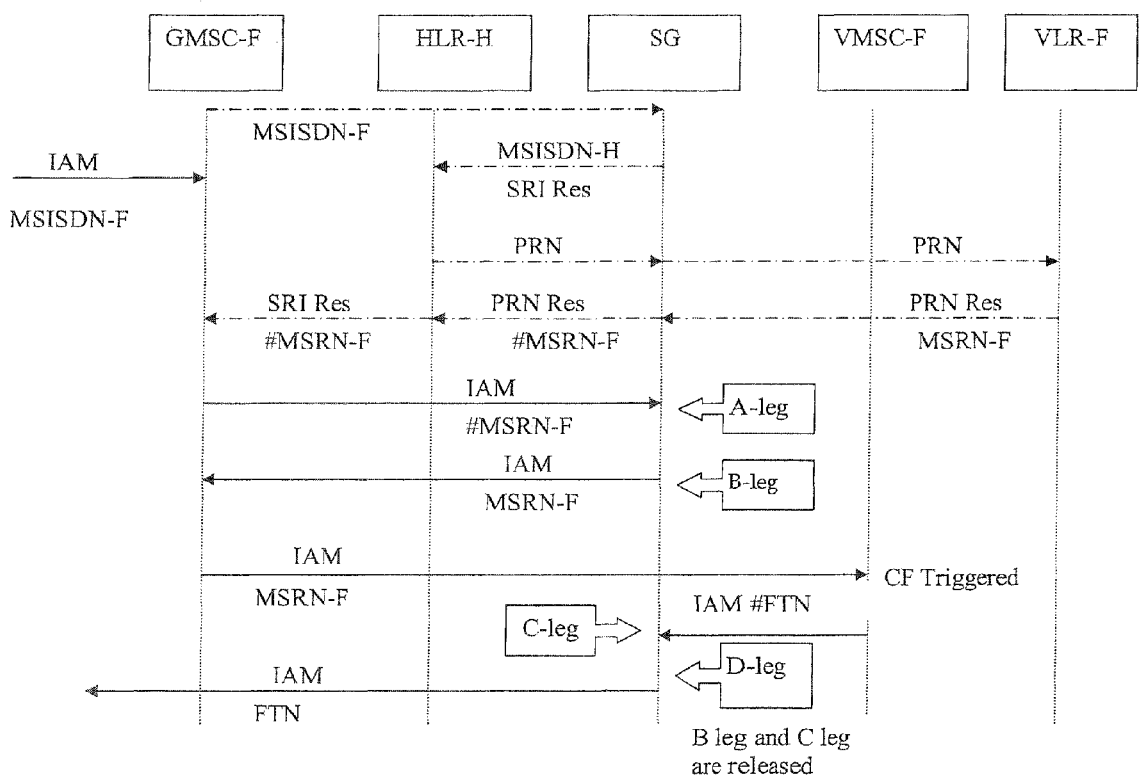
FIG. 42 is another signal flow diagram of conditional call forwarding to a SIMM subscriber in an FPMN including calls to an MSISDN-F, under an embodiment.

FIG. 42 is signal flow diagram of conditional call forwarding to a SIMM subscriber in an FPMN including calls to an MSISDN-F, under an embodiment.

An example algorithm supporting conditional call forwarding when the SIMM subscriber is in the HPMN and called on the MISIDN-F is as follows:

```
Forwarded Call (FORW):
FORW_CALL_REFERENCE CallRef MSISDN-F
FORW_EXCHANGE_ID SG
FORW_NUMBER_OF_SS_RECORDS 01
FORW_CAUSE_FOR_FORWARDING 29 (CFB)
FORW_FORWARDING_IMSI MCC|MNC|MSIN (SIMM subscriber
IMSI)
FORW_FORWARDING_IMEI FFFF . . .
FORW_FORWARDING_NUMBER NDC|B (MSISDN-F)
FORW_FORWARDED_TO_IMSI MCC|MNC|MSIN (unknown by
gateway)
FORW_FORWARDED_TO_IMEI TAC|FAC|SN (unknown by
gateway)
FORW_FORWARDED_TO_NUMBER NDC|C (FTN)
FORW_ORIG_CALLING_NUMBER CC|NDC|A (A#)
FORW_FORWARDING_FIRST_LAC FFFF
FORW_FORWARDING_FIRST_CI FFFF
FORW_FORWARDING_LAST_EX_ID FFFF
FORW_FORWARDING_LAST_LAC FFFF
FORW_FORWARDING_LAST_CI FFFF
FORW_FORWARDED_TO_FIRST_LAC FFFF
FORW_FORWARDED_TO_FIRST_CI FFFF
FORW_FORWARDED_TO_LAST_EX_ID FFFF
FORW_FORWARDED_TO_LAST_LAC FFFF
FORW_FORWARDED_TO_LAST_CI FFFF
FORW_IN_CIRCUIT_GROUP BSC_CCT (loopback in circuit group)
FORW_IN_CIRCUIT BSC_CCT (loopback in circuit)
FORW_OUT_CIRCUIT_GROUP BSC_CCT (loopback out circuit
group)
FORW_OUT_CIRCUIT BSC_CCT (loopback out circuit)
FORW_BASIC_SERVICE_TYPE 00 (tele serv.)
FORW_BASIC_SERVICE_CODE 11 (telephony)
FORW_FACILITY_USAGE 00001000
FORW_CAUSE_FOR_TERMINATION 00000000
FORW_CALL_TYPE 01 (forwarded)
FORW_PNI FFFFFF
FORW_FORW_MCZ_TARIFF_CLASS MCZ (FTN)
FORW_FORW_MCZ_PULSES 0000
FORW_FORWARDING_NUMBER_TON 05 (international)
FORW_FORWARDING_NUMBER_NPI 05 (isdn)
FORW_FORWARDED_TO_NUMBER_TON 06 (national)
FORW_FORWARDED_TO_NUMBER_NPI 05 (isdn)
FORW_ORIG_CALLING_NUMBER_TON 02 (internat.)
FORW_ORIG_CALLING_NUMBER_NPI 05 (isdn)
FORW_ORIG_CALLED_NUMBER_TON 05 (international)
FORW_ORIG_CALLED_NUMBER_NPI 05 (isdn)
FORW_ORIG_CALLED_NUMBER NDC|B (MSISDN-F)
FORW_LEG_CALL_REFERENCE CallRef FTN
FORW_SRI-ISSUING_MSC: GMSC-F
FORW_SET_UP_START_TIME
FORW_IN_CHANNEL_ALLOCATED_TIME
FORW_B_IDLE_TIME
FORW_ANSWER_TIME
FORW_CHARGING_START_TIME
FORW_CHARGING_END_TIME
FORW_FORW_MCZ_DURATION
```

2.11.3. SIMM Subscriber in VPMN
2.11.3.1. Calls to MSISDN-H
The GSM procedures apply.
2.11.3.2. Calls to MSISDN-F
The GMSC-F is configured to issue a SRI to the Signal Gateway with SCCP Called Party Address as MSISDN-F. Note that GMSC-F can either route SCCP messages on MSISDN-F towards HPMN side via a ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway. The Signal Gateway modifies the message as shown in Table 27.

TABLE 27

| | Send Routing Info from GMSC-H | | Message from Signal Gateway to GMSC-H | |
|---|---|---|---|---|
| | SCCP Called Address: | | SCCP Called Address: | |
| GT: | MSISDN-F | GT: | MSISDN-H | |
| SSN: | 6 | SSN: | 6 | |
| TT: | 0 | TT: | 0 | |
| | SCCP Calling Address: | | SCCP Calling Address: | |
| GT: | GMSC-F | GT: | SG | |
| SSN: | 8 | SSN: | 8 | |
| TT: | 0 | TT: | 0 | |
| | MAP level parameters: | | MAP level parameters: | |
| MSISDN: | MSISDN-F | MSISDN: | MSISDN-H | |

The HPMN HLR issues a PRN to the VLR-V and receives an MSRN in turn. The MSRN is returned in the SRI response and the Signal Gateway transforms it as shown in Table 28.

TABLE 28

| | Send Routing Info Response from HLR-H | | Message from Signal Gateway to GMSC-F via GMSC-H | |
|---|---|---|---|---|
| | SCCP Called Address: | | SCCP Called Address: | |
| GT: | SG | GT: | GMSC-F | |
| SSN: | 8 | SSN: | 8 | |
| TT: | 0 | TT: | 0 | |
| | SCCP Calling Address: | | SCCP calling Address: | |
| GT: | HLR-H | GT: | SG | |
| SSN: | 6 | SSN: | 6 | |
| TT: | 0 | TT: | 0 | |
| | MAP level parameters: | | MAP level parameters: | |
| MSRN: | MSRN-V | MSRN: | #MSRN-V | |

The GMSC-F routes the call via the leased line (by looking at the #MSRN-V) to the Signal Gateway. The Signal Gateway maps the #MSRN-V to the real MSRN-V and routes the call back to GMSC-H with MSRN-V as the destination number. The call is terminated on VMSC-V.

When the LCF event triggers, VMSC-V directly routes the call to the FTN numbers received in the Insert Subscriber Data message.

Figure 43:
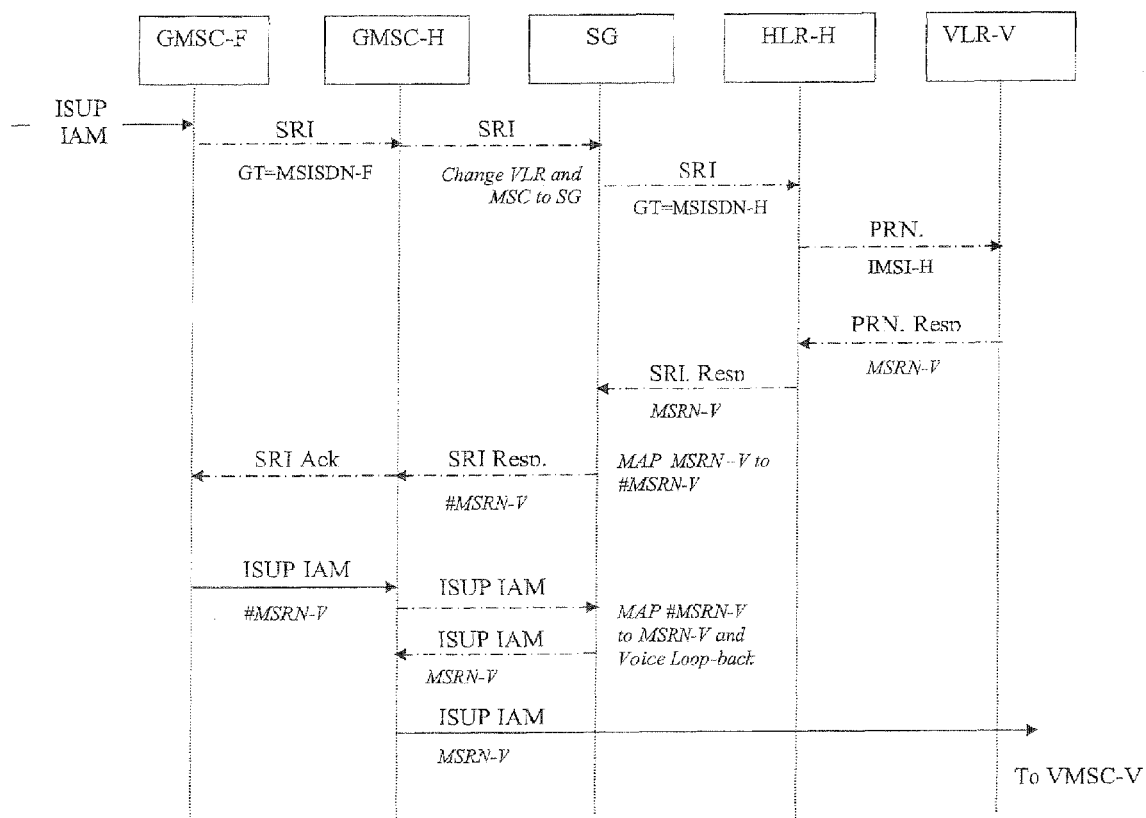
FIG. 43 is a signal flow diagram of conditional call forwarding to a SIMM subscriber in a VPMN including calls to an MSISDN-F, under an embodiment.

FIG. 43 is a signal flow diagram of conditional call forwarding to a SIMM subscriber in a VPMN including calls to an MSISDN-F, under an embodiment.

The CDR will be no different from a roaming call on MSISDN-F of a SIMM subscriber where the SIMM subscriber is registered at a VPMN network.

2.12. Support for Optimal Routing

The SIMM System/Service of an embodiment includes Optimal Routing Support for voice routing when the Calling and Called party/forward-to party are in the same country. Several cases of optimal routing are described below.

Figure 44:
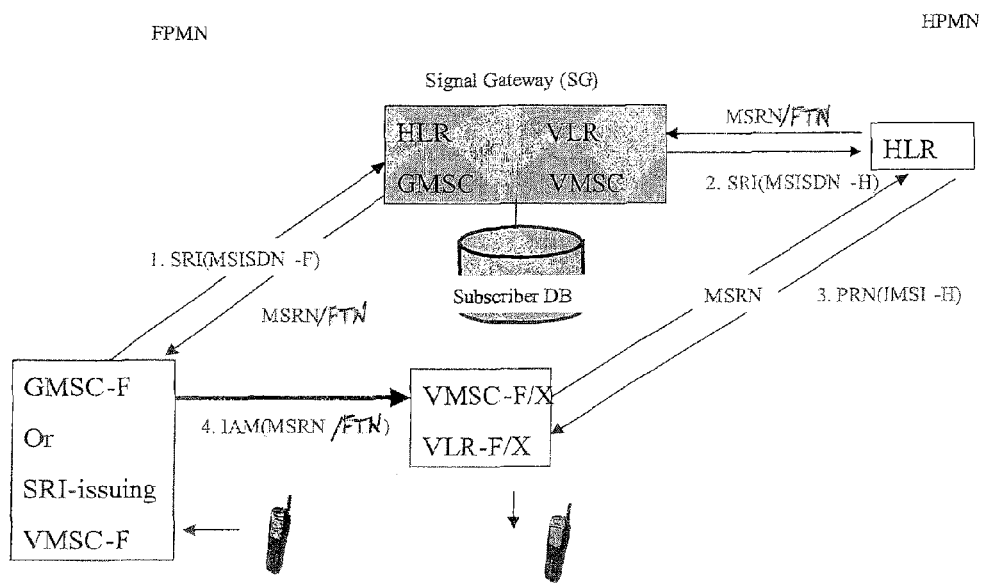
FIG. 44 is a signal flow diagram of call routing when an MSISDN-F is called and the subscriber is not in the HPMN, under an embodiment.

One embodiment of optimal routing is when the MSISDN-F is called when the subscriber is not at the HPMN (i.e., the subscriber is at FPMN or VPMN). FIG. 44 is a signal flow diagram of call routing when an MSISDN-F is called and the subscriber is not in the HPMN, under an embodiment. In this case, the Signal Gateway function addresses the optimal routing on MSRN and ECF/CFU forward-to number by maintaining a table of OR-allowed records each contains a MSISDN-F number, a GMSC-F or SRI-issuing VMSC-F number, and a destination number which can be MSRN, FTN, VMSC numbers. The value of each field can be a range or a prefix. If the call on MSISDN-F is to be routed from the GMSC-F/VMSC-F to a MSRN/FTN that is satisfied by a record in the FPMN-OR-allowed table, then the call can be optimally routed. If the call is OR routable, then the Signal Gateway function will return the MSRN/FTN directly to the SRI-issuing VMSC-F/GMSC-F. The Signal Gateway will not be able to generate a duration CDR in both cases although the MAP transaction record is generated. Table 29 shows FPMN-OR-allowed.

TABLE 29

| MSISDN-F | SRI-issuing MSC-F | Destination # |
|---|---|---|

Note that the FPMN-OR-allowed table can allow an OR call for a SIMM subscriber in one part of FPMN network and disallow an OR call in another part when MSISDN-F is called even though the caller is on the same FPMN switch in both cases. For example, a SIMM subscriber with a Beijing Mobile number is registered in a Beijing network. A call originated from a Beijing network could be optimally routed to the subscriber because the OR-allowed table allows such a case. The same SIMM subscriber with a Beijing Mobile number is later registered in a Shanghai network. A call originated from a Beijing network might not be optimally routed to the subscriber since the OR-allowed table does not have a supporting record.

It is also possible that the SRI-issuing MSC on MSISDN-F is not allowed for optimal routing to a VMSC-F/MSRN but the GMSC-F for MSISDN-F is allowed for optimal routing. In this case, the Signal Gateway can return the original MSISDN back to the SRI-issuing MSC which can then route the call nationally to GMSC-F which can then issue SRI on MSISDN-F to the Signal Gateway function. The Signal Gateway function can then obtain MSRN/FTN and return it directly to the GMSC-F which can then optimally route the call to the destination MSRN or FTN.

Figure 45:
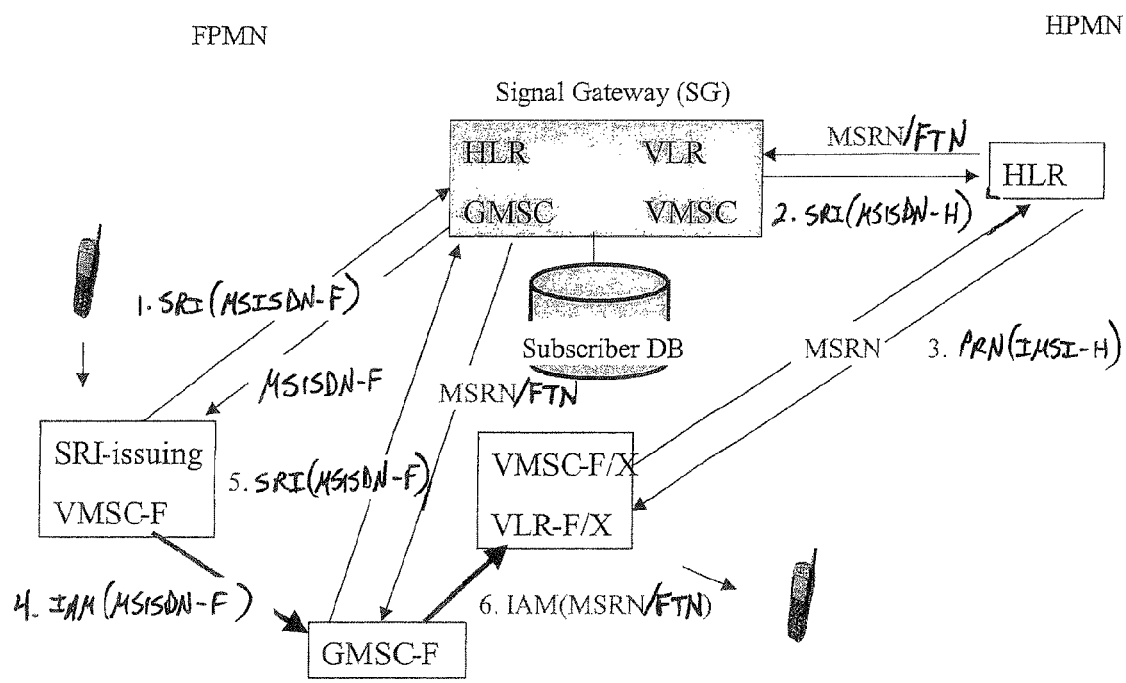
FIG. 45 is another signal flow diagram of call routing when an MSISDN-F is called and the subscriber is not in the HPMN, under an embodiment.

FIG. 45 is another signal flow diagram of call routing when an MSISDN-F is called and the subscriber is not in the HPMN, under an embodiment. In this example, a Beijing Mobile caller calls the SIMM subscriber's GMCC number when the caller is in Beijing and the subscriber is registered at Guang Dong, even though a direct optimal routing is not allowed, it is possible to route the call to Guang Dong first. Afterwards; the GMSC-F at GMCC can route the call to the VMSC-F at Beijing rather than routing the call through GMSC-H with loopback signaling through the Signal Gateway.

Another example is when the SIMM subscriber goes to a third VPMN; if his MSISDN-F is called, the call will reach GMSC-F first. If OR is allowed, the call will be routed directly from GMSC-F to VPMN; otherwise the call will be routed thru HPMN which will then route the call to VPMN.

If OR routing is allowed, the Signal Gateway will not be able to generate duration CDR although MAP signaling CDR can still be generated. To OR or not is controlled by the OR table. Billing arrangement need be made between HPMN and FPMN in both cases.

Optimal routing for a SIMM subscriber called via the MSISDN-F when the subscriber is registered at an FPMN is acceptable since there is a special relationship between FPMN and HPMN.

When a SIMM subscriber is called via the MSISDN-F when the subscriber is registered at an VPMN network, non-optimal routing will involve an IDD route from FPMN to HPMN and then another IDD route from HPMN to VPMN. The advantage to this is that since VPMN always presents the MT-TAP to HPMN based on IMSI, HPMN can then top it up with IDD leg to VPMN right away to charge the subscriber while eating the cost of the IDD leg from FPMN to HPMN since the leg can be a direct link from FPMN to HPMN. Even if the HPMN operator wants to charge the IDD leg from FPMN to HPMN, because the Signal Gateway has the CDR, HPMN can reconcile the MT-TAP from VPMN with the Signal Gateway CDR for those MT-TAP records on the SIMM IMSI range. This leg on the direct link can be charged cheaper than a normal route from FPMN to HPMN. The subscriber pays two legs of IDD rather than one leg or a local leg (if at FPMN) under this scenario.

However when optimal routing takes place, since VPMN still presents the MT-TAP records to HPMN, the FPMN and HPMN rely on each other's CDR for correct billing. HPMN cannot just top up the IDD leg from HPMN to VPMN to charge the subscriber. It needs to examine the MT-TAP on SIMM IMSI separately from ordinary MT-TAP records. It needs to be reconciled with the MAP transaction records in the Signal Gateway. The map transaction record will also indicate which MSISDN-F is called so correct IDD leg top up can be applied. However because MAP transaction does not have duration, reconciliation need be careful about the timing. Alternatively, HPMN can wait for FPMN to send out the rerouted CDR on MSISFN-F which will have durations to do the final reconciliation.

Figure 46:
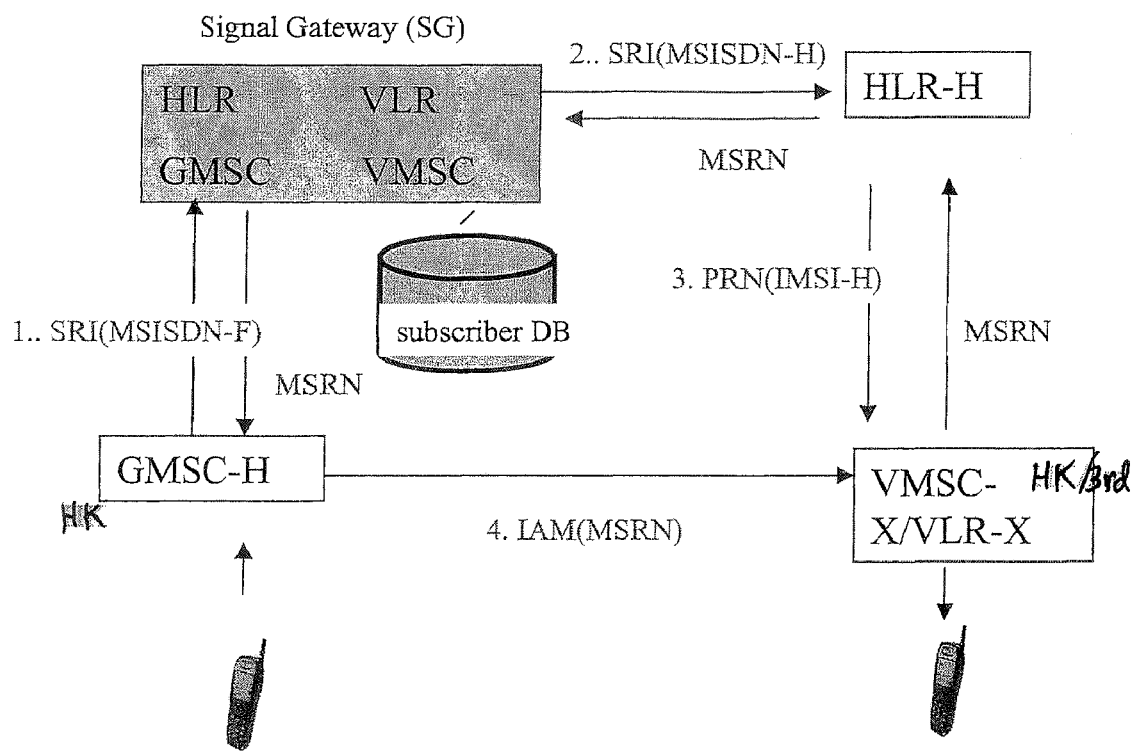
FIG. 46 is a signal flow diagram of call routing when an HPMN user (local or roamer) calls an MSISDN-F of a SIMM subscriber and the subscriber is not in the FPMN, under an embodiment.

Another embodiment of optimal routing is when an HPMN network user (local or roamer) calls MSISDN-F of a SIMM subscriber when the subscriber is not on the FPMN network. FIG. 46 is a signal flow diagram of call routing when an HPMN user (local or roamer) calls an MSISDN-F of a SIMM subscriber and the subscriber is not in the FPMN, under an embodiment.

In this embodiment, the GMSC-H is configured to issue SRI-query on the MSISDN-F to the Signal Gateway. The Signal Gateway function maintains a list of MSISDN-Fs that are allowed (e.g. may be offered as a subscription) to OR route the call for the case.

When an SRI query is received at a Signal Gateway, the gateway checks if the SRI-issuing GT is an HPMN one and, if it is, it checks the MSISDN-F in the query against the HPMN-OR-allowed table. If there is a match, the real MSRN/FTN (after finding it) is returned; otherwise the original MSISDN-F is returned.

Figure 47:
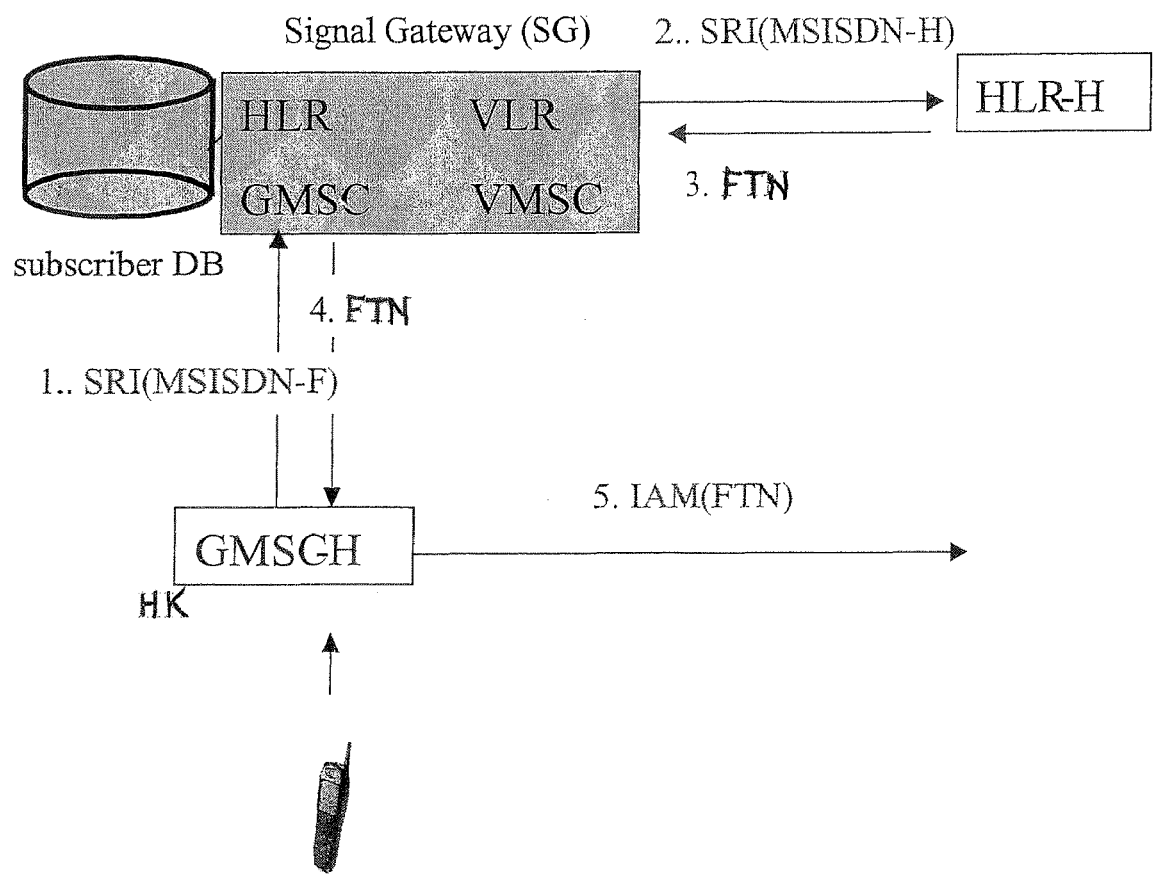
FIG. 47 is another signal flow diagram of call routing when an HPMN user (local or roamer) calls an MSISDN-F of a SIMM subscriber and the subscriber is not in the FPMN, under an embodiment.

FIG. 47 is another signal flow diagram of call routing when an HPMN user (local or roamer) calls an MSISDN-F of a SIMM subscriber and the subscriber is not in the FPMN, under an embodiment. Table 30 shows HPMN-OR-allowed.

TABLE 30

| MSISDN-F |
| --- |

Note that the SIMM subscribers can get OR calls from either a local or a roamer in HPMN. The SIMM receiving party might be charged a subscription fee or a markup for reduced phone rate due to optimal routing.

While the Signal Gateway will have a SRI query record, the Signal Gateway will not be able to generate the CDR. However this service can either be offered as a subscription service or a one time fixed charge, then the SRI query record will be sufficient. The MTC record for the SIMM subscriber that received such an OR-routed call will be as if his/her HPMN number had been called.

The above simple HPMN-OR-allowed table can be further extended to cover more fine-grained cases where destination # can be FTN, MSRN, VMSC/VLR # ranges.

Table 31 shows HPMN-OR-allowed.

TABLE 31

| MSISDN-F | SRI-issuing MSC-H | Destination # |
| --- | --- | --- |

However if destination # is FPMN, ISUP loopback will be used as if the subscriber's MSISDN-H is called when the subscriber is registered at FPMN even OR is allowed.

Figure 48:
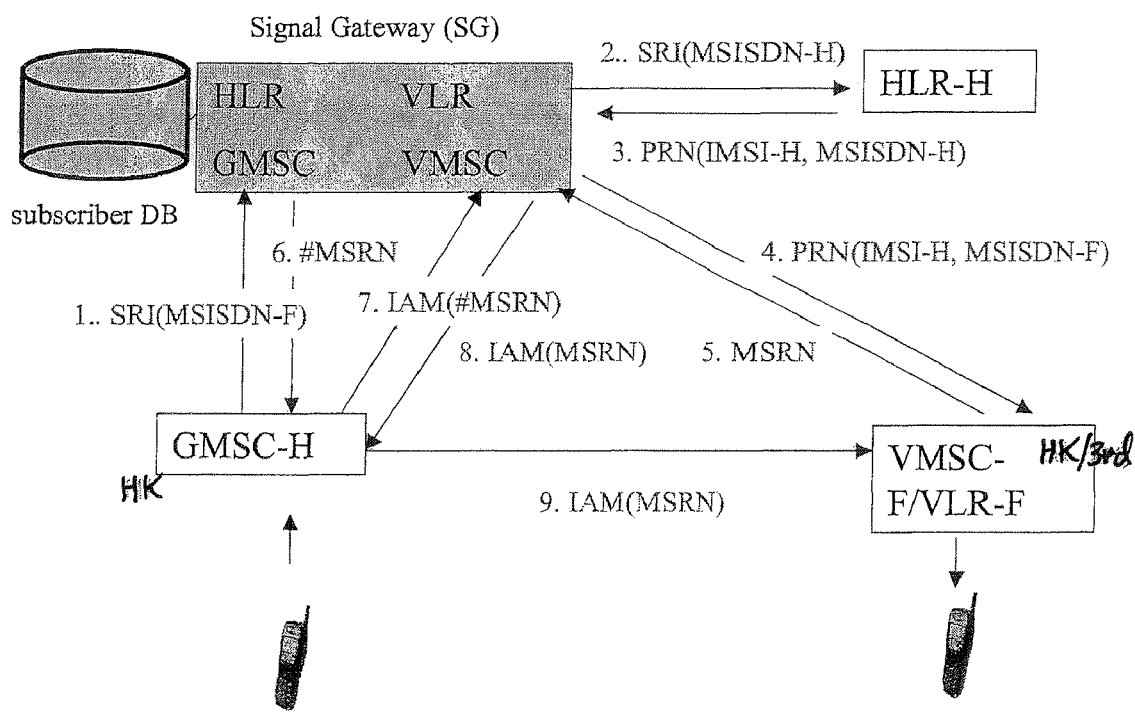
FIG. 48 is yet another signal flow diagram of call routing when an HPMN user (local or roamer) calls an MSISDN-F of a SIMM subscriber and the subscriber is not in the FPMN, under an embodiment.

FIG. 48 is yet another signal flow diagram of call routing when an HPMN user (local or roamer) calls an MSISDN-F of a SIMM subscriber and the subscriber is not in the FPMN, under an embodiment. Similar CFU/ECF forwarding can also be optimally addressed when the FTN is a FPMN number.

Figure 49:
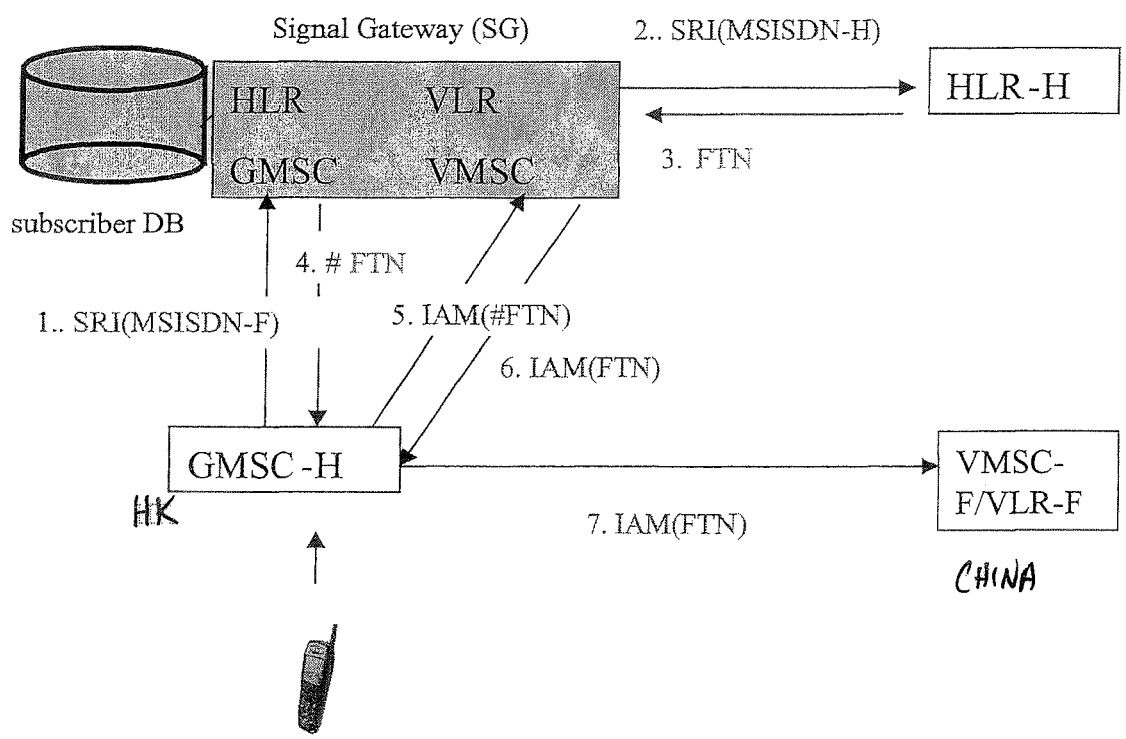
FIG. 49 is still another signal flow diagram of call routing when an HPMN user (local or roamer) calls an MSISDN-F of a SIMM subscriber and the subscriber is not in the FPMN, under an embodiment.

FIG. 49 is still another signal flow diagram of call routing when an HPMN user (local or roamer) calls an MSISDN-F of a SIMM subscriber and the subscriber is not in the FPMN, under an embodiment.

The Signal Gateway produces CDR similar to the case as if the subscriber's MSISDN-H is called when the subscriber is registered at FPMN except that the CDR indicates it is the MSISDN-F that is originally called. In this way, HPMN can choose to charge a mark-up if so desired.

2.13. Determine Number Called On

In general, it is not always possible to determine which number (MSISDN-H or MSISDN-F1 to MSISDN-Fn) a SIMM subscriber is called on. However, if caller ID is delivered to the SIMM subscriber, without optimal routing (when the SIMM subscriber is at VPMN), the subscriber can determine which number has been called via the caller ID. In practice, caller ID is usually delivered between HPMN and FPMN countries. Some operators also deliver caller ID to outbound roamers.

When MSISDN-H is called while the SIMM subscriber is at HPMN or VPMN, no caller ID will be changed. The subscriber can deduce that his MSISDN-H is called.

When MSISDN-H is called while the SIMM subscriber is at FPMN-i (where i is 1, 2, . . . n), since the call will always go thru the Signal Gateway via ISUP loopback or IN, the Signal Gateway will modify the calling party A to A^ if the caller ID is also a MSISDN-F-i number and will not change the calling party A otherwise. Here A^ is a logical notation that contains A along with some other notation that denotes the HPMN number either as a prefix or postfix. The exact form of A^ will depend on operator requirements. Some examples of A^ include A99, A#, A*, ##-A, 99-A. Postfix has the advantage that the number can be immediately called. Prefix has the advantage that caller name from phone book can be displayed.

When MSISDN-F-i is called while the SIMM subscriber is at HPMN or XPMN, then the call will always go thru the Signal Gateway via ISUP loopback or IN without optimal routing. In this case, the Signal Gateway will modify the calling party A to A' where A' is a logical notation that contains A along with some other notation that denotes the FPMN number either as a prefix or postfix. The exact form of A's will depend on operator requirements. Some examples of A' could be A00i, A*i, A#i, #i-A, and 00i-A. Postfix has the advantage that the number can be immediately called. Prefix has the advantage that caller name from phone book can be displayed.

When optimal routing is allowed at VPMN, however since the call is not going thru the signal relay gateway, caller ID cannot be manipulated to let the SIMM recipient to deduce which number is called on. This is one of the disadvantages of allowing optimal routing to VPMN network from FPMN when calls are made on MSISDN-F when the SIMM roamer is at VPMN.

When optimal routing is allowed at FPMN, since caller ID is shown, even though it is not going thru the Signal Gateway, the SIMM roamer at FPMN can deduce that the call is on his MSISDN-F of the FPMN in which he/she is located.

Alternatively, for MT calls (MSISDN-F or MSISDN-H) to SIMM subscribers going thru the Signal Gateway, an out-of-band SMS/USSD over SS7 will be sent to the subscriber handset with the message "Called on MSISDN-F" if not called on MSISDN-H. If the number is called on MSISDN-H, no message will be sent to the handset.

2.14. Mobile Terminated SMS

The SIMM subscriber of an embodiment is able to receive SMS in any GSM network irrespective of it being sent to MSISDN-H or MSISDN-F. The SMS could be sent from any SMSC.

2.14.1. SMS to MSISDN-H when Subscriber in HPMN

Normal GSM operations apply regardless of whether the SMS is sent by SMSC-H, SMSC-F or SMSC-V. VMSC-H MT SMS CDR is used for SMS Inter-working settlements between HPMN and APMN.

2.14.2. SMS to MSISDN-H when Subscriber in FPMN

Only when the SIMM subscriber registers at FPMN and the VMSC/SGSN address is modified to a Signal Gateway GT is the Signal Gateway function involved. To VLR-F, the Signal Gateway is the HLR for the subscriber and it also knows the VMSC-F of the subscriber. SMSC-X (SMSC-H, SMSC-F or SMSC-V) issues an SRI-SM to the HLR-H. HLR-H has the address of the Signal Gateway as the serving MSC and returns it in SRI-SM response. SMSC-X issues a FSM to the Signal Gateway. The Signal Gateway performs the translation as shown in Table 32.

TABLE 32

| MT FSM from SMSC-X | | Message from Signal Gateway to VMSC-F via GMSC-H | |
|---|---|---|---|
| SCCP Called Address: | | SCCP Called Address: | |
| GT: | SG | GT: | VMSC-F |
| SSN: | 8 | SSN: | 8 |
| TT: | 0 | TT: | 0 |
| SCCP Calling Address: | | SCCP Calling Address: | |
| GT: | SMSC-X | GT: | SG |
| SSN: | 8 | SSN: | 8 |
| TT: | 0 | TT: | 0 |

The Sending SMSC address, the Sender address and the recipient address in the MAP message are left unchanged. Note that the recipient address SP-RP-DA is based on IMSI-H (or LMSI), there is no need to worry about swapping MSISDN-H by MSISDN-F.

Note that the SCCP Calling Address has also been changed and hence the response also goes through the Signal Gateway as shown in Table 33.

TABLE 33

| MT FSM Response from VMSC-F | | Message from Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |
| SCCP Calling Address: | | SCCP Calling Address: | |
| GT: | VMSC-F | GT: | SG |
| SSN: | 8 | SSN: | 8 |
| TT: | 0 | TT: | 0 |

Figure 50:
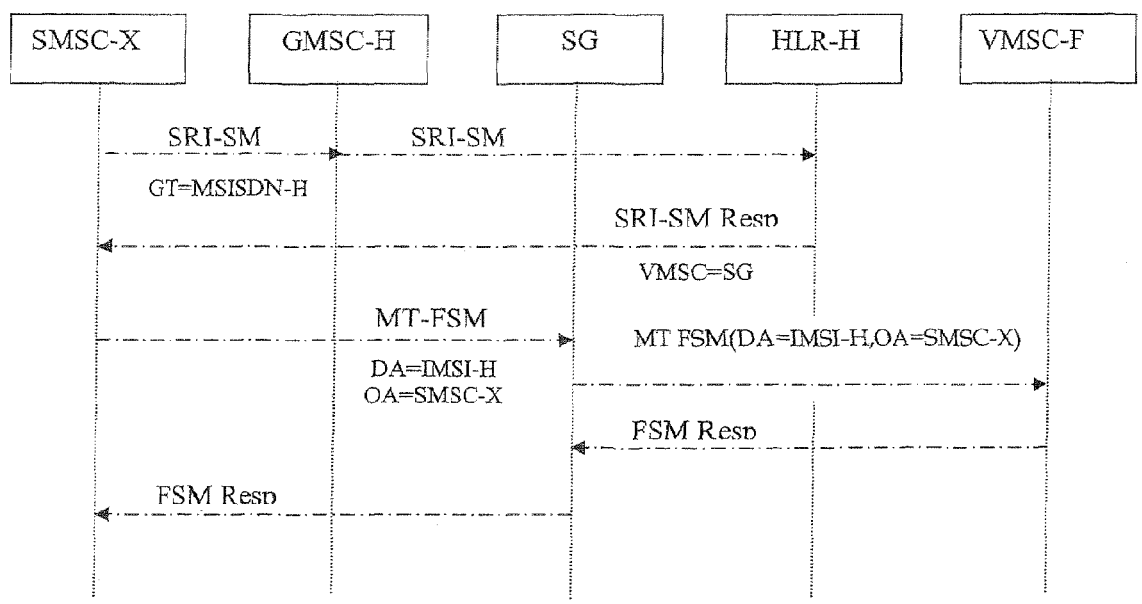
FIG. 50 is a signal flow diagram for a mobile terminated Short Message Service (SMS) message to an MSISDN-H when the subscriber is in an FPMN, under an embodiment.

FIG. 50 is a signal flow diagram for a mobile terminated Short Message Service (SMS) message to an MSISDN-H when the subscriber is in an FPMN, under an embodiment.

The Signal Gateway generates a CDR for this transaction and can be used to apply special charges/discounts. The VMSC-F MT SMS CDR is used for SMS Inter-working settlement. Special rates may be negotiated for the specific HPMN IMSI range for Multiple MSISDN subscriber. An example CDR algorithm is as follows:

```
SMMT CDR
SMMT_CALL_REFERENCE
SMMT_EXCHANGE_ID SG
SMMT_CALLED_IMSI SIMM subscriber IMSI
SMMT_CALLED_IMEI FFFF . . .
SMMT_CALLED_NUMBER NDC|B (MSISDN-H)
SMMT_CALLED_NUMBER_TON 06 (national)
SMMT_CALLED_SUBS_LAC FFFF
SMMT_CALLED_SUBS_CI FFFF
SMMT_SMS_CENTRE SMSC
SMMT_INCOMING_TIME when SG receives a SMS from sc.
SMMT_DELIVERY_TIME when sent an acknowledgement to sc.
SMMT_CAUSE_FOR_TERMINATION 00000000
SMMT_BASIC_SERVICE_TYPE 00 (tele serv.)
SMMT_BASIC_SERVICE_CODE 21 (SMS-MT)
SMMT_CALL_TYPE 00 (incoming)
SMMT_MSC_TYPE 02 (GMSC/SG)
SMMT_CALLING_NUMBER CLI from sm-data
SMMT_CALLING_NUMBER_TON CLI ton
SMMT_CALLING_VMSC_NUMBER VMSC-H
```

-continued

```
SMMT_CALLING_NUMBER_NPI 05 (isdn)
SMMT_CALLED_NUMBER_NPI 05 (isdn)
SMMT_CALLING_VMSC_NUMBER CALLING_SUB_VMSC
SMMT_SMS_TYPE 02 (MT)
SMMT_CALLED_VMSC_NUMBER VMSC-F
```

Figure 51:
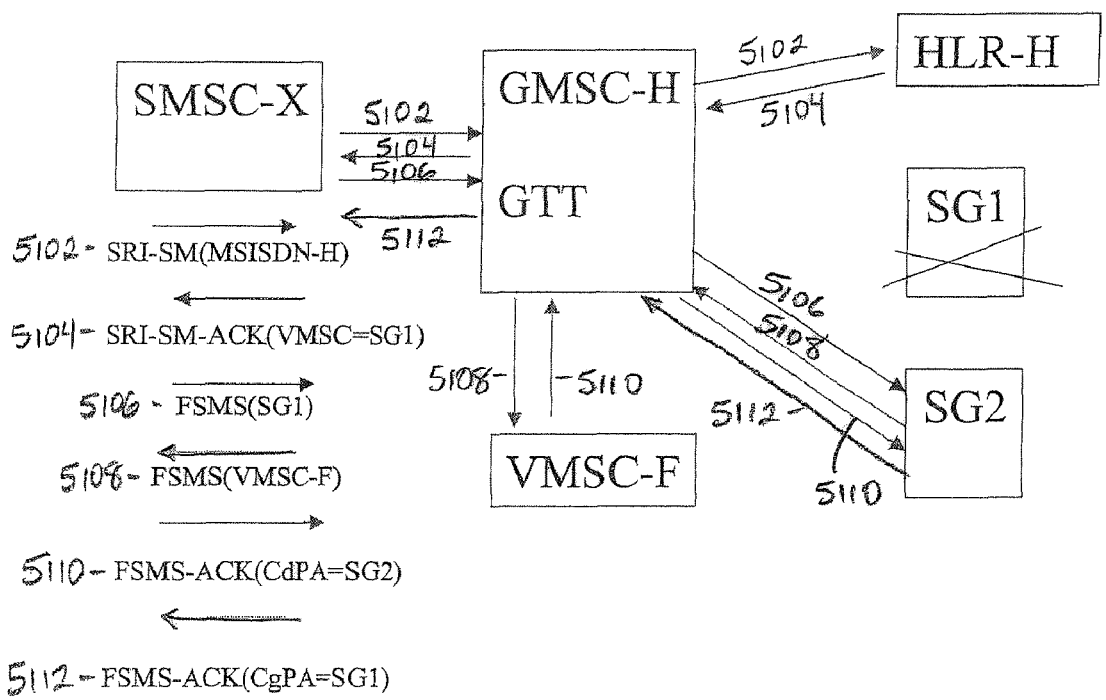
FIG. 51 is a signal flow diagram for a mobile terminated SMS message to an MSISDN-H when the subscriber is in an FPMN and the targeted Signal Gateway (SG) fails, under an embodiment.

Turning to the case where the initially targeted SG fails after SMSC-X is told of it by HLR-H, FIG. 51 is a signal flow diagram for a mobile terminated SMS message to an MSISDN-H when the subscriber is in an FPMN and the targeted Signal Gateway (SG) fails, under an embodiment. When SMSC-X's MAP MT-SMS to SG1 reaches GMSC-H, since SG1 failed, SG2 SPC2 is the backup to SG1. GMSC-H forwards the MT-SMS to SPC2 of SG2. SG2 will relay MT-SMS to VMSC-F whose response is sent back SG2. SG2 then relays the response back to SMSC-X except that the calling GT is that of SG1 since SMSC-X has SG1 as the called GT when MT-SMS is initiated.

Figure 52:
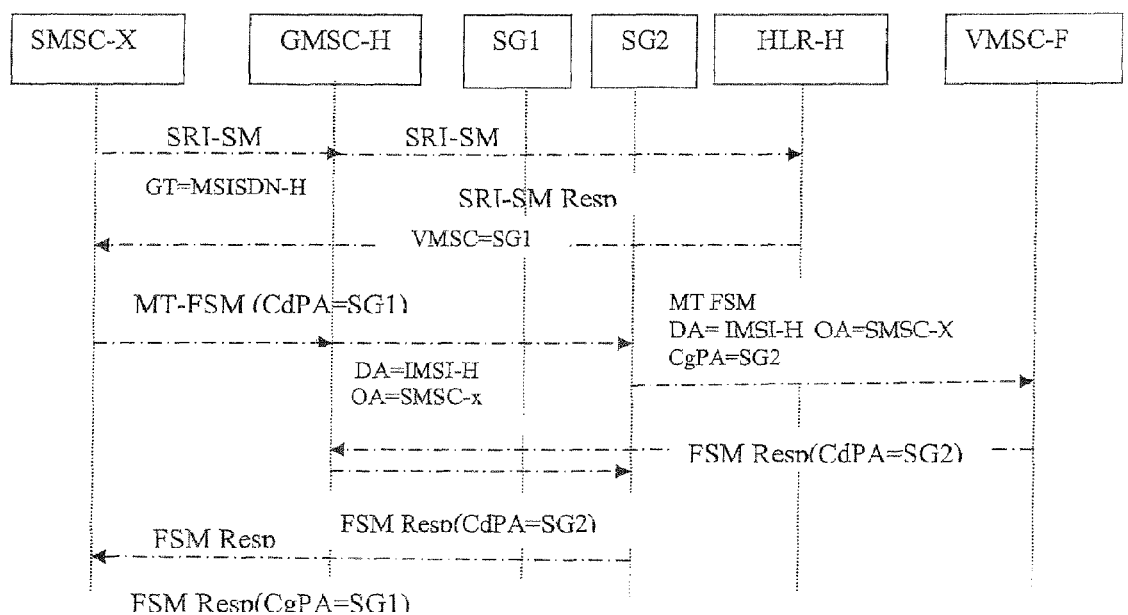
FIG. 52 is another signal flow diagram for a mobile terminated SMS message to an MSISDN-H when the subscriber is in an FPMN and the targeted Signal Gateway (SG) fails, under an embodiment.

Note that this case is supported by partial fail-over since the MAP transaction between HLR-H and SMSC-X involves no on-going transaction with the Signal Gateway function. FIG. 52 is another signal flow diagram for a mobile terminated SMS message to an MSISDN-H when the subscriber is in an FPMN and the targeted Signal Gateway (SG) fails, under an embodiment.

2.14.3. SMS to MSISDN-H when Subscriber in VPMN

Normal GSM operations apply regardless of whether the SMS is sent by SMSC-H, SMSC-F or SMSC-V. VMSC-V MT SMS CDR is used for SMS Inter-working settlements between HPMN and VPMN.

2.14.4. SMS to MSISDN-F when Subscriber in FPMN

Since MSISDN-F is from a specific range of numbers, GMSC-F is configured with GTT to route the CdPA=MSISDN-F SCCP message (e.g. SRI/SRI-SM) towards GMSC-H which then routes the message to the Signal Gateway function. Note that GMSC-F can either route SCCP messages on MSISDN-F towards HPMN side via an ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway.

The Signal Gateway could immediately return itself as the VMSC-F or SGSN-F. However to avoid recovery situation where HLR might have changed the VLR or SGSN address without the Signal Gateway knowing about it and there may be other indicators (e.g. message waiting indicators from MAP-Inform-Service-Center), so relaying the SRI-SM back to HLR-H on MSISDN-H by replacing MSISDN-F will be important.

Note here that regardless of whether the Signal Gateway function passes VMSC/SGSN transparently or not when location update is sent from FPMN, the Signal Gateway function always return itself as the VMSC/SGSN address when the SRI-SM is issued on MSISDN-F rather than the real VMSC/SGSN address. This supports special billing by the Signal Gateway function on MSISDN-F numbers.

Figure 53:
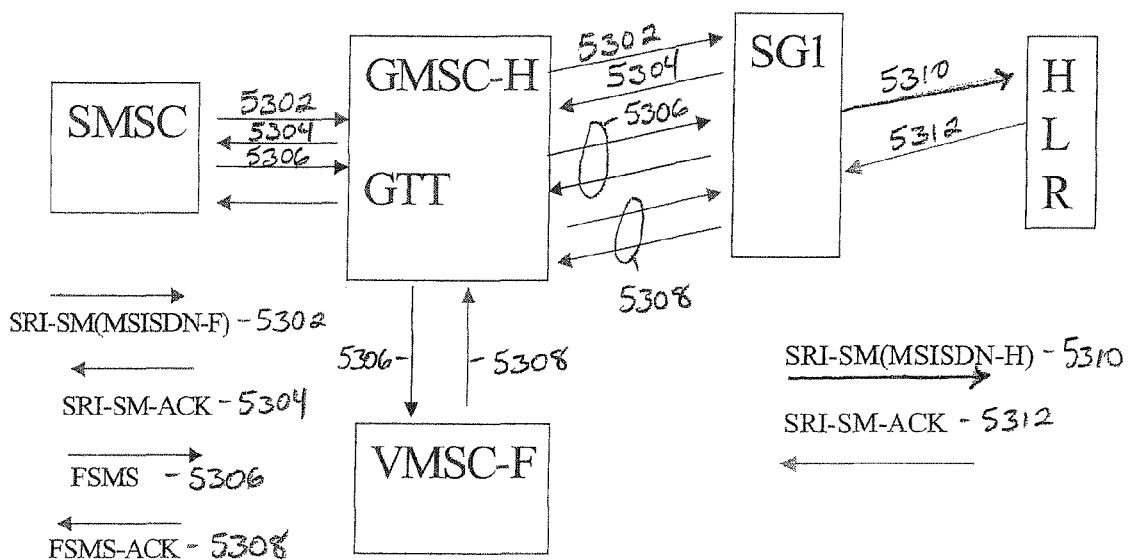
FIG. 53 is a signal flow diagram for a mobile terminated SMS message to an MSISDN-F when the subscriber is in an FPMN, under an embodiment.

FIG. 53 is a signal flow diagram for a mobile terminated SMS message to an MSISDN-F when the subscriber is in an FPMN, under an embodiment. The Signal Gateway first maps the incoming SRI-SM message from SMSC-X to a new transaction of SRI-SM with HLR-H by replacing the MSISDN-F number by MSISDN-H. The transformation is shown in Table 34.

TABLE 34

| SRI-SM from SMSC-X | | SRI-SM from Signal Gateway to HLR-H via GMSC-H | |
|---|---|---|---|
| SCCP Called Address: | | SCCP Called Address: | |
| GT: | MSISDN-F | GT: | HLR-H |
| SSN: | 6 | SSN: | 6 |
| TT: | 0 | TT: | 0 |
| SCCP Calling Address: | | SCCP Calling Address: | |
| GT: | SMSC-X | GT: | SG |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The Ack is transformed as shown in Table 35.

TABLE 35

| SRI-SM Ack from HLR-H to the SG | | Ack from Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| VMSC: | SG/VMSC-F | IMSI: | IMSI-H |
| IMSI: | IMSI-H | VMSC: | SG |

The return VMSC field can be SG itself or any VMSC-F from HLR-H. The SMSC-X issues a FSM message to the Signal Gateway. The message is transformed as shown in Table 36.

TABLE 36

| MT FSM from SMSC-X | | Message from Signal Gateway to VMSC-F via GMSC-H | |
|---|---|---|---|
| SCCP Called Address: | | SCCP Called Address: | |
| GT: | SG | GT: | VMSC-F |
| SSN: | 8 | SSN: | 8 |
| TT: | 0 | TT: | 0 |
| SCCP Calling Address: | | SCCP Calling Address: | |
| GT: | SMSC-X | GT: | SG |
| SSN: | 8 | SSN: | 8 |
| TT: | 0 | TT: | 0 |

No MAP level parameters are changed. Note that the Signal Gateway has a HPMN Global Title so there is no concern whether SM-RP-OA is national or international since the sending SMSC takes care of this case by making the address indicator international as if the subscriber is roaming, irrespective of what subscriber number the sender is sending to.

Since the Signal Gateway also modifies the SCCP Calling Party Address, the confirmation message is also routed back the same way as shown in Table 37.

TABLE 37

| MT FSM Response from VMSC-F | | Message from Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |
| SCCP Calling Address: | | SCCP Calling Address: | |
| GT: | VMSC-F | GT: | SG |
| SSN: | 8 | SSN: | 8 |
| TT: | 0 | TT: | 0 |

Figure 54:
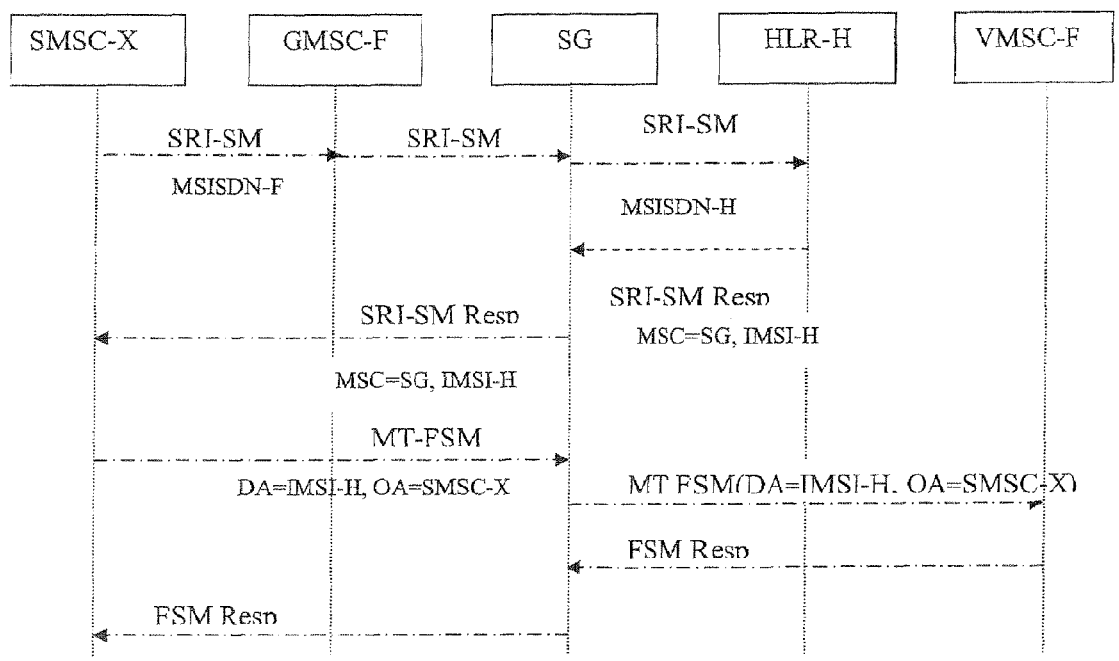
FIG. 54 is another signal flow diagram for a mobile terminated SMS message to an MSISDN-F when the subscriber is in an FPMN, under an embodiment.

FIG. 54 is another signal flow diagram for a mobile terminated SMS message to an MSISDN-F when the subscriber is in an FPMN, under an embodiment.

The Signal Gateway generates a CDR if the message was delivered successfully. This CDR, to which the example algorithm that follows relates, may be used to apply a special discount for SIMM subscribers.

```
SMMT CDR
SMMT_CALL_REFERENCE
SMMT_EXCHANGE_ID SG
SMMT_CALLED_IMSI SIMM subscriber IMSI
SMMT_CALLED_IMEI FFFF . . .
SMMT_CALLED_NUMBER NDC|B (MSISDN-F)
SMMT_CALLED_NUMBER_TON 05 (international)
SMMT_CALLED_SUBS_LAC FFFF
SMMT_CALLED_SUBS_CI FFFF
SMMT_SMS_CENTRE SMSC
SMMT_INCOMING_TIME when SG receives a SMS from sc.
SMMT_DELIVERY_TIME when sent an acknowledgement to sc.
SMMT_CAUSE_FOR_TERMINATION 00000000
SMMT_BASIC_SERVICE_TYPE 00 (tele serv.)
SMMT_BASIC_SERVICE_CODE 21 (SMS-MT)
SMMT_CALL_TYPE 00 (incoming)
SMMT_MSC_TYPE 02 (GMSC/SG)
SMMT_CALLING_NUMBER CLI from sm-data
SMMT_CALLING_NUMBER_TON CLI ton
SMMT_CALLING_VMSC_NUMBER VMSC-X
SMMT_CALLING_NUMBER_NPI 05 (isdn)
SMMT_CALLED_NUMBER_NPI 05 (isdn)
SMMT_CALLING_VMSC_NUMBER CALLING_SUB_VMSC
SMMT_SMS_TYPE 02 (MT)
SMMT_CALLED_VMSC_NUMBER VMSC-F
```

2.14.5. SMS to MSISDN-F when Subscriber in XPMN

Collectively, for the purposes of this scenario, HPMN and VPMN are referred to here as XPMN. Since MSISDN-F is from a specific range of numbers, GMSC-F is configured with GTT to route the SRI-SM request towards GMSC-H which then routes the SRI-SM to the Signal Gateway with SCCP Called Party Address as MSISDN-F. The Signal Gateway transforms the message as shown in Table 38.

TABLE 38

| SRI-SM from SMSC-X | | Message from Signal Gateway to HLR-H via GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | SMSC-X | GT: | SG |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The SRI-SM response is routed back to the Signal Gateway since the SCCP Calling Party Address was modified too. The response is translated as shown in Table 39.

TABLE 39

| SRI-SM Response from HLR | | Message from Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| IMSI: | IMSI-H | IMSI: | IMSI-H |
| MSC: | VMSC-X | MSC: | SG |

The SMSC-X issues a FSM message to the Signal Gateway. The message is transformed as shown in Table 40.

TABLE 40

| MT FSM from SMSC-X | | Message from Signal Gateway to VMSC-X via GMSC-H | |
|---|---|---|---|
| SCCP Called Address: | | SCCP Called Address: | |
| GT: | SG | GT: | VMSC-X |
| SSN: | 8 | SSN: | 8 |
| TT: | 0 | TT: | 0 |
| SCCP Calling Address: | | SCCP Calling Address: | |
| GT: | SMSC-X | GT: | SG |
| SSN: | 8 | SSN: | 8 |
| TT: | 0 | TT: | 0 |

No MAP level parameters are changed. Since the Signal Gateway also modifies the SCCP Calling Party Address, the confirmation message is also routed back the same way as shown in Table 41.

TABLE 41

| MT FSM Response from VMSC-X | | Message from Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |
| SCCP Calling Address: | | SCCP Calling Address: | |
| GT: | VMSC-X | GT: | SG |
| SSN: | 8 | SSN: | 8 |
| TT: | 0 | TT: | 0 |

Figure 55:
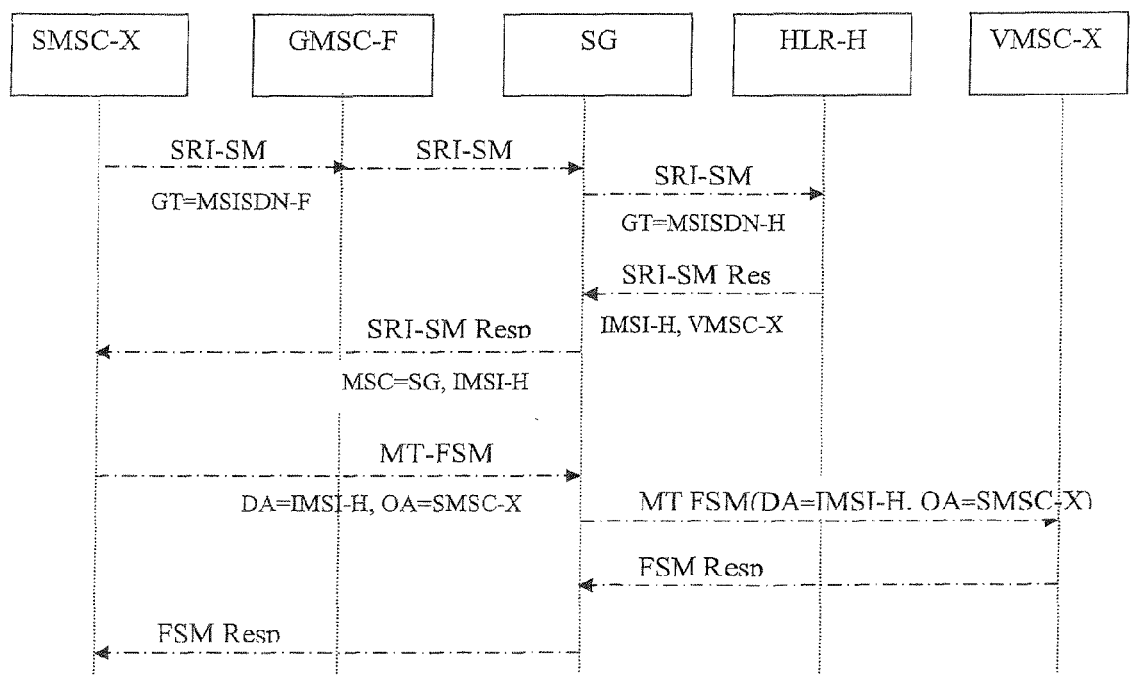
FIG. 55 is a signal flow diagram for a mobile terminated SMS message to an MSISDN-F when the subscriber is in an VPMN, under an embodiment.

FIG. 55 is a signal flow diagram for a mobile terminated SMS message to an MSISDN-F when the subscriber is in an VPMN, under an embodiment.

The Signal Gateway generates a CDR if the message was delivered successfully. This CDR, to which the example algorithm that follows relates, may be used to apply a special discount for SIMM subscribers.

```
SMMT CDR
SMMT_CALL_REFERENCE
SMMT_EXCHANGE_ID SG
SMMT_CALLED_IMSI SIMM subscriber IMSI
SMMT_CALLED_IMEI FFFF . . .
SMMT_CALLED_NUMBER NDC|B (MSISDN-F)
SMMT_CALLED_NUMBER_TON 05 (international)
SMMT_CALLED_SUBS_LAC FFFF
SMMT_CALLED_SUBS_CI FFFF
SMMT_SMS_CENTRE SMSC
SMMT_INCOMING_TIME when SG receives a SMS from sc.
SMMT_DELIVERY_TIME when sent an acknowledgement to sc.
SMMT_CAUSE_FOR_TERMINATION 00000000
SMMT_BASIC_SERVICE_TYPE 00 (tele serv.)
SMMT_BASIC_SERVICE_CODE 21 (SMS-MT)
SMMT_CALL_TYPE 00 (incoming)
SMMT_MSC_TYPE 02 (GMSC/SG)
SMMT_CALLING_NUMBER CLI from sm-data
SMMT_CALLING_NUMBER_TON CLI ton
SMMT_CALLING_VMSC_NUMBER VMSC-X1
SMMT_CALLING_NUMBER_NPI 05 (isdn)
SMMT_CALLED_NUMBER_NPI 05 (isdn)
SMMT_CALLING_VMSC_NUMBER CALLING_SUB_VMSC
SMMT_SMS_TYPE 02 (MT)
SMMT_CALLED_VMSC_NUMBER VMSC-X2
```

2.15. Mobile Originated SMS

For all practical purposes, it is assumed that the SIMM subscriber uses one of the HPMN SMSC for sending mobile originated SMS messages. However SMSC-S-H is a special HPMN SMSC address to be used as a SMSC address in the SIM of SIMM subscribers. In the Insert Subscriber Data message routed from HPMN to a FPMN where MSISDN-H was changed to MSISDN-F, all SMS messages originating from such a FPMN will have MSISDN-F as the sender address.

Unlike MO-calls, MO-SMS is always going thru the Signal Gateway. As a result, the Signal Gateway is capable of changing the caller ID based on the destination number of the message irrespective of the network (FPMN or HPMN or VPMN) the subscriber registered on. If the destination number is from a FPMN country, then the caller ID can be changed to the subscriber's FPMN number unless it is set not to be automatically changed by the Signal Gateway via the USSD command **123*2#. Conversely, if the destination is HPMN or VPMN, then the caller ID can be changed to MSISDN-H.

For example, when the SIMM subscriber registered with FPMN sends a SMS to a non-FPMN country number, the sender's address should be changed to MSISDN-H unless the subscriber sets the option otherwise. When FPMN is registered, SMSC-S-H is used instead of SMSC-H for a normal subscriber. The SMSC-S-H is a GT that HPMN GMSC-H/GTT translates to a Signal Gateway. When a FPMN registered SIMM subscriber sends a MO-SMS to SMSC-S-H. The MO-SMS reaches the Signal Gateway. The Signal Gateway then relays it to the real SMSC-H after converting MSISDN-F to MSISDN-H and others.

Figure 56:
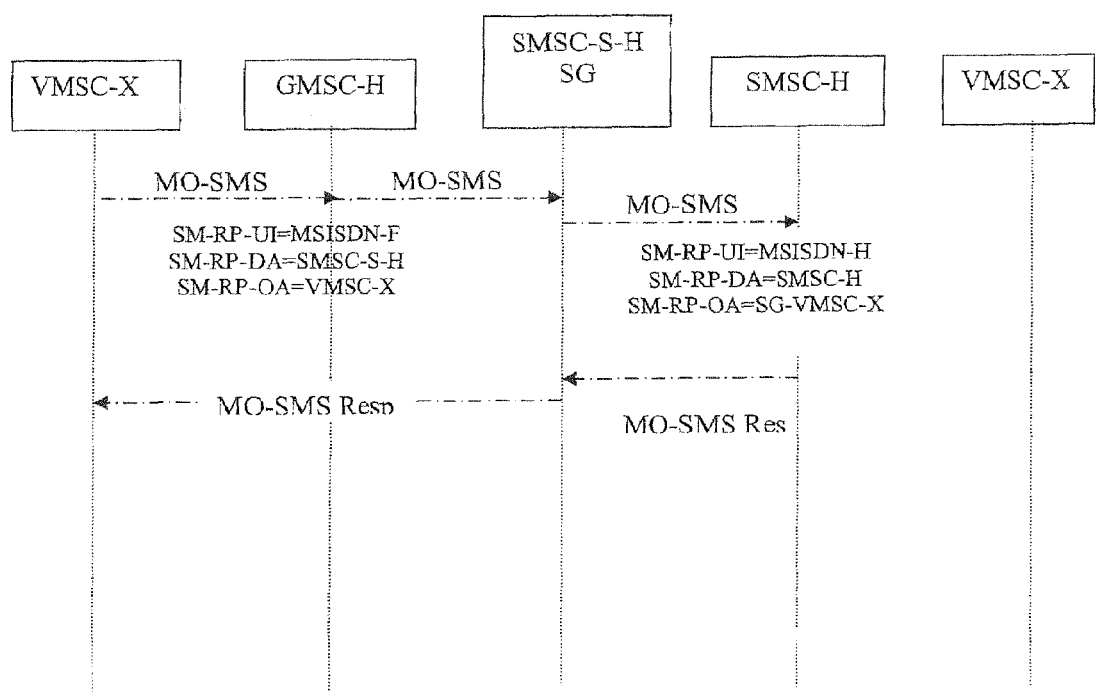
FIG. 56 is a signal flow diagram for a mobile originated SMS message, under an embodiment.

FIG. 56 is a signal flow diagram for a mobile originated SMS message, under an embodiment.

2.16. SMS Re-Delivery Management

In the case of an SMS sent to the MSISDN-H number by a SMSC-X, because the Signal Gateway always forward SMS delivery status back to the SMSC-X, SMSC-X will only need to inform HLR-H for delivery report (e.g., to set message waiting data). Subsequent interactions regarding Alert Service Center and Inform Service Center are between the HLR-H and the SMSC-X directly. The Signal Gateway function will not be involved.

Ready-For-SMS map message on IMSHI-H for a SIMM subscriber is handled transparently by the Signal Gateway function.

However because the Signal Gateway functions like a virtual HLR to the MSISDN-F number of a SIMM subscriber, when SRI-SM was sent on CdPA=MSISDN-F, the Signal Gateway function is the responding entity or HLR to the SMSC-X. This means that delivery report status due to failure will be sent by the SMSC-X to the Signal Gateway. Subsequent interactions regarding Alert-Service-Center and Inform-Service-Center will also be between the SMSC-X and the Signal Gateway.

The Signal Gateway first maps the incoming ReportSM Delivery message from SMSC-X to a new transaction of ReportSM with HLR-H by replacing the MSISDN-F number by MSISDN-H. The transformation is as shown in Table 42.

TABLE 42

| ReportSM from SMSC-X | | ReportSM from Signal Gateway to HLR-H via GMSC-H | |
|---|---|---|---|
| SCCP Called Address: | | SCCP Called Address: | |
| GT: | MSISDN-F | GT: | HLR-H |
| SSN: | 6 | SSN: | 6 |
| TT: | 0 | TT: | 0 |
| SCCP Calling Address: | | SCCP Calling Address: | |
| GT: | SMSC-X | GT: | SG |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The Ack is transformed as shown in Table 43.

TABLE 43

| ReportSM Ack from HLR-H to the SG | | Ack from Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| MSISDN-alert: | MSISDN-H | MSISDN-alert: | MSISDN-H |

Figure 57:
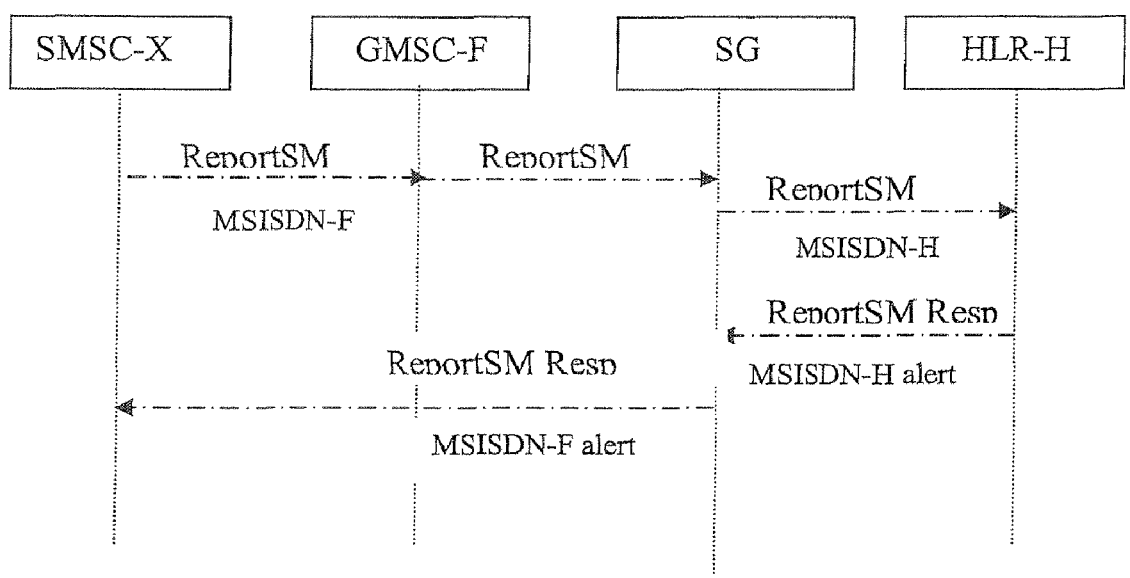
FIG. 57 is a signal flow diagram for SMS message re-delivery management, under an embodiment.

FIG. 57 is a signal flow diagram for SMS message re-delivery management, under an embodiment.

To the HLR-H in this case, the Signal Gateway that sent the ReportSM-Delivery will be the SMSC-X to send Alert-Service-Center when ready-for-SM is received. Similar actions for Inform-Service-Center will also be performed when SRI-SM is issued from the Signal Gateway to the HLR-H, as shown in Table 44.

TABLE 44

| AlertSC from HLR-H | | AlertSC from the Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| MSISDNAlert: | MSISDN-H | MSISDNAlert: | MSISDN-F |

Figure 58:
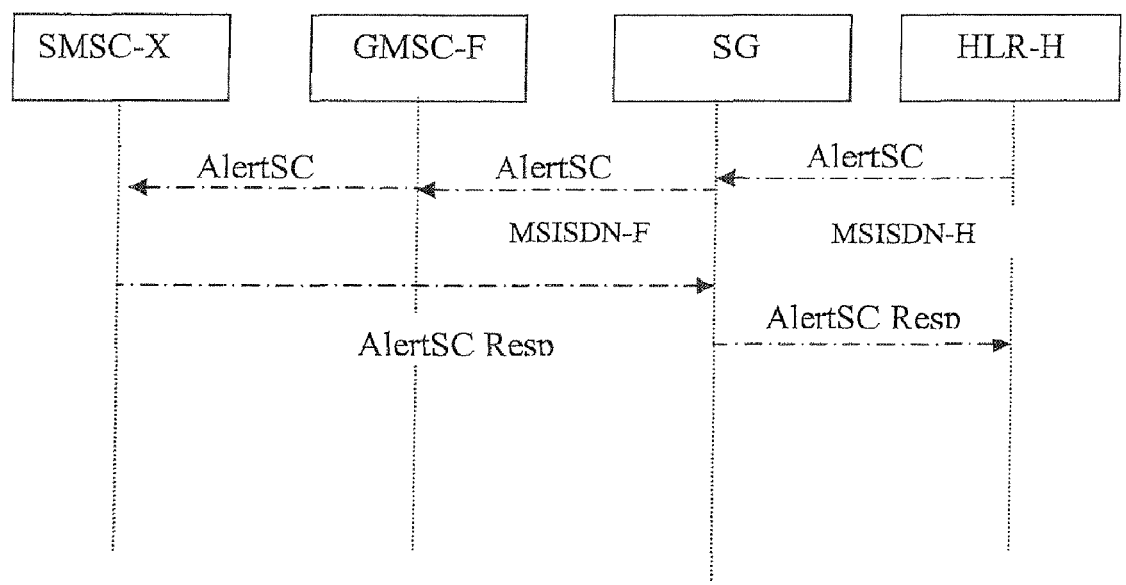
FIG. 58 is another signal flow diagram for SMS message re-delivery management, under an embodiment.

FIG. 58 is another signal flow diagram for SMS message re-delivery management, under an embodiment.

3. SIMM Roaming Variations

The SIMM service for roaming is a subscription-based service that provides a local number at each partner network for a subscriber, but is not so limited. The local number can be assigned to a subscriber permanently or temporarily depending upon operator requirements. The SIMM service for roaming is generally applied by an HPMN operator for (international and national) outbound roamers at partner Foreign PMN (FPMN) networks involving some logistical arrangements at FPMNs. However the SIMM solution for roaming can also be applied to (national or international) inbound roamers without involving any HPMN logistics. In particular, it can be deployed for a Mobile Virtual Network Operator (MVNO).

So far, the document has primarily focused on SIMM roaming for international roaming and for outbound roamers for permanent local numbers has been described above. Before continuing, in this section, adaptations of the SIMM roaming solution are described that provide temporary local numbers, national roaming and inbound roaming, and MVNO.

3.1. Temporary MSISDN-F

Instead of assigning a permanent MSISDN-F of a FPMN when the SIMM subscriber is roaming on the FPMN network, the Signal Gateway can assign a temporary MSISDN-F based on operator requirements. The operator can even choose to provide a permanent MSISDN-F for some subscribers (e.g., high end customers such as frequent business travelers) and a temporary MSISDN-F for other subscribers (e.g., low end customers such as occasional visitors who would otherwise buy a local prepaid). The operator can in particular offer cheaper subscription fees or even duration-based rental fees for subscribers who just want a temporary MSISDN-F.

From a signaling and logistics perspective, temporary or permanent MSISDN-F makes no difference. However to accommodate the temporary MSISDN-F, the Signal Gateway maintains a pool of MSISDN-F intended for temporary use. When a SIMM subscriber is roaming at an FPMN, the Signal Gateway first checks if the subscriber has already an assigned MSISDN-F (permanent or temporary), if not the Signal Gateway will select a MSISDN-F from the pool to assign to the SIMM subscriber at FPMN.

To track the temporary MSISDN-F assignment to facilitate the recycle of assigned temporary MSISDN-F back to the pool of free MSISDN-F, the Signal Gateway of an embodiment also maintains a database of records on assigned temporary MSISDN-F that contains MSISDN-H of the assignment, the time of the assignment and the last time of its reference (e.g. registration, call or SMS).

Depending on operator requirements, the duration of temporary MSISDN-F can be a fixed duration (e.g., 1 week) for each entire use or a fixed duration (e.g., 3 days) after the last time of its reference. Since the SIMM roamer often gives out his/her temporary MSISDN-F at FPMN country/region, it is also possible for the roamer to extend the duration via a SMS or USSD command just in case a caller from FPMN country/region calls that number a while after he left the country/region. The operator can charge the extension on a per day extension basis.

3.2. National Outbound Roaming

Although the description herein provides details on international outbound roaming, the SIMM solution is equally applicable to national roaming. This is usually applied to large countries such as India and China where national roaming costs are significant compared to the tariffs of local calls. For example, China Mobile consists of many provisional operators. A GuangDong Mobile (GMCC) SIMM subscriber who goes to Beijing can obtain a Beijing Mobile (BMCC) local number.

Although China Mobile, for example, provides optimal routing already within their own network and the tariff of mobile originated call when roaming is close to that of a mobile originated call made at home, a local number at a region/province for a nationally outbound roamer is still useful for receiving calls outside the China Mobile network which is not optimally routed. For example, when the GMCC roamer goes to Beijing and obtains a BMCC local number, if the Beijing caller is from a fixed line phone or a China Unicorn customer, then the call will be routed to GuangDong first and then re-routed back to Beijing, costing caller a long distance call and the roamer a long distance rerouted call. In India, there is also significant tariff difference between MO-call when roaming and MO-call made at home.

From a signaling and logistics perspective, international outbound roaming and national outbound roaming are equivalents. However since national roaming is within the same country, there will not be any signaling protocol conversions or ISC involved. This will also simplify the logistics of treating the Signal Gateway as the virtual HLR of those FPMN MSISDN-Fs as MAP signaling on MSISDN-F (SRI, SRI-SM, etc.) can just follow a normal SCCP GTT on DPC rather than on a special leased line or on global title modification in order to cross international boundary via an ISC operator.

3.3. Inbound Roaming

SIMM roaming for inbound roaming is another variation that does not involve HPMN logistics. Examples are provided in national roaming and in international roaming to illustrate the application of SIMM roaming.

3.3.1. National Inbound Roaming

As an example, an inbound roamer of GMCC registers with China Unicom at Beijing. Generally, a GMCC subscriber cannot register with China Unicom; however in this case, China Unicom accepts the GMCC registration and sends messages on CdPA=MGT-of-GMCC thru the Signal Gateway. The Signal Gateway determines if the GMCC IMSI is a subscriber of the temporary local number service. If it is not, registration will be rejected. If it is, the registration message will be relayed to the GMCC except that the calling GT aid VLR and VMSC will be modified to a Signal Gateway GT. Conversely, the HLR from GMCC will also be modified to a Signal Gateway GT and a temporary local number of China Unicom will be replacing the GMCC MSISDN-H of the subscriber.

The Signal Gateway will be located in an SS7-based network so that the GMCC network sees the subscriber as roaming into an acceptable operator, e.g., a MVNO operator that has its own MCC/MNC or CC/NDC. There are few if any differences in normal SIMM signaling.

Again the temporary local number can be permanent based on operator (e.g. the MVNO operator) and SIMM subscriber requirements. The subscriber can change its caller ID at any time via USSD. The MVNO operator can also choose to change caller ID automatically via an IN interface at China Unicom if this is supported as indicated in the IN general interface section mentioned before.

The MVNO can sell the temporary/permanent local number services directly to the GMCC subscribers (more accurately to the enterprises employees) without requesting them to change their SIMs and GMCC subscription. The MVNO can charge the subscribers on a monthly fee or a rental fee per day (e.g. 1 chinese dollar per day) for free incoming calls. China Unicom does not charge the GMCC subscribers of the service. Instead, it charges the MVNO operator. The MVNO operator can arrange to have bulk or whole sale relationship with China Unicom while it makes it margin thru the retailing relationship with enterprise customers.

3.3.2. International Inbound Roaming

As an example, an international inbound roamer comes to Macau. When first registered with Smartone Macau, he will receive a welcome SMS indicating that he could get a temporary local number for a fee of five dollar per day for free incoming calls from Macau provided he is registered at Smartone Macau at the time of the incoming calls. He can call Smartone Macau customer care number to turn this on or use the ##Send service of an embodiment to activate the assignment of a temporary local number which will be sent to his phone as a SMS message.

Once the temporary local number is activated, the Signal Gateway will issue an InsertSubscriberData to the Smartone Macau VLR location of the subscriber. To make it possible, an inbound roamers registration is directed thru the Signal Gateway in the first place. The signaling and call flows will be similar to SIMM roaming for international outbound roaming except that the Signal Gateway in this case is located at a VPMN.

When the registration message UpdateLoc is routed thru the Signal Gateway, the Signal Gateway relays the message by modifying the calling GT but not the VLR to a Signal Gateway GT corresponding to the VLR while the VMSC address and the called party address remain the same. On receiving InsertSubData from HLR, the Signal Gateway again modifies the calling GT to be the Signal Gateway GT that correspond to the HLR. The Signal Gateway however does not modify the real HLR in UpdateLoc Ack so the VLR has the real HLR. Signal gateway also remembers the real HLR, VLR, VMSC involved in the transaction. The roamers can also change caller ID via USSD like standard SIMM solution except that in this case, USSD has to be VPMN service code since the Signal Gateway is located at VPMN. If USSD is not possible, the ##SEND service of an embodiment can be deployed.

To avoid all signaling on CdPA=MGT going thru the Signal Gateway for inbound roamers, the MGT range can be limited to certain networks or certain countries. The SIMM Signal Gateway can also be integrated with the SRS platform of an embodiment which is used to extend virtual roaming relationships for an operator such as Smartone Macau. In this example, all signaling relating to inbound roamers from operators that do not have direct roaming relationships with Smartone Macau are routed thru the SRS gateway which then represents the VPMN network as that of Smartone HK which has the roaming relationships.

Smartone Macau currently has deployed the SRS using Smartone HK as the sponsoring operator for roaming relationships. Smartone Macau can further extend the service to encourage the inbound roamers (from operators that do not have a direct roaming relationships with Smartone Macau) to register with its network by offering a temporary local number service for these inbound roamers. In this way, when they make local calls (including those to HK), their caller ID will be the temporary Macau numbers. When they receive calls on the temporary Macau numbers from any operator (including fixed line) or from HK, it will be a cheap call rather than an internationally re-routed call. Note that the temporary local number call is slightly different from optimal routing offered by an embodiment. The temporary local number call applies across operators and countries. For example, the HK call to a Macau number is cheaper for the inbound roamer from England and the caller from HK.

Finally, if caller ID is not important for the inbound roamer who requests a temporary local number, there is a more simplified solution. In this solution, normal registration of the roamer will apply with no involvement of a Signal Gateway. However roamers registration transactions are monitored on the roaming links. A temporary number is assigned on demand and maintained within the roamer DB of the subscriber. When the roamer makes a call or sends an SMS, there is no difference in signal flow. However when the roamer receives a call on the temporary number, the Signal Gateway is viewed as the HLR of these temporary numbers. The Signal Gateway then issues a PRN request to the real VLR of the subscriber from the roamer DB. When the roamer receives SRI-SM query on the temporary number, the query is sent to the Signal Gateway which returns the real VMSC from the roamer DB of the subscriber.

3.4. SIMM for MVNO

In the national roaming for inbound roaming example, the use of a MVNO that has its own MCC/MNC or CC/NDC has been described. The MVNO can also be used in international roaming.

For example, today a Taiwanese operator (e.g., TCC) is not allowed to sell its MSISDNs to China Mobile for the China Mobile outbound roamers registering on the operator due to regulatory restrictions in Taiwan. To avoid this problem, a MVNO can be introduced. The Taiwanese operator simply sells its MSISDN-F to the MVNO operator. When the SIMM subscriber from China Mobile is registering with TCC, TCC can route message on CdPA=MGT-ChinaMobile-special-range thru the Signal Gateway located in the MVNO.

The MVNO can relay the message to China Mobile by modifying the calling GT and VLR/VMSC to be a Signal Gateway GT (from the MVNO operator) without changing the Called GT. The Signal Gateway will modify MSISDN-H (China Mobile) into MSISDN-F (TCC MSISDN) accordingly. The number could be permanent or temporary. Normal SIMM signaling and call flows apply.

4. SIMM Roaming Variation Using any FPMN Number

The SIMM Service/System describer herein uses an FPMN number that is in a special range defined by the FPMN. The reason for the FPMN number in a particular range is because there is no profile or IMSI associated with these numbers at the FPMN. The SIMM Signal Gateway is the HLR for these specially ranged FPMN numbers. All call-related and non-call related signaling messages on these FPMN numbers go through the Signal Gateway. As a result, no HLR entry in the FPMN is required and a single profile is defined by HPMN for any number of FPMNs. However, this means that the SIMM Service can not use existing FPMN numbers or just any FPMN number.

A variation of SIMM roaming described below, however, supports SIMM Service using any FPMN number including any existing FPMN numbers assigned to the subscriber. This variation uses an FPMN profile for the subscriber at the FPMN in addition to the subscriber's HPMN profile. Consequently, this variation allows for the use of any FPMN number without the need for special signaling on the FPMN number to the HPMN network. Alternative embodiments may use a hybrid in which one FPMN makes use of any FPMN number approach under the variation while another FPMN uses FPMN numbers in the specified range, as described herein.

The variation of SIMM roaming that supports SIMM Service using any FPMN number is implemented under partnership and non-partnership embodiments as described below. Under the partnership embodiment, for example, each FPMN provides a maximum profile or at least the profile of the HPMN. The subscriber does not have a FPMN SIM and hence does not know the IMSI and Ki associated with the IMSI. Special billing relationships are in place for the subscriber at FPMN networks. Special routing arrangements over leased line are also in place for rerouted calls to cut down rerouting cost for the subscribers. The subscriber receives a single bill from the HPMN only for the services.

Turning to the non-partnership embodiment, generally, the subscriber already has an FPMN number but the subscriber may get a new FPMN number. There will be a bill from the HPMN, and each FPMN operator with which the subscriber has an FPMN number. There are no special billing relationship and no prearranged leased lines to cut down rerouting cost. When the subscriber is in an FPMN network, despite having a local number, the FPMN still treats him/her as a roamer and charges accordingly. The HPMN either passes this cost to the subscriber or absorbs the cost (of the difference between roaming and local) so the subscriber still feels like he/she is at home when in the FPMN network. Since the subscriber also has an FPMN SIM, he/she can put the SIM in the handset when in the FPMN where billing is done locally. However in this case, the subscriber will not be able to receive calls and SMS messages from the HPMN and his/her other FPMN numbers. Under both the partnership and non-partnership embodiments where the HPMN SIM is used, the subscriber will be able to receive calls, SMS on any HPMN or FPMN number.

The SIMM roaming variation for any FPMN number of an embodiment supports use of different profiles in the HPMN/FPMN. For example, one profile is GPRS allowed, incoming calls when roaming allowed, while another profile is GPRS allowed, incoming calls when roaming not allowed. Another example includes the case where one profile is Camel and the other is something other than Camel. Under the partnership embodiment, the different profiles can be synchronized logistically, while the non-partnership embodiment requires the subscriber to ensure profiles are synchronized in order to provide seamless service in the different partner networks. For example, under the first example above, without synchronization the subscriber having an FPMN profile that does not allow incoming calls when roaming will not be able to receive calls when in the HPMN.

When operating under the variation of SIMM roaming that supports SIMM Service using any FPMN number and registering at a network (for example XPMN) with HPMN SIM, since the HPMN IMSI is in a special range, the signaling is via the Signal Gateway. The signal gateway relays the signal to the real HPMN HLR. At each successful registration, the signal gateway also issues a registration to each FPMN with which the subscriber has an FPMN number. The signal gateway appears as a VLR or SGSN to these FPMN HLRs. Unlike the special range approach, even for local signaling, it will be fully relayed thru the Signal Gateway in both directions, not just one direction. While the HPMN profile is sent to the VLR, the FPMN profile is not. For example, if the FPMN profile does not allow outbound calls when roaming or roaming restricted or roaming not allowed, it will not affect the VLR profile at HPMN. So MMS, GPRS, and Camel will adhere to the HPMN IMSI profile.

Regarding MO-calls/MO-SMS, when the subscriber is in the HPMN, MO-calls/MO-SMS are billed as normal HPMN subscribers. When the subscriber is in the FPMN, depending on the operator-subscriber arrangement and whether operations are under the partnership or non-partnership embodiment, roaming charges or local airtime charges may or may not apply. Also depending on destination number, caller ID can be modified to one of the subscriber's numbers.

Regarding MT-calls, when the subscriber is in the HPMN/VPMN, calls on the MSISDN-H follow the normal signal flow. Calls on the MSISDN-F involve the HLR-F issuing PRN to the Signal Gateway and the Signal Gateway retrieves the MSRN from the real VLR and returns the MSRN or a variation back to the HLR-F. One possible alternative is that, under the partnership embodiment, special rerouting and billing can be controlled. Also if the VPMN is in the same country as FPMN, then optimal routing might be allowed.

Further, when the subscriber is in the FPMN, MT-calls on MSISDN-H are rerouted from HPMN to FPMN. The PRN from HLR-F comes to the signal gateway which in turn sends it to VLR-F. Again the MSRN returned can vary depending on the partnership embodiment where special rerouting or billing can be applied. Calls on MSISDN-F are then optimally routed. The PRN query from HLR-F comes to the Signal Gateway which in turn sends it to VLR-F. The MSRN returned is sent directly back to HLR-F.

Regarding MT-SMS, when the subscriber is in the HPMN, SMS on MSISDN-H are in accordance with the normal signal flow. SMS on MSISDN-F is relayed thru the Signal Gateway where at least one of spam filtering can be applied, SMS interworking can be charged, and SMS delivery can be managed from an HPMN perspective.

When in the FPMN, MT-SMS on MSISDN-H will be again relayed thru the Signal Gateway to the VMSC-F. SMS on MSISDN-F will be also be relayed thru the Signal Gateway first before being sent to the VMSC-F.

5. Miscellaneous Interfaces 5.1. Number Portability Considerations

The number portability domain considered is within a country. Subscribers who port a SIMM service number to another operator will no longer have access to this service. Their IMSI and all MSISDN-H to MSISDN-F mappings are deleted from the Signal Gateway. Other operations like removing the subscriber from the HLR and adding entries to Number Portability database are performed independent of the Signal Gateway. Since the ported-out MSISDN will now be associated with the IMSI of another operator, the MGT-based routing is not received at HPMN. However, the HPMN GMSC still performs Number Portability lookup and routing of calls to the PMN currently serving the ported-out MSISDN.

Subscribers are allowed to port-in their existing numbers from other operators in the country of the HPMN. This is the case where frequent roamers from other networks decide to churn in order to have this service available. Normal operations like adding a new subscriber (by assigning a SIM with IMSI in the SIMM range) in the HLR and associating the ported-in number, and adding the ported-in number to the Number Portability database, etc., are outside the scope of the Signal Gateway. Through the Signal Gateway provisioning interface, this IMSI is mapped to MSISDN-H and MSISDN-F at the Signal Gateway subscriber DB.

For signaling messages (Update Location, for example) routed on MGT for this subscriber, since the IMSI belongs to HPMN, the messages will get routed to HPMN. The ported-in MSISDN-H will be returned in the Insert Subscriber Data message and substituted with MSISDN-F when the subscriber is roaming in an FPMN. The HPMN GMSC handles signaling messages routed on the MSISDN-H (when not routed via the Signal Gateway). For signaling messages routed on the MSISDN-F, there are several options available including, but not limited to: the Signal Gateway routes the messages directly to the HLR by mapping the MSISDN-F to MSISDN-H and looking up corresponding IMSI range mapping to HLR (recommended); the Signal Gateway maps MSISDN-F to MSISDN-H and routes the message via the HPMN GMSC/STP (the GMSC/STP is responsible for looking up the Number Portability database and forwarding the signaling message) (also recommended); and the Signal Gateway maps MSISDN-F to MSISDN-H, interfaces to the Number Portability database, retrieves the routing number and sends it to GMSC/STP for further routing (his approach uses an interface to the Number Portability Database, but is not so limited).

If the MSISDN-F is ported out, FPMN GMSC is responsible for handling the signaling in the typical way for a ported out number (e.g., does not route messages on CdPA=ported-out-MSISDN-F towards GMSC-H and the Signal Gateway function) and hence these messages will never reach the Signal Gateway. If a number in FPMN is ported-in and needs to be part of the SIMM service, then the FPMN GMSC configures to route the signaling messages for this MSISDN to the Signal Gateway. This is similar to the case where FPMN ports one number from a HLR to another HLR. The Signal Gateway is the port-in HLR in this case. The Signal Gateway simply adds the ported in number to its subscriber DB.

5.2. Location-Based Services

Location-based services include SMLC and GMLC. The SMLC is like a VLR in that it determines the positioning method and determines the position of a MS based on MS's measurements of LMUs. These location measurement units are to the SMLC like a VMSC is to the VLR. The GMLC provides a location interface for LCS (location service) clients to request location information about a targeted MS.

SRI-LCS is a MAP message between GMLC and HLR that operates on IMSI and MSISDN to locate the VMSC to request location information of a MS. If the message is on MSISDN-H, it has nothing do with the Signal Gateway function except returning SG as VMSC if the SIMM subscriber is registered on FPMN. However if the message is on MSISDN-F, then the Signal Gateway maps the message by replacing MSISDN-F by MSISDN-H when relaying the message to HLR-H. It also returns the Signal Gateway itself to the GMLC.

Provide Subscriber Location (PSL) is a MAP message between GMLC and VMSC to request location information of a target MS that operates on IMSI and MSISDN. When the SIMM subscriber is registered in FPMN, the VMSC to GMLC is the Signal Gateway itself. Thus in this case, if the message is on MSISDN-H, the Signal gateway will map the message by replacing MSISDN-H by MSISDN-F and impersonating the GMLC to the real VMSC; if the message is on MSISDN-F, the Signal Gateway will simply relay the message to the real VMSC.

The SRI-LCS and PSL are analogous to SRI and PRN for call services. However there is no analogy for SLR service which arises when a request for location is either implicitly administered or made at some earlier time by PSL. For Subscriber Location Report service between VMSC and GMLC which also operates on MSISDN and IMSI, special handling is used when the subscriber registers at FPMN. In this case, when message is sent to the Signal Gateway by VMSC-F on MSISDN-F, the Signal Gateway replaces the MSISDN-F by MSISDN-H before relaying on to the original requesting GMLC if the original requesting GMLC is asking location information on MSISDN-H; the MSISDN-F is not replaced if the original requesting GMLC is asking location information on the MSISDN-F.

5.3. Multiple HPMN Support in a Central Location

Figure 59:
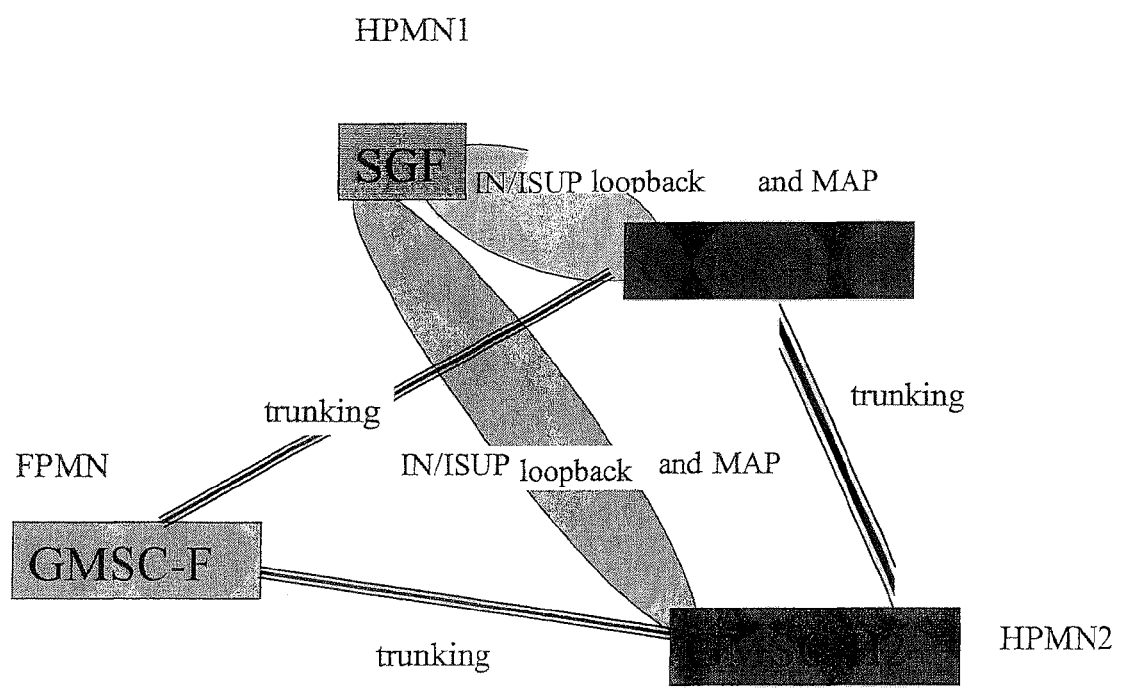
FIG. 59 is a signal flow diagram for multiple HPMN support, under an embodiment.

The Signal Gateway function of an embodiment supports multiple HPMNs in addition to multiple FPMNs. The platform is hosted or managed in one HPMN or by a third party service provider although different HPMNs will have their secure access to provision for their own subscribers and to examine and process their own CDRs. The platform will access the SS7 networks of each HPMN. Where there are signal protocol variants, special signaling conversion over leased lines is performed. Further more, GTT configuration between the hosting network and the targeting network is performed to pass messages routed on CdPA=MSISDN-F/MSISDN-H. FIG. 59 is a signal flow diagram for multiple HPMN support, under an embodiment.

Voice trunk calls can occur directly between the FPMN and HPMN, but are not so limited. The ISUP loopback or IN signaling are performed via a common platform hosted in one HPMN or by a third party service provider.

A centrally hosted Signal Gateway for several HPMN operators means that only one operator or party need be responsible for the management and logistics of the Signal Gateway. In addition, hardware costs are shared among the HPMN operators.

5.4. Signal Gateway Recovery Procedure

When a SIMM subscriber registers at FPMN, the Signal Gateway maintains the information on the true VMSC-F and VLR-F in which the roamer is currently located. Additional dynamic information that needs to be maintained is between original FTN and the temporary, substituted FTN sent to the VLR-F in Insert Subscriber Data message. The data is maintained in memory; and also stored on DB of mirrored disks. It is also periodically backed-up into a non-volatile storage.

Since the Signal gateway is a virtual VLR and a virtual HLR, all information maintained at the Signal Gateway is transitional and can be established by interactions with VLR-F and HLR-H. There will be no indicators about the status of real VLR stored in the Signal Gateway. The Signal Gateway will just map whatever incoming messages to the real destinations. Also, since the HLR information is obtained upon a location update at FPMN by the Signal Gateway function, VLR restoration procedure at the Signal Gateway is unnecessary. The MAP-Reset to the real VLR-F by the faulty Signal Gateway's recovery procedure will be sufficient to automatically obtain the HLR data.

Figure 60:
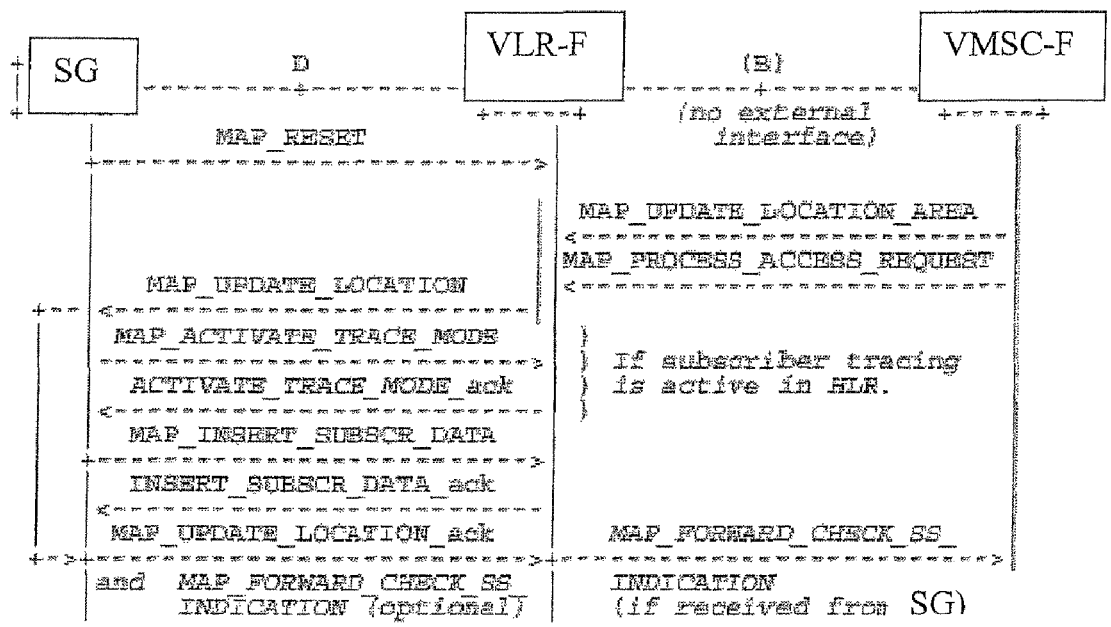
FIG. 60 is a signal flow diagram for Signal Gateway (SG) recovery, under an embodiment.

FIG. 60 is a signal flow diagram for Signal Gateway (SG) recovery, under an embodiment. Regarding recovery of the Signal Gateway, when the VLR fails, the VLR issues MAP-Restore on an affected IMSI. For MAP-Restore on a SIMM IMSI, the Signal Gateway simply relays the message to the corresponding HLR-H. Similarly when HLR fails, MAP-Reset will be issued to the Signal Gateway when the SIMM subscriber registers at FPMN. The Signal Gateway thus relays the MAP-Reset message to the real VLR-F.

Now after a recovery/restart operation of the Signal Gateway, all roaming records affected in the system are marked as "Not Updated". For all SIMM subscribers, the Signal Gateway issues a SRI-SM using SCCP Called Party Address as MSISDN-H. The HLR returns the IMSI and MSC address. If the MSC address is not in FPMN, the corresponding record in the Signal Gateway is deleted. If the MSC address is the Signal Gateway address, the corresponding record is marked as "Not Updated". This is because the only concern is for SIMM subscribers in FPMN. However the SRI-SM part could flood the HLR-Hs, it is only treated as an option and does not affect the overall recovery procedure.

For each IMSI of a "Not Updated" record, if the VLR address of the record is not null it is put in the set of Reset-VLR, and if the SGSN address of the record is not null it is put in the set of Reset-SGSN. For each VLR in Reset-VLR, the Signal Gateway issues a MAP-Reset to the VLR with SG as the HLR number in the MAP-Reset message. This causes the VLR-F to issue Updatelocation after radio contact is established. This also causes HLR-H to insertSubData to the Signal Gateway function. For each SGSN in Reset-SGSN, the Signal Gateway issues a MAP-Reset to the SGSN with SG as the HLR number in the MAP-Reset message. This causes the SGSN-F to issue UpdateGPRSlocation after radio contact is established. This also causes HLR-H to insertSubData to the Signal Gateway function.

Alternatively for each IMSI of a "Not Updated" record, the Signal Gateway issues a MAP-Reset to the VLR if the VLR field is not empty and issues a MAP-Reset to the SGSN if the SGSN field is not empty. In both cases, either HLR number or HLR number list containing the IMSI could be used in the MAP-reset message. This causes the VLR-F/SGSN-F to issue Updatelocation/UpdateGPRSlocation after radio contact is established. This also causes HLR-H to insertSubData to the Signal Gateway function.

Unlike a real VLR, upon receipt of a MAP_PROVIDE_ROAMING_NUMBER indication from a HLR-H for an IMSI that is unknown in the SG's roamer record, the Signal Gateway simply issues error ack back to the HLR-H. If the IMSI is known, since there is no status indicator at the Signal Gateway, the Signal Gateway issues PRN to the real VLR-F if known. After that, normal restoration procedure and status indicator management at the real VLR-F occurs.

The SG restoration procedure results in updating of VMSC-F number, VLR-F number, SGSN number and, if provided by the VLR-F, LMSI in the SG. Consistency of subscriber data that are stored in the VLR-F for an MS that has been affected by a SG fault with the subscriber data stored in the SG for this MS is achieved.

As an implementation option, a notification can be forwarded to the MS to alert the subscriber to check the parameters for supplementary services that allow subscriber controlled input (MAP_FORWARD_CHECK_SS_INDICATION service). If the VLR-F or SGSN-F receives this notification from the SG it shall forward the notification to the MS. The figure below illustrates the signaling sequence for SG restoration.

After a restart, the Signal Gateway performs the following actions for the subscriber data records that have been affected by the SG fault, but is not so limited: reload the all roamer data from a non-volatile back up; if the MAP_FORWARD_CHECK_SS_INDICATION service is required, mark each subscriber record "SS Check Required" by setting the "Check SS" indicator; and send a MAP_RESET request to the VLR-Fs or SGSNs where its MSs are located.

The MAP_RESET request contains the SG number and optionally the HLR Identity List. When receiving a MAP_RESET indication, the VLR-F derives all involved MSs of that SG either from the HLR Identity List (if present) or from the SG number. The VLR-F will then mark these MSs with the indicator "Location Information Confirmed in HLR" set to "Not Confirmed" and will deactivate all subscriber tracings for these MSs.

The status "Not Confirmed" of the indicator "Location Information Confirmed in HLR" causes the VLR-F to invoke the MAP_UPDATE_LOCATION service after establishment of authenticated radio contact with the MS concerned.

When the MAP_UPDATE_LOCATION procedure is performed, after receipt of the MAP_UPDATE_LOCATION acknowledgement containing the SG number, the status of the indicator "Location Information Confirmed in HLR" is changed to "Confirmed".

If the MAP_UPDATE_LOCATION procedure is unsuccessful for any reason, the status of the indicator "Location Information Confirmed in HLR" remains unchanged except for the case that the IMSI record in the VLR-F is deleted because either of the errors "Unknown Subscriber" or "Roaming Not Allowed" has been received from the SG in response to a MAP_UPDATE_LOCATION request.

For "Not Updated" records, if Signal Gateway receives an Update Location message, the MSC and VLR addresses are extracted, stored in the Signal Gateway and the record status is changed to "Updated". A log of recovery messages attempted and received is generated.

5.5. Compliance

The Signal Gateway of an embodiment complies with the following key specifications, but is not so limited: 3GPP TS 09.02 v7.7 R1999/3GPP TS29.002; Q711-716 SCCP; Q761-764 Q767; 3GPP TS 23.003 V3.9.0 (2001 June); GSM 03.60 version 6.6.1 Release 1997; GSM 03.90 version 7.0.0 Release 1998; GSM 03.40 version 7.4.0 Release 1998/3GPP TS03.40 V7.5.0 (2001 December); GSM 03.18 version 6.6.0 Release 1997/3GPP TS 23.018 V3.10.0 (2002 January); and OFTA spec 2202/2204.

The Signal Gateway handles the mapping between the MSISDN-H stored in HPMN HLR and the MSISDN-F stored in the Signal Gateway function. There are many data services (circuit switch, HSCSD, GPRS) which may not involve the MSISDN, and there are SS and USSD services which reach the HPMN real HLR according to the IMSI. In these situations, the Signal Gateway function either relays signals to the real destinations at the first interaction (where subsequent interactions are directly between the two parties without further participation from the Signal Gateway), or maps them to the real destination by initiating a new transaction and subsequent iterations pass through the Signal Gateway function.

Table 45 includes the procedures handled by the Signal Gateway of an embodiment.

TABLE 45

| Message |
| --- |
| MAP_Send_Routing_Info_For_SM request |
| MAP_Send_Routing_Info_For_SM response |
| MAP_Forward_Short_Message MO-request |
| MAP_Forward_Short_Message MO-response |
| MAP_Forward_Short_Message MT-request |
| MAP_Forward_Short_Message MT-response |
| MAP_Report_SM_Delivery_Status request |
| MAP_Report_SM_Delivery_Status response |
| MAP_Ready_For SM request |
| MAP_Ready_For_SM response |
| MAP_Alert_Service_Centre request |
| MAP_Alert_Service_Centre reposnse |
| MAP_Activate_Trace_Mode request |
| MAP_Activate_Trace_Mode response |
| MAP_Deactivate_Trace_Mode request |
| MAP_Dectivate_Trace_Mode response |
| MAP_Purge_MS request |
| MAP_Purge_MS response |
| MAP_Send_Authentication_Info request |
| MAP_Send_Authentication_Info response |
| MAP_Delete_Subscriber_Data request |
| MAP_Delete_Subscriber_Data response |
| MAP_Register_SS request |
| MAP_Register_SS response |
| MAP_Activate_SS request |
| MAP_Activate_SS response |
| MAP_Deactivate_SS request |
| MAP_Deactivate_SS response |
| MAP_Interrogate_SS request |
| MAP_Interrogate_SS response |
| MAP_Purge_MS request |
| MAP_Purge_MS response |
| MAP-Reset request |
| MAP-Restore request |
| MAP-Restore response |
| MAP-Forward-SS Check indication |
| MAP-UpdateGPRSLocation |
| MAP-Register-CC entry |
| MAP-Erase-CC entry |
| MAP-processUSSDrequest |
| MAP-UssdRequest |
| MAP-SSInvokeNotify |
| etc |

In summary, all MAP messages going through the Signal Gateway are not affected by the Signal Gateway for the normal services. For ISUP messages, the Signal Gateway is compliant with OFTA-2202-3 and 2204.

5.6. GPRS

The GPRS service of SIMM subscribers is not affected by the Signal Gateway function. Since UpdateGPRSLocation is routed with CdPA=MGT-of-IMSI-H by the SGSN-X, when the message reaches the GMSC-H, GMSC-H's GTT will direct the message to a Signal Gateway. If the Signal Gateway function completely fails, the HLR-H that corresponds to the MGT of IMSI-H will be selected as a result of the backup configuration at GMSC-H's GTT configuration.

Assuming a Signal Gateway is chosen by the GMSC-H's GTT, the Signal gateway will not modify the CgPA address but the CdPA to the GT of the HLR-H corresponding to the MGT of IMSI-H without issuing a new transaction between the Signal Gateway and the HLR-H when the subscriber is not registered at the FPMN. Subsequent interactions are directly between HLR-H and SGSN-X. Future transactions initiated by SMSC/HLR such as SRI-SM or by HLR such as Cancel-Location will not involve the SG.

However, if the subscriber registers at the FPMN, the Signal gateway modifies the CgPA address to the SG and the CdPA to the GT of the HLR-H corresponding to the MGT of IMSI-H by issuing a new transaction between the Signal Gateway and the HLR-H. In particular, the SG becomes the SGSN number to HLR-H. The HLR-H interacts with the SG and subsequently with SGSN-F (e.g., insertSubData, acks, etc.) in their corresponding transaction contexts.

When CancelLocation is issued by HLR-H due to an UpdateGPRSLocation from another SGSN, the message is sent directly to the SG which then maps to the real SGSN-F by issuing a new transaction. When SRI-SM with GPRS support indicator issued by a SMSC to HLR-H that also supports GPRS, then the SG will be returned as the SGSN node to the SMSC which then forwards the message to the SG which forwards the message in turn to the real SGSN.

In other words, the behavior of GPRS MAP signaling will be very similar to the voice and SMS signaling except that the SGSN plays the role of VMSC or VLR and hence the Signal Gateway doubles as the SGSN when the mobile station registers with GPRS at FPMN.

Table 46 shows the case of updateGPRSLocation by SGSN-F and SRI-SM by a SMSC that supports GPRS. SGSN SSN is 1001-0101 or 95 BCD.

TABLE 46

| updateGPRSLoc from SGSN-F to the Signal Gateway function via GMSC-H GTT | | Message Signal Gateway to HLR-H via GMSC-H | |
|---|---|---|---|
| SCCP Called Address: | | SCCP Called Address: | |
| GT: | MGT-H | GT: | HLR-H |
| SSN: | 6 | SSN: | 6 |
| TT: | 0 | TT: | 0 |
| SCCP Calling Address: | | SCCP Calling Address: | |
| GT: | SGSN-F | GT: | SG/SGSN-GT |
| SSN: | 95 | SSN: | 95 |
| TT: | 0 | TT: | 0 |
| MAP level parameters: | | MAP level parameters: | |
| SGSN: | SGSN-F | SGSN: | SG/unchanged |

Note however since SMS will be forwarded to whatever the HPMN-HLR will return when it receives a SRI-SM (MSISDN-H), then when SIMM subscriber registers at a FPMN via SGSN, the Signal Gateway can present according to one of the following options: the Signal Gateway presents its HPMN GT to a HPMN HLR for SGSN imitations; the Signal Gateway presents its FPMN GT to a HPMN HLR for SGSN imitations in which case, the FPMN STP is configured to translate the FPMN GT in CdPA to the HPMN GT of the Signal Gateway; the GT of SGSN-F are passed transparently to HPMN HLR without any change (the calling GT of SGSN-F is unchanged when relayed to the HLR-H) (Insert-SubData is communicated directly with the SGSN GT and the signal gateway is bypassed) (recommended).

Table 47 shows the signal translations when the Signal Gateway presents its HPMN GT to a HPMN HLR for SGSN imitations.

TABLE 47

| Insert Subscriber Data from HLR-H | | Message from Signal Gateway to SGSN-F via GMSC-H | |
|---|---|---|---|
| SCCP Called Address: | | SCCP Called Address: | |
| GT: | SG | GT: | SGSN-F |
| SSN: | 95 | SSN: | 95 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| MSISDN: | MSISDN-H | MSISDN: | MSISDN-H |

The message is routed to the FPMN SGSN-F. The SCCP Calling Party Address is replaced with the Signal Gateway GT. This guarantees that when the reply for this message is sent, the GMSC-H can route it to the Signal Gateway. Note that unlike UpdateLoc at FPMN, the Signal Gateway does not change MSISDN-H to MSISDN-F.

Figure 61:
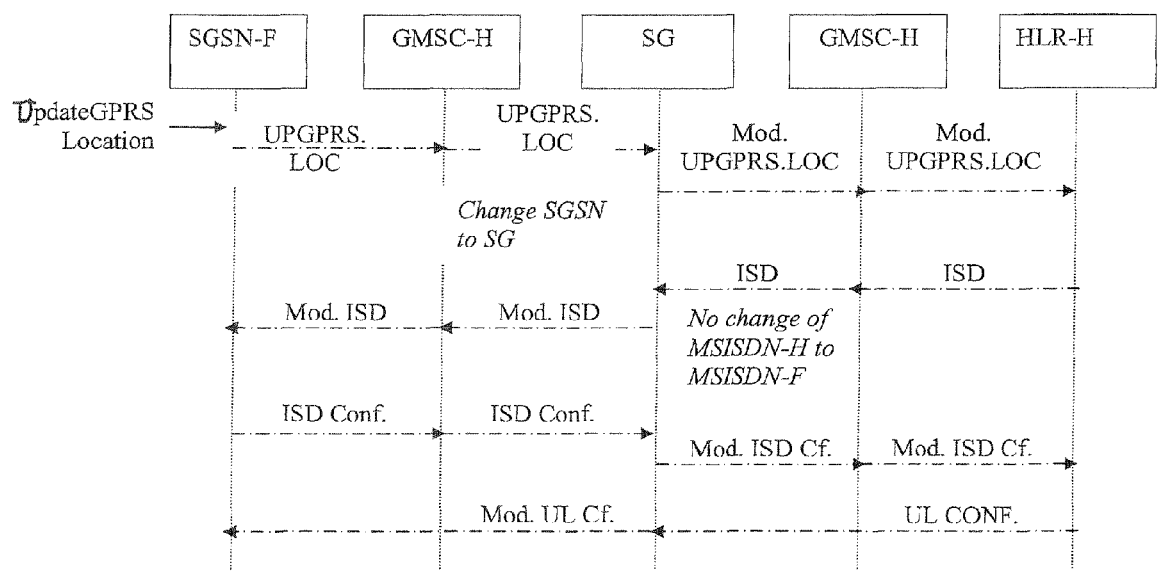
FIG. 61 is a signal flow diagram for use of a Signal Gateway (SG) with General Packet Radio Service, under an embodiment.

FIG. 61 is a signal flow diagram for use of a Signal Gateway (SG) with General Packet Radio Service, under an embodiment.

Note that F-SG is not used to represent the SGSN at the HLR-H when the Signal Gateway is presenting itself to HLR-H for updateGPRSLocation. This is because the SGSN will be returned to the SMSC that supports GPRS in which case SMSC will not be able to route if SGSN is F-SG, and because the VLR address is still F-SG which really influences the insertSubData parameters while roaming.

For GPRS service, there may also be combined IMSI/GPRS attachment involving combined location and routing area update. However since this involves two separate updates from VLR an SGSN to HLR respectively, the Signal Gateway can distinguish when to swap the MSISDN-H by MSISDN-F when the SIMM subscriber is registering in FPMN.

The combined update is achieved by an association created between SGSN and MSC/VLR to provide for interactions between SGSN and MSC/VLR. The association is created when the VLR stores the SGSN number and the SGSN stores the VLR number. The association is used for coordinating MSs that are both GPRS-attached and IMSI-attached. The association supports the following actions: IMSI attach and detach via SGSN (this makes combined GPRS/IMSI attach and combined GPRS/IMSI detach possible, thus saving radio resources); coordination of LA update and RA update, including periodic updates, thus saving radio resources (a combined RA/LA update is sent from the MS to the SGSN, and the SGSN forwards the LA update to the VLR); paging for a CS connection via the SGSN; alert procedures for non-GPRS services; identification procedures; MM Information procedures.

The SGSN-MSC/VLR association is created at the following occasions: combined IMSI/GPRS attachment; GPRS attachment when the MS is already IMSI-attached; combined RA/LA update when the MS performs IMSI attachment and is already GPRS-attached; and combined RA/LA update when an IMSI and GPRS-attached MS changes from an area of network operation mode II or III to an area of network operation mode I.

The association between SGSN and MSC/VLR is initiated by the SGSN. The SGSN creates an association by sending a BSSAP+ message concerning a particular MS to the VLR. To get the VLR number, the SGSN translates the current RAI to a VLR number via a translation table. During a CS connection, an MS in class-B mode of operation cannot perform GPRS attach nor routing area updates, only MSs in class-A mode of operation can perform these procedures. If a GPRS attach was made during a CS connection, the association shall be initiated by a combined RA/LA update after the CS connection has been released.

The association between SGSN and MSC/VLR is updated on the following occasions: when an MS changes VLR; and when an MS changes SGSN. The association is not updated during a CS connection.

When the MS is in idle mode (see GSM 03.22), the association between SGSN and MSC/VLR is updated with the combined RA/LA updates procedure.

Figure 62:
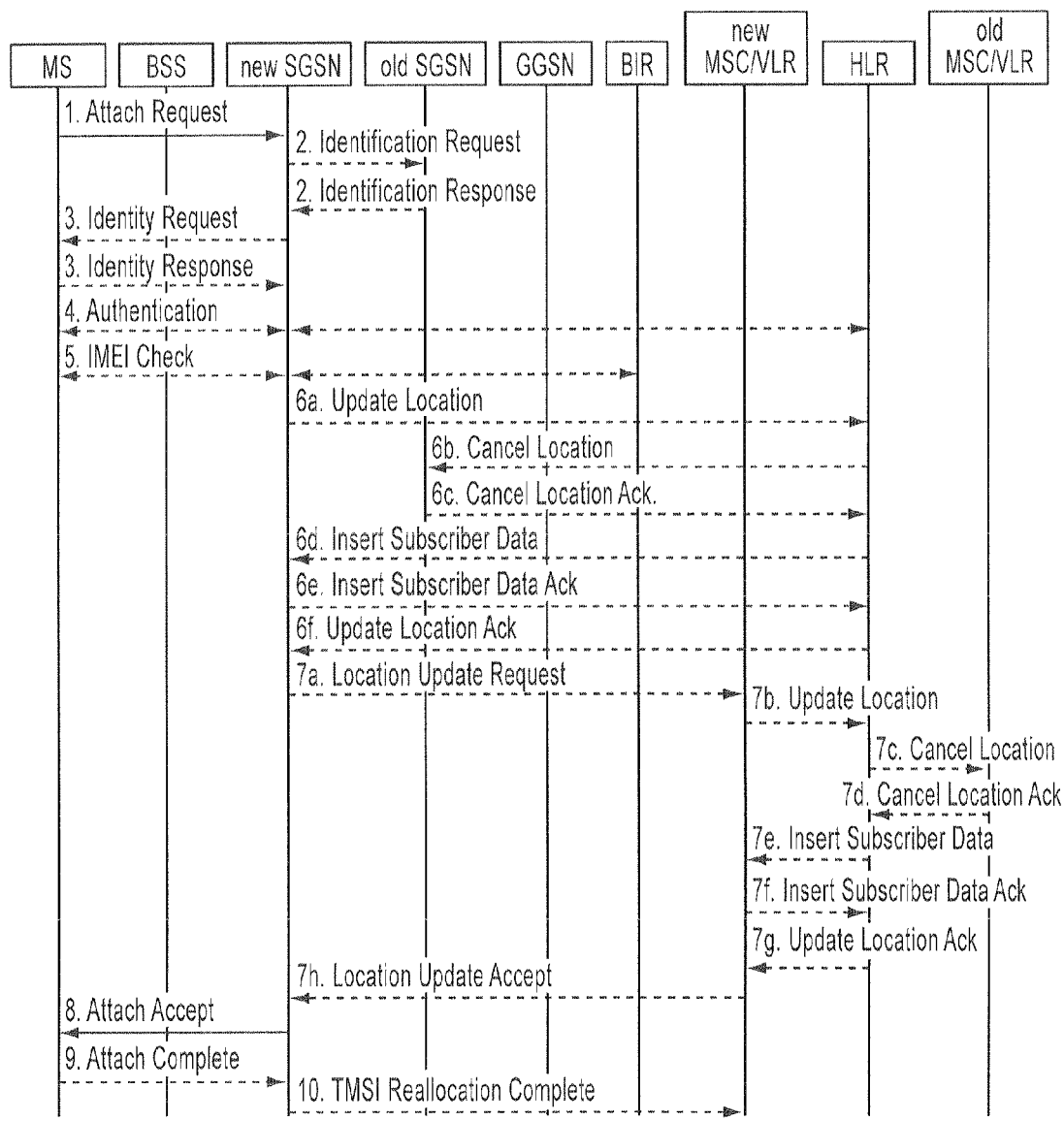
FIG. 62 is another signal flow diagram for use of a Signal Gateway (SG) with General Packet Radio Service, under an embodiment.

FIG. 62 is another signal flow diagram for use of a Signal Gateway (SG) with General Packet Radio Service, under an embodiment.

Now consider the MT SMS example to MSISDN-H when the subscriber is registered at SGSN-F. The SMSC-X (SMSC-H, SMSC-F or SMSC-V) issues an SRI-SM MSISDN-H with GPRS support to the HLR-H with GPRS support. The HLR-H has the address of the Signal Gateway as the SGSN and returns it in SRI-SM response. SMSC-X issues a FSM to the Signal Gateway. The Signal Gateway performs the translation as shown in Table 48.

TABLE 48

| MT FSM from SMSC-X | | Message from Signal Gateway to SGSN-F via GMSC-H | |
|---|---|---|---|
| SCCP Called Address: | | SCCP Called Address: | |
| GT: | SG | GT: | SGSN-F |
| SSN: | 8 | SSN: | 8 |
| TT: | 0 | TT: | 0 |
| SCCP Calling Address: | | SCCP Calling Address: | |
| GT: | SMSC-X | GT: | SG |
| SSN: | 8 | SSN: | 8 |
| TT: | 0 | TT: | 0 |

The Sending SMSC address, the Sender address and the recipient address in the MAP message are left unchanged. Note that the SCCP Calling Address has also been changed and hence the response also goes through the Signal Gateway as shown in Table 49.

TABLE 49

| MT FSM Response from SGSN-F | | Message from Signal Gateway to SMSC-X via GMSC-H | |
|---|---|---|---|
| SCCP Called Address: | | SCCP Called Address: | |
| GT: | SG | GT: | SMSC-X |
| SSN: | 8 | SSN: | 8 |
| TT: | 0 | TT: | 0 |

TABLE 49-continued

| MT FSM Response from SGSN-F | | Message from Signal Gateway to SMSC-X via GMSC-H | |
|---|---|---|---|
| SCCP Calling Address: | | SCCP Calling Address: | |
| GT: | SGSN-F | GT: | SG |
| SSN: | 8 | SSN: | 8 |
| TT: | 0 | TT: | 0 |

Figure 63:
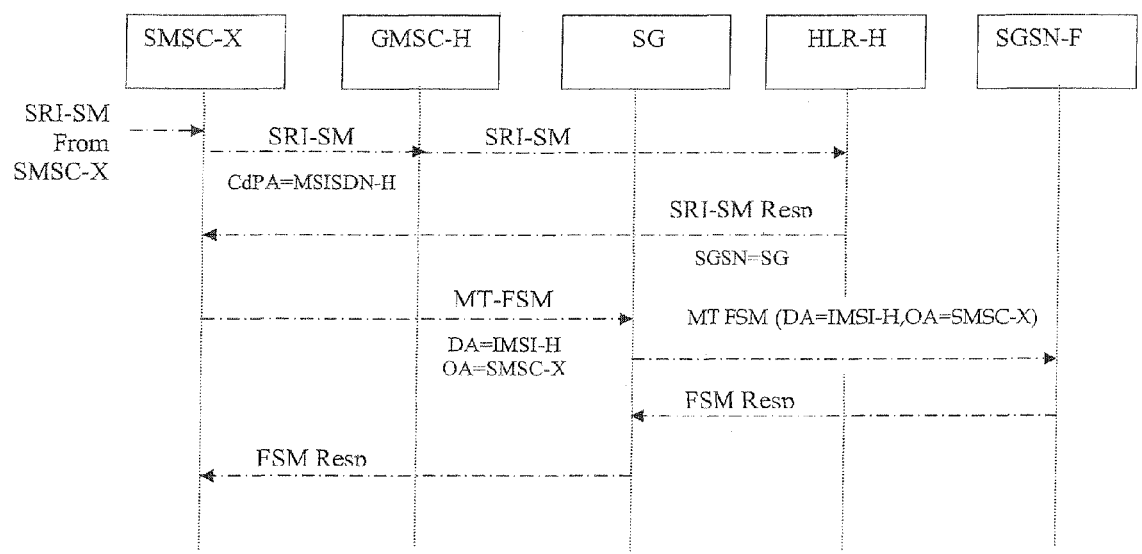
FIG. 63 is yet another signal flow diagram for use of a Signal Gateway (SG) with a General Packet Radio Service (GPRS), under an embodiment.

FIG. 63 is yet another signal flow diagram for use of a Signal Gateway (SG) with a General Packet Radio Service (GPRS), under an embodiment. The Signal Gateway generates a CDR for this transaction and can be used to apply special charges/discounts. SGSN-F MT SMS CDR is used for SMS Inter-working settlement. Special rates may be negotiated for the specific HPMN IMSI range for Multiple MSISDN subscriber.

5.7. Send Authentication, USSD and Supplementary MAP Services

All MAP messages on Authentication services, supplementary services and USSD services are based on IMSI. They can be initiated by MS, e.g., a MO call can trigger for authentication service. These services are conducted between VMSC and VLR, between VLR and HLR, and between HLR and SCF. Since the Signal Gateway is only a virtual HLR/VLR/GMSC/VMSC, the only time the Signal Gateway will be involved is between VLR and HLR communication.

When the MAP messages on Send-Authentication, supplementary services and USSD services are routed on MGT between a VLR-X and HLR-H through HPMN where X is not a FPMN network, they are redirected to the Signal Gateway function based on GTT on MGT at the GMSC-H. The selected Signal Gateway relays the messages to HLR-H that corresponds to the MGT by replacing the called MGT with the corresponding HLR-H GT without changing the calling party global title.

Since there is no CgPA change, the transaction initiated by the VLR-X can still be retained by the Signal Gateway function without the need to initiate a new transaction dialog towards the other party. After the initiating transaction, subsequent interactions within the same transactional dialog will be directly between HLR and VLR. Therefore, the Signal Gateway function is not involved in the transaction after the initiating transaction. Thus all services regarding Send-Authentication, SS, USSD can proceed as normal services not affected by the SIMM service.

However, when the SIMM subscriber is at a FPMN network, the Signal Gateway function will become the HLR to the VLR-F. Hence MAP communications such as Authentication, supplementary and USSD services will be between VLR-F and SG. So when the SG forwards these services to HLR-H, the SG presents its FPMN SG to the HLR-H so that corresponding HLR procedures might be performed. For example, if a subscriber is not allowed to make changes to call forwarding numbers while roaming, the SG presents the FPMN SG to HLR. However on the return path back to the VLR-F, SG presents the HPMN GT or more precisely the GT with which the VLR-F initially communicated.

Following is an example using the RegisterSS, with reference to Table 50.

TABLE 50

| RegisterSS from VLR-F | | | Message from Signal Gateway1 to HLR1 | |
|---|---|---|---|---|
| SCCP Called Address: | | | SCCP Called Address: | |
| GT: | SG1 | | GT: | HLR1-H |
| SSN: | 6 | | SSN: | 6 |
| TT: | 0 | | TT: | 0 |
| SCCP Calling Address: | | | SCCP Calling Address: | |
| GT: | VLR-F | | GT: | F-SG1 |
| SSN: | 7 | | SSN: | 7 |
| TT: | 0 | | TT: | 0 |

The reason that F-SG1 is introduced is because HPMN HLR procedure could be based on the subscriber network location. For example, sometimes call forwarding and call barring services registration may be not allowed while roaming. However if HPMN regards the FPMN as an extension of its network so as not to treat the subscriber as a roamer when registered at the FPMN, then there is no need to distinguish HPMN SG and FPMN F-SG for this particular FPMN.

If the HLR procedures can be configured based on VLR GT ranges, then there will not be a need to assign two types of GTs (HPMN and FPMN) to a Signal Gateway. The HPMN GTs of the Signal Gateways are simply regarded as roaming GTs by the HLR procedure configuration. As a result, for a Signal Gateway, its FPMN GT will be the same as its HPMN GT. For example, to support national roaming, a HLR is configured to indicate which address is a roaming GT. The SG GT can be configured like a roaming GT as if it is a roaming GT in national roaming.

Alternatively, if the HPMN network wants to regard a FPMN network as if it is an extended home network, then there is no need for the FPMN type of GT for the Signal Gateway function for the FPMN network as shown in Table 51.

TABLE 51

| RegisterSS from HLR-H | | | Message from Signal Gateway to VLR-F via GMSC-H | |
|---|---|---|---|---|
| SCCP Called Address: | | | SCCP Called Address: | |
| GT: | F-SG1 | | GT: | VLR-F |
| SSN: | 7 | | SSN: | 7 |
| TT: | 0 | | TT: | 0 |
| SCCP Calling Address: | | | SCCP Calling Address: | |
| GT: | HLR1-H | | GT: | SG1 |
| SSN: | 6 | | SSN: | 6 |
| TT: | 0 | | TT: | 0 |

The message is routed to the FPMN VLR. SCCP Calling Party Address is replaced with the Signal Gateway GT. This guarantees that when the reply for this message is sent, GMSC-H can route it to the Signal Gateway.

Figure 64:
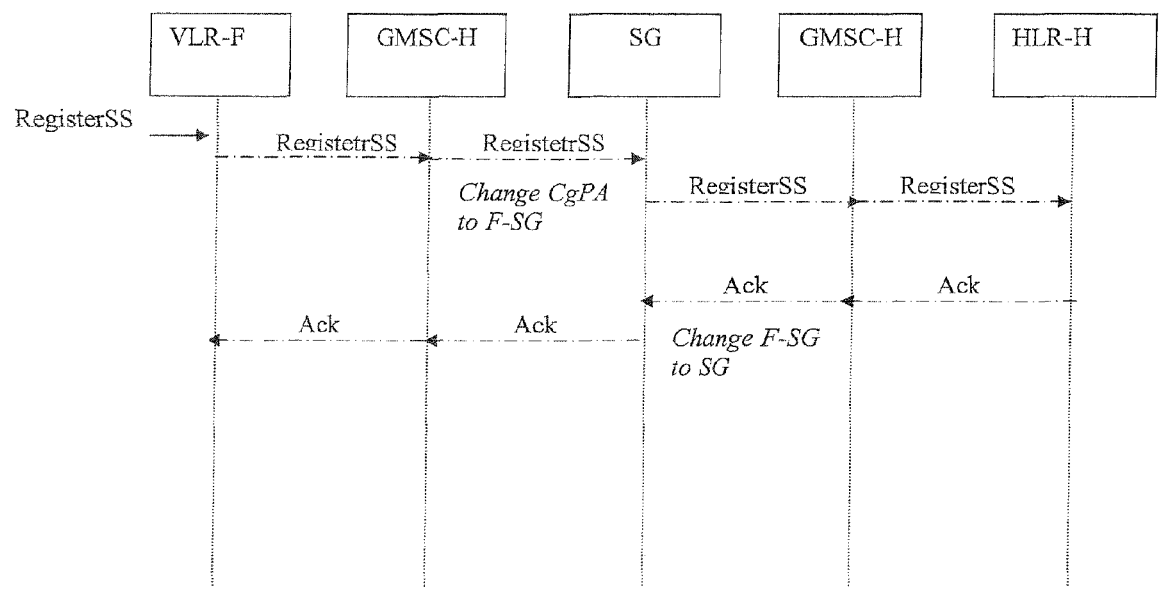
FIG. 64 is a signal flow diagram for use of a Signal Gateway (SG) in the transfer of Message Application Part (MAP) messages on Send-Authentication, Unstructured Supplementary Service Data (USSD) and supplementary MAP services, under an embodiment.

FIG. 64 is a signal flow diagram for use of a Signal Gateway (SG) in the transfer of Message Application Part (MAP) messages on Send-Authentication, Unstructured Supplementary Service Data (USSD) and supplementary MAP services, under an embodiment.

The MAP-Process-USSD request is the only one in which the content may be modified where the optional MSISDN-F parameter in the MAP message from FPMN is changed to MSISDN-H when the message is going through the Signal Gateway as shown in Table 52. This is because MSISDN-H may be used to address subscriber data in gsmSCF if the USSD is further sent by HLR to gsmSCF for processing.

TABLE 52

| ProcesssUSSD from VLR-F to the Signal Gateway function via GMSC-H GTT | | | Message from Signal Gateway to HLR-H via GMSC-H | |
|---|---|---|---|---|
| SCCP Called Address: | | | SCCP Called Address: | |
| GT: | SG | | GT: | HLR-H |
| SSN: | 6 | | SSN: | 6 |
| TT: | 0 | | TT: | 0 |
| SCCP Calling Address: | | | SCCP Calling Address: | |
| GT: | VLR-F | | GT: | VLR-F |
| SSN: | 7 | | SSN: | 7 |
| TT: | 0 | | TT: | 0 |
| MAP level parameters: | | | MAP level parameters: | |
| IMSI: | IMSI-H | | IMSI: | IMSI-H |
| MSISDN: | MSISDN-F | | MSISDN: | MSISDN-H |

Figure 65:
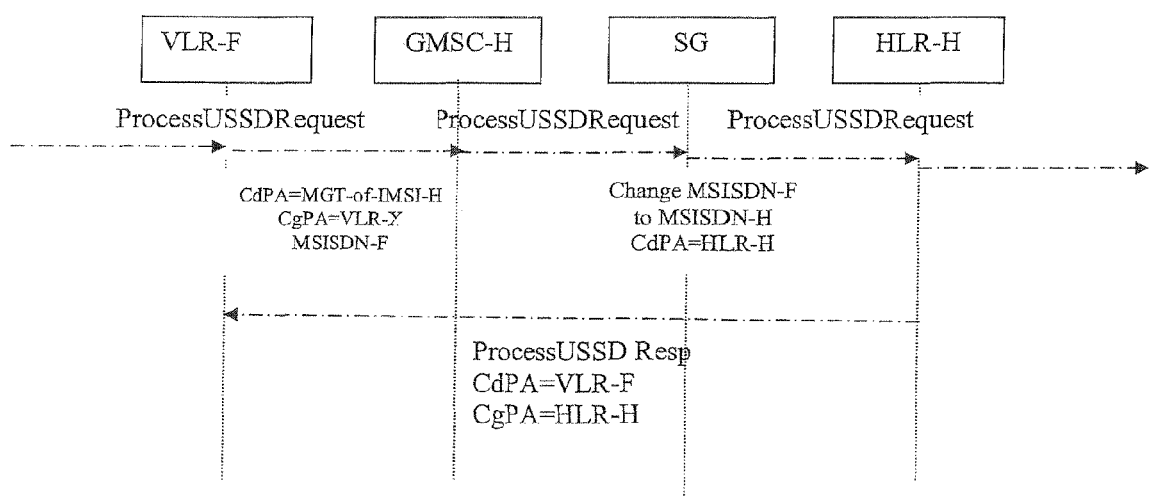
FIG. 65 is another signal flow diagram for use of a Signal Gateway (SG) in the transfer of Message Application Part (MAP) messages on Send-Authentication, Unstructured Supplementary Service Data (USSD) and supplementary MAP services, under an embodiment.

FIG. 65 is another signal flow diagram for use of a Signal Gateway (SG) in the transfer of Message Application Part (MAP) messages on Send-Authentication, Unstructured Supplementary Service Data (USSD) and supplementary MAP services, under an embodiment.

However, when a network-initiated USSD (e.g. USSDRequest, USSDNotify) is sent by the HLR directly towards a Signal Gateway which is treated as the VLR of the SIMM subscriber when the subscriber registers at FPMN, the Signal Gateway will not only modify the CdPA from the Signal Gateway to the real VLR-F but also the CgPA to the Signal Gateway in a new transaction, as shown in Table 53. The response from VLR-F to the Signal Gateway will be relayed by the Signal Gateway back to the HLR-H.

TABLE 53

| USSDRequest from HLR-H to the Signal Gateway function | | | Message from Signal Gateway to VLR-F | |
|---|---|---|---|---|
| SCCP Called Address: | | | SCCP Called Address: | |
| GT: | F-SG | | GT: | VLR-F |
| SSN: | 7 | | SSN: | 6 |
| TT: | 0 | | TT: | 0 |
| SCCP Calling Address: | | | SCCP Calling Address: | |
| GT: | HLR-H | | GT: | SG |
| SSN: | 6 | | SSN: | 7 |
| TT: | 0 | | TT: | 0 |

Figure 66:
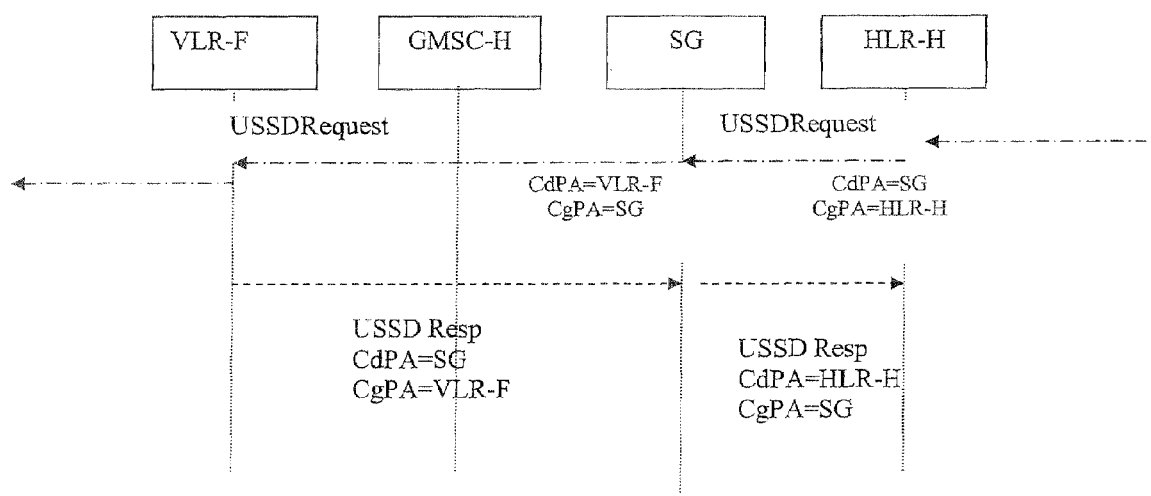
FIG. 66 is yet another signal flow diagram for use of a Signal Gateway (SG) in the transfer of Message Application Part (MAP) messages on Send-Authentication, Unstructured Supplementary Service Data (USSD) and supplementary MAP services, under an embodiment.

FIG. 66 is yet another signal flow diagram for use of a Signal Gateway (SG) in the transfer of Message Application Part (MAP) messages on Send-Authentication, Unstructured Supplementary Service Data (USSD) and supplementary MAP services, under an embodiment.

5.8. CSD/Fax

Since the IMSI is still a HPMN IMSI and no CSD/Fax related numbers get changed, these services will be same as a normal subscriber for SIMM subscribers.

5.9. MMS, IN, Camel and 3G

The MMS, IN, Camel, and 3G services are supported by the Signal Gateway (SG) of an embodiment. Since MMS roaming is based on GPRS roaming described above, MMS roaming service is transparent on top of GPRS. MSISDN-H is not changed at FPMN SGSN so MMSC and GPRS context set up need not make any modification or permission control on MSISDN-F.

When the SIMM subscriber is sending a MMS to a FPMN country number, the message goes to the home MMSC first. Unlike SMS messages that are delivered directly to recipients via home SMSCs, MMS messages are forwarded to the MMSCs of receiving operators in the FPMN (need not be the FPMN operator). This involves MMS interworking.

Furthermore, when the MMS subscriber of a sending operator in FPMN country sends a MMS to MSISDN-F of a SIMM subscriber, since the home MMSC of MSISDN-F is really MMSC-H, not MMSC-F, when MMSC-F receives the MMS message, it must route them via MMS-internetworking for the special range of MSISDN-F numbers.

The MMS-internetworking can be direct bilateral relationships or via MMS broker/MMS relay. In the former case, HPMN MMSC should arrange to direct MMS from SIMM subscribers via the broker/relay.

Figure 67:
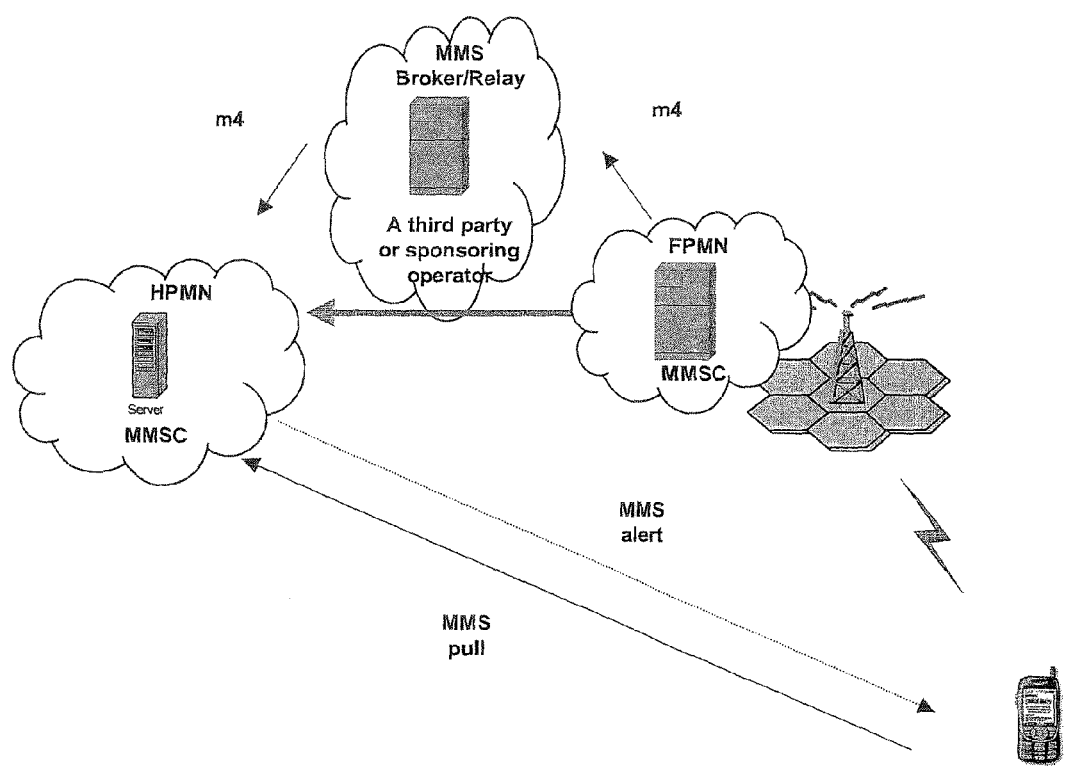
FIG. 67 is another signal flow diagram for use of a Signal Gateway (SG) with Multimedia Messaging Service, under an embodiment.

FIG. 67 is another signal flow diagram for use of a Signal Gateway (SG) with Multimedia Messaging Service, under an embodiment.

When MMS is sent by a SIMM subscriber to a FPMN country number via the MMS broker/relay, the sending MSISDN-H can be changed to MSISDN-F.

When MMS is sent to a SIMM subscriber's MSISDN-F, the MMSC-F is configured to route all these message destined to the special ranges of MSISDN-F via the MMS broker/relay which will then relay the message to MMSC-H after changing the destination address MSISDN-F to MSISDN-H.

5.10. Logging and Reports

The SIMM system of an embodiment includes logging functions in real-time on SS7 transaction history, roamer history, provisioning transactions, etc. Each can be turned on/off based on configuration options.

The system generates reports including, but not limited to: list of IMSI, MSISDN-H to MSISDN-F mapping and other subscriber data per FPMN configured in system; number of SS7 messages handled with details on individual message statistics (number of Update Location, Insert Subscriber Data, SRI, SRI-SM etc per FPMN); roamer statistics at FPMN such as average number of roamers in FPMN (can be divided down to provincial networks) at any time, average number of #FTN assigned at any time, average # of calls made and received through the Signal Gateway per subscriber, etc.; traffic report such as Call traffic and signaling message traffic; current number of MAP transactions and ISUP calls, and total number of these transactions in a hour; unsuccessful calls are also logged with reason of failure (the failure may be due to MAP signaling (e.g., error message is returned when SRI is sent to HLR) or ISUP (e.g. congestion, SIMM subscriber does not answer etc)).

The reports can be conducted daily, weekly and monthly. Customized reports can be built based on customer requirements.

For generating a monthly report, the daily log files are processed rather than holding the one-month data in the DB. Daily statistics are saved for use in calculating monthly statistics.

Transactional history data (such as MAP/IUSP transactions, roamer history information) is logged in separate disk drive from CDR data to improve drive-write performance even though both sets of data could be mirrored in each other's drive.

SRI and SRI-SM logs are in both transaction history data and in CDR data. When they are in CDR data, they use CDR format although a different call-type from the other call types (ROAM, FORW, SMS-MT etc). They will also have a separate DB table from other call types CDR.

There is also a configuration option ON/OFF to control whether ISUP/SMS unsuccessful calls are logged or not in the CDR data. However all transaction data is logged separately in the transaction history data.

Transaction logging based on transaction type (e.g., Send-Parameters no need to log, Location update yes, ISUP yes, SRI logging only OR-routed, provisioning transactions, maintenance transactions etc) can also be turned on/off based on switch options.

5.11. OAMP (Operation, Administration, Maintenance and Provisioning), Access Control and Overloading The SIMM system of an embodiment supports a provisioning interface (including browser and HTTP API, text file, XML file, stored procedures for DB, etc.) where the administrator can configure System configuration, Global Titles, Participating PMN based configuration, different pools of #s, OR-allow tables, etc. Mapping between MSISDN-H and MSISDN-F is also maintained using this interface. It is also possible to define network capabilities and specify the various FPMN that are participating in this service deployment. If the subscriber opts-out of the service, they should surrender their SIM cards even though they will be able to keep the same HPMN MSISDN (where number portability applies). The FPMN MSISDN will be quarantined.

The Signal Gateway provides a web interface for use by administrators in defining user groups and their associated rights on different operators of the Signal Gateway configurations. Only administrators are allowed direct access to the Signal Gateway function via a Unix system console.

The Signal Gateway publishes SNMP v1 traps in case of critical failures or warnings. The MIB also supports set and get SNMP methods to retrieve and set run-time information. System can be shutdown remotely, if required.

Components of the SIMM System monitor the critical processes of the system. If any process fails, the process is automatically restarted or the system switchovers to another node (if it is running in active-standby mode). Each node is dimensioned to support the total load. In case of switchover, the new node can take over the total load. There is a means to display the active-standby status of the system components.

Also, SIMM System displays the status of different physical interfaces. The interfaces cover the system signaling links for sending and receiving SS7 message, the ISUP loopback signaling and the external database. In case of major breakdown of these interfaces, alerts can be generated to a maintenance staff. If any in-service signaling links are down, there is a minor alarm. If all of them are down, there is a Critical alarm. The signaling links carry both MAP and ISUP messages. If the database connection fails (e.g., due to LAN failure, database shutdown, etc.), the system re-establishes the database connection when the database is up and generates an alarm to indicate DB connection is down.

The SIMM System also supports other performance and capacity related indications such as those relating to the CPU, memory, MAP transaction rate, BHCA and SS7 loading, etc.

Any call duration longer than a configurable timer, (e.g., 1 hour) will be specially handled. It can be continued with an alarm flag or released depending on a control flag.

The Signal Gateway function also tracks the transaction loading of the system. Alarms are generated when memory, CPU, and transaction rates exceed pre-specified thresholds.

In this case, the Signal Gateway can choose to reject certain type of SS7 messages, e.g., SMS, so that the sending SMSC can queue it at its end. The Signal Gateway can also reject messages based on FPMN. The Signal Gateway can also choose to relay for new LUP messages so the SIMM subscribers can be handled as normal roamers as if the Signal Gateway function fails; this relay can be applied based on FPMN during times of system overloading.

5.12. Call Detail Record

As described above, CDRs are generated for ISUP calls, SMSs and their associated MAP transactions. The CDRs are stored in the database after each call. For calls of long duration, periodic updates of the CDR in the DB also take place. Duplicated and missing CDRs are safe-guarded by a sequence number. Long records share the same sequence number but use additional intermediate sequence numbers to relate them.

CDR records are converted to files of any switch format based on the ASN.1 format of the switch CDR. Transmission of CDR files to external systems can be physically delivered or via FTP.

A separate billing related document is prepared in the CDR customization process. Key information elements captured in the call detail record are shown in Table 54, but the embodiment is not so limited.

TABLE 54

| S. No | Information Element |
|---|---|
| 1. | Call Type |
| 2. | Signal Gateway ID |
| 3. | Start Date [DD MM YY] |
| 4. | Start Time [HH MM SS] |
| 5. | Call Setup Duration [HH MM SS] |
| 6. | Effective Call Duration [HH MM SS] |
| 7. | Incoming Group/Trunk ID |
| 8. | Outgoing group/Trunk ID |
| 9. | Calling Party Details |
| 10. | Called Party Details |
| 11. | Backward Call Indicator |
| 12. | Forward Call Indicator |
| 13. | Call Reference |
| 14. | Additional Called Party Details |
| 15. | Call End Reason |
| 16. | IMSI |
| 17. | MSISDN-F |
| 18. | MSISDN-H |
| 19. | Originating SRI-issuing MSC |
| 20. | Terminating VLR |
| 21. | MSRN |
| 22. | #MSRN |
| 23. | FTN |
| 24. | #FTN |
| 25. | Original called party number |
| 26. | Original calling party number |
| 27. | SMSC |
| 28. | Message length |
| 29. | Terminating VMSC |
| 30. | Call Forwarding Reason |
| 31. | Intermediate Sequence # |
| 32. | Sequence number |
|  | Delivery time |
|  | etc |

The call type will indicate different CDR type, such as Roaming call, forwarding call, SRI, SRI-SM. Only MTC (call or SMS including call forwarding, call transfer, call re-routing due to roaming) types of records are generated. MO records (call or SMS), SUPS (supplementary services) and USSD service records are not the responsibilities of the Signal Gateway function.

The original called party number indicates whether MSISDN-F or MSISDN-H was originally called or SMSed. The originating SRI-issuing MSC indicates which network GMSC issued the SRI query so to determine where the call originates from FPMN or HPMN. The additional called party details are those captured in the IAM messages. The forwarding indicators might contain charge indicators.

The FTN and Call Forwarding Reason fields indicate whether call forwarding/transfer has taken place or not and whether it is early/unconditional/transfer call forwarding or late call forwarding. The SRI event can be configured to log only cases where optimal routing has been applied.

All MAP transactions and ISUP transactions can also be logged. All call/SMS records can also be generated for unsuccessful cases as well as successful ones depending on configuration options.

The CDR is customized based on HPMN mediation system requirements. The Signal Gateway CDRs can be mapped to the different call types (e.g., FORW for forwarding, ROAM for roaming, MO, transit, MO-SMS, LOCA for location update, HLRI for locating subscriber, etc.) of the HPMN CDR types. Other HPMN CDR specific parameters (e.g., tariff class, charging zone, charging type, call type, etc.) can also be deduced from the Signal Gateway CDRs.

5.12.1. IMSI/MSISDN-H/F Not Found in DB

A Location Update/processUSSD request/SS related message (routed by MGT) can be received by the SG, wherein the IMSI data is not present in the DB. This can happen when the subscriber de-subscribes the SIMM service but fails to replace the SIM card. In this situation there will be a configuration option for HPMN to select one of the two following actions: SG rejects the request; and SG passes the message to the HLR by modifying the SCCP called party address to HLR and keeping the VLR-F as the SCCP calling party address (there is a table which maps the IMSI range to the corresponding HLR; if the IMSI does not match it can map to a default HLR). An error log is generated under either option.

If the entire SG function goes down, a SIMM user location Update in FPMN has direct communication between the VMSC-F and HLR-H. After the SG is restored, the ProcesssUSSDRequest is routed to the SG. The MSISDN field is an optional field. If it is present, it contains MSISDN-H. In this case, SG modifies the SCCP called party address to HLR and keeps the VLR-F as the SCCP calling party address.

6. Hardware and Software Components

Various components can be used to provide the services described herein. The components include, for example, an Application Server, Database, SS7 cards, etc, but are not so limited.

Table 55 shows example specifications for hardware components used to host and run the SIMM Service for two FPMN operators and a total registered subscriber count of 50,000 assuming 30% of them are roaming at an FPMN at any point in time (15,000 simultaneous roaming subscribers of SIMM Service at FPMN), under an embodiment. The ASN.1 is from Objective Systems. Host-based protocol stacks include SCCP, ISUP etc.

TABLE 55

| S. No | Description | Qty | Comments |
|---|---|---|---|
| 1. | Sun Netra V480 with AC power<br>4 CPU each of 900 MHz<br>4 GB RAM<br>72 GB Disk space (2 Disks of 36 GB Mirrored)<br>For DB server 144 GB Disk space (mirrored) and 8 G RAM<br>6 PCI slots<br>Dual Ethernet NIC<br>19" rack mount kit<br>Tape Drive<br>CD-ROM Drive<br>Two 100-240 VAC power supplies | 4 | 2 app servers + 2 DB servers |
| 2. | Data kinetics (Intel) Quad E1 PCI SS7 board | 4 | Each card has 4 E1 links<br>2 card per app server |
| 3. | Board based SS7 protocol stacks (MTP1, MTP2 and MTP3) | 4 | |
| 4. | Host based SS7 protocol stack ISUP, SCCP CL (SCCP Connectionless) for Septel cards on Solaris 8 | 2 | 1 per host app server |
| 5. | Objective Systems ASN.1 run-time license | 2 | |
| 6. | Oracle 8.1.7 Enterprise Edition with fail-safe, TAF and replication support for 40 "Named User" license | 1 | Use 10 per processor. Have two systems with 4 CPU; hence 80 named user license |

Table 56 shows example specifications for hardware components used to host and run the SIMM Service for two FPMN operators and a total registered subscriber count of 20,000 assuming, under an embodiment.

TABLE 56

| S. No | Description | Qty | Comments |
|---|---|---|---|
| 1. | Sun Fire V-480 with AC power<br>2 CPU each of 900 MHz<br>2 GB RAM<br>2 * 36 GB Disk space (2 Disks of 36 GB Mirrored)<br>For DB server use 4 G RAM and 4X36 GM DB server<br>6 PCI slots<br>Dual Ethernet NIC<br>19" rack mount kit<br>Tape Drive<br>CD-ROM Drive<br>Two 100-240 VAC power supplies | 4 | 2 app servers and 2 DB servers |
| 2. | Data kinetics (Intel) Quad E1 PCI SS7 board | 2 | Each card has 4 E1 links |
| 3. | Board based SS7 protocol stacks (MTP1, MTP2 and MTP3) | 2 | |
| 4. | Host based SS7 protocol stack ISUP, SCCP CL (SCCP Connectionless) for Septel cards on Solaris 8 | 2 | |
| 5. | Objective Systems ASN.1 run-time license | 2 | |
| 6. | Oracle 8.1.7 Enterprise Edition with fail-safe, TAF and replication support for 40 "Named User" license | 1 | Use 10 per processor. Have two systems with 2 CPU; hence 40 named user license |

A SIMM System and method is provided that supports many Mobile Subscriber Integrated Service Digital Network (MSISDN) numbers on a mobile device. The SIMM System and Service is also referred to as Single IMSI Multiple MSISDN Service (SIMM). The system of an embodiment comprises: a mobile device including a Subscriber Identity Module (SIM) and an International Mobile Subscriber Identity (IMSI); a first Mobile Subscriber Integrated Service Digital Network (MSISDN) number for use in a first public mobile network; a second MSISDN number for use in a second public mobile network; and at least one signal gateway coupled among components of the first public mobile network and the second public mobile network, wherein the signal gateway couples calls between the SIM and the first public mobile network using the first MSISDN, wherein the signal gateway couples calls between the SIM and the second public mobile network using the second MSISDN.

At least one of the first MSISDN number and the second MSISDN number is permanently assigned to the SIM in the system of an embodiment.

At least one of the first MSISDN number and the second MSISDN number is temporarily assigned to the SIM in the system of an embodiment.

The first MSISDN number of an embodiment is a telephone number of the mobile device that is local to the first public mobile network.

The second MSISDN number of an embodiment is a telephone number of the mobile device that is local to the second public mobile network.

Components of the signal gateway of an embodiment map the first MSISDN number to the second MSISDN number.

The system of an embodiment includes at least one component of the signal gateway that provides at least one of a home location register (HLR), a visited location register (VLR), a gateway mobile switching center (GMSC), a visited mobile switching center (VMSC), a short message service center (SMSC), and a service node in at least one of the first public mobile network and the second public mobile network.

In the system of an embodiment the signal gateway is coupled to at least one first mobile switching center of the first public mobile network and is coupled to provide signal loop-back at the first mobile switching center, wherein the signal gateway couples to at least one component of the second public mobile network via the first mobile switching center.

The signal gateway of an embodiment is coupled to at least one second mobile switching center of the second public mobile network and is coupled to provide signal loop-back at the second mobile switching center, wherein the signal gateway couples to at least one component of the first public mobile network via the second mobile switching center.

The first public mobile network of an embodiment includes first and second mobile switching centers, wherein the at least one signal gateway includes first and second signal gateways coupled among the first and second mobile switching centers via couplings that support Signaling System Number 7 (SS7) protocols.

The first signal gateway of an embodiment couples to the first mobile switching center using a common signal point code. The first signal gateway also couples to the second mobile switching center using a first signal point code. The second signal gateway of an embodiment couples to the first mobile switching center using a second signal point code. Further, the second signal gateway couples to the second mobile switching center using the common signal point code.

The first signal gateway of another embodiment couples to the first mobile switching center using a first signal point code. The second signal gateway couples to the second mobile switching center using a second signal point code.

The second public mobile network of an embodiment includes third and fourth mobile switching centers, wherein the at least one signal gateway includes third and fourth signal gateways coupled among the third and fourth mobile switching centers via couplings that support Signaling System Number 7 (SS7) protocols.

The third signal gateway of the second public mobile network of an embodiment couples to the third mobile switching center using a common signal point code. The third signal gateway also couples to the fourth mobile switching center using a first signal point code. The fourth signal gateway couples to the third mobile switching center using a second signal point code; the fourth signal gateway also couples to the fourth mobile switching center using the common signal point code.

In the second public mobile network of another embodiment the third signal gateway couples to the third mobile switching center using a first signal point code and the fourth signal gateway couples to the fourth mobile switching center using a second signal point code.

The mobile device of the system of an embodiment includes at least one of cellular telephones, personal computers, portable computing devices, portable telephones, portable communication devices, subscriber devices or units, and personal digital assistants.

The SIMM System/Service of an embodiment comprises at least one of means for wireless communications, means for associating a single subscriber identity with the means for wireless communications, and means for coupling calls among the means for wireless communications and a first public mobile network using a first telephone number and for coupling calls among the means for wireless communications and a second public network using a second telephone number.

The system of an embodiment includes a wireless client device that includes one Subscriber Identity Module (SIM) having one assigned International Mobile Subscriber Identity (IMSI), and at least one signal gateway that supports use of two or more Mobile Subscriber Integrated Service Digital Network (MSISDN) numbers by the client device, wherein the signal gateway couples among at least one of first and second mobile switching centers, wherein the signal gateway couples calls between the client device and the first mobile switching center using a first MSISDN and couples calls between the client device and a second mobile switching center using a second MSISDN.

The SIMM System/Service of an embodiment includes a device comprising at least one signal gateway coupled among components of a first public mobile network and a second public mobile network, wherein the signal gateway couples calls between a mobile device and the first public mobile network using a first Mobile Subscriber Integrated Service Digital Network (MSISDN) number, wherein the signal gateway couples calls between the SIM and the second public mobile network using a second MSISDN, wherein the mobile device includes a single Subscriber Identity Module (SIM) and International Mobile Subscriber Identity (IMSI).

The first MSISDN number of the device of an embodiment is a telephone number of the mobile device that is local to the first public mobile network and the second MSISDN number is a telephone number of the mobile device that is local to the second public mobile network.

The signal gateway of an embodiment maps the first MSISDN number to the second MSISDN number.

The signal gateway of an embodiment provides at least one of a home location register (HLR), a visited location register (VLR), a gateway mobile switching center (GMSC), a visited mobile switching center (VMSC), a short message service center (SMSC), and a service node in at least one of the first and second public mobile networks.

The signal gateway of an embodiment is coupled to at least one first mobile switching center of the first public mobile network and is coupled to provide signal loop-back at the first mobile switching center, wherein the signal gateway couples to at least one component of the second public mobile network via the first mobile switching center.

The signal gateway of an embodiment is coupled to at least one second mobile switching center of the second public mobile network and is coupled to provide signal loop-back at the second mobile switching center, wherein the signal gateway couples to at least one component of the first public mobile network via the second mobile switching center.

The first public mobile network of an embodiment includes first and second mobile switching centers, wherein the at least one signal gateway includes first and second signal gateways coupled among the first and second mobile switching centers via couplings that support Signaling System Number 7 (SS7) protocols. An embodiment includes cross-connections between the first and second signal gateways and the first and second mobile switching centers.

The second public mobile network of an embodiment includes third and fourth mobile switching centers, wherein the at least one signal gateway includes third and fourth signal gateways coupled among the third and fourth mobile switching centers via couplings that support Signaling System Number 7 (SS7) protocols. An embodiment includes cross-connections between the third and fourth signal gateways and the third and fourth mobile switching centers.

The mobile device of an embodiment includes at least one of cellular telephones, personal computers, portable computing devices, portable telephones, portable communication devices, subscriber devices or units, and personal digital assistants.

The SIMM System/Service described herein includes at least one method for supporting multiple Mobile Subscriber Integrated Service Digital Network (MSISDN) numbers in a mobile device, comprising at least one of: connecting calls between the mobile device and a first public mobile network using a first MSISDN that is associated with the first public mobile network, wherein the mobile device includes a Subscriber Identity Module (SIM) with an International Mobile Subscriber Identity (IMSI); mapping the first MSISDN number to a second MSISDN number that is associated with a second public mobile network; and connecting calls between the client device and the second public mobile network using the second MSISDN via a coupling through the first public mobile network.

The IMSI of an embodiment is associated with the first public mobile network.

Connecting calls between the mobile device and the first public mobile network in an embodiment comprises coupling calls between the first public mobile network and the SIM via at least one signal gateway, wherein the signal gateway is coupled among components of the first public mobile network and the second public mobile network.

The first MSISDN number of an embodiment is a telephone number of the mobile device that is local to the first public mobile network and the second MSISDN number is a telephone number of the mobile device that is local to the second public mobile network.

Components of a signal gateway of an embodiment coupled to at least one of the first and second public mobile networks map the first MSISDN number to the second MSISDN number.

Connecting calls in an embodiment between the mobile device and each of the first and second public mobile networks includes coupling the first and second public networks using at least one signal gateway, wherein at least one component of the signal gateway provides at least one of a home location register (HLR), a visited location register (VLR), a gateway mobile switching center (GMSC), a visited mobile switching center (VMSC), a short message service center (SMSC), and a service node in at least one of the first public mobile network and the second public mobile network.

Connecting calls in an embodiment between the mobile device and each of the first and second public mobile networks includes coupling at least one signal gateway to at least one first mobile switching center of the first public mobile network to provide signal loop-back at the first mobile switching center, wherein the signal gateway couples to at least one component of the second public mobile network via the first mobile switching center.

Connecting calls in an embodiment between the mobile device and each of the first and second public mobile networks includes coupling at least one signal gateway to at least one second mobile switching center of the second public mobile network to provide signal loop-back at the second mobile switching center, wherein the signal gateway couples to at least one component of the first public mobile network via the second mobile switching center.

The mobile devices of the methods of an embodiment include at least one of cellular telephones, personal computers, portable computing devices, portable telephones, portable communication devices, subscriber devices or units, and personal digital assistants.

A computer readable medium is provided herein that includes executable instructions which, when executed, provide numerous Mobile Subscriber Integrated Service Digital Network (MSISDN) numbers in a mobile device, by: connecting calls between the mobile device and a first public mobile network using a first MSISDN that is associated with the first public mobile network, wherein the mobile device includes a Subscriber Identity Module (SIM) with an International Mobile Subscriber Identity (IMSI); mapping the first MSISDN number to a second MSISDN number that is associated with a second public mobile network; and connecting calls between the client device and the second public mobile network using the second MSISDN via a coupling through the first public mobile network.

Aspects of the SIMM system/service described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the SIMM system/service include: microcontrollers with memory (such as electronically erasable programmable read only memory (EEPROM)), embedded microprocessors, firmware, software, etc. Furthermore, aspects of the SIMM system/service may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the SIMM system/service is not intended to be exhaustive or to limit the system to the precise form disclosed. While specific embodiments of, and examples for, the SIMM system/service are described herein for illustrative purposes, various equivalent modifications are possible within the scope of the SIMM system/service, as those skilled in the relevant art will recognize. The teachings of the SIMM system/service provided herein can be applied to other processing systems and communication systems, not only for the SIMM system/service described above.

The elements and acts of the various embodiments described above can be combined to provide further embodiments. These and other changes can be made to the SIMM system/service in light of the above detailed description.

All of the above references and United States patents and patent applications are incorporated herein by reference. Aspects of the SIMM system/service can be modified, if necessary, to employ the systems, functions and concepts of the various patents and applications described above to provide yet further embodiments of the SIMM system/service.

In general, in the following claims, the terms used should not be construed to limit the SIMM system/service to the specific embodiments disclosed in the specification and the claims, but should be construed to include all processing and communication systems that operate under the claims to provide the SIMM system/service. Accordingly, the SIMM system/service is not limited by the disclosure, but instead the scope of the system is to be determined entirely by the claims.

While certain aspects of the SIMM system/service are presented below in certain claim forms, the inventor contemplates the various aspects of the system in any number of claim forms. For example, while only one aspect of the system is recited as embodied in computer-readable medium, other aspects may likewise be embodied in computer-readable medium. Accordingly, the inventor reserves the right to add additional claims after filing the application to pursue such additional claim forms for other aspects of the SIMM system/service.

What I claim is:

1. A communication system comprising:
a mobile device of a first public mobile network, the mobile device including a Subscriber Identity Module (SIM), the SIM having a single International Mobile Subscriber Identity in the first public mobile network (IMSI-H), wherein the first public mobile network has a Home Location Register (HLR) including a single HLR profile corresponding to the IMSI-H;
a first Mobile Subscriber Integrated Service Digital Network (MSISDN) number for use in the first public mobile network, the first MSISDN corresponding to the single HLR profile;
a second MSISDN number for use in a second public mobile network belonging to a network operator different from that of the first public mobile network, the second MSISDN corresponding to the single HLR profile; and
at least one signal gateway routing a first communication between the mobile device and the first public mobile network using the first MSISDN, and routing a second communication between the mobile device and the second public mobile network using the second MSISDN, wherein the at least one signal gateway routes the first and second communications using the single IMSI-H, and wherein the first public mobile network and the second public mobile network have a roaming agreement.

2. The system of claim 1, wherein at least one of the first MSISDN number and the second MSISDN number is permanently assigned to the SIM.

3. The system of claim 1, wherein at least one of the first MSISDN number and the second MSISDN number is temporarily assigned to the SIM.

4. The system of claim 1, wherein the at least one signal gateway is coupled to at least one first mobile switching center of the first public mobile network and is coupled to provide signal loop-back at the first mobile switching center, wherein the at least one signal gateway couples to at least one component of the second public mobile network via the first mobile switching center.

5. The system of claim 1, wherein the second public mobile network includes third and fourth mobile switching centers, wherein the at least one signal gateway includes third and fourth signal gateways coupled among the third and fourth mobile switching centers via couplings that support Signaling System Number 7 (SS7) protocols.

6. The system of claim 1, wherein the mobile device includes at least one of cellular telephones, personal computers, portable computing devices, portable telephones, portable communication devices, subscriber devices or units, and personal digital assistants.

7. The communication system of claim 1, wherein the first public mobile network is a Home Public Mobile Network (HPMN) and the second public mobile network is a Foreign Public Mobile Network (FPMN).

8. A communication system comprising:
means for wireless communications;
means for associating a single subscriber identity with the means for wireless communications; and
means for routing communication among the means for wireless communications and a first public mobile network using a first telephone number and for routing communication among the means for wireless communications and a second public mobile network using a second telephone number, wherein the communication is routed using a single subscriber identity;
wherein the single subscriber identity comprises a single International Mobile Subscriber Identity in the first public mobile network (IMSI-H),
wherein the first public mobile network has a Home Location Register (HLR) including a single HLR profile corresponding to the IMSI-H,
wherein the first telephone number and the second telephone number correspond to the single HLR profile, wherein the second public mobile network belongs to a network operator different from that of the first public mobile network, and wherein the first public mobile network and the second public mobile network have a roaming agreement.

9. A system comprising a wireless client device that includes:

one Subscriber Identity Module (SIM) having one assigned International Mobile Subscriber Identity in a first public mobile network (IMSI-H), and at least one signal gateway that supports use of two or more Mobile Subscriber Integrated Service Digital Network (MSISDN) numbers by the client device, wherein the at least one signal gateway couples among at least one of first and second mobile switching centers that correspond to the first public mobile network and a second public mobile network, respectively, wherein the at least one signal gateway routes communication between the client device and the first mobile switching center using a first MSISDN and routes communication between the client device and a second mobile switching center using a second MSISDN, wherein the communication is routed using the one IMSI-H, wherein the first public mobile network has a Home Location Register (HLR) including a single HLR profile corresponding to the IMSI-H, wherein the two or more MSISDN numbers correspond to the single HLR profile, wherein the second public mobile network belongs to a network operator different from that of the first public mobile network, and wherein the first public mobile network and the second public mobile network have a roaming agreement.

10. A device comprising:

at least one signal gateway coupled among components of a first public mobile network and a second public mobile network, wherein the at least one signal gateway routes communication between a mobile device and the first public mobile network using a first Mobile Subscriber Integrated Service Digital Network (MSISDN) number, wherein the at least one signal gateway routes communication between the mobile device and the second public mobile network using a second MSISDN, wherein the mobile device includes a single Subscriber Identity Module (SIM) and a single International Mobile Subscriber Identity in the first public mobile network (IMSI-H), wherein the first public mobile network has a Home Location Register (HLR) including a single HLR profile corresponding to the IMSI-H, wherein the first MSISDN and the second MSISDN correspond to the single HLR profile, wherein the second public mobile network belongs to a network operator different from that of the first public mobile network, and wherein the first public mobile network and the second public mobile network have a roaming agreement.

11. The device of claim 10, wherein the first MSISDN number is a telephone number of the mobile device that is local to the first public mobile network and the second MSISDN number is a telephone number of the mobile device that is local to the second public mobile network.

12. The device of claim 10, wherein the at least one signal gateway maps the first MSISDN number to the second MSISDN number.

13. A method for supporting multiple Mobile Subscriber Integrated Service Digital Network (MSISDN) numbers in a mobile device, comprising:

routing communication between the mobile device and a first public mobile network using a first MSISDN that is associated with the first public mobile network, wherein the mobile device includes a Subscriber Identity Module (SIM) with a single International Mobile Subscriber Identity in the first public mobile network (IMSI-H);

mapping the first MSISDN number to a second MSISDN number that is associated with a second public mobile network; and routing communication between the client device and the second public mobile network using the second MSISDN via a coupling through the first public mobile network using the single IMSI-H, wherein the first public mobile network has a Home Location Register (HLR) including a single HLR profile corresponding to the IMSI-H, wherein the first MSISDN and the second MSISDN correspond to the single HLR profile, wherein the second public mobile network belongs to a network operator different from that of the first public mobile network, and wherein the first public mobile network and the second public mobile network have a roaming agreement.

14. The method of claim 13, wherein the IMSI is associated with the first public mobile network.

15. The method of claim 13, wherein routing communication between the mobile device and the first public mobile network comprises routing communication between the first public mobile network and the SIM via at least one signal gateway, wherein the signal gateway is coupled among components of the first public mobile network and the second public mobile network.

16. A computer program readable storage medium including executable instructions encoded therein, which, when executed, provide numerous Mobile Subscriber Integrated Service Digital Network (MSISDN) numbers in a mobile device, by:

routing communication between the mobile device and a first public mobile network using a first MSISDN that is associated with the first public mobile network, wherein the mobile device includes a Subscriber Identity Module (SIM) with a single International Mobile Subscriber Identity in the first public mobile network (IMSI-H);

mapping the first MSISDN number to a second MSISDN number that is associated with a second public mobile network; and connecting calls between the client device and the second public mobile network using the second MSISDN via a coupling through the first public mobile network using the single IMSI-H;

wherein the first public mobile network has a Home Location Register (HLR) including a single HLR profile corresponding to the IMSI-H, wherein the first MSISDN and the second MSISDN correspond to the single HLR profile, wherein the second public mobile network belongs to a network operator different from that of the first public mobile network, and wherein the first public mobile network and the second public mobile network have a roaming agreement.

17. A communication system comprising:

a mobile device including a Subscriber Identity Module (SIM) and a single International Mobile Subscriber Identity in a first public mobile network (IMSI-H);

a first Mobile Subscriber Integrated Service Digital Network (MSISDN) number for use in the first public mobile network;
a plurality of second MSISDN numbers for use in at least one second public mobile network; and
at least one signal gateway coupled among components of the first public mobile network and the second public mobile network, wherein the at least one signal gateway routes communication between the SIM and the first public mobile network using the first MSISDN, wherein the at least one signal gateway automatically routes communication between the SIM and the second public mobile network using one of the plurality of second MSISDNs using the single IMSI-H,
wherein the first public mobile network has a Home Location Register (HLR) including a single HLR profile corresponding to the IMSI-H,
wherein the first MSISDN and the plurality of second MSISDNs correspond to the single HLR profile,
wherein the second public mobile network belongs to a network operator different from that of the first public mobile network, and
wherein the first public mobile network and the second public mobile network have a roaming agreement.

18. The system of claim 17, wherein at least one of the first MSISDN number and one of the plurality of second MSISDN numbers is permanently assigned to the SIM.

19. A method for supporting multiple Mobile Subscriber Integrated Service Digital Network (MSISDN) numbers in a mobile device, comprising:
routing communication between the mobile device and a first public mobile network using a first MSISDN number that is associated with the first public mobile network, wherein the mobile device includes a Subscriber Identity Module (SIM) with single International Mobile Subscriber Identity in the first public mobile network (IMSI-H);
mapping the first MSISDN number to one of a plurality of second MSISDN numbers that are associated with a second public mobile network; and
automatically routing communication between the client device and the second public mobile network using one of the plurality of second MSISDN numbers via a coupling through the first public mobile network using the single IMSI-H;
wherein the first public mobile network has a Home Location Register (HLR) including a single HLR profile corresponding to the IMSI-H,
wherein the first MSISDN and the plurality of second MSISDNs correspond to the single HLR profile,
wherein the second public mobile network belongs to a network operator different from that of the first public mobile network, and
wherein the first public mobile network and the second public mobile network have a roaming agreement.

20. A method for routing communication, the method comprising:
assigning a first Mobile Subscriber Integrated Service Digital Network (MSISDN) number to a mobile device for use in a first public mobile network, the mobile device having a Subscriber Identity Module (SIM) and a single International Mobile Subscriber Identity in the first public mobile network (IMSI-H), wherein the first public mobile network has a Home Location Register (HLR) including a single HLR profile corresponding to the IMSI-H;
assigning a second MSISDN number to the mobile device for use in a second public mobile network; and
optimally routing communication between the SIM and the second public mobile network using the second MSISDN and the single IMSI-H via a signal gateway, wherein the signal gateway is coupled among components of the first public mobile network and the second public mobile network;
wherein the first MSISDN number and the second MSISDN number correspond to the single HLR profile,
wherein the first MSISDN number is a telephone number of the mobile device that is local to the first public mobile network,
wherein the second MSISDN number is a telephone number of the mobile device that is local to the second public mobile network,
wherein the mobile device is roaming in the second public mobile network,
wherein the second public mobile network belongs to a network operator different from that of the first public mobile network, and
wherein the first public mobile network and the second public mobile network have a roaming agreement.

* * * * *